United States Patent
Loria

(10) Patent No.: US 11,294,645 B2
(45) Date of Patent: Apr. 5, 2022

(54) VISUAL VIRTUAL PROGRAMMING MACHINE FOR REAL-TIME INTERACTIVE CREATION, PLAYBACK, EXECUTION, INSPECTION AND MANIPULATION OF PROGRAMMING ELEMENTS

(71) Applicant: Gavriel Loria, New York, NY (US)

(72) Inventor: Gavriel Loria, New York, NY (US)

( * ) Notice: Subject to any disclaimer, the term of this patent is extended or adjusted under 35 U.S.C. 154(b) by 0 days.

(21) Appl. No.: 16/837,872

(22) Filed: Apr. 1, 2020

(65) Prior Publication Data
US 2020/0319856 A1 Oct. 8, 2020

Related U.S. Application Data

(60) Provisional application No. 62/828,305, filed on Apr. 2, 2019.

(51) Int. Cl.
*G06F 16/00* (2019.01)
*G06F 9/44* (2018.01)
(Continued)

(52) U.S. Cl.
CPC ............... *G06F 8/34* (2013.01); *G06F 3/011* (2013.01); *G06F 9/3017* (2013.01); *G06F 9/3836* (2013.01); *G06F 9/45558* (2013.01); *G06F 16/282* (2019.01); *G06F 8/31* (2013.01); *G06F 8/36* (2013.01); *G06F 8/42* (2013.01); *G06F 8/427* (2013.01); *G06F 8/443* (2013.01);
(Continued)

(58) Field of Classification Search
CPC ..... G06F 8/34; G06F 8/31; G06F 8/42; G06F 8/443; G06F 8/36; G06F 8/73; G06F 8/427; G06F 8/30; G06F 8/33; G06F 3/011; G06F 3/0482; G06F 3/048; G06F 9/3836; G06F 9/3017; G06F 9/4552; G06F 9/451; G06F 16/285; G06F 40/111
See application file for complete search history.

(56) References Cited

U.S. PATENT DOCUMENTS 5,341,466 A 8/1994 Perlin
6,097,888 A 8/2000 Simonyi
(Continued)

OTHER PUBLICATIONS

Richard Zanibbi et al., Recognizing Mathematical Expression Using Tree Transformation, Nov. 2002, [Retrieved on Dec. 14, 2021], Retrieved from the internet: <URL: https://ieeexplore.ieee.org/stamp/stamp.jsp?tp=&arnumber=1046157> 13 Pages (1455-1467) (Year: 2002).*

(Continued)

*Primary Examiner* — Anibal Rivera
(74) *Attorney, Agent, or Firm* — Fitch, Even, Tabin & Flannery LLP

(57) ABSTRACT

Systems and methods for real-time interactive graphical computing are disclosed. Methods include a system receiving a first user input, determining an executable instruction associated with the first user input, executing the instruction; and displaying, concurrent with the execution of the instruction, an associated executed instruction graphical representation for the executable instruction on the display, wherein the executed instruction graphical representation is a visual expression of the execution of the instruction. Systems and methods are also described for recording and creating programming instructions, as well as displaying graphical operations.

24 Claims, 76 Drawing Sheets

(51) Int. Cl.
*G06F 8/41* (2018.01)
*G06F 8/34* (2018.01)
*G06F 9/30* (2018.01)
*G06F 9/455* (2018.01)
*G06F 3/01* (2006.01)
*G06F 9/38* (2018.01)
*G06F 16/28* (2019.01)
*G06F 8/30* (2018.01)
*G06F 40/111* (2020.01)
*G06F 8/36* (2018.01)
*G06F 8/73* (2018.01)

(52) U.S. Cl.
CPC .............. *G06F 8/73* (2013.01); *G06F 9/4552* (2013.01); *G06F 40/111* (2020.01); *G06F 2009/45595* (2013.01)

(56) References Cited

U.S. PATENT DOCUMENTS

| | | | |
|---|---|---|---|
| 6,523,134 | B2 | 2/2003 | Korenshtein |
| 7,174,536 | B1* | 2/2007 | Kothari ............... G06F 11/3664 717/105 |
| 7,900,142 | B2 | 3/2011 | Baer |
| 2005/0081141 | A1 | 4/2005 | Jonsson |
| 2009/0178031 | A1 | 7/2009 | Zhao |
| 2012/0042242 | A1* | 2/2012 | Garland ................ G06F 40/111 715/256 |
| 2016/0124723 | A1 | 5/2016 | Ma |
| 2016/0342582 | A1* | 11/2016 | Hiatt ...................... G06F 16/285 |
| 2016/0350084 | A1 | 12/2016 | Waggoner |
| 2019/0005163 | A1* | 1/2019 | Farrell ..................... G06F 8/36 |

OTHER PUBLICATIONS

Algebra Touch by Regular Berry; http://www.regularberry.com/; 2016.
Dragon Box Algebra 12+; https://dragonbox.com; first released Apr. 2014.
Gulwani; "Dimensions in Program Synthesis"; Microsoft Research; Jan. 2010; 12 pages.
LaViola, Jr., et al.; "MathPad2: A System for the Creation and Exploration of Mathmatical Sketches"; Brown University; 2004 ACM; pp. 432-440.
Magma; current website https://magma.maths.usyd.edu.au/magma/documentation/; first release Aug. 1993; 2 pages.
Maple; current website https://www.maplesoft.com/products/maple/; first release Jan. 1982; 11 pages.
Max MSP; Cycling '74; https://cycling74.com/products/max; first paper published 1985; 13 pages.
Mayer et al.; "User Interaction Models for Disambiguation in Programming by Example"; Nov. 8-11, 2015; 2015 ACM; 11 pages.
MIT Scratch; https://scracth.mit.edu/; first published 2003; 2 pages.
Parabola; https://parabola.io/; 2018; 4 pages.
Raza et al.; "Programming by Example using Least General Generalizations"; published by Association for the Advancement of Artificial Intelligence; Jul. 2014; 8 pages.
Sage Math; current website https://www.sagemath.org/; first release Feb. 24, 2005; 1 page.
SymPy; current website https://www.sympy.org/en/index.html; first release 2007; 4 pages.
Wolfram Mathmatica; current website https://www.wofram.com/mathematica/; first release Jun. 23, 1988; 4 pages.
Yoon et al.; "Supporting Selective Undo in a Code Editor"; Carnegie Mellon University; Dec. 31, 2014; 11 pages; retrieved from: http://repository.cmu.edu/cgi/viewcontent.cgi?article=1307&context=hcii.
YouTube; "Algebra Touch"; https://www.youtube.com/watch?v=-txnFG_OHWI; Feb. 8, 2014; 3 pages.
YouTube; "Excel Macro Tutorial—Learn how macros can really speed up your work in Excel"; https://www.youtube.com/watch?v=-QHT6TEm3NE; Nov. 7, 2012; 2 pages.
YouTube; "Hands-On Math: a page-based multi-touch and pen desktop for technical work and problme solving"; https://www.youtube.com/watch?v=pYuDTOqFmqc; Jan. 20, 2011; 2 pages.
YouTube; "Learning to solve equations with the game DragonBox Algebra"; https://www.youtube.com/watch?v=uua7Xx5iCWw; Sep. 11, 2014; 2 pages.
YouTube;"Bret Victor—Inventing on Principle"; https://www.youtube.com/watch?v=PUv66718DII; Feb. 22, 2012; 2pages.
Zeleznik et al.; "Hands-On Math"; Brown University; Oct. 3-6, 2010; ACM 2010; 10 pages.

\* cited by examiner

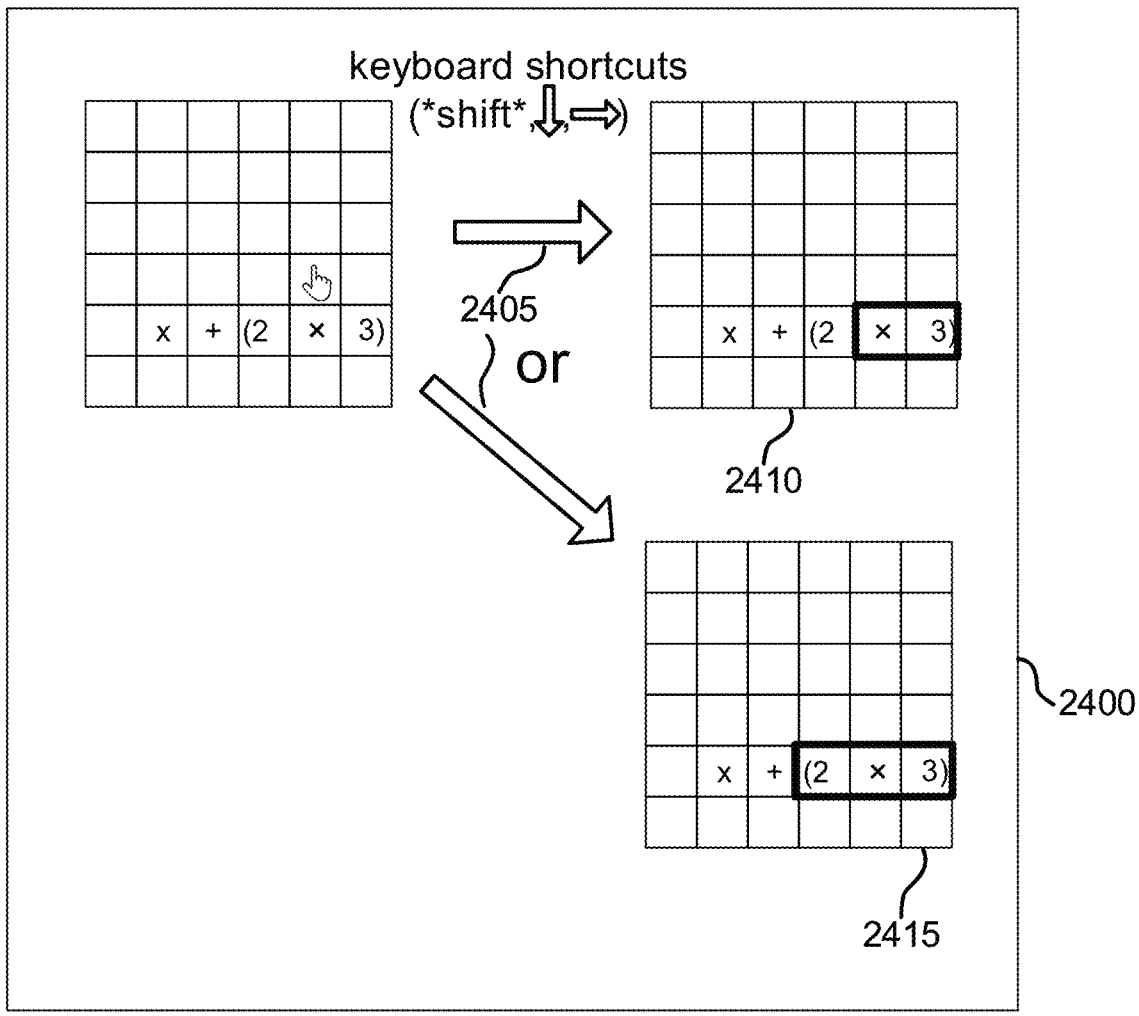
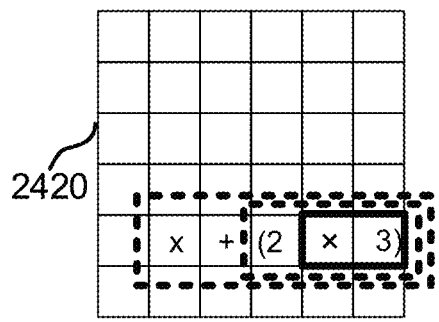
FIG. 24

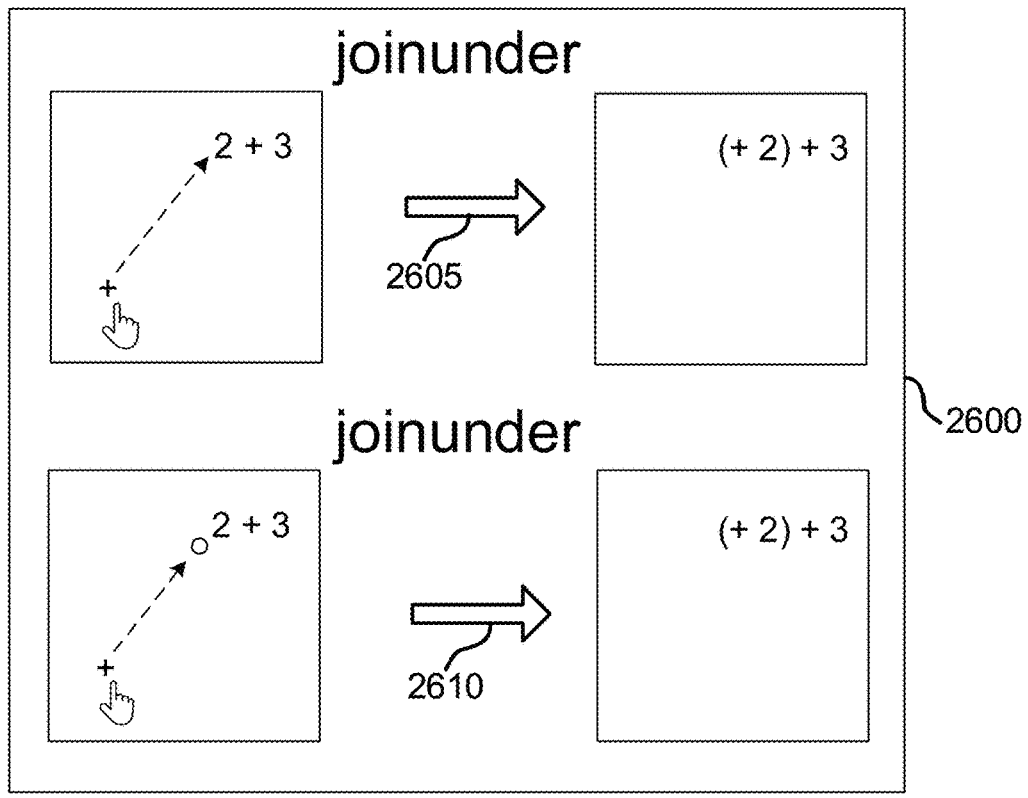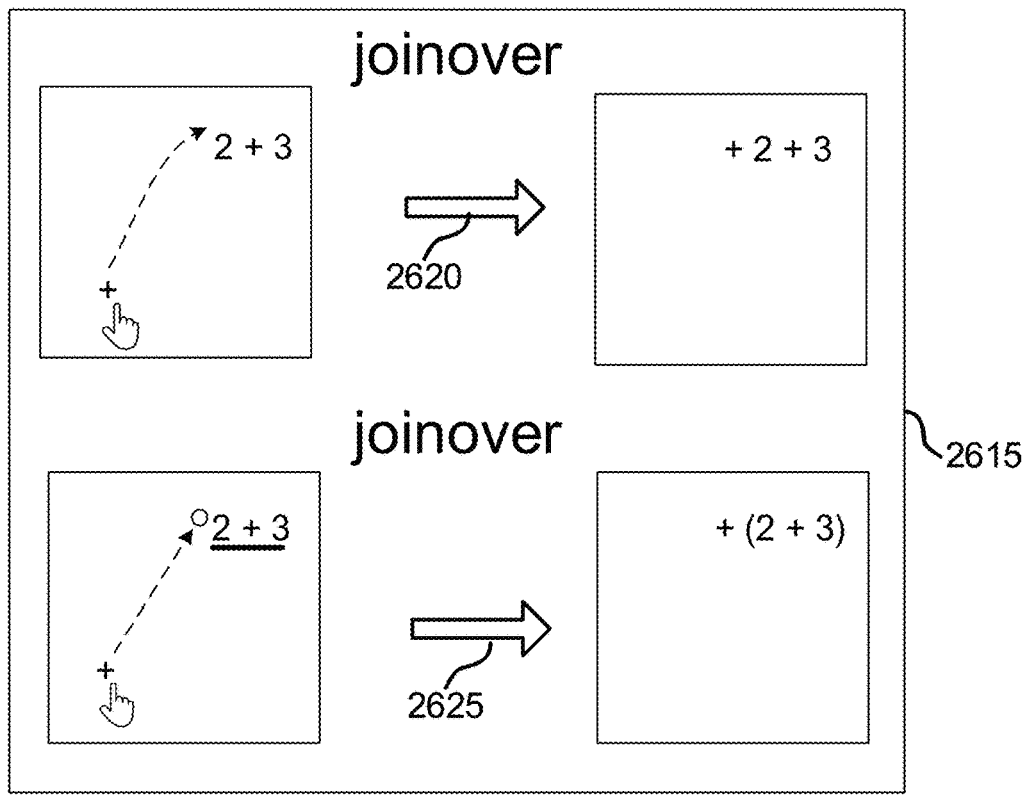
FIG. 26

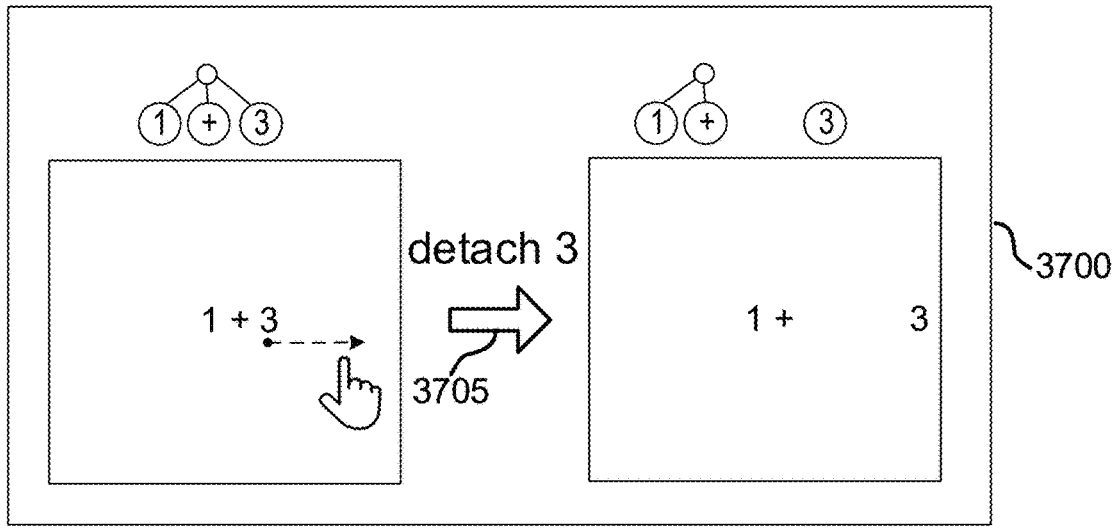
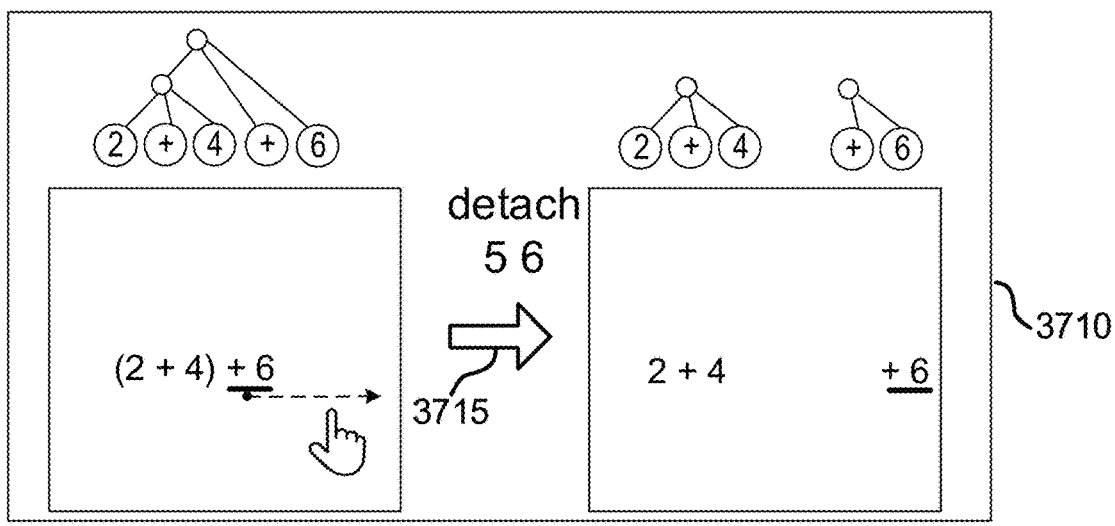
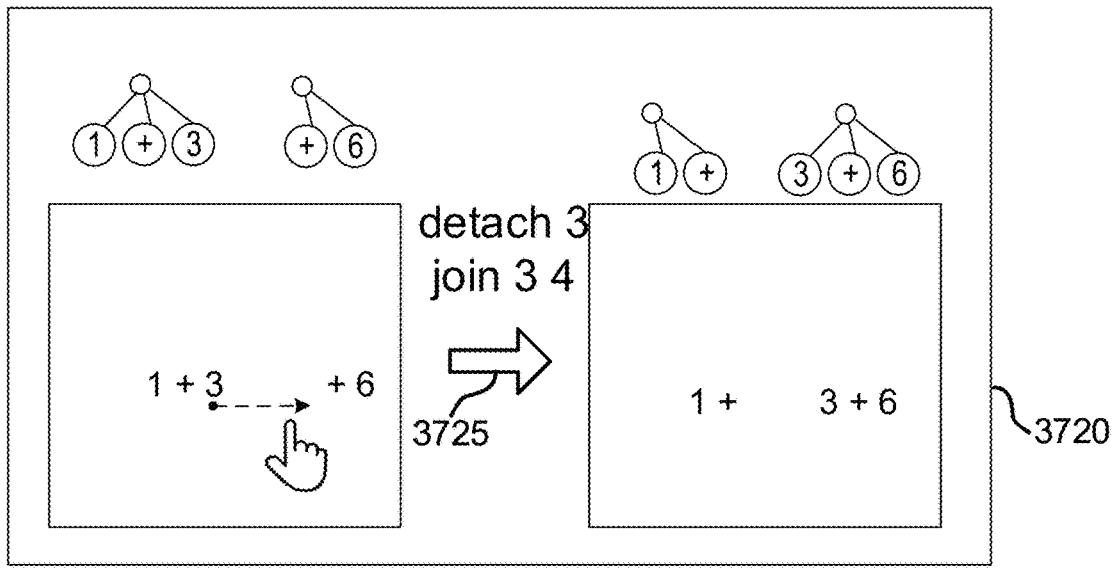
FIG. 37

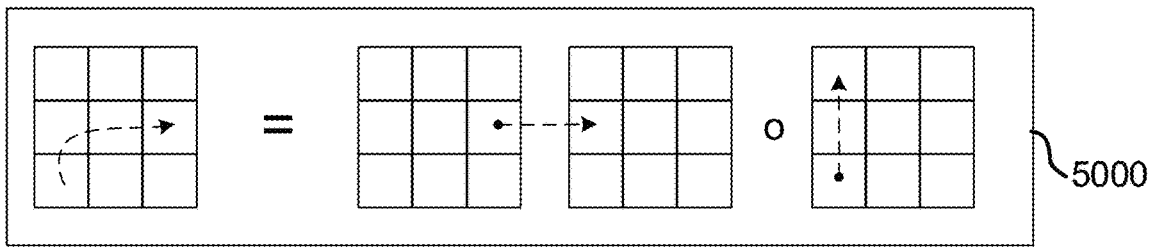
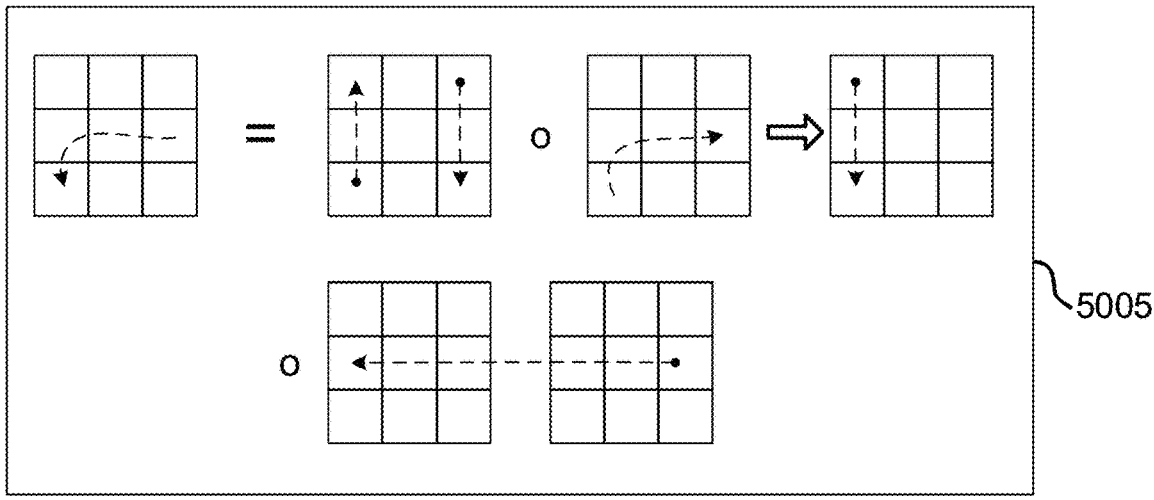
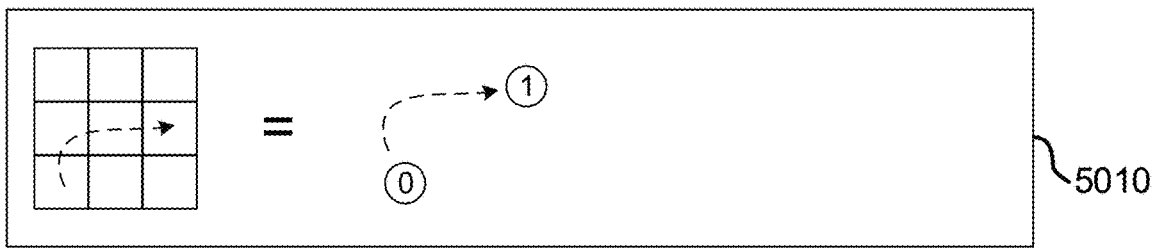
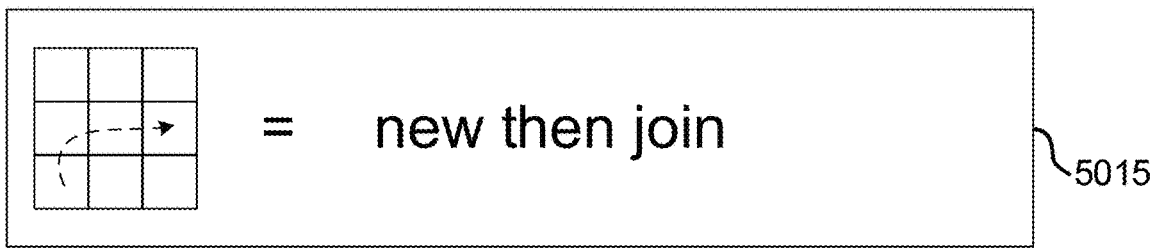
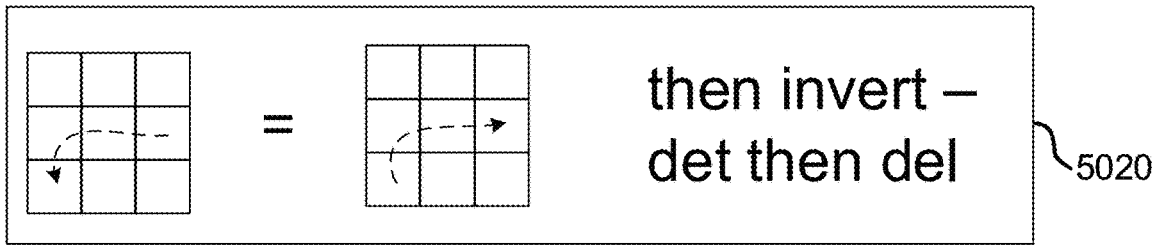
FIG. 50

| E15 | | × | ✓ | $f_x$ | =D15+E14 | | |
|---|---|---|---|---|---|---|---|

| ⊿ | A | B | C | D | E | F | G |
|---|---|---|---|---|---|---|---|
| 1 | | Start | January | February | March | | |
| 2 | Money Received | | | | | | |
| 3 | Lemonade | | 10 | 20 | 20 | | |
| 4 | Iced Tea | | 0 | 10 | 10 | | |
| 5 | Arnold Palmer | | 0 | 0 | 5 | | |
| 6 | Total Income | | 10 | 30 | 35 | | |
| 7 | | | | | | | |
| 8 | Money Spent | | | | | | |
| 9 | Cups | | 40 | 0 | 0 | | |
| 10 | Ingredients | | 20 | 20 | 20 | | |
| 11 | Labor | | 50 | 50 | 50 | | |
| 12 | Total Spent | | 110 | 70 | 70 | | |
| 13 | | | | | | | |
| 14 | Cash Flow | | -100 | -40 | -35 | | |
| 15 | Cash Balance | 1000 | 900 | 860 | 825 | | |
| 16 | | | | | | | |
| 17 | | | | | | | |
| 18 | | | | | | | |
| 19 | | | | | | | |

FIG. 71

```
TOTAL INCOME - TOTAL EXPENSE
    SUM OF
        TOTAL RENT INCOME
        R/E TAX + SPRINKLER
        WATER & SEWER
        RENT INCOME (other)
        RETURNED CHECK CHARGES SUM OF
        AMORTIZATION EXPENSE
        BANK SERVICE CHARGES
        COMMISSION
        FILING FEES
        TOTAL INSURANCE
                SUM OF
                        BOILER & MACHINERY
                        DISABILITY INSURANCE
                        HEALTH INSURANCE
                        UMBRELLA INSURANCE POLICY
                        WORKER'S COMPENSATION
        LICENSES AND PERMITS
        MANAGEMENT FEES
        MICELLANEOUS
        OFFICE EXPENSE
        TOTAL OPERATING EXPENSES
                SUM OF
                        A/C REPAIR
                        BOILER SERVICE
                        CLEANING SERVICES
                        DEPUTY FIRE SAFETY DIRECTOR
                        ELEVATOR ANNUAL INSPECTION
                        EXTERMINATOR
                        FIRE ALARM
                        FIRE INSPECTION PREVENTION
                        HEATING OIL
                        SUPPLIES
        TOTAL PAYROLL EXPENSES
                SUM OF
                        FEE PAYCHEX
                        FICA MEDICARE PAYCHEX
                        FUTA PAYCHEX
                        GROSS SALARY PAYCHEX
                        MEDICAL INSURANCE PAYCHEX
                        NY DISABILITY PAYCHEX
        PENALTIES
        POSTAGE AND DELIVERY
        TOTAL PROFESSIONAL FEES
            ACCOUNTING FEES + LEGAL FEES + PROFESSIONAL FEES (other) + REAL ESTATE
TAX
        TOTAL REPAIRS
            BUILDING REPAIRS
                COMPUTER REPAIRS
                ELECTRICAL REPAIRS
                ELEVATOR REPAIR
                EQUIPMENT REPAIRS
                LOCKSMITH REPAIR
                PLUMBING REPAIRS
                WATER TANK
        TOTAL TAXES
            INDIVIDUAL INCOME TAX
        TOTAL TELEPHONE
            SUPERINTENDENT CELLPHONE
            TELEPHONE (other)
        TOTAL UTILITIES
            GAS AND ELECTRIC
                WATER        FIG. 72
        VIOLATION
```

VISUAL VIRTUAL PROGRAMMING MACHINE FOR REAL-TIME INTERACTIVE CREATION, PLAYBACK, EXECUTION, INSPECTION AND MANIPULATION OF PROGRAMMING ELEMENTS

This application claims the benefit of U.S. Provisional Application No. 62/828,305, filed Apr. 2, 2019, entitled GRAPHICALLY-ENABLED MANIPULATION OF ABSTRACT SYNTAX TREE STRUCTURES, which is incorporated in its entirety herein by reference.

BACKGROUND OF THE INVENTION

1. Field of the Invention

The present invention relates generally to computer systems for graphical logic manipulation, and more specifically to real-time Turing-complete systems for graphical logic manipulation.

2. Discussion of the Related Art

Computer programs are typically constructed from text code. However, programmers often conceptualize what their code does or is supposed to do in their heads as a vision or a visual mental image. Traditionally, creating or understanding programs requires translating back and forth between the programmer's vision and text code.

Computer programs can be a challenge to create or understand for beginners and experts alike. There is a relative lack of features in current programming relating text code to a visual intuition for what the program is doing. Programmers also must take on the full responsibility of learning how to express what they want a computer to do in terms of languages the computer understands, rather than have the computer learn to understand what the programmer intends or is trying to express. As a result, there is an unnecessary conceptual separation between the programmer's vision and text code, limiting the ability of programmers of all skill levels to write and read code. This conceptual separation also introduces an unnecessary barrier to entry for those with less programming education and experience, as well as those who have a propensity for visual/spatial thinking and learning.

In traditional programming, there is one degree of conceptual separation between a programmer's vision and their code. The user or programmer optionally may adapt a visual apparatus, such as a traditional visual programming language, to try to make the text code something the programmer can reason about visually. However, rather than minimize the degree of conceptual separation, traditional visual programming languages actually add an additional degree of conceptual separation. This is because, instead of directly visually representing the programmer's mental image or intuition for how their code works, they visually represent the traditional text code, which is often just a proxy for the programmer's intuition. Visually representing text code does nothing to eliminate the original conceptual separation, and in fact probably adds to it. These traditional approaches are indirect. Thinking and reasoning about code, as well as reading and interpreting code through a text or text-derivative medium, are unnecessarily difficult and limiting.

Computer code is crucial to the operation of many systems found in society. People's lives depend on the successful operation of computer code, including, for example, emergency communication systems. There is a large impact upon economic and resource costs, amounting to billions of dollars and a large number of person-hours, to program readable code. This is particularly true for debugging complex systems before or after a major crash. Due to a lack of visual features and techniques for inferencing and verifying programmer intent, programming, debugging, or otherwise addressing problems in these critical computer programs can only be performed by people who have extensive knowledge of computer programming and programming languages. Furthermore, the people with this extensive knowledge may require more time and effort to create, debug and fix code because of a lack of these features.

SUMMARY

A system for real-time interactive graphical computing is described. The system may include a user computing device, a display coupled to the user computing device, a graphical user interface displayed on the display, a virtual machine configured for network communication with the user computing device and including an instruction set architecture, wherein the instruction set architecture is configured to retain an association between each of a plurality of executable instructions and at least an executed instruction graphical representation and a user input, and an application configured to run on the virtual machine and communicate with the graphical user interface and configured to receive a first user input, determine an executable instruction associated with the first user input, execute the instruction, and display, concurrent with the execution of the instruction, the associated executed instruction graphical representation for the executable instruction on the display, wherein the executed instruction graphical representation is a visual expression of the execution of the instruction.

A method for real-time interactive graphical computing is disclosed by a system comprising a user computing device, a display coupled to the user computing device, a graphical user interface displayed on the display, a virtual machine configured for network communication with the user computing device and including an instruction set architecture, wherein the instruction set architecture is configured to retain an association between each of a plurality of executable instructions and at least an executed instruction graphical representation and a user input, and an application configured to run on the virtual machine and communicate with the graphical user interface, comprising the steps of receiving a first user input, determining an executable instruction associated with the first user input, executing the instruction, and displaying, concurrent with the execution of the instruction, the associated executed instruction graphical representation for the executable instruction on the display, wherein the executed instruction graphical representation is a visual expression of the execution of the instruction.

A method for graphically-enabled manipulation of abstract syntax tree structures is described. The method may include receiving a first user input having a content and a location in the user input display area, assigning the content to locations in an abstract syntax tree based on the content and the location in the user input display area, displaying the content, wherein the display of the content includes both graphical display of the content and location of the displayed content in the user display area, on the user input display area based on the location specified by the first user input, shape of the abstract syntax tree and the locations of the content in the abstract syntax tree, receiving a second user input, modifying, based on the second user input, at least one of the content of the abstract syntax tree, the location of the content in the abstract syntax tree, and the display of the content on the user input display area, and displaying the content on the user input display area based on the revised abstract syntax tree.

A non-transitory computer readable medium storing code for graphically-enabled manipulation of abstract syntax tree structures is described. In some examples, the code comprises instructions executable by a processor to: receive a first user input having a content and a location in the user input display area, assign the content to locations in an abstract syntax tree based on the content and the location in the user input display area, display the content, wherein the display of the content includes both graphical display of the content and location of the displayed content in the user display area, on the user input display area based on the location specified by the first user input, shape of the abstract syntax tree and the locations of the content in the abstract syntax tree, receive a second user input, modify, based on the second user input, at least one of the content of the abstract syntax tree, the location of the content in the abstract syntax tree, and the display of the content on the user input display area, and display the content on the user input display area based on the revised abstract syntax tree.

A system for graphically-enabled manipulation of abstract syntax tree structures is described. The system may include a user computing device; a display coupled to the user computing device; a graphical user interface displayed on the display and including a user input display area; a virtual machine in network communication with the user computing device; and an application configured to run on the virtual machine and communicate with the graphical user interface and configured to: receive a first user input having a content and a location in the user input display area, assign the content to locations in an abstract syntax tree based on the content and the location in the user input display area, display the content, wherein the display of the content includes both graphical display of the content and location of the displayed content in the user display area, on the user input display area based on the location specified by the first user input, shape of the abstract syntax tree and the locations of the content in the abstract syntax tree, receive a second user input, modify, based on the second user input, at least one of the content of the abstract syntax tree, the location of the content in the abstract syntax tree, and the display of the content on the user input display area, and display the content on the user input display area based on the revised abstract syntax tree.

A method for graphically-enabled manipulation of abstract syntax tree structures is described. The method may include receiving an initial user input indicating onset of creation of programming instructions, inputting by the user via the user input display area a function and instructions for evaluating the function, performing, in response to the receiving the function and instructions, at least one of organizing at least one abstract syntax tree and constructing a series of manipulations and/or comparisons of the at least one abstract syntax tree, whereby the organization, manipulations and/or comparisons evaluate the function, inputting by the user via the user display area a gesture associated with the instructions, storing of the instructions, the syntax tree organization, the series of manipulations, and the association with the gesture, and receiving a user input indicating termination of the creation of the programming instructions.

A non-transitory computer readable medium storing code for graphically-enabled manipulation of abstract syntax tree structures is described. In some examples, the code comprises instructions executable by a processor to: receive an initial user input indicating onset of creation of programming instructions, input by the user via the user input display area a function and instructions for evaluating the function, perform, in response to the receiving the function and instructions, at least one of organizing at least one abstract syntax tree and constructing a series of manipulations and/or comparisons of the at least one abstract syntax tree, whereby the organization, manipulations and/or comparisons evaluate the function, input by the user via the user display area a gesture associated with the instructions, store of the instructions, the syntax tree organization, the series of manipulations, and the association with the gesture, and receive a user input indicating termination of the creation of the programming instructions.

A system for creating a sequence of programming instructions is described. The system may include a user computing device; a display coupled to the user computing device; a graphical user interface displayed on the display and including a user input display area; a virtual machine in network communication with the user computing device; and an application configured to run on the virtual machine and communicate with the graphical user interface and configured to: receive an initial user input indicating onset of creation of programming instructions, input by the user via the user input display area a function and instructions for evaluating the function, perform, in response to the receiving the function and instructions, at least one of organizing at least one abstract syntax tree and constructing a series of manipulations and/or comparisons of the at least one abstract syntax tree, whereby the organization, manipulations and/or comparisons evaluate the function, input by the user via the user display area a gesture associated with the instructions, store of the instructions, the syntax tree organization, the series of manipulations, and the association with the gesture, and receive a user input indicating termination of the creation of the programming instructions.

A method for graphically-enabled manipulation of abstract syntax tree structures is described. The method may include receiving a user input indicating initiation of a recording session, receiving, during the recording session, a series of user inputs using the user input display area, where the user inputs are evaluated by previously-defined rules according to the content of the input, the location of the input in the user input display area, and the graphical manipulation of the input, determining a series of programming instructions based on the series of user inputs wherein the programming instructions include performing at least one of organizing at least one abstract syntax tree and constructing a series of manipulations and/or comparisons of the at least one abstract syntax tree, and receiving a user input indicating termination of the recording session.

A non-transitory computer readable medium storing code for graphically-enabled manipulation of abstract syntax tree structures is described. In some examples, the code comprises instructions executable by a processor to: receive a user input indicating initiation of a recording session, receive, during the recording session, a series of user inputs using the user input display area, where the user inputs are evaluated by previously-defined rules according to the content of the input, the location of the input in the user input display area, and the graphical manipulation of the input, determine a series of programming instructions based on the series of user inputs wherein the programming instructions include performing at least one of organizing at least one abstract syntax tree and constructing a series of manipulations and/or comparisons of the at least one abstract syntax tree, and receive a user input indicating termination of the recording session.

A system for recording a series of evaluation steps and assigning the steps to a specific input is described. The system may include a user computing device; a display coupled to the user computing device; a graphical user interface displayed on the display and including a user input display area; a virtual machine in network communication with the user computing device; and an application configured to run on the virtual machine and communicate with the graphical user interface and configured to: receive a user input indicating initiation of a recording session, receive, during the recording session, a series of user inputs using the user input display area, where the user inputs are evaluated by previously-defined rules according to the content of the input, the location of the input in the user input display area, and the graphical manipulation of the input, determine a series of programming instructions based on the series of user inputs wherein the programming instructions include performing at least one of organizing at least one abstract syntax tree and constructing a series of manipulations and/or comparisons of the at least one abstract syntax tree, and receive a user input indicating termination of the recording session.

A method for graphically-enabled manipulation of abstract syntax tree structures is described. The method may include receiving an indication from a user to execute at least one computing operation, executing the at least one computing operation, and displaying, concurrent with the execution of the at least one computing operation, a graphical representation of the at least one computing operation on the user input display area, wherein the graphical representation is a direct representation of the execution of the at least one computing operation.

A non-transitory computer readable medium storing code for graphically-enabled manipulation of abstract syntax tree structures is described. In some examples, the code comprises instructions executable by a processor to: receive an indication from a user to execute at least one computing operation, execute the at least one computing operation, and display, concurrent with the execution of the at least one computing operation, a graphical representation of the at least one computing operation on the user input display area, wherein the graphical representation is a direct representation of the execution of the at least one computing operation.

A system for real-time graphical display of computing operations is described. The system may include a user computing device; a display coupled to the user computing device; a graphical user interface displayed on the display and including a user input display area; a virtual machine in network communication with the user computing device; and an application configured to run on the virtual machine and communicate with the graphical user interface and configured to: receive an indication from a user to execute at least one computing operation, execute the at least one computing operation, and display, concurrent with the execution of the at least one computing operation, a graphical representation of the at least one computing operation on the user input display area, wherein the graphical representation is a direct representation of the execution of the at least one computing operation.

BRIEF DESCRIPTION OF THE DRAWINGS

FIG. 24 shows an example of a graphical representation of selecting nodes in accordance with aspects of the present disclosure.

FIGS. 25 through 26 show examples of a graphical representation of joining nodes in accordance with aspects of the present disclosure.

FIG. 37 shows an example of a graphical representation of detach commands in accordance with aspects of the present disclosure.

FIGS. 49 through 51 show examples of a graphical representation of abstract manipulations in accordance with aspects of the present disclosure.

FIG. 71 shows an example of a traditional spreadsheet representation of a cash flow statement along with the abstract tree dependency structure logic determining how it calculates values.

FIG. 72 shows an exemplary abstract tree representation of a profit/loss statement.

DETAILED DESCRIPTION

Figure 1:
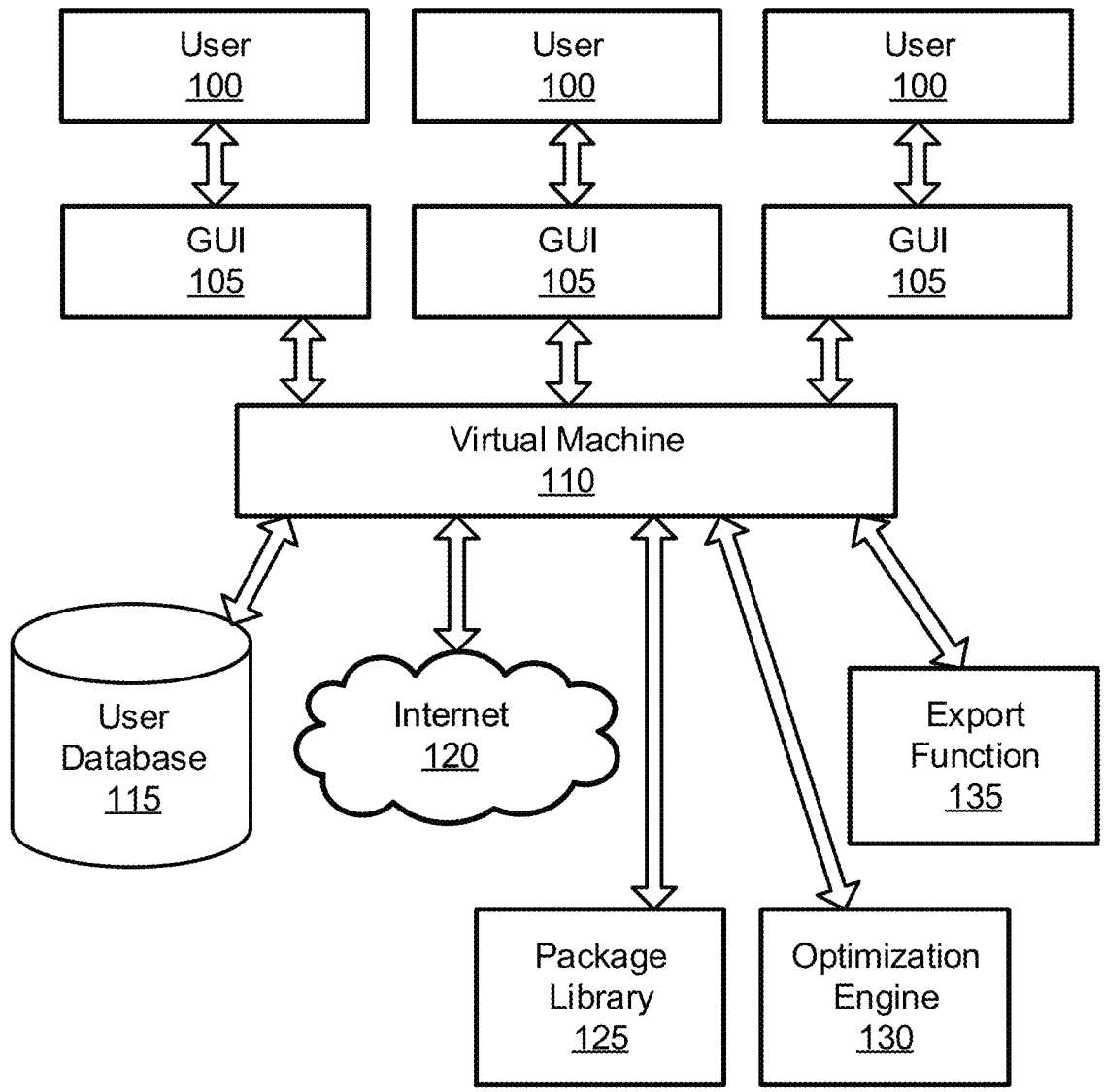
FIG. 1 shows an example of a system for graphical manipulation for multiple end users in accordance with aspects of the present disclosure.

The present disclosure describes systems and methods for modifying abstract logical elements in a graphical interface. For example, in computer programming, programs are typically constructed from text code. However, programmers often first conceptualize what their code is supposed to do in their heads as a vision or as a visual mental image. Traditionally, creating a general-purpose program that is in accordance with the programmer's specifications requires translating this vision into text and verifying that the text aligns with the vision.

The following description is not to be taken in a limiting sense, but is made merely for the purpose of describing the general principles of exemplary embodiments. The scope of the invention should be determined with reference to the claims. Certain embodiments of the present disclosure relate to computer programming in a graphical environment. Certain embodiments of the invention are also applicable to analytical disciplines where sentences that are arranged in abstract syntax tree (AST) structures, for example, in the fields of mathematics, proofs, argumentation, and natural language descriptions.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

There are a number of benefits and advantages associated with certain embodiments of the invention. It will be appreciated that the use cases include, for example, prototyping, scripting, or teaching, as well as in enterprises.

In addition to writing, reading and debugging computer programs, the fields in which the embodiments of the invention is applicable include, but are not limited to, the manipulation of mathematical content, argumentation, finances, data, natural language descriptions/text, and other media. Certain embodiments include using Oracle's Truffle or Graal VM or other universal polyglot/virtual machine systems to expedite the process of optimizing the system.

It will be appreciated that certain embodiments of the invention include, but are not limited to, implementing to run on a standard computer as a standalone program, a PC-hosted program with automatic push updates, a cloud-based application, a smartphone based application, a browser-based application, and/or a web-application. In certain embodiments of the invention, the method, system, and device may be used without a visual environment. However, it will be appreciated that it is best suited for a visual environment. These visual environments include, but is not limited to a standard monitor accompanied with a typical mouse-keyboard setup, a touchscreen with single or multi-touch capability (mobile/pad/laptop/monitor), an interactive whiteboard, a variety of motion-capture camera(s), a virtual reality input system, and/or a brain-computer interface.

Embodiments of the invention provide improved accessibility to the computer code, including to those with less education surrounding computer programming. Embodiments of the invention further make computer programs accessible to facilitate the building of prototypes. Embodiments of the invention further introduce a critical visual intuition to building and reasoning about code. Embodiments of the invention further reformulates programming as a dialogue between humans and machines rather than the traditional one-way relationship wherein programmers must gain deep expertise expressing their ideas through the computer, while preparing for all use cases and pitfalls.

It will be appreciated that, by using the method, system, and apparatus found in certain embodiments of the invention, the user's code may be a direct visual representation of the user's visual mental image of how the code works, allowing for zero degrees of conceptual separation between the user's vision for the program and the text code.

Certain embodiments of the invention are applicable for the field of computer programming. Certain embodiments of the invention are also applicable for analytical disciplines where sentences that are arranged in AST structures, for example, in the fields of mathematics, proofs, argumentation, and natural language descriptions.

A method for graphically-enabled automated manipulation of syntax tree data structures in a computer is described. A system for graphically-enabled automated manipulation of syntax tree data structures in a computer is also described. Further, a device or apparatus for graphically-enabled automated manipulation of syntax tree data structures in a computer is described.

Certain embodiments of the invention separately and jointly include a description and implementation of a set of atomic instructions describing canonically visual fundamental operations on sets of abstract syntax trees containing mathematical expressions, computer source code, or natural language. Certain embodiments of the invention also include a visual programming environment for the creation and application of compositions of fundamental instructions. Certain embodiments of the invention further includes an interactive inference system to apply these compositions to trees different in content or form from previous training examples in the case that these compositions are programmed-by-example.

A general-purpose computer automation environment and communication language with a frame-free graphical interface that generalizes the user's intents and builds functions out of visually-cued and composable instructions, according to interactive dialogue with the user, are described in certain embodiments of the invention.

In certain embodiments of the invention, the method allows for an approachable, and a more streamlined visual programming environment that allows more efficient and dynamic computations, while minimizing the set of independent preset actions or commands. The purpose of the method as described herein is to design a minimal set of fundamental operations in the context of a visual environment, in order to render the experience of automating a computer for multiple purposes, as intuitive, interactive, tangible, physical, and visual as possible.

The aim, in certain embodiments of the invention, is to sufficiently minimize the basic set of instructions that are required at a fundamental level, such that users can easily recall operations to execute these instructions. Instructions are provided by the user using gestural movements. Feedback, for example, how the user detects when those instructions are being performed, is provided with corresponding visual changes to the environment.

There are a number of results associated with the developments found in certain embodiments of the invention. The first intended result of these developments is a decrease in dependence on menus and buttons. With this decreased dependence on menus and buttons, a user is able to perform their programming tasks without depending on the boundaries of the frame in which they are working. Hence, a user can more effectively and robustly program, without a standard keyboard-mouse-monitor integrated development environment setup.

The second intended result is to introduce a paradigm shift for visual programming languages. A user's intuitive mental image of how their programs work may be more closely related with what is displayed on the screen, and how the user interacts with what is displayed on the screen.

The third intended result is to decrease the effort and difficulty involved in describing basic instructions to the computer. In certain embodiments, a more simplified form of programming-by-example (also termed programming by demonstration, as known to those skilled in the art) is facilitated.

In certain embodiments of the invention, the method, system, and device outputs an inferred generalized program based on a user's input and/or manipulations of a few values. The advantage of using a more simplified form of programming-by-example is that in order to output a program, the user and the computer communicate with each other using a set of operational or gestural cues or keywords, to achieve an effective dialogue, and to arrive at a program that is intended and more accurate with what was imagined by the user.

It will be appreciated that the emphasis on visual reasoning, and steps towards a unification of mental imagery and source code is useful for analytical systems with many complex moving parts. The invention may also provide critical value towards lowering the educational background necessary to create any computer automations at all.

In certain aspects, there is a focus on "top-down programming", where the over-arching intent of the program is expressed upfront. The more detailed intent is considered later, allowing the computer's contextual understanding of the user's current and future linguistic intentions to be deepened.

An aspect of certain embodiments of the invention that facilitates "top-down programming" is similarity scoring. In similarity scoring, programming-by-example is enabled, whereby a function may be described largely through the process of operating on just a few salient example inputs. The function is then reviewed by observing the process of exemplary visual instructions being applied to any other example input by means of the visual environment. The function is then clarified with more salient examples. This process allows the user to engage in a form of dialogue with the computer about what is intended. This process is accomplished using a sequence of gestures/function applications. As a result, the computer makes inferences, which may be refined upon further investigation, if necessary. Therefore, unlike preexisting general-purpose visual programming or communication environments, the method, system, and apparatus of embodiments of the invention includes an inference system, which minimizes the amount of abstraction a new user must do in their head. As a result, a user may not even require that mathematical operations be described in terms of variables (which confuse many who struggle with math). The user is thus allowed to think and express to the computer in terms of examples, rather than the user requiring the full understanding of a computer's terms in order to engage with, and output the user's intentions to the computer.

Another aspect of certain embodiments of the invention that is found in the consideration in its design. It is recognized that there is a close relationship between functional programming and basic mathematics. There is a tendency for the average person to have more exposure to math-like functions that map onto sets of values, and reduce them into single values, rather than using loops and switch statements. Thus, embodiments of the invention have characteristics that generally deemphasize loops and switch statements, and emphasizing of math-like functions.

In certain embodiments of the invention, users are able to manipulate visually represented alphanumeric/symbolic notations. In certain embodiments, there is a juxtaposition of using a familiar language (e.g. basic math) with familiar actionable movements (e.g. user interface movements in 2D or 3D space).

The familiar, actionable movements described here (e.g. moving programming elements in a visual environment) allows for various users having a wide array of thinking styles to access and use certain embodiments of the invention.

The method, system, and device related to certain embodiments of the invention includes a number of aspects:

(1) A first aspect includes a description for a rudimentary machine, focusing on its primitive elements and basic instructions;

(2) A second aspect considers the process implemented in the back-end;

(3) A third aspect includes a front-end visual environment, in which the machine would ideally run. A third aspect further includes exemplary representations and gestures to be associated with states and actions in the back-end;

(4) A fourth aspect includes a process for determining the similarity of different abstract syntax trees to aid the computer in predicting the user's intention when prerecorded actions are performed on trees of different form and content;

(5) A fifth aspect describes a novel notion of package, whereby the user may have control over the tests for calculating similarity scores and aid the computer in making correct estimations about the user's intent.

In a first aspect, a description for a rudimentary machine, focusing on its primitive elements and basic instructions is described here. In certain embodiments of the invention, a novel class of specifications for a virtual instruction set architecture (ISA) that runs on a virtual machine is described. The specifications include a basic set of atomic graph editing actions on zero or more syntax trees.

The ISA includes instructions, where an instruction is a member of the rudimentary instruction set (architecture) of an implementation of a virtual machine. In certain embodiments, instructions include, but are not limited to new, delete, substitute, load, and join. The following are exemplary instructions and a description of each.

Changes to the display as a result of a command in some embodiments result in an instant change to the display. In other embodiments the display change may comprise a graphical animation between the first display state and the display state as a result of the command. For example, the packing (collapsing) of element into a single location may include an animation of the elements collapsing. The unpacking (expansion) of a single element to a spread in the display area would similarly include a graphical animation of the element expanding into the multiple elements. In another example, moving of an element from one location on the display to a different location on the display would include an animation showing the element moving across the screen.

The command "new" generates new syntax trees in the runtime engine on the basis of content fed into the instruction as a parameter.

The command "delete" removes or frees syntax trees in the runtime engine. The trees to be deleted may be referred to either by their content or by unique identifiers, such as ID numbers. The trees may either be genuinely deleted or simply nullified by making them invisible or inaccessible to the user.

The command "join" takes two or more trees and connects them at the same level of scope, or off by a given number of levels of scope. The level of scope, or just level, of a syntax tree is to be understood as a layer of depth of the syntax tree, so that (1+2+3) has just a top layer whereas ((1+2)+3) has a top layer ( )+3 and one child layer (1+2). To allow one level of scope's difference, the minimum required to connect nodes at any location within a syntax tree when instructions take just unique node identifiers as input, it may be necessary to distinguish between two complimentary join operators. These join operators include underjoin and overjoin, when instructions are required to specify no more than an ordered set of graph/tree editing instructions. Joining nodes at the same level in a tree may require the creation of a new parent node.

The command "detach" takes a set of connected nodes and disconnects them from their original parent node in a manner that otherwise preserves their structure.

The command "time" may navigate a tree of the virtual machine's states over time. The tree may be generated by performing actions and then calling combinations of a global undo and redo.

A "branch" is an optional instruction to allow traversal of the virtual machine's states through a tree structure by selecting to navigate a different branch at a given fork in the virtual machine's history.

The command "evaluate" performs an evaluation of the specified nodes and their children as standard in any AST interpreter.

The commands "packing" and "unpacking" refer to substituting a previously-existing closest conceptual analogues are selective or localized redo and undo. Each node in the set of abstract syntax trees, which the virtual machine holds in memory, has memory of its previous states, so that each node's history of states may be navigated independently of the other nodes. The end result is the ability to represent every node at a precise level of abstraction, and furthermore to give substance to the concept of expanding to understand. For example, a user can perform a gesture such as a pinching motion (e.g. zooming in on a touchscreen) to investigate the content make-up of a node, such as that a given 3 is the result of a previous evaluation of 1+2.

The command "substitute" substitutes sets of nodes for other sets of nodes. In some cases, the substitute instruction simply adds definitions to the programming environment. Depending on whether an implementation intends to preserve immutability of data, a node may be overwritten or deleted and replaced with a new node in the same spatial location.

The command "apply" performs the aforementioned substitution action repeatedly to satisfy a requirement such as replacing all appearances of one element with another. The apply instruction is a composite action describable in terms of multiple substitute actions, but is special insofar as it accommodates a dynamic number of substitutions depending on the tree expression in which the substitutions are occurring.

The command "flatten" takes all of the leaves (i.e. nodes with no children) under the specified nodes and rearranges them such that all leaves have the same parent while graphical positions are maintained. Flatten may be a composite action describable in terms of detachments, underjoins and overjoins.

The command "raise" takes a given set of nodes and its children and deepens their scope by one level. Raise may be a composite action describable in terms of detachments, underjoins and overjoins.

The command "record" begins or stops recording zero or more actions, either named directly or performed in the visual environment, and converts them into a generalized macro for application on future tree expressions. The saved record is associated with both a function name, which itself may either be or be associated with a gestural movement, and the expressions the function was performed on during original recording. A record may be overloaded, such that when the record is used on a future expression, the computer may choose one set of recorded actions associated with the function name over other sets of recorded actions associated with the function name because the set is associated with the original application expression that is most similar to that future expression.

The command "manipulate" accesses a record of actions on the basis of an inputted function name or gestural movement, optionally being fed zero or more parameter tree expressions, and applies the associated set of recorded actions to the virtual machine's state. If the record is overloaded, the set of recorded actions to perform is chosen on the basis of how the parameter tree expressions are to the original recorded expression(s) saved in the record. This may be done using a similarity scoring process such as is disclosed herein.

The command "store" takes the current machine state, optionally serializes it for human-readability, and saves it as a file on the host machine to be opened at any future point in time.

The command "load" takes a save-file previously produced by the virtual machine using the store instruction and either overwrites or appends the save-file's content to the current state.

The command "copy" takes a syntax tree and generates a copy of it in the runtime engine, possibly including copies of its histories and component nodes and their histories.

A "test" allows the user to directly specify a conditional test for future application of an overloaded function. The test instruction may insert the inputted test into a function/gesture's sequence of tests such that it may impact similarity scoring. The test may be applied to an expression tree at the beginning of a manipulation with that gesture thereafter, or precisely with a value achieved at the point in the process of manipulation at which it was called during that action sequence's recording.

The term dissatisfied refers to, after performing a manipulation, performing a global undo to undo the manipulation. In some cases, this function is followed by toggling the record switch to "on" to allow overloaded recording for a given gesture. While the record switch is "on", the performed actions are saved in relation to the current expression. In certain cases, if the expression is identical in form and content to the previous recording for that gesture, this function may overwrite previously saved recording information.

The command "arrange" allows the user to manually rearrange the order of tests for similarity scoring for a given function.

The command "set-package" allows the user to change the basic set of tests used for similarity scoring for each newly described function.

The command "debug" may be an on/off switch that toggles whether multistep manipulations may be stepped through.

The command "step" allows a manipulation to be stepped through one instruction at a time. Standard accompanying tools in debuggers may also be included, such as breakpoints and continues. Stepping may be precise to any level of abstraction, down to ISA instructions.

Furthermore, the specifications of the ISA additionally include, but are not limited to the following instructions:

The command "graph" generates a graph, which may be symbolic, numeric, or graphical (in the math-theoretic sense with nodes and edges). The graph maintains the back-end and front-end properties of the elements which make up its underlying information, meaning operations may be performed on graphs as with any other elements. Calling graph on a node may have the effect of flipping an on/off switch, toggling between representation as a graph and representation as ordinary nodes with alphanumeric or symbolic content. If the graph-toggle value of a given node is set to be automatically transferred to its parents with a logical OR relation in an immutable-value setting, or if node expressions are allowed to be mutable; then the graph may be redrawn upon every evaluation, thereby live-generating an animation showing how the graph changes over time.

The command "move" sets the spatial coordinates of a set of zero or more nodes and performs a visual adjustment reflecting the change.

Furthermore, the specifications of the ISA include primitives. In certain embodiments, the following primitives are included:

In one example, all primitives and pre-defined functions and macros as would be found in an already existing functional programming and/or object-oriented programming languages are included. These primitives include, for example, implementations of LISP (such as Clojure, Common LISP, and Scheme), especially including numbers, booleans, keywords (to be understood as named variables such as x), and basic operators such as +, −, /, *, =, <, <=, >=, => (if), ?: (if/then/else), >, map, filter, reduce/fold, loop, setx, cons, cond, list, hash-map, set.

In one example, functions, which are pre-programmed or custom-built compositions of the basic instructions, which may be named by its associated gesture or with a standard symbolic/alphanumeric name, are included.

The "comma-like" (,) infix operator: In one example, a distinct "comma-like" (,) infix operator is included. A distinct "comma-like" (,) infix operator aids in the construction of matrices and to distinguish matrices from mere lists of elements, the latter of which is a form of intermediary state the user passes through when trying to build a syntactically correct statement for the machine.

The "namespace" (::) infix operator: In one example, a distinct "namespace" (::) infix operator is included. A distinct "namespace" (::) infix operator accesses the library functions from a given module. The left operand is a module/factory/object and the right operand is its constituent function or value.

The "function compose" ○ infix operator: In one example, a distinct "function compose" ○ infix operator is included. A distinct "function compose" ○ infix operator appends functions, which may be either sets of instructions or standard symbolic expressions, either of which may generically take parameters as inputs.

In one example, a distinct "assignment" (←,→) infix operator is included. A distinct "assignment" (←,→) infix operator may allow standard symbolic descriptions of functions, including functions described in terms of functions, optionally upon performing an evaluation. Exemplary assignments include, but are not limited to: (1) simple functions with symbolic names, like "add1(x)←x+1"; (2) simple functions with gestural names, like "swipe-up←x+1"; (3) composed functions with either symbolic or gestural names, like these (using gestural names for example): (i)"swipe-up-left←swipe-up swipe-up", (ii) "swipe-up-left←swipe-up*2" (meaning the same as swipe-up swipe-up), (iii) "swipe-up swipe-up swipe-up" (a reassignment to the function name), (iv) "swipe-up, swipe-up←swipe-up (x)+swipe-up (y)" in the case of there being multiple parameters involving multiple m-by-n grids; and (4) Associations between symbolic and gestural names, like "add1=swipeup"

Additionally, the ISA may or may not also recognize user-defined compositions of instructions (macros), These macros are optionally named with symbols or gestural movements as first-class citizens which themselves may be operated on.

It will be appreciated that a function may be a series of programming instructions, often associated with a gesture but most generally associated with a function name. In certain embodiments, a function refers to a series of programming instructions. It will also be appreciated that functions may also include an expression such as 'x+3'. It will also be appreciated that a term such as 'x+3' is referred to as an expression or an equation. In some examples, a function name refers to how a function is referred. In some examples, a gesture is a visual function name. In certain examples, a visual function name may also have a text representation.

In a second aspect, the process by which the aforementioned specification is implemented in the back end is described here. Certain embodiments include a virtual machine/runtime interpretation engine that maintains a state of zero or more abstract syntax trees (ASTs) The virtual machine/runtime interpretation engine implements the aforementioned specification for an instruction set architecture.

Abstract syntax trees (ASTs) may include nodes. In certain embodiments, a node is a vertex in a mathematical-style graph, such as an abstract syntax tree. References to nodes may also refer to a subtree, consisting of itself and all of its children. For example, in an AST representation of '1+3', each of '1', '+', '3', and the entirety of '1+3' may each be called a node.

Each node is an object in the tree and includes, but is not limited to include the following information:

(a) A unique ID or identifier, such as an unsigned int.

(b) A current and historical content, stored in a data structure such as an AST or indexed sequence, and a pointer to the current version within the data structure.

(c) The unique identifier of a parent node, in the case the node has a parent.

(d) The unique identifiers of the node's children, if there are any.

(e) Additional optional concrete syntax information. This additional information may include, for example, parentheses in the case of mathematical expressions, or commas in the case of natural language.

(f) Graphical or visual information, such as spatial coordinates and image/icon dimensions of its associated independently-moving element in the visual environment.

(g) What nodes were evaluated to generate the current node, in case of an incomplete evaluation of a node-level, e.g. (2+3+4)=>(5+4).

In a third aspect, a front-end visual environment is provided. The machine runs on the front-end visual environment in certain embodiments.

A third aspect further includes exemplary representations and gestures to be associated with states and actions in the back-end.

In a front-end visual environment, in certain embodiments, a novel style of graphical user interface termed "symbolic visual programming" is provided. In exemplary "symbolic visual programming," syntax trees are represented using traditional natural language and mathematical notations, and actions are enabled through direct gestural actions.

In a front-end visual environment, the following are present, although it will be appreciated that it is not limited to the following.

In one example, each node of the syntax tree may be represented as an independently movable icon/image/object in a visual space. An object of this kind may be referred to as an 'element'. In certain embodiments, an element is a data object associated with each node in an AST. An element may contain fields having information, for example, a unique ID, a local history, a graphical location, an image/sprite for the visual environment, and parent and children information. If one uses the word node to refer to the data object at a vertex in an AST or graph, then it may have the same meaning as an element. One may refer to graphical elements, which are just elements, but the term may be used when discussing their visual representations images/sprites (e.g. one may drag one graphical element to another to initiate a join operation). Not every element need be ostensibly represented or representable graphically, such as the parent node whose children constitute '1+3', but generally every node ought to be accessible through some manner graphically, such as through selecting multiple elements with graphical representations.

In one example, each element may be selected, enabling functionality that may be regarded as referring to the selected element. Multiple elements may be simultaneously selected.

In one example, the end-user may make appear and disappear an m-by-n grid, where m and n are natural numbers, which may be used as a guide for drawing gestures referring to the element for which the grid was generated.

In one example, the end-user may group elements together, such as through a lassoing mechanism or a shift-click mechanism, both for the purpose of moving them or operating on them simultaneously, as well as for the purpose of referring to their least common node when sending instructions to the back-end machine.

In one example, there may exist a basic set of gestures that have consistent functionality, covering a portion of the space of elementary instructions. In certain embodiments, a gesture describes how one signifies, names, or calls special manipulations associated with it in a visual environment. In certain aspects, gestures are a subset of manipulations, namely insofar as they are special manipulations referred to visually. A gesture may have a serialized text name, which may also be used to refer to a series of instructions without necessarily requiring a GUI. In certain embodiments, a gesture is a visual name for a function.

Reference to gestures drawn in an m-by-n grid is understood herein to include all gestures drawn and recognized in the display space, not only gestures confined to a rectangular grid. Gestures may include shapes, patterns and scribbles. Gestures may be facilitated by machine-learning recognition or a scoring system comparing similarity of gestures, such that the end-user need not be confined to drawing a gesture in a rigid manner just so that the right coordinates in the grid are indicated.

Gestures may be input through the use of intermediate keyboard strokes, for example by using the number pad of a keyboard. The numerals 1-9 are arranged on a 3×3 grid on a standard keyboard. The keyboard numerals can be mapped in a one-to-one correspondence with coordinates on a 3×3 grid in the visual environment. In some embodiments, a custom keyboard for gesture input may be designed for use with the invention.

In one example, the basic set of gestures includes, for example, "new", "delete", "join", "detach", "time", "branch", "evaluate", "packing" ("unpacking"), "apply", "flatten", "move", "raise", "record", "manipulate", "store", "load", "copy", "test", "dissatisfied", "arrange", "set-package", "debug", "step", "graph", and "move".

In certain embodiments, a "new" gesture generates new elements. This is accomplished, for example, by handwriting within an empty space in the visualization environment. Machine learning image-processing programs, such as MyScript® Calculator may be used to detect the handwriting. In another example, the "new" gesture is accomplished by clicking, tapping, double-clicking, or double-tapping on an empty space, and then inputting a string by handwriting or typing. In another example, the "new" gesture is accomplished by using pre-interpreted images.

In certain embodiments, a "deleting" gesture deletes elements. For example, deleting may be accomplished by tossing them off-screen with acceleration. In another example, deleting may be accomplished by dropping them off-screen. In another example, deleting may be accomplished by dragging them to a designated trash area, such as the border of the screen. In another example, deleting may be accomplished by double-clicking or double-tapping and selecting 'delete' from a dropdown menu.

In certain embodiments, a "joining" gesture joins elements. For example, joining may be accomplished by dragging expressions so that they are adjacent to each other, including immediately above, immediately below, immediately to the left, immediately to the right, and at diagonals from each other. In another example, joining may be accomplished by selecting an expression and then dragging a different one to the just-previously-selected one, for the purpose of clarifying which total expression is referred. In another example, "underjoining" and "overjoining" may be differentiated. In order to further differentiate the two, the visual interface may further discriminate between: (1) an upper right/lower right/upper left/lower left diagonal positions; and/or (2) previous selection or non-selection of the recipient of a join.

In certain embodiments, a "detaching" gesture detaches elements. For example, elements are detached by dragging or pulling them away from those elements to which they are joined.

In certain embodiments, a "moving" gesture moves elements. For example, elements are moved by dragging and dropping one or more elements in the visual environment.

Certain embodiments of the invention include "flattening" gesture, "raising" gesture, and "copying" gesture. In certain examples, these gestures are found in a traditional drop-down menu. In another example, these gestures are accomplished by first selecting on the relevant element(s) and then making a swiping motion down, up, far away in any direction, left, right, or any number of other directions, distances, or times. For example, these can be determined in the visual environment by beginning a drawing motion on the selection grid and then continuing a drawn line outside of the grid. Single-touch packing and unpacking, also possibly referred to as "selective/local redo" and "selective/local undo", may occur through these gestural actions.

Certain embodiments of the invention include "packing" and "unpacking" gestures. In one example, packing and unpacking is accomplished through a pinching and expanding motion. For example, packing would use a two-finger pinch, and unpacking would use a two-finger expansion. This particular visual apparatus is intended to embody the concept of "expanding to understand", or more generally zooming to the precise level of abstraction the user desires. The concept of packing and unpacking may equivocate analytical evaluation with mere abbreviation, for instance in the context of packing individual components of a matrix (tensor) into its abbreviation of indexed rows or columns, or into a single node (for example, where letter M stands for a whole matrix).

In certain embodiments, a matrix (tensor) consists of indexed rows or columns. A matrix (tensor) may be shrunk and expanded using either a pinch/expand motion with two fingers, with a single tap and drag motion, or by dragging the end of one row/column into its other end. This may allow a matrix to be represented as a grid of rows and columns of fewer dimensions than the total content of the grid. For example, a standard two-dimensional matrix may be packed by shrinking it from right to left into a column of named/indexed rows, and then shrunk from bottom to top into a single element representing the entire matrix that may be dragged around, graphed, and manipulated like any other element. This grid may then be expanded to its original state by unpacking it, for example horizontally to produce a row of named/indexed columns, and then vertically to show the whole original two-dimensional matrix. Each element in the original matrix may share all the characteristics of all other elements, e.g. they themselves may be packed and unpacked, joined to and detached from the matrix, and so forth. This may be enabled through the use of the addition of concrete syntax to the elements (such as curly braces as in Mathematica® notation) or through the use of an infix "comma" operator.

In certain embodiments, elements are evaluated using an "evaluate" gesture. In one example, the evaluate gesture is accomplished by dragging one element into another. In another example, the evaluate gesture is accomplished by placing two pointers on each element at either end of the evaluation and dragging the pointers into close proximity with each other; whereby these two options both conceptually resemble the act of packing them together by a two-finger pinch.

In certain embodiments, a macro includes any and every manipulation of a function. In certain embodiments, a macro refers to a series of programming instructions that change programming instructions. Exemplary macros include, but are not limited to: taking a content-wise inverse of a special manipulation (such as flipping new-join_on_left to detach_on_right-delete); moving all of the instructions' graphical coordinates 200 pixels down-screen; requiring that a visual function name no longer need to begin with a clockwise circular stroke around the first inputted parameter; or taking a graphical inverse of a gesture where, for instance, a clockwise circular stroke may instead be counter-clockwise.

In certain embodiments, a macro may be "recorded" by performing an unassigned custom gesture. The custom gesture may be drawn on an m-by-n grid(s) associated with the parameters of the macro to simplify the computer's reading of gestures if necessary.

Certain embodiments of the invention include a "manipulation". In certain embodiments, manipulation is a change of machine state, particularly changes to the form/organization and/or content of a set of ASTs/graphs. Manipulation may refer either to the name(s) of kinds of machine state changes, or a particular change of machine state. For example, joining elements is a type or class of manipulation, or just a manipulation, and joining '1' to '+3" is a manipulation. The former may be termed an "abstract manipulation" and the latter a "concrete manipulation". A manipulation may be primitive or fundamental if it corresponds to exactly zero or one programming instruction(s) out of an implementation of a machine's rudimentary instruction set; it may be composite, compound, condensed or synthetic if its corresponding sequence of programming instructions depends upon a conditional, consists of more than one programming instructions out of the implementation's rudimentary instruction set, or may possibly have either of these qualities in the future. A manipulation may be preset or custom, depending on whether the user has or can play any role in affecting its meaning. A manipulation may be ordinary or direct, or special or indirect. In certain aspects, a manipulation is special if its naming or calling requires performing or depicting an 'indirect' visual action such as an abstract drawing that represents what it does rather than 'simply doing it'. One may refer to the graphical component of a manipulation as well as to its technical content, comparable to the distinction between a graphical element and just an element. In certain embodiments, a manipulation may occur by performing a previously assigned gesture. In one example, a manipulation includes dragging one graphical element to another to join them. In another example, a manipulation includes dragging one graphical element away from another to detach them. In one example, a manipulation includes dragging them to the bottom of the screen or out of the visual environment to delete them. In certain aspects, these are examples of primitive, preset, direct manipulations.

The following examples relate to the action of dragging a portion of a tree off-screen without deleting it, which in some embodiments might implicitly consist of first detaching this portion and then afterward deleting it. This action is an example of a compound, preset, direct manipulation if this kind of manipulation is enabled in the graphical environment independent of user input. This action is an example of a compound, custom, direct manipulation if the user may explicitly signify to the computer that this particular graphical action should execute these two instructions.

In certain embodiments, any manipulation requiring an indirect drawing representing the action or a gesture, such as could be performed in an m-by-n grid, is special or indirect. In certain embodiments, any manipulation not requiring an indirect drawing representing the action or a gesture is ordinary or direct.

An example of a compound, custom manipulation includes a user-defined method for one-step algebraic solving.

In one embodiment, examples of primitive, preset, special manipulations may include the grid motions for graph, return, flatten, raise, pack, unpack, copy, and substitute.

In some embodiments, the user input type or gesture is not required to specifically be drawn in an m-by-n grid—the purpose of the grid is to considerably simplify the code for allowing the generation of special manipulations. For example, solving an algebraic equation in accordance with a user's desires may involve a special gesture dragging elements to the other side of an equation, rather than simply drawing in a grid a motion from a left square to a right square.

In certain embodiments, a manipulation is performed without using an m-by-n grid. In this situation, the manipulation may be performed in a similar position relative to the element parameter(s) within the visual interface as though there were m-by-n grid(s). In certain embodiments, for each element, the gestural action is sufficiently proximal to the object of manipulation, according to the current layout. In certain situations, the elements in the environment are snapped into a grid for the purpose of distance calculations.

In situations where the user's intention by a particular graphical action is unclear or needs disambiguation, other methods may be used to clarify the user's intention. In some embodiments, the front-end may try to make a judgment on the basis of which graphical elements are closest to the graphical action. In some embodiments, the front-end may prompt the user explicitly to clarify their intention. In some situations, the front-end may default to assuming the user's intention is to execute the most recently used or most frequently used function the graphical actions may have plausibly indicated.

In certain embodiments, some elementary instructions may be made available through preset grid-based gestures; In certain embodiments, substitution and graphing are available through preset grid-based gestures.

Certain embodiments of the invention include functions. Functions, named by gestures and/or by typical symbolic strings, may themselves be edited as first-class objects in the visual environment. In one example, if the function is named by gesture, they may be represented as an animation of motions on one or more m-by-n grids representing how one would call the function, or as a fixed icon with numbered and/or colored labels associated with each pen-drawn curve notating the necessary gestural movements to execute the gesture (comparable in nature to Chinese/Japanese calligraphy/handwriting tutorials).

Certain embodiments of the invention include idiomatic gestures for other basic instructions. These basic instructions include, for example, store, load, dissatisfaction, test, branch, debug, set-package, and arrange.

In a fourth aspect, a prediction processor for predicting the user's intention is provided. In general, in the fourth aspect, the similarity of different abstract syntax trees is determined, as to aid the computer in predicting the user's intention, when prerecorded actions are performed on trees of different form and content. In other words, a class of deterministic processes for evaluating and scoring the similarity of abstract syntax trees to each other is provided. By undergoing these processes, an aforementioned implementation of a virtual machine may determine how to manipulate compositions of atomic syntax tree operations on inputs that do not exactly match the function's training examples in content and form.

In some embodiments, the virtual machine may prompt the user to clarify what they intend at a step to minimize the role of the prediction/intention-inferencing system.

In the fourth aspect, a prediction processor including the following is provided, although in certain embodiments, it is not limited to the following.

One example of a prediction processor is the following. Upon performing a gesture/using a custom function that has been overloaded (i.e. has more than one sequence of actions recorded for it), a user may optionally perform a similarity comparison between the current expression upon which a gesture/function has been performed and each of the previous expressions for which a set of actions has been recorded for that gesture/function. The set of actions associated with the saved expression most similar to the current expression is performed. If a failure or error occurs, the set of actions associated with the next most similar expression is performed.

Another example of a prediction processor is the following. The process includes a similarity function, where similarity function may operate as follows, for each pair of expressions to be compared. One may consider the way two paired exemplary expressions may be aligned relative to one another to best capture where their similarities lie.

Similarity function: In a first example, the expression pair $\{(1+2), (0+1+2)\}$ share "1+2" in common. In order to capture that similarity, the "1" from the first expression may be aligned with the "1" from the second expression, such that the nodes "1+2" in each member of the pair of expressions are aligned. There is a spectrum of options for how to consider the alignment of expressions to maximize their scoring potential, where on one end of the spectrum one may perform a thorough and complete similarity calculation for the two expressions with every possible choice of alignment relationship, and on the other end of the spectrum one may perform shortcut estimations of what alignment will bear the greatest similarity and either take these guesses as good enough or perform more thorough analyses for just the top guesses from the estimations. Generally, a general alignment relationship between two expressions is considered an offset. Generally, node pairings by relative locations may be referred as fixed points.

In the above exemplary expression, the offset is 2 because the left end of (1+2) is to be aligned two nodes down the expression (0+1+2). In the same exemplary expression, the fixed point is (0, 2), because aligning the 0th node/position in the first expression "(1+2)" with the 2nd node/position in the second expression "(0+1+2)" does an optimal job of satisfying a pointwise equivalence test. In essence, this is because if one starts looking at the '1' in each expression and then looks to the right of each '1', one may observe that the sequence '1', then '+', then '2' is common in each expression. Here, 0 is the address of the '1' in the first expression (counting from the left, starting from 0) and 2 is the address of the '1' in the second expression.

In a second example, the similarity score of the pair $\{(1+2), (1+2+3)\}$ is compared with the similarity score of the pair in the previous example ($\{(1+2), (0+1+2)\}$). In some embodiments, it would be appropriate to say that the similarity between '(1+2)' and '(1+2+3)' should be the same as the similarity between '(1+2)' and '(0+1+2)', since '1+2' is common in each pair. If the optimal fixed point solution for maximizing recognition of similarity between '(1+2)' and '(0+1+2)' in the first example was (0, 2), and if the optimal offset solution in the first example was 0, then in this example similarity recognition maximization for the pair $\{(1+2), (1+2+3)\}$ may involve recognizing the offset of 0, or the fixed point (0, 0), as optimal. From the 0th node in each of '(1+2)' and '(1+2+3)', one may see in succession '1', then '+', then '2'. The ability to recognize these two expression pairs as having equivalent similarity scores is enabled by the use of more general offsets and more precise fixed points.

When compared with offsets, fixed points enable more robust similarity scoring. In a third example, the pairing $\{(1+3), (1+2+3)\}$ is provided. The traditional offset could perform no shifting (1=1, +=+, 3≠2, nil≠+, nil≠3), or shift by 2 nodes (nil≠1, nil≠+, 1≠2, +=+, 3=3). It will be appreciated that neither of these choices of offset is optimal, because they both miss important semantic information. By recognizing the fixed points (0, 0) and (2, 4) simultaneously, one may not only capture the presence of both a "1" at the far left of each expression and a "3" at the far right of the expression, but also that the node to the right of each "1" is a "+" and the node to the left of each "3" is also a "+". This recognition is made possible by considering the relative addresses of nodes from the perspectives of multiple pairs of indexes that indicate which nodes in a pair of expressions agree according to a given test such as point-wise equality.

Another example of a prediction processor is the following. The aforementioned example illustrates an exemplary implementation of an offset calculation or a fixed point calculation. In such example, a point-wise equivalence test between each node in every alignment is performed. This point-wise equivalence test is performed alongside the top level of the two expressions in each pair, and the offset that produces the maximum score is chosen. These steps further involve aligning the end of one expression with the beginning of another expression and comparing every absolute position in each tree and generating points. Additionally, the values of the points are compared, including, for example, summing the matched points, and summing the errors. Then, one may perform the same calculations with the two expressions aligned one spot closer in each other's direction, and repeat calculations for every possible alignment of the top levels of the tree expressions.

(1) In one example, a pairing {(a+b), (x+y+z)} is provided. For this pairing, each iteration is scored in the following manner:

(a) {(a, nil), (+, nil), (b, x), (nil, +), (nil, y), (nil, +), (nil, z)}

(b) {(a, nil), (+, x), (b, +), (nil, y), (nil, +), (nil, z)}

(c) {(a, x), (+, +), (b, y), (nil, +), (nil, z)} (d) {(nil, x), (a, +), (+, y), (b, +), (nil, z)} (e) {(nil, x), (nil, +), (a, y), (+, +), (b, z)}

(f) {(nil, x), (nil, +), (nil, y), (a, +), (+, z), (b, nil)}

(g) {(nil, x), (nil, +), (nil, y), (nil, +), (a, z), (+, nil), (b, nil)}

(2) In this example from part (1), above, if the point-wise equivalence is considered, the maximum score is 1. The iterations, (c) and (e), have a score of 1, because (+, +) is a pair of two equivalent nodes. It is noted here that the iterations (c) and (e), have offsets of 0 and 2 respectively.

(3) It is noted that iterations (a) and (b) may be considered as having negative offsets −2 and −1 respectively.

Another example of a prediction processor is the following. The naive implementation for calculating offsets may be expanded to include other kinds of tests besides pointwise equivalence. A plurality of tests may be performed to see how the values compare with one another. These tests may include, for example, equivalence tests, tests for determining if they are both even integers, tests for determining if the values are multiples of an arbitrary number.

In one example, a sequence of pointwise tests is used upon each set of matched nodes. These sequences determine, for example, whether the compared values are non-nil, whether the compared values have the same type or belong to the same set of types, whether the compared values are positive numbers, whether the compared values are even integers, whether the compared values are multiples of seven, whether the compared values are either nil or multiples of seven, among others. The user may generate these tests to be applied in the scoring system for a given gesture/function. The user may use certain instructions, such as test and arrange instructions along with text entry, along with computer-aided translation of this text entry to human-readable functions such as LISP lambdas. The user may also make changes to the basis of the scoring or choose preset sequences of tests for the basis of scoring, for a particular gesture/function. Optionally, these preferences may further be selected before recording the gesture/function.

Another example of a prediction processor is the following. The user may optionally select to have a functionality enabled. A functionality includes the option where similarity scoring includes more general questions about the expressions. These general questions include, for example, whether each expression is an equation or inequality (e.g. has one of a set of nodes like =, >, <). The similarity scoring processes described need not be the only means of calculating similarities.

Another example of a prediction processor is the following. To minimize the number of ways pairs of expressions can produce equal similarity scores, a user may introduce certain biases to the process. For example, one may assign different numbers of points for matches or errors for each test in a test sequence. In another example, some nodes may be weighed more heavily than others. In another example, there are options available to not proceed down a test sequence when errors/failures are detected for a given test.

Another example of a prediction processor is the following. In certain embodiments, a robust implementation of expression alignment may be included.

(1) In one example, an expression pair {(1+2), ((1+2)+3)} is provided. In this example, with an offset of 0, the comparison between the pair results in the following result: (1≠(1+2), +=+, 2≠3). From this result, the following can be observed: (a) the deepest or broadest similarity that can be determined is each expression has three nodes on its first level, (b) that the pair is a summation of two nodes; and (c) that the rightmost element is a positive integer. Alternatively, the prediction processor may assign offsets or fixed points that are not limited to just the first level of the tree. In one example, the prediction processor may assign an offset of (0 0), meaning that the values at the top level of one expression would be left-aligned (i.e. with 0 offset) with the values contained within the zeroth node of the other expression. Yet in another example, given the expressions "(1+2)" and "((1+2)+3)", the prediction processor may let the leftmost node ("1") in the first expression be node-matched with the leftmost node down one level ("1") in the second expression. Here, the composite fixed point solution could be written as ((0), (0 0)) or as (( ) (0)), where the "( )" indicates that the entire first expression should be compared with the zeroth node of the second expression.

(2) In another example, a brute force method for calculating the offset/fixed point to maximize potential for similarity score is performed. In this example, the prediction processor performs the iterative pairing algorithm for the pairing {(a+b), (x+y+z)}, as described above, for the first level and each level of every child traveling all the way down to the leaves of the right expression tree.

In certain embodiments of the present disclosure, elements (e.g., logical expressions) may be compared for the purpose of similarity scoring according to their relative positioning, or alignment. Example alignments are described below, signified with fixed points.

In a first example, suppose $t1=(1+3)$ and $t2=(1+2+3)$, and tests=(=), m=0 (the depth allowed for test application), and n=0 (the depth allowed for alignment). Then a first alignment may be represented by ((0),(0)) with a score of two (having two similar elements in the same column):

| Score | 1 | 1 | 0 | 0 | 0 | =2 |
|---|---|---|---|---|---|---|
| t1 | 1 | + | 3 | | | |
| t2 | 1 | + | 2 | + | 3 | |

A second alignment may be represented by ((0),(2)):

| Score | 0 | 0 | 0 | 1 | 1 | =2 |
|---|---|---|---|---|---|---|
| t1 | | | 1 | + | 3 | |
| t2 | 1 | + | 2 | + | 3 | |

A composite alignment, {((0),(0)), ((0),(2))}:

| Score | 1 | 1 | 0 | 1 | 1 | =4 |
|---|---|---|---|---|---|---|
| t1 | 1 | + | 3 | | | |
| t1 | | | 1 | + | 3 | |
| t2 | 1 | + | 2 | + | 3 | |

Let tests2=(nil?, type?, =). Then nil?×36=180, type?× 6=30, and the best alignment=4, for a final similarity score of 214 (Where "=" is a test, and 36 and 6 are weights, for clarity).

In a second example, suppose t1=(1+2), t2=((1+2)+3), m=n=1, tests1=(=), and tests2=(=). Then a first alignment ((0),(0)) would be:

| | Score | | | |
|---|---|---|---|---|
| | 0 | 1 | 0 | =1 |
| t1 | 1 | + | 2 | |
| t2 | (1 + 2) | + | 3 | |

A second alignment ((0),(0 0)) would be:

| Score | 1 | 1 | 1 | 0 | 0 | =3 |
|---|---|---|---|---|---|---|
| t1 | 1 | + | 2 | | | |
| t2 | 1 | + | 2 | + | 3 | |

A composite alignment would be {((0),(0)), ((0),(0 0))}:

| Score | 1 | 1 | 1 | 1 | 0 | =4 |
|---|---|---|---|---|---|---|
| t1 | 1 | + | 2 | | | |
| t2 | 1 | + | 2 | + | 3 | |
| t1 | | 1 | | + | 2 | |

The general scoring may be 4, since tests1=tests2.

In a third example, let t1=(1+8), t2=((1+2)+3), n=1, m=0,

| | Score | | | |
|---|---|---|---|---|
| | 1 | 1 | 0 | =2 |
| t1 | (1 + 8) | | | |
| t2 | (1 + 2) | + | 3 | |
| t1 | 1 | + | 8 | |

With m=1:

| Score | 1 | 1 | 0 | 1 | 0 | =3 |
|---|---|---|---|---|---|---|
| t1 | 1 | + | 8 | | | |
| t2 | 1 | + | 2 | + | 3 | |
| t1 | 1 | | | + | 8 | |

In a fourth example of alignment, let t1=(1+(3+(5+7)), t2=((5+7)+9), m=n=2, tests1=tests2=(=). Given alignment ((0),(0)):

| Score | 0 | 0 | 0 | 1 | 0 | 0 | 0 | 0 | =1 |
|---|---|---|---|---|---|---|---|---|---|
| t1 | 1 | | + | 3 | + | 5 | + | 7 | |
| t2 | 5 | + | 7 | + | | 9 | | | |

A second alignment would be ((2 2 0), (0 0)):

| Score | 0 | 0 | 0 | 0 | 1 | 1 | 1 | 0 | 0 | =3 |
|---|---|---|---|---|---|---|---|---|---|---|
| t1 | 1 | + | 3 | + | 5 | + | 7 | | | |
| t2 | | | | | 5 | + | 7 | + | 9 | |

A composite alignment would be {((0),(0)), ((2 2 0), (0 0))}:

| Score | 0 | 0 | 0 | 0 | 1 | 1 | 1 | 1 | 0 | =4 |
|---|---|---|---|---|---|---|---|---|---|---|
| t1 | | | | 1 | | + | 3 | + | 5 | + | 7 |
| t1 | 1 | + | 3 | + | 5 | + | 7 | | | |
| t2 | | | | | 5 | + | 7 | + | | 9 |

This gives a final similarity score of 4.

A fifth aspect describes a novel notion of package. In the fifth aspect, a user has control over the tests for calculating similarity scores and aid the computer in making correct estimations about the user's intent. A package allows the end-user to make changes to the aforementioned process of scoring the similarity of abstract syntax trees.

In one example, the user has control over the context that the computer has for interpreting the user's intentions from their actions. Packages include preset or custom-built default sequences of tests for calculating similarity scores between tree expressions based on the programming topic (such as cryptography vs. data science, or on the broader level of computation vs. mathematics vs. linguistics). Packages are swapped in mid-session, singled out for particular handpicked or regularly-described categories of gestures/ functions. Packages may be designed by a user, by a greater corporate entity, or crowd-sourced based on usage data collected from the users by a central or decentralized authority.

Figure 2:
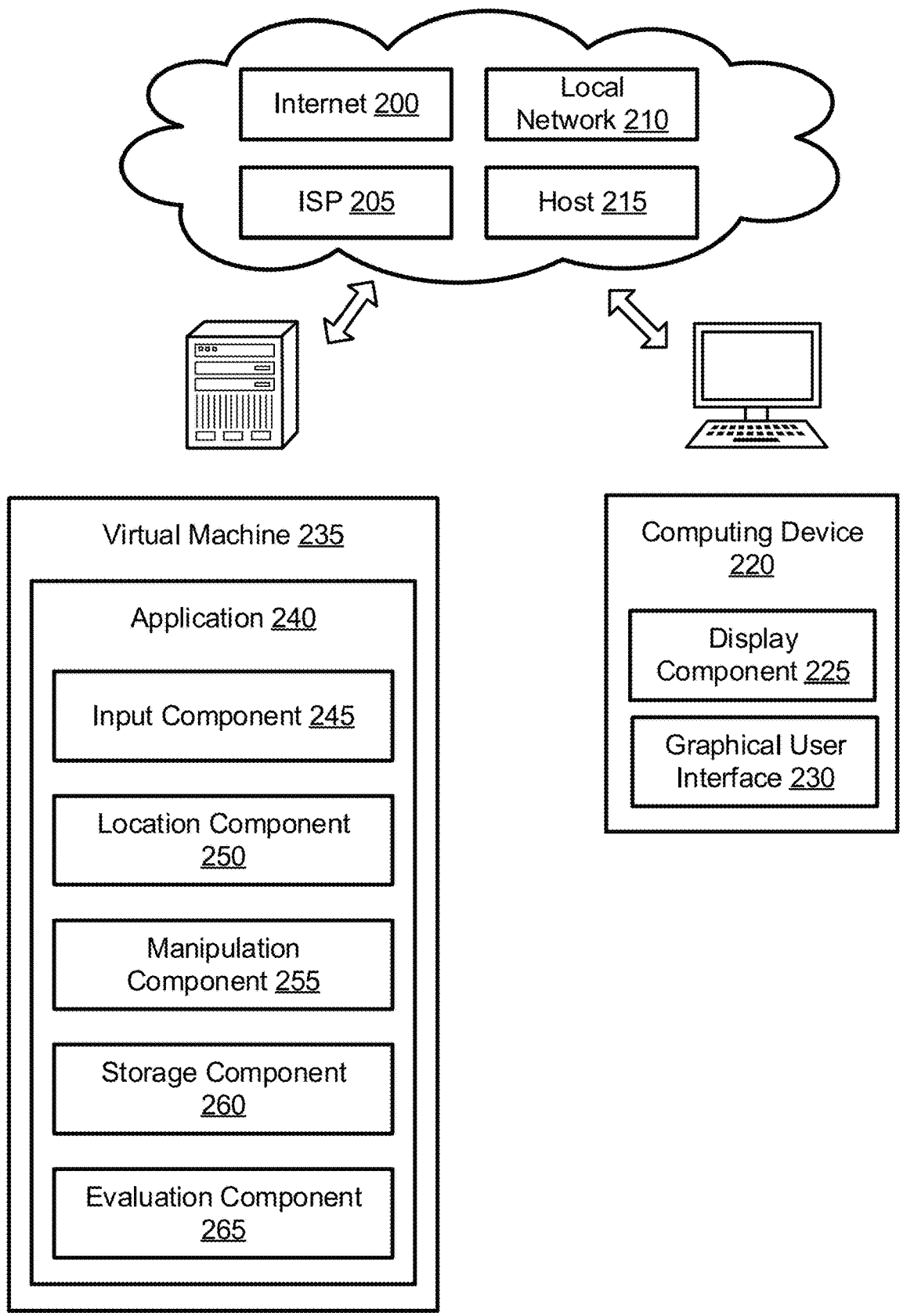
FIG. 2 shows an example of a system for graphical manipulation in accordance with aspects of the present disclosure.

FIG. 1 shows an example of a system for graphical manipulation for multiple end users in accordance with aspects of the present disclosure. Certain embodiments include a virtual machine. The system may include users 100, who utilize graphical user interfaces (GUIs) 105 to interact with a virtual machine 110. It should be noted that the example systems represented in FIGS. 1 and 2 represent example embodiments. Other example implementations are possible, including, for example, embodiments where the methods described in the present disclosure are performed locally on a machine of a user 100, or on a distributed network of machines.

The virtual machine 110 may access a user database 115, resources on an internet 120, a package library 125, an optimization engine 130, and an export function 135. A virtual machine 110 may include, for example, an instruction set architecture consisting of "canonically" visual instructions encompassing the base functionality of a programming language.

Users 100 may provide visual environment actions and receive visual output from the GUIs 105. The GUIs 105 may provide serialized instructions and receive a serial state from the virtual machine 110.

The user database 115 may store machine saved data, user data from files, and the files themselves. The virtual machine may scrape websites on the internet 120 to access additional data. The package library 125 may include lists of basic tests for similarity scoring, lists of expansion tests for similarity scoring, pre-defined composite sequences of atomic instruction, and methods for recognizing particular visual actions as representing atomic instructions.

The virtual machine state includes, but is not limited to the following:

In one example, the virtual machine 110 includes a set of ASTs containing primary content about the current state. This set of ASTs may optionally be viewed as sharing a parent stage, which may be seen as a singular root node.

In one example, the virtual machine 110 has the ability to access previous states of the virtual machine 110, saved as a serialized JSON, or other syntax-tree literal representation. The ability to access the previous states of the virtual machine 110 is accomplished by one of two methods, although it will be appreciated that it is not limited to these two methods:

1. Holding the information about previous states in the memory of the running process. Holding of this information is accomplished by, for example, using a simple sequential container like a dynamically allocated array (henceforth termed a 'vector') and a pointer/index indicating the current position or branch in the history.

2. Saving each state as a separate file or portion of a file, and keeping track of which files refer to which states in the history. Keeping track of which files refer to which states is accomplished by, for example, performing a consistent hash function on each state and returning a string which represents the file name to be used.

In one example, the virtual machine 110 is able to navigate to the previous states of the virtual machine 110. The ability to navigate to the previous states of the virtual machine 110 is accomplished by one of two methods, although it will be appreciated that it is not limited to these two methods:

(a) using linear traversals and using simple globalized undo/redo operations, (b) additionally using an interactive window depicting the tree structure of machine states, or instead (c) using navigation through the tree structure through four commands. Certain embodiments include four commands, where two commands allowing forward/backward movement on a linear traversal, and two to allow branch-up/branch-down movement.

In one example, the virtual machine 110 further includes a data structure. An exemplary data structure includes, for example a hash-map that associates function names, which may either be simple symbolic strings or series of one or more codified/serialized gestures, to pairings of previous expressions and recorded actions performed on them. This data structure serves as an environment for the user's custom-made functions.

In one example, the virtual machine's data structure, for example, the hash-map, further includes the following feature. The hash-map may save the record content as it is being made, prior to its submission into the environment structure. The saving of record content is accomplished, for example, by the following method:

(a) A record is created by first recording its function name, the unique identifiers of each expression the user 100 intends as parameters, and the content and form of each of the given parameters. Then, either as each action occurs or all together at the end of recording, the instructions the user 100 executes are recorded. Each determinate node identifier/ID may be substituted with abstracted identifiers, such as simply "the first argument", to facilitate the recorded macro's transition to generalized applicability on other expressions. At the end of recording, a record may then optionally be given name aliases and may optionally result in a prompt asking the user 100 to confirm the recording before submission into the environment data structure.

(b) Optionally, the user 100 may directly input instructions and commands as text strings.

In one example, the virtual machine 110 includes a set of flags, which may contain information such as whether a macro is being recorded, whether a macro manipulation has recently occurred which may be reversed under dissatisfaction, and whether a macro manipulation reversal has occurred due to the initiation of a dissatisfied state.

In one example, the virtual machine 110 includes an optional set of easily accessible information from the previous state, such as the previously executed instruction, and the most recent key used in determining which set of instructions to call on an expression.

In certain embodiments, the virtual machine/runtime interpretation engine further includes methods for execution of multiple atomic operations in succession. The execution step may be optimized through a compiler. In certain embodiments, the virtual machine/runtime interpretation engine is integrated with a polyglot virtual machine such as Oracle Corporation's Graal Virtual Machine by means of their Truffle framework API.

The optimization engine may compile composite actions in immediate instructions. The export function may facilitate exporting documents in third party file formats such as PDF, XLS, CSV, XML, HTML, etc. These files may also be made available for download by a user 100.

Certain embodiments of the invention include methods for manipulating syntax trees, and further exacting and notationally visualizing semantic meaning from the graphical placement of different elements. The location of the nodes have significance in certain embodiments of the invention. For example, for the expression, "1+2", the placement of the "1", "+", and "2" next to each other in a particular order has significance to the methods, system, and apparatus described here. An expression may refer generally or concretely to an AST.

In certain embodiments, the significance of graphical placement meaning, including, for example, the organization and ordering of elements, in conjunction with syntactic conventions in math/code/language/logic notation, conveys the dependency relationship between tokens. In certain embodiments, this dependency relationship is established without explicitly drawing arrows.

In certain embodiments, the performance of recorded sequences is animated. The juxtaposition of animations, debugging, "conversational programming" (programming by demonstration), and the application of machine learning techniques to recognize and interpret different user inputs allows users to code while observing how the program is constructed on screen. Certain embodiments include features for recording macros for a visual programming environment using motion gestures, including the use of an m-by-n grid interface to record actions.

Certain embodiments include a visual programming environment designed to be frameless, for example, not heavily depending on menus located in fixed positions such as in the corner or along an edge of the work environment. Certain embodiments include a direct gestural manipulation of mathematical/natural language symbolic expressions in a visual programming environment.

Certain embodiments include an expanding-to-understand feature. In such feature, the faculty of zooming-in or following a hyperlink to learn more about information is extended to accessing the local history (i.e. selective undoing/redoing) of a mathematical or computational object, such as that 3 was previously the sum of a 1 and a 2, allowing the user 100 total freedom over the scope/detail of every object shown in the visual environment.

Certain embodiments include a new notion of and process for inductive programming based in calculating similarities between a given tree expression and actions performed on previous tree expressions. Certain embodiments include a new notion of package as a sequence of tests to be applied to expressions in the aforementioned similarity scoring that is particularly relevant to the domain or field of interest.

Certain embodiments include an interactive system for building functions wherein a function works in some regard even though it is still being described, without needing to re-describe the function in its entirety to change it.

In certain embodiments, collaborative real-time work is allowed across multiple devices, similar to what is currently possible with software such as Google Drive/Docs/Sheets/etc. Multiple users 100 may work on the same engine, for example, by means of internet browser clients connecting to a server. Each user 100 may have their own GUI and communicate with a shared back-end server asynchronously. Each update to the server may be broadcast to all clients.

In certain embodiments, a user 100 may download or upload different kinds of packages or sets of packages to build a local library of understood instructions. In certain embodiments, there are at least four different kinds of packages. They include basic/default test sequences for newly generated gestures, expansion test sequences for distinguishing between expressions during gesture overloading, pre-defined composite sequences so a user 100 need not generate composite gestures from scratch, and machine-learning training information for recognizing what gestures indicate atomic instructions. These packages may be crowd-sourced, created by user 100, or created by official authorities, such as a corporation.

In certain embodiments of the invention, retrieval of data on the internet by web scraping or interactions with third-party APIs is enabled. Certain embodiments include a process for optimizing composite instructions so that fewer steps are required to produce an equivalent back-end state transformation. Certain embodiments include a compiler for manipulation instructions on ASTs. Certain embodiments include functions to export and import data with third-party file formats.

In certain embodiments, the system's state is saved and loaded manually or automatically. In the case of implementation in LISP or other homoiconic programming languages, serialization of system state is accomplished by printing the code representation of the data. Certain embodiments include optional network connection.

The following example illustrates an example interaction between a user 100 and a virtual machine 110.

Step 1: A user 100 enters expression: "1+2". The expression is stored by virtual machine 110 and displayed on the GUI 105.

Step 2: The user 100 selects the expression on GUI 105.

Step 3: The user 100 inputs gesture on the screen. In response, the virtual machine 110 enters the record mode, and displays the record mode interface. In response to the input of the gesture, a recording session is started and additional recording session controls (e.g., graphical circle elements) appear on the display. The user drags across the expression to select it. The selected portion (which may be the entire expression) is underlined.

Step 4. The user 100 graphically manipulates the expression displayed on GUI 105 to indicate that the expression is to be evaluated. The virtual machine 110 performs the indicated operation, stores the result, and displays the result: 3.

Step 5. As the user 100 is finished with the instructions in this example, the user 100 then selects the "stop recording" control and recording session is terminated. The virtual machine 110 interprets the recording session and stores a sequence of manipulations based on its interpretation of the user input, to be associated with the gesture.

Step 6. The user 100 enters a new expression: 1+2+3. The new expression is stored by the virtual machine 110, and displayed on GUI 105.

Step 7. The user 100 selects a new expression and inputs the same gesture from step 3. The virtual machine 110 evaluates the new expression based on the stored sequence of manipulation.

Step 8. The virtual machine 110 displays the results of the manipulation: 3+3. The virtual machine 110 has performed an operation on the first two numbers in the expression and stored the result on the basis of what it has interpreted as the user's intent, in accordance with the sequence of instructions associated with the gesture. A "dissatisfaction" control may be displayed or enabled as a consequence of executing any series of instructions automatically, in case the user 100 is dissatisfied with the virtual machine 110's interpretation of the user's intent.

For the sake of example, suppose the user's intention is to evaluate the whole expression, not just its first two values. In this case, the user 100 may be dissatisfied with the virtual machine 110's interpretation of the user 100's intent.

Step 9. The user 100 selects dissatisfaction, and a new recording session is started.

Step 10. The unevaluated new expression 1+2+3 is re-displayed. The user 100 graphically manipulates the new expression to indicate that the whole expression is to be evaluated, leading to a result of 6 for the new expression evaluation. In response to the user 100 selecting the "dissatisfaction" button, the virtual machine 110 goes back to recording mode and receives input from the user. The user 100 then graphically manipulates the second expression to indicate to the virtual machine 110 how the instructions are to be applied to the second expression. For example, the user 100 may drag the 1 onto the 3 to indicate that the entire expression is to be evaluated.

Step 11. The user 100 indicates that the recording session has stopped. The virtual machine 110 updates the stored sequence of manipulations in response to the new input. That is, the user 100 then selects the "stop recording" control to indicate that the user input has ended. The virtual machine 110 updates the instructions associated with the gesture in response to the additional input (in this case, changing the instructions to "evaluate entire expression" instead of "evaluate first portion of expression").

Another example provided below indicates an additional use case for the systems and methods described in the present disclosure. The following example describes certain embodiments of the invention integrated with an external application by an I/O with a computer file. It will be appreciated that the example demonstrates the context of use of embodiments of the invention. That is, the example describes the manner in which visual and physical intuition may be used to program a computer.

In this example, a simplified version of a quotidian and ubiquitous task is described. An employee working in a payroll department may frequently encounter an exemplary problem: (1) given a spreadsheet; (2) the spreadsheet containing a row having the name of a worker, followed by a sequence of numbers signifying hours of work the named person has performed on each day of a work week; (3) the instruction to count the total number of regular hours and the total number of overtime hours the named person worked that week. Certain rules may be applied. For example, the first forty (40) hours worked cumulatively in a week count as regular work, and any hour worked in excess of forty (40) hours cumulative for that week will count as overtime.

The employee working in payroll will create a spreadsheet document (e.g. csv file). Using certain exemplary embodiments of the invention, using the visual environment and intention-inferencing engine, two functions are built. A first function inputs a number, x, and calculates the regular hour component and the overtime hour component from that number. If the number is greater than 40 (e.g. 50 hours), the function designates the first 40 of those hours as regular hours. Then, the result of the following formula, x-40 hours, is designated as overtime, and a pair of these two numbers (40, x-40) is returned. If the number is less than or equal to 40, the pair (x, 0) is returned, where x signifies the total number of regular hours worked, and 0 signifies the overtime hours worked.

A second function takes an example comma-separated row imported from a CSV file, and performs a set of actions on that row. These actions include: detach the work hours from the name, sum the work hours together, call the first function on the resulting sum, and reattach the result of the first function to the end of the row. With these two functions sufficiently described to the computer, one may ask the computer to automatically transform each row in a CSV file and output the results into another CSV file. The outputted file is itself compatible with spreadsheet applications. Compatibility with file types allows for a successful integration of certain embodiments into the simplified workflow of a hypothetical end-user working within a typical office computer environment.

Step 1: The spreadsheet file (e.g. CSV file) to be inputted (e.g. "hours.csv") does not yet exist.

Step 2: After saving our work in an end-user spreadsheet application, the file to input exists.

Step 3: The next step is to create a function that accepts a number representing the sum of worked hours (x hours) in a week and returns a regular component and an overtime component. First, values greater than 40 will be considered. The desired output is a pair of numbers 40 and x-40, signifying regular hours and over time hours respectively, where x may be a particular input value (e.g. "50"). While recording, the user 100 demonstrates to the machine how to produce this pair given an input value x. In one example, this process may involve joining "–40" on "x"'s right, evaluating the expression "x-40", joining "40+" to that result, and returning the two numbers delimited by a "+". In this example, the result of performing graphical manipulations on an input x='50' is '40+10'. Here, the plus sign may act as a sort of 'comma' operator, organizing two values into a simple data structure.

Step 4: For clarity of demonstration in the visual environment, the panel of visible sprites is cleared.

Step 5: Next, values less than or equal to 40 are considered. In this example, x='30', with the desired output '30+0'. The rule previously-defined on '50' is performed on '30'.

Step 6: The result from step 5 is '40+−10', which is the result of performing a similar series of instructions as was performed on '50', instead on '30'. However, this is not the way we intend the rule to work. The next step is to express dissatisfaction, introduce a comparison/conditional, and signify that, for a sum of hours less than or equal to '40', the form 'x+0' is desired.

Step 7: The user may obtain the desired output, '30+0', by expressing dissatisfaction, having the virtual machine redisplay the original unmanipulated value/expression '30' and commence recording once again, generating a new expression '+0', joining the two expressions together, and signaling "stop recording" to the virtual machine. Remove the elements from the screen.

Step 8: The overtime function is generated, and completed. Next, demonstrate to the computer how to operate on a given row of a CSV file. In one example, the spreadsheet contains the following data: 'row+8+10+12+14+15'. The word 'row' stands in place of an employee's name. The five numbers are placed where hours worked on each day of a business week will be positioned in future input.

Step 9: A new function/gesture name is inputted. The new function/gesture will accept as input parameter an entire row of data and output an entire row of data. The function detaches the numbers from the row, sums the numbers together, and executes the previously-defined overtime function on the sum. The result of the function is outputted back onto the original row. The function flattens the row (i.e. removes the parentheses), and returns the resulting row. Recording may be stopped and elements removed from the display area.

Step 10: Progress is saved with a keystroke or other input, and the window is closed.

Step 11: The results of the recorded hypothetical examples are applied onto real examples. There are four possible choices: a user interface with no graphics (fastest), graphics displaying only inputs and outputs, graphics displaying each step occurring as a movie, and graphics allowing the user to manually progress through each step of the machine's execution to an arbitrary degree of precision given by the user.

Step 12: Loading of the save-file information has completed and the first row of our input CSV is ready when returned to the manual stepper. Each graphical manipulation occurs when an event is executed, such as a keystroke or pressing a button. The graphical manipulations are done entirely by the computer at this stage.

Step 13: The row as displayed is converted into the next line in the CSV file to be outputted, and the next row from the input CSV file is prepared for graphical manipulation. The new row is then graphically manipulated step by step until returned. This procedure is performed for all rows in the inputted CSV file.

Step 14: Upon completion of the manipulation of the last row, the result is exported to an output CSV file.

Step 15: The content of the newly created output file ("manip.csv") is created. This file may be loaded into an end-user spreadsheet application.

The outcome of implementing certain embodiments of the invention is that the end-user may benefit. Primarily, a program is designed in a visual environment with the help of an intention-inferencing engine. Additionally, the program itself is visual, and corresponds to how the end-user visualizes their program. This has the benefit of the user seeing a visual representation of the code operating on the inputted data in real time, and the machine itself operating at any level of abstraction the user desires. This is possible because visual actions as performed by the user or by the computer are themselves the code, where code may generally be the manipulation of abstract syntax trees.

In a further embodiment of the invention, one may visually debug or fix the machine operating in real time on real data if it misinterprets the user's intention or otherwise breaks, just as one can fix a physical machine in real time if it abruptly breaks or does something unexpectedly. One example of this embodiment is shown below in FIG. 70.

FIG. 2 shows an example of a system for graphical manipulation in accordance with aspects of the present disclosure. The example shown includes internet 200, internet service provider (ISP) 205, local network 210, host 215, computing device 220, and virtual machine 235. Computing device 220 may include display component 225 and graphical user interface 230.

Display component 225 may display the content, wherein the display of the content includes both graphical display of the content and location of the displayed content in the user display area, on the user input display area based on the location specified by the first user input, shape of the abstract syntax tree and the locations of the content in the abstract syntax tree. Display component 225 may also display the content on the user input display area based on the revised abstract syntax tree.

Display component 225 may display the result of the evaluation on the display. Display component 225 may display, concurrent with the execution of the at least one computing operation, a graphical representation of the at least one computing operation on the user input display area, wherein the graphical representation is a direct representation of the execution of the at least one computing operation. In other words, the graphical representation is a visual expression of the at least one computing operation. In some examples, the graphical representation includes at least one moving graphical image. The graphical representation may be a user input graphical representation, where the graphical representation provides a visual expression of the direct user input, or the graphical representation may be a executable instruction graphical representation, where the graphical representation shows graphically one or more operations being carried out by the system wherein the operations are not in direct response to a user input. For example, an executable instruction graphical representation may be used when the user has previously recorded a macro, and the executable instruction graphical representation shows the operations being carried out by the macro when the macro is played. The user input graphical representation may be the same as the executable instruction graphical representation for the same associated instruction, or may be different.

Virtual machine 235 may include application 240. Application 240 may include input component 245, location component 250, manipulation component 255, storage component 260, and evaluation component 265.

Input component 245 may receive a first user input having a content and a location in the user input display area. Input component 245 may also receive a second user input.

Input component 245 may receive an initial user input indicating onset of creation of programming instructions. Input component 245 may also receive input by the user via the user input display area a function and instructions for evaluating the function. Input component 245 may also input by the user via the user display area a gesture associated with the instructions.

Input component 245 may also receive a user input indicating termination of the creation of the programming instructions. Input component 245 may also receive input by the user of a function to be evaluated. Input component 245 may also receive input by the user of the gesture. Input component 245 may also receive a user input indicating dissatisfaction with the evaluation. Input component 245 may also receive a second sequence of instructions for evaluating the instructions.

Input component 245 may receive a user input indicating initiation of a recording session. Input component 245 may also receive, during the recording session, a series of user inputs using the user input display area, where the user inputs are evaluated by previously-defined rules according to the content of the input, the location of the input in the user input display area, and the graphical manipulation of the input. Input component 245 may also receive a user input indicating termination of the recording session.

Input component 245 may also receive an indication from a user to execute at least one computing operation.

Location component 250 may assign the content to locations in an abstract syntax tree based on the content and the location in the user input display area.

Manipulation component 255 may modify, based on the second user input, at least one of the content of the abstract syntax tree, the location of the content in the abstract syntax tree, and the display of the content on the user input display area.

Manipulation component 255 may perform, in response to the receiving the function and instructions, at least one of organizing at least one abstract syntax tree and constructing a series of manipulations and/or comparisons of the at least one abstract syntax tree, whereby the organization, manipulations and/or comparisons evaluate the function. Manipulation component 255 may also modify the stored instructions based on the second set sequence of instructions.

Manipulation component 255 may determine a series of programming instructions based on the series of user inputs wherein the programming instructions include performing at least one of organizing at least one abstract syntax tree and constructing a series of manipulations and/or comparisons of the at least one abstract syntax tree.

In some examples, the determining of the series of programming instructions includes compiling the instructions into a compound step producing an equivalent result. Manipulation component 255 may also perform one of convert source code for the series of programming instructions to source code for a different programming language and convert source code for a different programming language to source code for the series of programming instructions.

Manipulation component 255 may execute the at least one computing operation. Storage component 260 may store of the instructions, the syntax tree organization, the series of manipulations, and the association with the gesture. In some embodiments the storage component 260 stores the instruction set architecture, which associates each graphical representation with an instruction or function. Evaluation component 265 may evaluate the function based on the stored programming instructions associated with the gesture.

Figure 3:
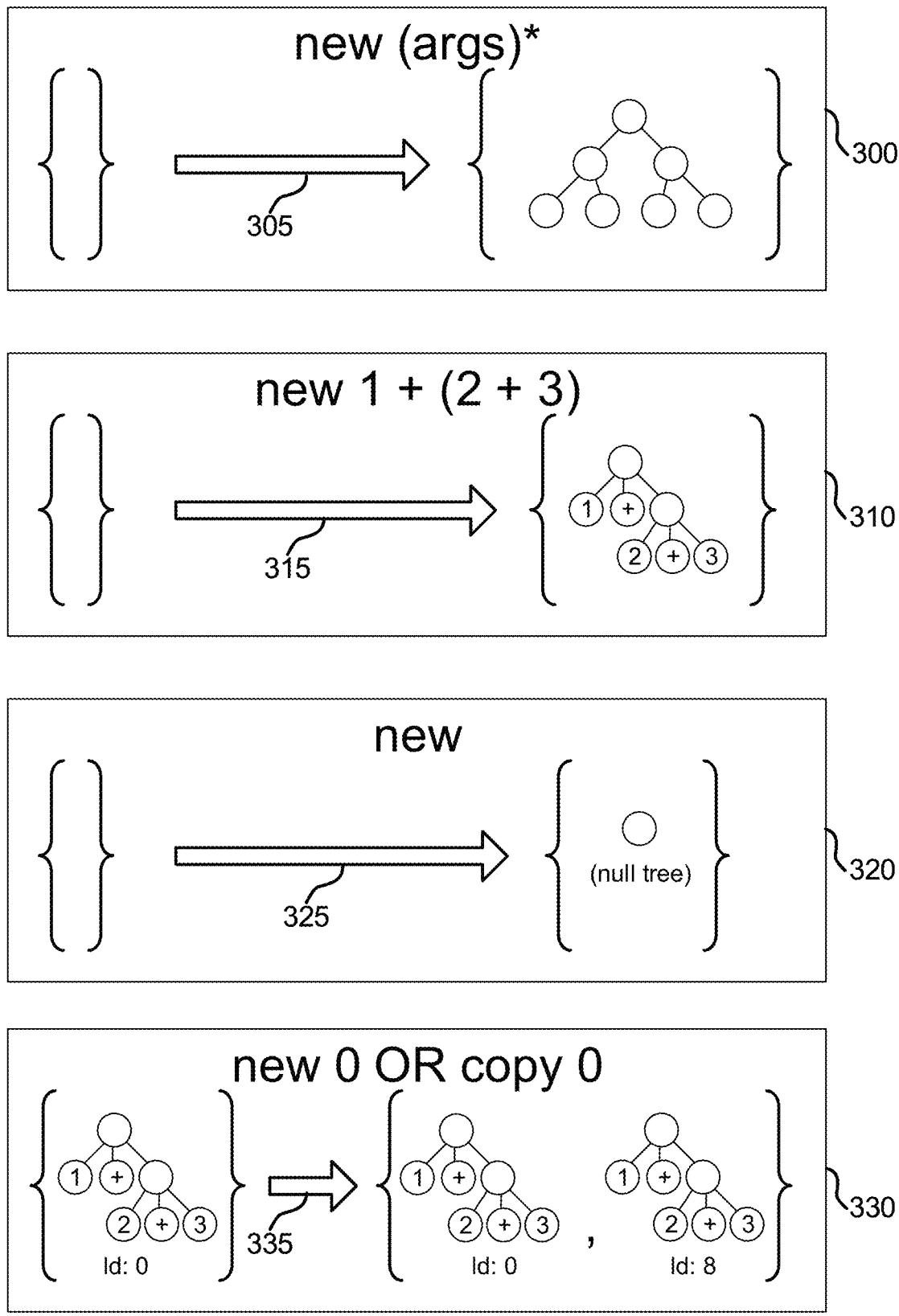
FIG. 3 shows an example of commands for creating new elements in accordance with aspects of the present disclosure.

FIG. 3 shows an example of commands for creating new elements in accordance with aspects of the present disclosure. The example shown includes first command sequence 300, second command sequence 310, third command sequence 320, and fourth command sequence 330. The illustrated examples show an AST represented as a node tree.

First command sequence 300 may include first step 305, which represents a new (args)* command on an arbitrary argument. Second command sequence 310 may include second step 315, a new 1+(2+3) command. Third command sequence 320 may include third step 325, a new command. Fourth command sequence 330 may include fourth step 335, a new 0 or equivalent copy 0 command. In some cases, the representation of the abstract logic trees depends on implementation of a runtime engine.

Figure 4:
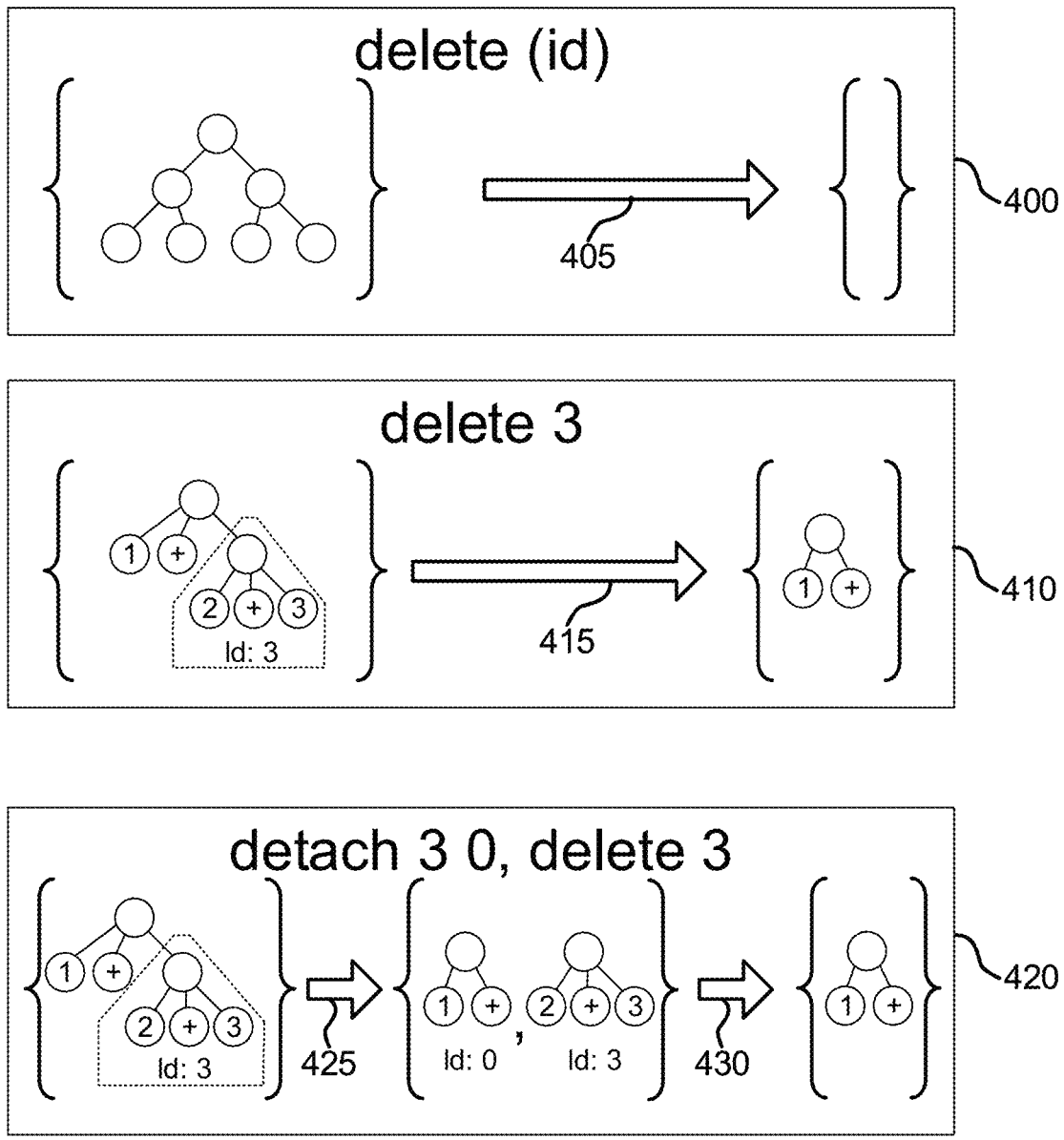
FIG. 4 shows an example of commands for deleting nodes in accordance with aspects of the present disclosure.

FIG. 4 shows an example of commands for deleting nodes in accordance with aspects of the present disclosure. The example shown includes first command sequence 400, second command sequence 410, and third command sequence 420.

First command sequence 400 may include first step 405, delete (id). Second command sequence 410 may include second step 415, delete 3. Third command sequence 420 may include third step 425, detach 3 0 and fourth step 430, delete 3.

Figure 5:
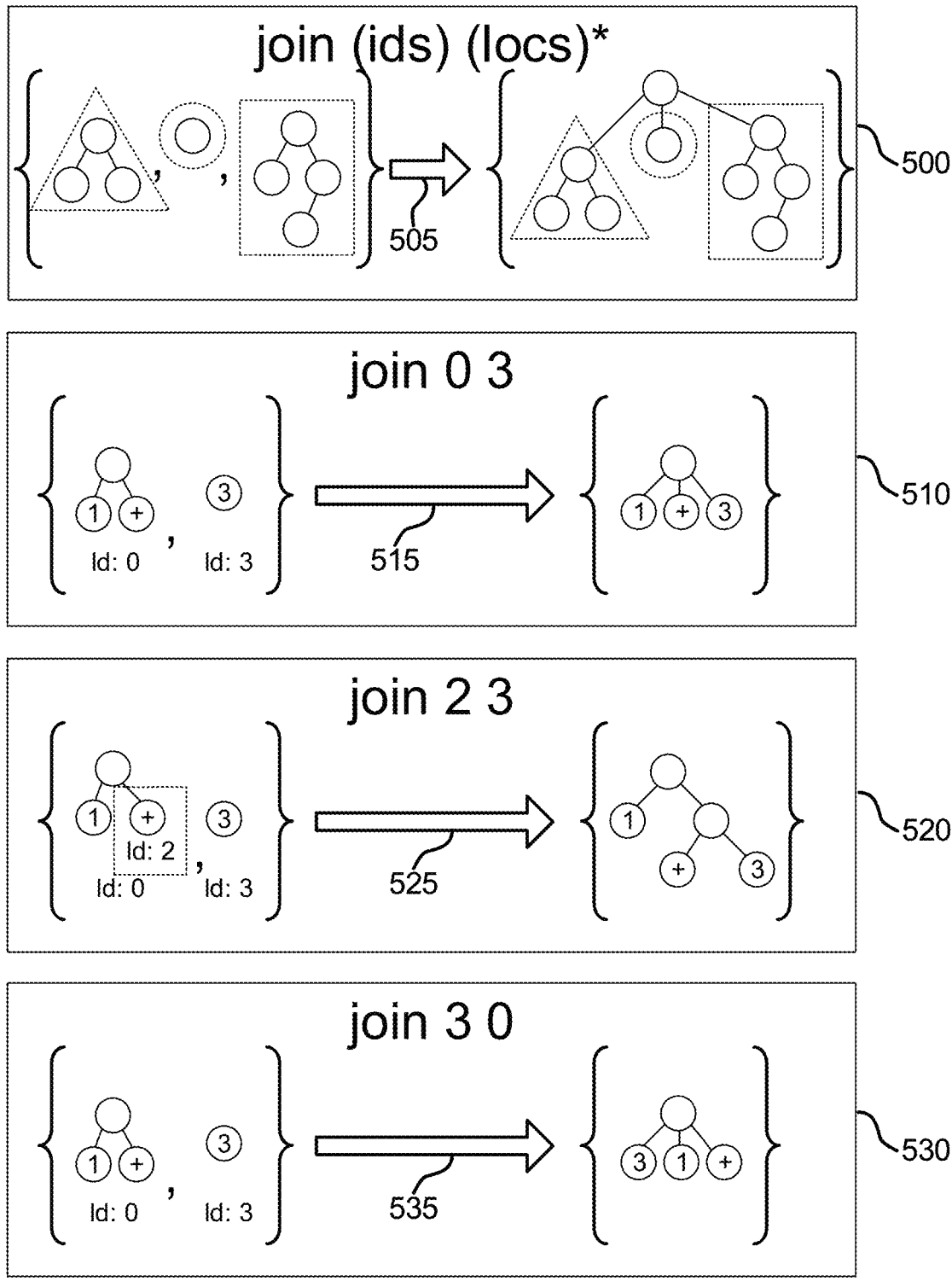
FIG. 5 shows an example of commands for joining nodes in accordance with aspects of the present disclosure.

FIG. 5 shows an example of commands for joining nodes in accordance with aspects of the present disclosure. The example shown includes first command sequence 500, second command sequence 510, third command sequence 520, and fourth command sequence 530.

The 'join' command takes the names of trees to be connected left-to-right (and, optionally, the graphical location coordinates for the result in a visual environment) and outputs the joined nodes.

In some embodiments, the join command will do nothing if more than one id refers to a non-root node. In some embodiments, the join command does nothing if the same id is input more than once. In some cases, the join command may have an alias to distinguish it from optional alternatives (e.g., joinover and joinunder).

First command sequence 500 may include first step 505, join (ids) (locs)*. Second command sequence 510 may include second step 515, join 0 3. Third command sequence 520 may include third step 525, join 2 3. Fourth command sequence 530 may include fourth step 535, join 3 0.

Figure 6:
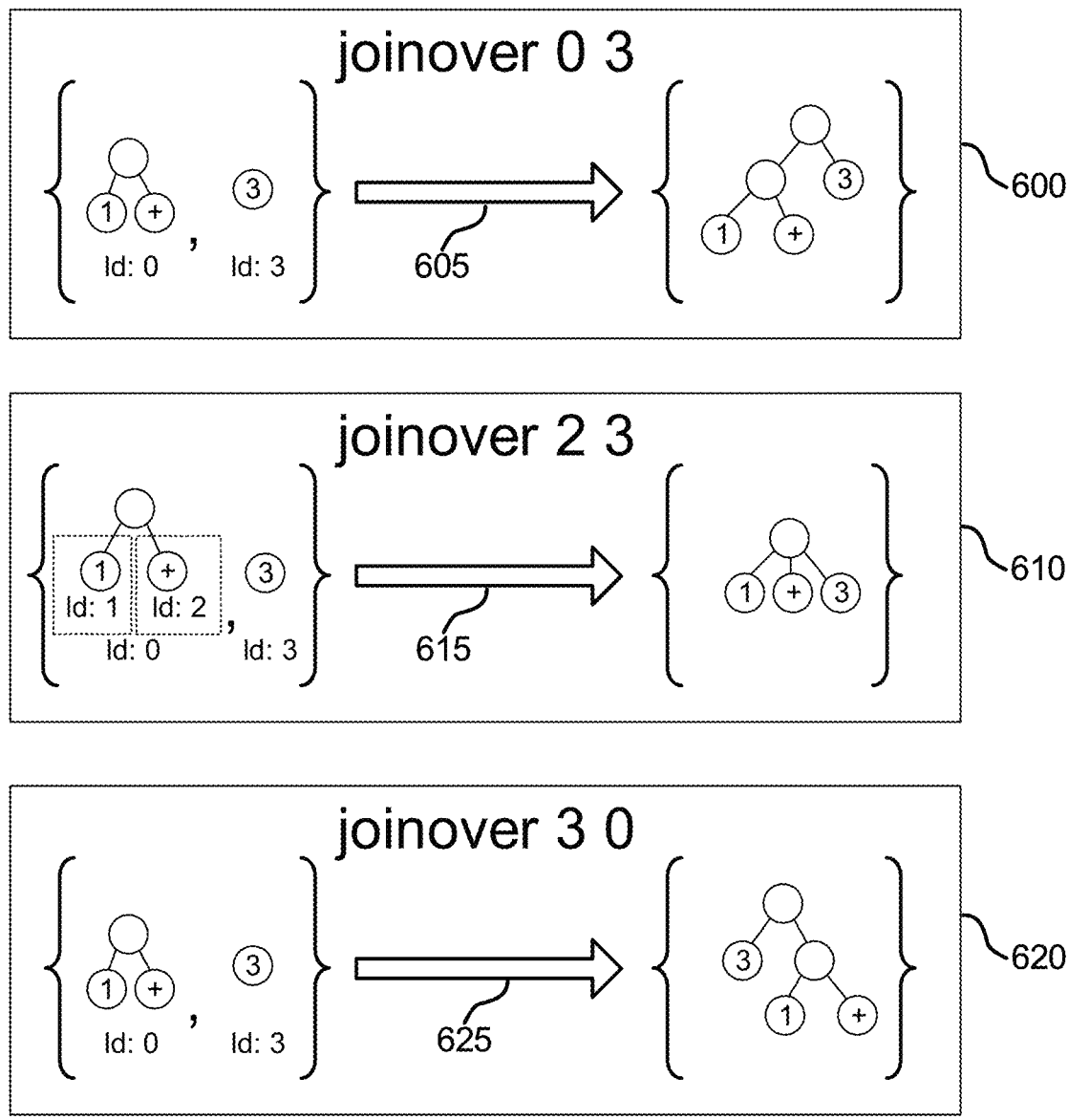
FIG. 6 shows an example of commands for executing a joinover in accordance with aspects of the present disclosure.

FIG. 6 shows an example of commands for executing a joinover in accordance with aspects of the present disclosure. The example shown includes first command sequence 600, second command sequence 610, and third command sequence 620.

The 'joinover' command takes names of trees to be connected left-to-right (and, optionally, the graphical location coordinates for the result in a visual environment, like join or joinunder). In some cases, such as in the instruction set architecture (ISA), different methods of specifying and implementing the join command may be used so long as the functionality includes sufficient elements of the join functions described herein.

First command sequence 600 may include first step 605, joinover 0 3. Second command sequence 610 may include second step 615, joinover 2 3. Third command sequence 620 may include third step 625, joinover 3 0.

Figure 7:
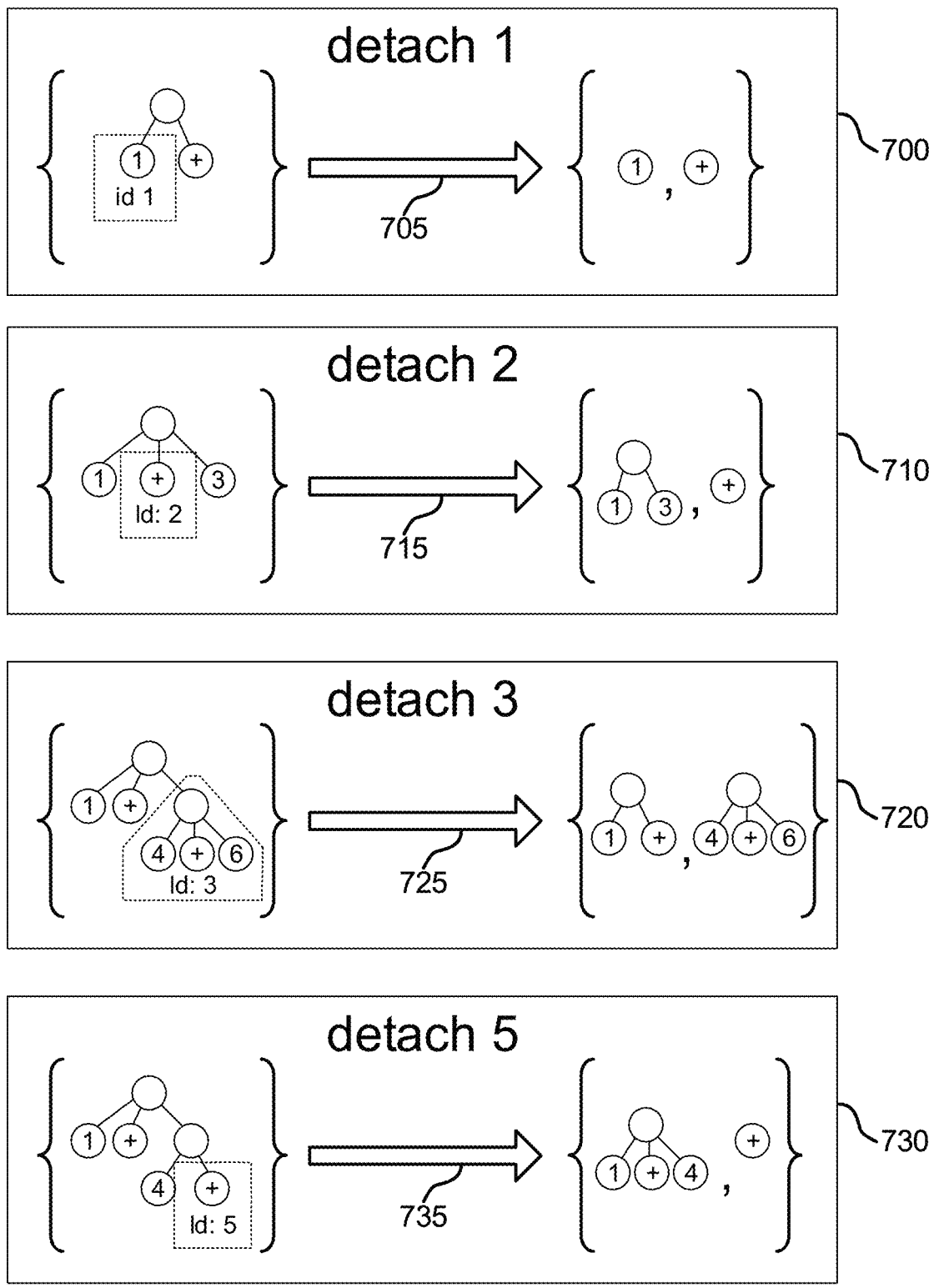
FIGS. 7 through 8 show examples of commands for detaching nodes in accordance with aspects of the present disclosure.

FIG. 7 shows an example of commands for detaching nodes in accordance with aspects of the present disclosure. The example shown includes first command sequence 700, second command sequence 710, third command sequence 720, and fourth command sequence 730.

The 'detach' command takes each id inputted as a parameter and disconnects it from its parent (if it has one). To avoid nodes with exactly one leaf, nodes with one leaf may be 'elevated'. The detach instruction optionally contains an extra parameter to signify that multiple detached nodes should be kept connected. The parameter may be the lowest common node.

First command sequence 700 may include first step 705, detach 1. Second command sequence 710 may include second step 715, detach 2. Third command sequence 720 may include third step 725, detach 3. Fourth command sequence 730 may include fourth step 735, detach 5.

Figure 8:
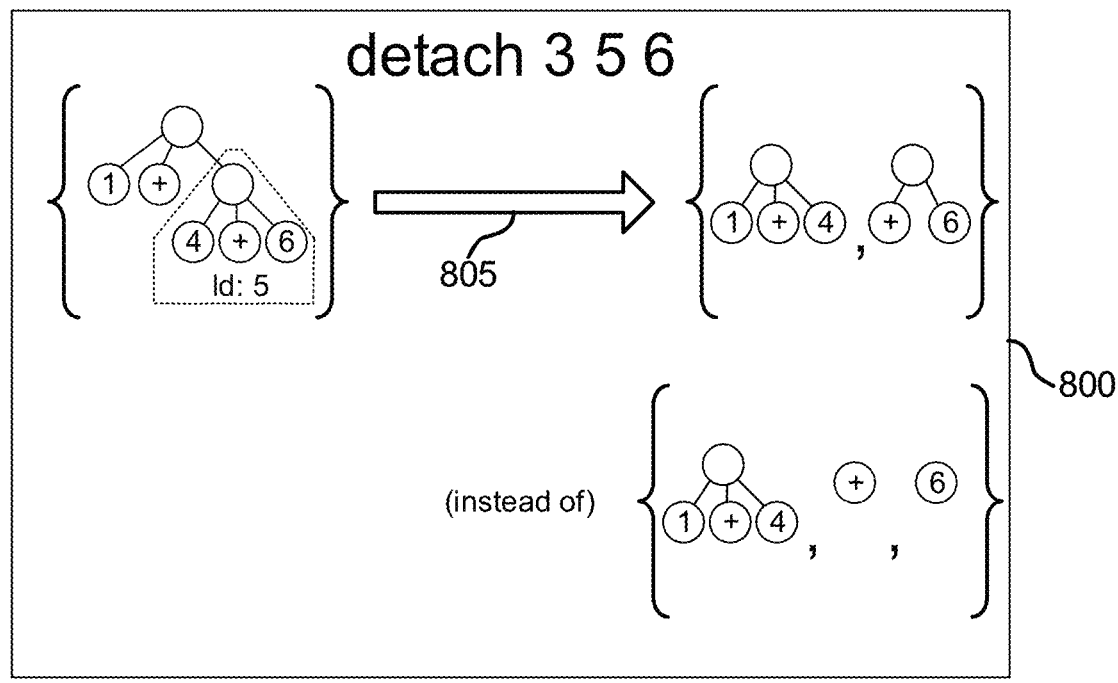

FIG. 8 shows an example of commands for detaching nodes in accordance with aspects of the present disclosure. Fifth command sequence 800 may include fifth step 805, detach 3 5 6.

Figure 9:
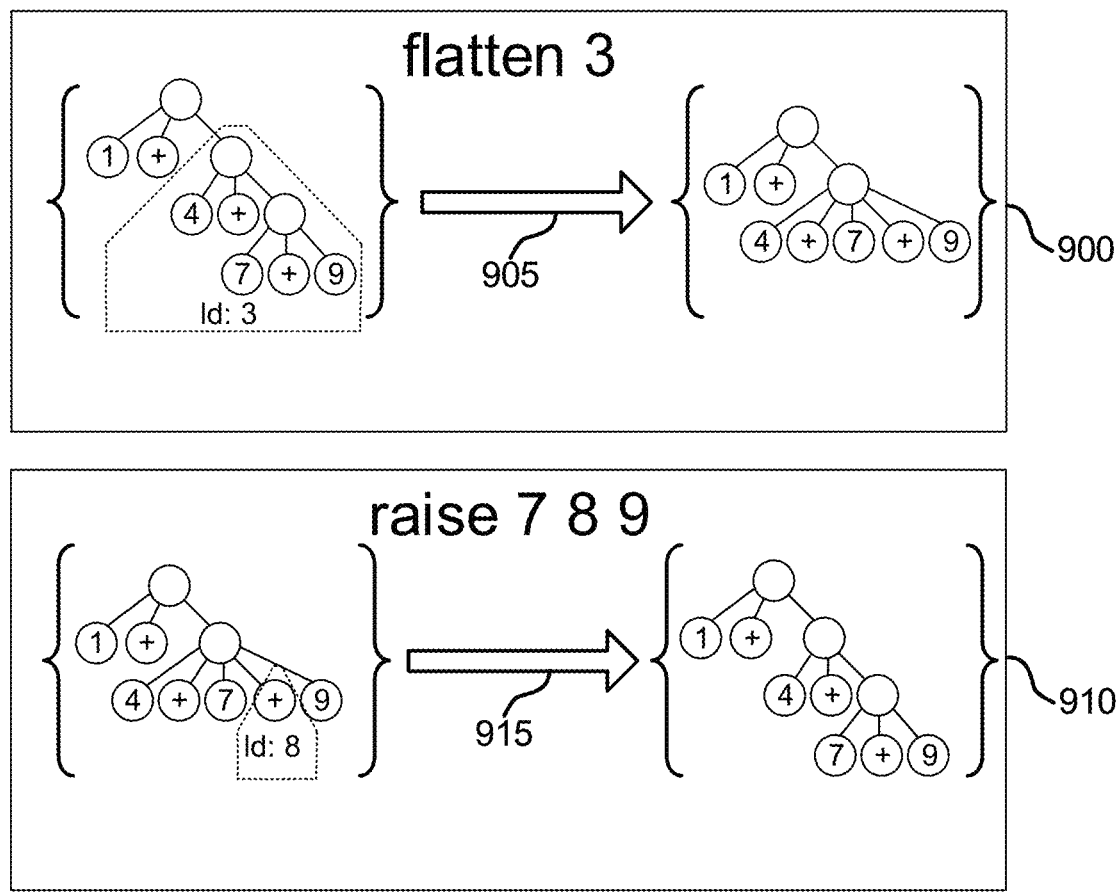
FIG. 9 shows an example of commands for raising and flattening nodes in accordance with aspects of the present disclosure.

FIG. 9 shows an example of commands for raising and flattening nodes in accordance with aspects of the present disclosure. The example shown includes first command sequence 900 and second command sequence 910.

The 'flatten' instruction arranges all children so they are directly under the same parent. Flatten may optionally work recursively on all children under each of the listed nodes. The 'raise' instruction adds an intermediary node between a node and the least common node. Optionally, the IDs must all have the same parent. The raise instruction may act as an inverse to the flatten instruction.

First command sequence 900 may include first step 905, flatten 3. Second command sequence 910 may include second step 915, raise 7 8 9.

Figure 10:
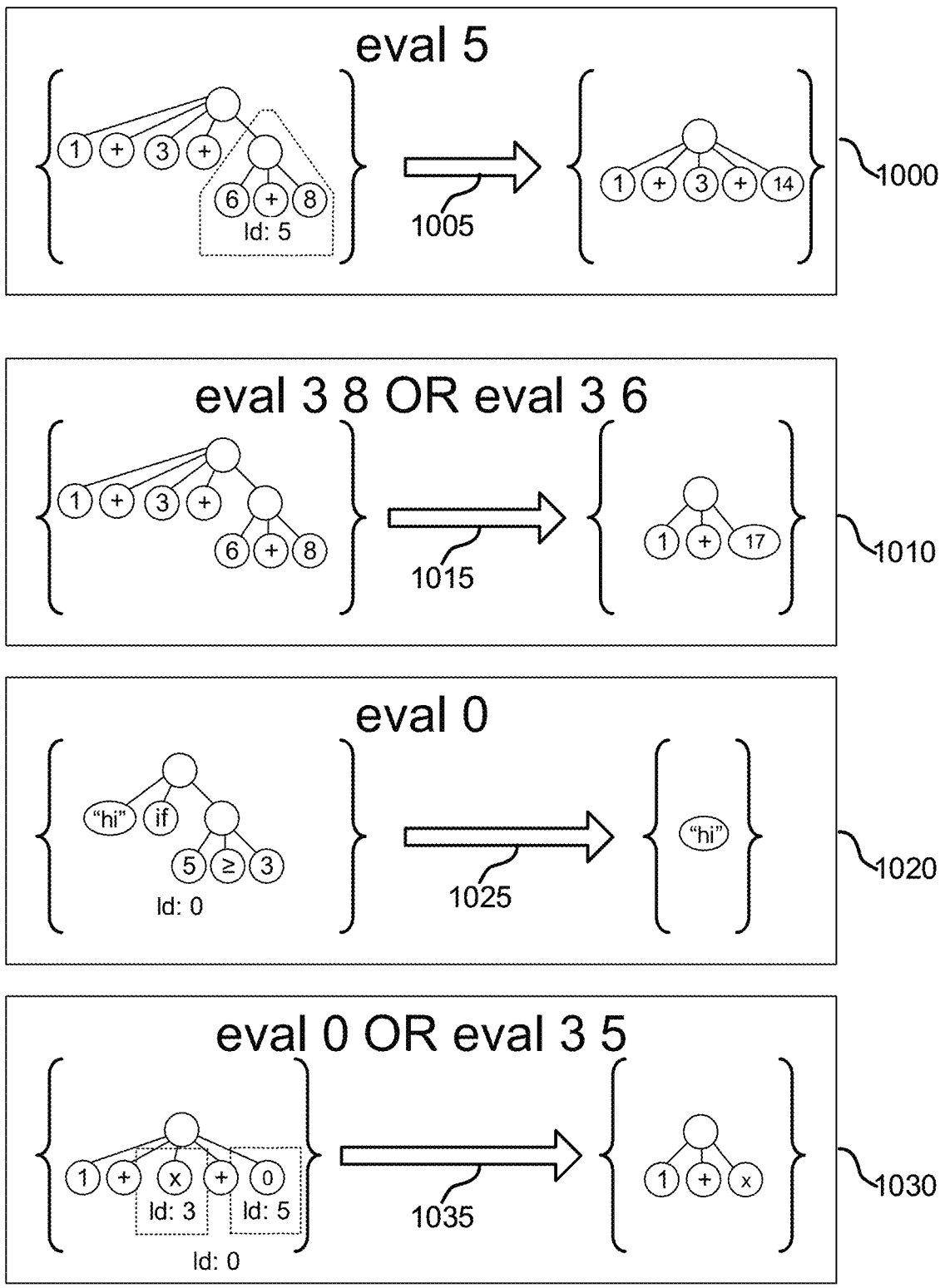
FIGS. 10 through 11 show examples of commands for evaluating nodes in accordance with aspects of the present disclosure.

FIG. 10 shows an example of commands for evaluating nodes in accordance with aspects of the present disclosure. The example shown includes first command sequence 1000, second command sequence 1010, third command sequence 1020, and fourth command sequence 1030.

In the case of mathematical expressions and equations, as well as program source code as found in AST parses or LISP code, the eval instruction may perform an evaluation, either for the entirety of a uniquely identified subtree or for everything left of an ID, right of an ID, or in between two IDs inclusive.

First command sequence 1000 may include first step 1005, eval 5. Second command sequence 1010 may include second step 1015, eval 3 8 OR eval 3 6. Third command sequence 1020 may include third step 1025, eval 0. Fourth command sequence 1030 may include fourth step 1035, eval 0 OR eval 3 5.

Figure 11:
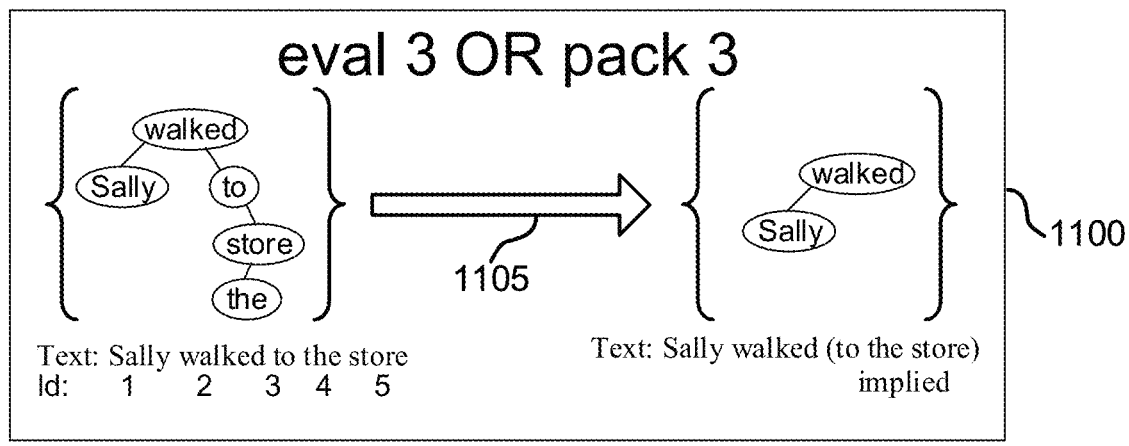

FIG. 11 shows an example of commands for evaluating nodes in accordance with aspects of the present disclosure. Fifth command sequence 1100 may include fifth step 1105, eval 3 OR pack 3. FIG. 11 illustrates an example in which eval is used in the case of a natural language context. The eval or pack commands may pack contextual meaning into remaining tokens.

Figure 12:
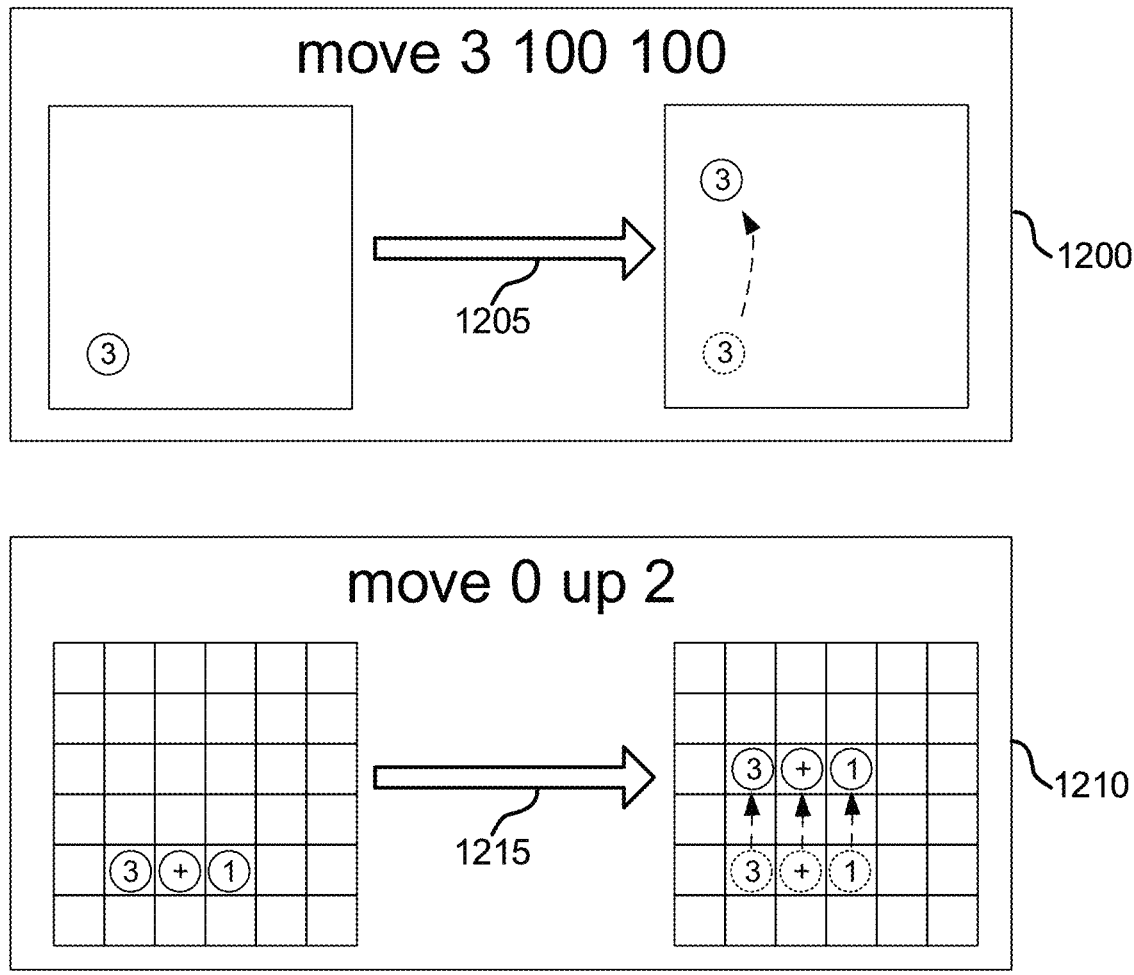
FIG. 12 shows an example of commands for moving nodes in accordance with aspects of the present disclosure.

FIG. 12 shows an example of commands for moving nodes in accordance with aspects of the present disclosure. The example shown includes first command sequence 1200 and second command sequence 1210.

The 'move' instruction sets the graphical coordinate location in a visual environment. Optionally, the move command may have default flags for in-front vs behind preferences, or for what to do in case of overlapping elements in virtual space. In some examples locations may include grid coordinates, pixel coordinates, or prepositional descriptors relative to locations of other elements.

First command sequence 1200 may include first step 1205, move 3 100 100. Second command sequence 1210 may include second step 1215, move 0 up 2.

Figure 13:
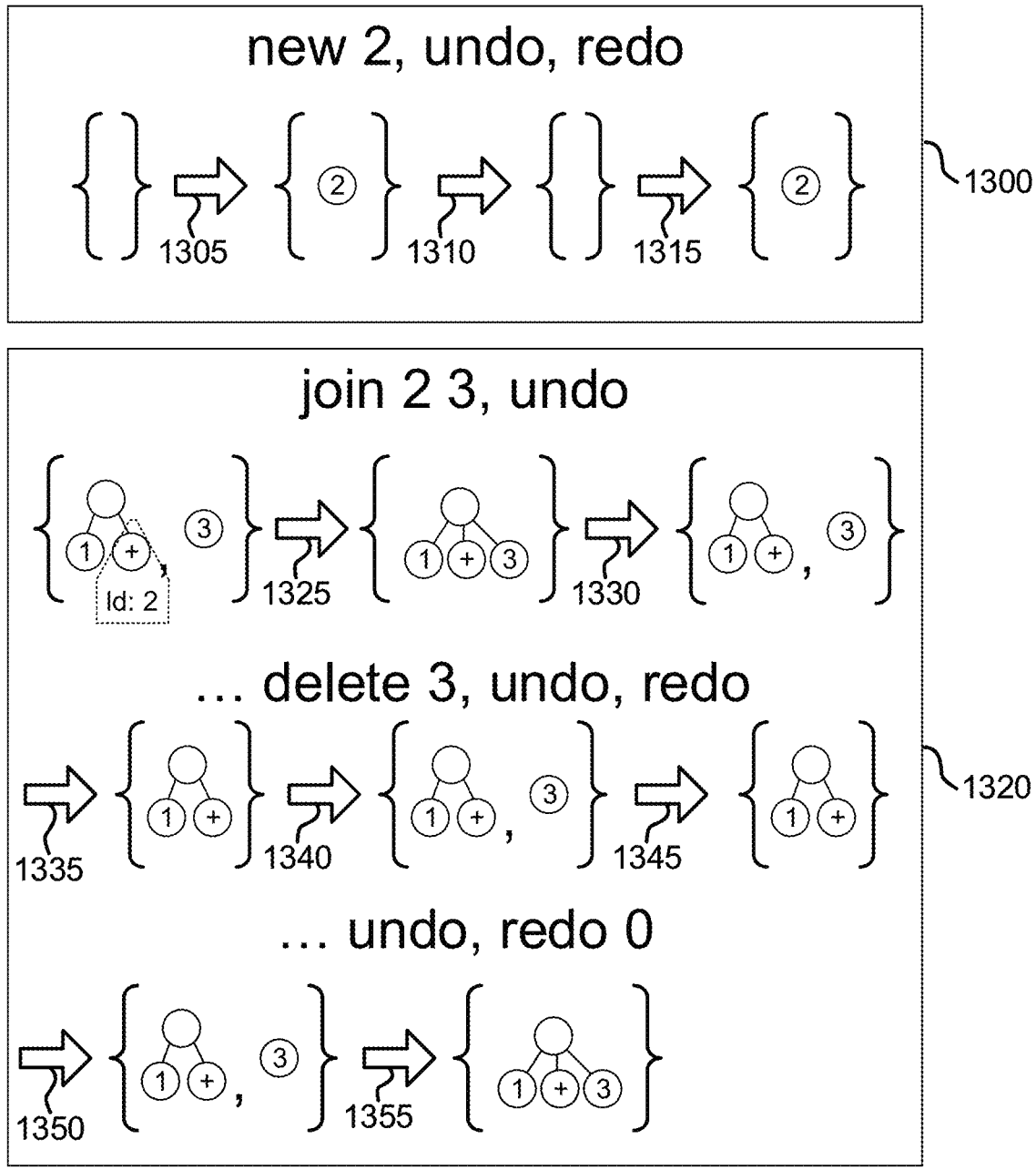
FIG. 13 shows an example of commands for undoing and redoing previous actions in accordance with aspects of the present disclosure.

FIG. 13 shows an example of commands for undoing and redoing previous actions in accordance with aspects of the present disclosure. The example shown includes first command sequence 1300 and second command sequence 1320.

The 'undo' and 'redo' instruction may traverse a tree of global states of a program. Optionally, the commands may accept as a parameter a key referring to a particular state or branch, possibly stored as a file whose name is the result of a function from the set of states to a string, such as a hash of the state. If invoked at the beginning or end of a history, redo and undo may not have an effect.

First command sequence 1300 may include first step 1305, new 2, second step 1310, undo, and third step 1315, redo.

Second command sequence 1320 may include fourth step 1325, join 2 3, fifth step 1330, undo, sixth step 1335, delete 3, seventh step 1340, undo, eighth step 1345, redo, ninth step 1350, undo, tenth step 1355, redo 0.

Figure 14:
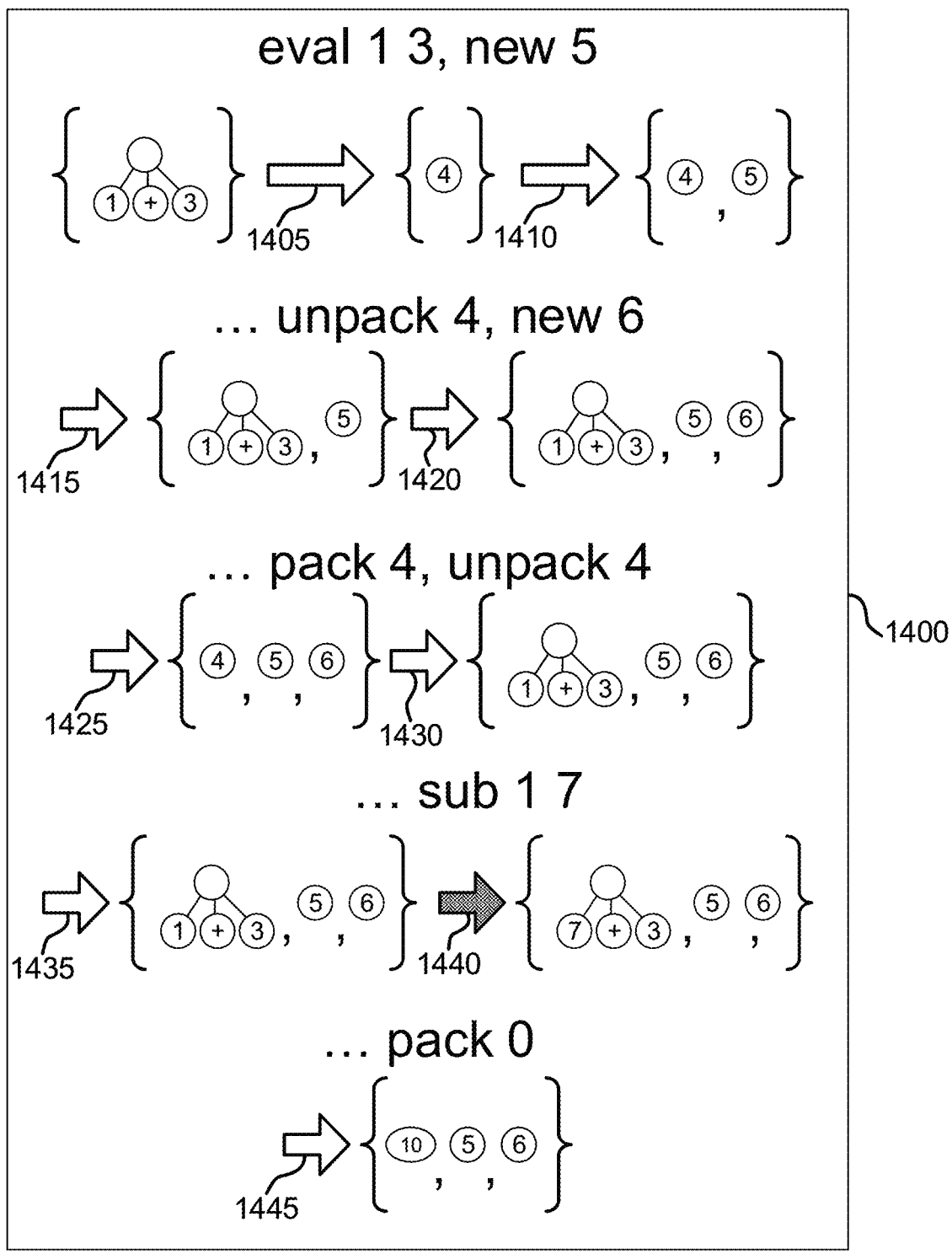
FIG. 14 shows an example of commands for packing and unpacking nodes in accordance with aspects of the present disclosure.

FIG. 14 shows an example of commands for packing and unpacking nodes in accordance with aspects of the present disclosure.

The 'pack' and 'unpack' commands allow a regional undo/redo while moving the global time of the state forward. A history of packed content may optionally be reset on certain sets of actions, such as a change in a final evaluation, to maintain a sense of immutability.

First command sequence 1400 may include first step 1405, eval 1 3, second step 1410, new 5, third step 1415, unpack 4, fourth step 1420, new 6, fifth step 1425, pack 4, sixth step 1430, unpack 4, seventh step 1435, sub 1 7, eighth step 1440, pack 0.

Figure 15:
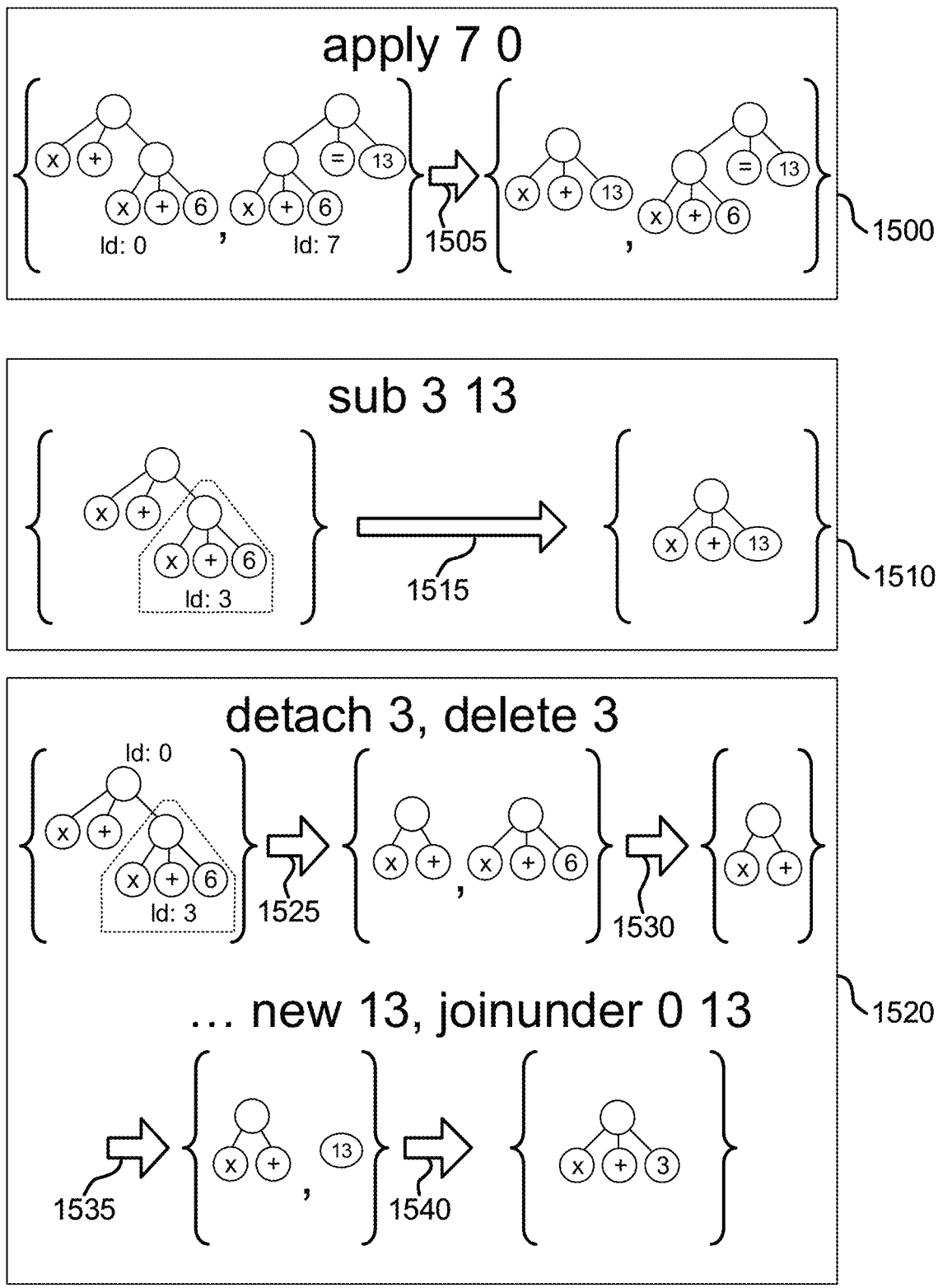
FIG. 15 shows an example of commands for substitution, and application of nodes in accordance with aspects of the present disclosure.

FIG. 15 shows an example of commands for substitution, and application of nodes in accordance with aspects of the present disclosure. The example shown includes first command sequence 1500, second command sequence 1510, and third command sequence 1520.

The 'sub' instruction removes the subtree indicated by the id parameter and replaces it with new content. The 'apply' instruction finds content matches, possibly using a pre-walk method, of one side of an equation signified by the equation id within the subtree indicated by the id parameter and replaces them with the content of the other side of the equation.

First command sequence 1500 may include first step 1505, apply 7 0. Second command sequence 1510 may include second step 1515, sub 3 13. Third command sequence 1520 may include first step 1525, detach 3, second step 1530, delete 3, third step 1535, new 1 3, and fourth step 1540 joinunder 0 13.

Figure 16:
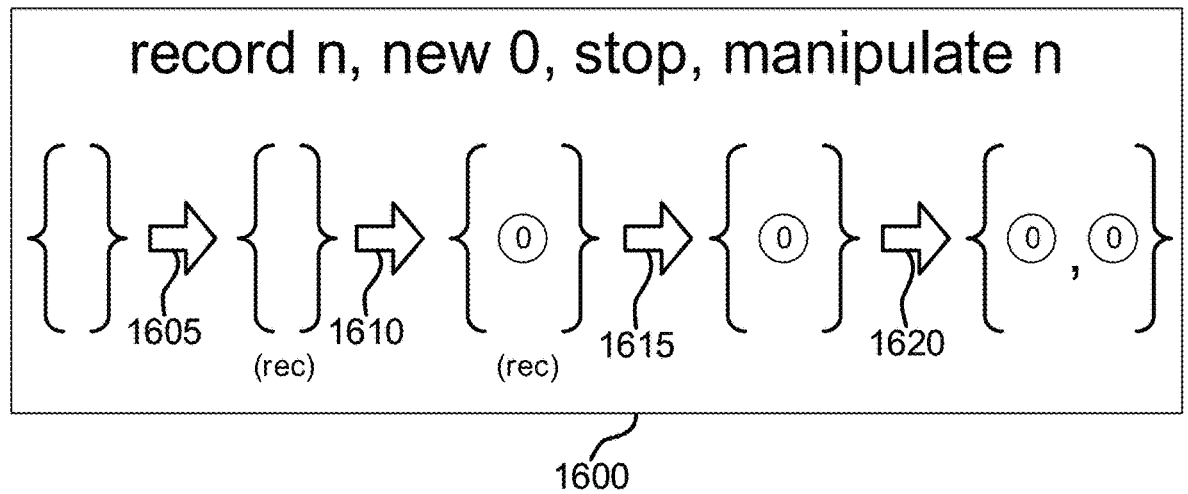
FIGS. 16 through 18 show examples of commands for recording instructions and manipulating nodes in accordance with aspects of the present disclosure.

FIG. 16 shows an example of commands for recording instructions and manipulating nodes in accordance with aspects of the present disclosure.

The 'record' command optionally interprets the global state as being a tree structure, saves the text content of each instruction executed until the user has stopped recording, and then saves this text along with the operated subtrees for later interpretation in case of manipulation. In some cases, 'record' can overload a function with multiple sets of operated subtrees and sequences of zero or more instructions.

The instruction 'manipulate' takes the content of a subtree at an id, and compares it with different trees operated on with the same function name, selects the most similar one (i.e., using the similarity scoring described above) and tries to execute the commands associated with the selected id. The instruction 'dissatisfied' undoes the state and records new instructions for an id.

First command sequence 1600 may include first step 1605, record n, second step 1610, new 0, third step 1615, stop, and fourth step 1620, manipulate n.

As illustrated in the example of FIG. 16, the command "record n" in step 1605 indicates to the system that recording has started, i.e. that all subsequent instructions/operations will be recorded until recording is stopped. The recording is also given the name "n". in step 1605. In step 1610 the operation "new 0" is recorded and the action of creating a new empty syntax tree is recorded and graphically displayed so that the user can see the visual expression of the recorded action.

In step 1615 the user gives the command "stop", whereby the system stops recording the operations. In step 1620, the function "manipulate" is applied to the recording "n", where as previously described, the system attempts to apply the actions recorded for "n" to the current global state. In the present example, this results in the system adding another empty abstract syntax tree, whereby in step 1620 there are now two empty abstract syntax trees.

Figure 17:
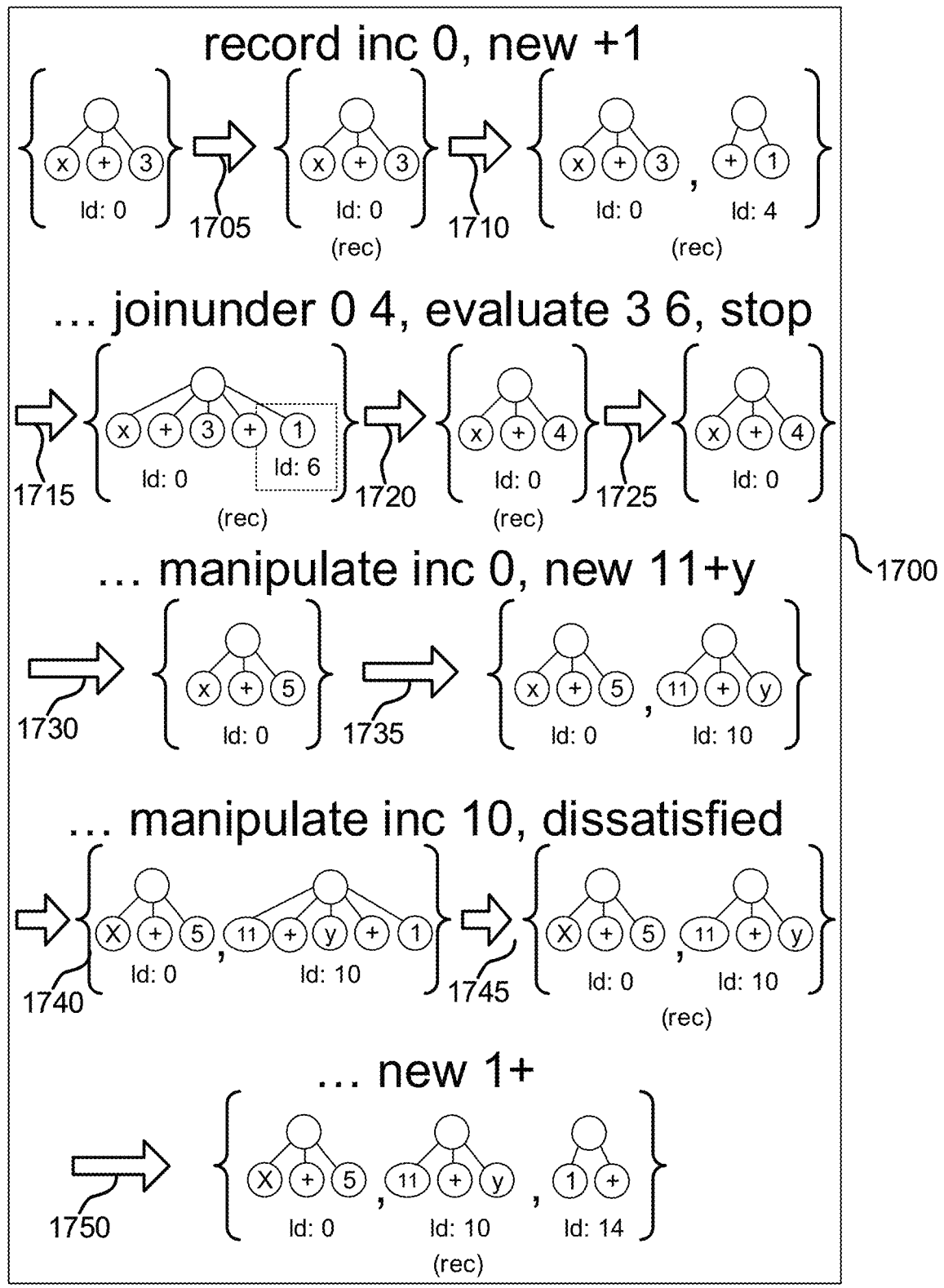

FIG. 17 shows an example of commands for recording instructions and manipulating nodes in accordance with aspects of the present disclosure.

Second command sequence 1700 may include first step 1705, record inc 0, second step 1710, new+1, third step 1715, joinunder 0 4, fourth step 1720, evaluate 3 6, fifth step 1725, stop, sixth step 1730, manipulate inc 0, seventh step 1735, new 11+y, eighth step 1740, manipulate inc 10, ninth step 1745, dissatisfied, and tenth step 1750, new 1+.

Figure 18:
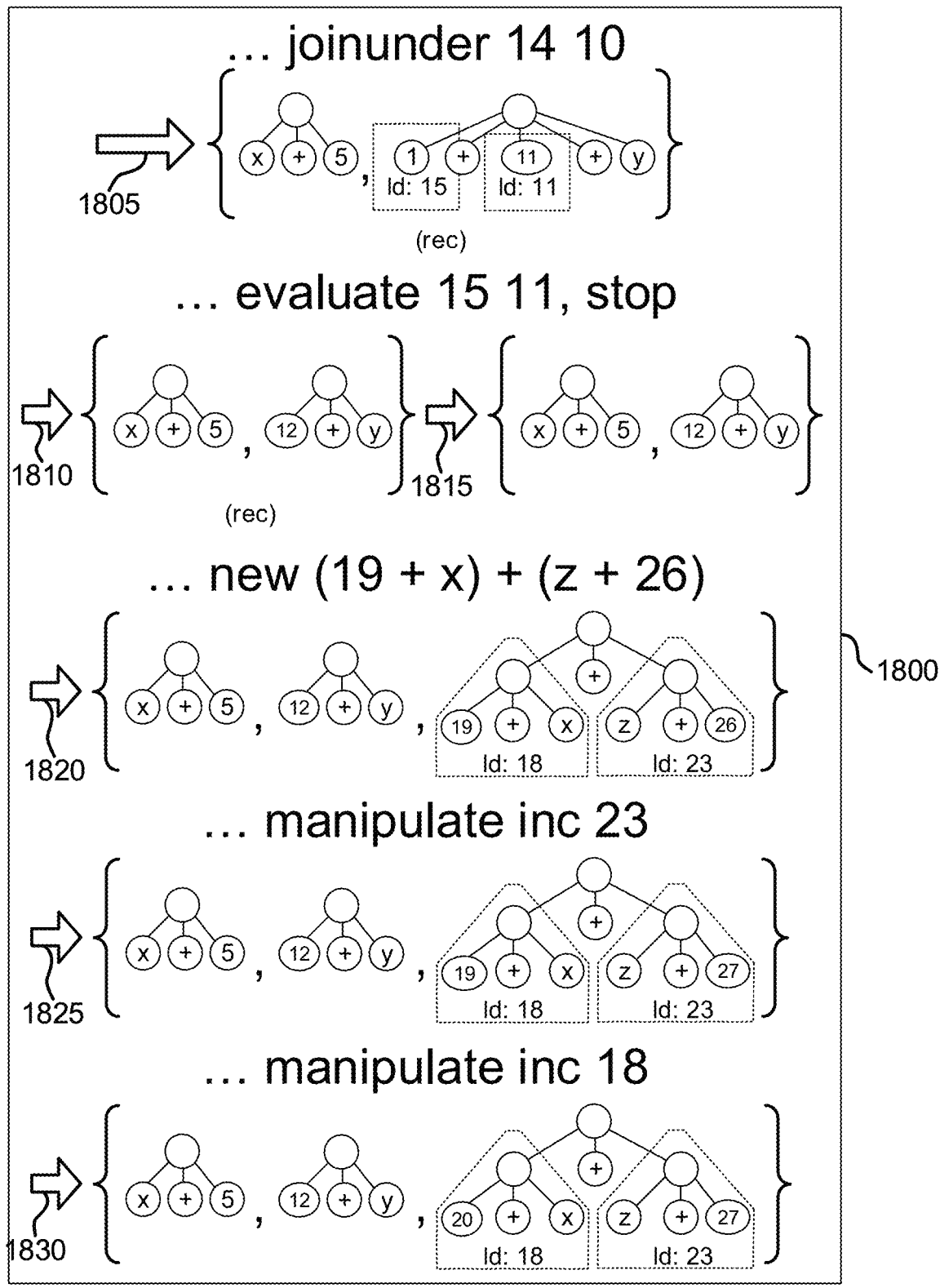

FIG. 18 is a continuation of the example for commands for recording instructions and manipulating nodes of FIG. 17 in accordance with aspects of the present disclosure.

Second command sequence 1800 may be a continuation of first command sequence 1700 and may include eleventh step 1805, joinunder 14 10, twelfth step 1810, evaluate 15 11, thirteenth step 1815, stop, fourteenth step 1820, new (19+x)+(z+26), fifteenth step 1825, manipulate inc 23, and sixteenth step 1830, manipulate inc 18.

Referring again to FIGS. 17 and 18, another recording example is shown. Initially, the abstract syntax tree state comprises a single AST with an id of 0. The AST has three lower-level nodes: "x", "+", and "3". In the first step 1705, the command "rec inc 0" starts a recording, names the recording "inc", and sets the current state equal to the AST with id=0. In the second step 1710, the command "new+1" is given, and a new AST with the nodes "+" and "1" is created and has an Id=4. The step is recorded.

In the third step 1715, the command "joinunder 0 4" is given. The AST with id=4 is joined under the AST with id=0. The step is recorded. In the fourth step 1720, the command "evaluate 3 6" is given. The nodes with ids of 3 and 6 are evaluated. The step is recorded. In the fifth step 1725, the command "stop" is given. The recording is stopped.

In the sixth step 1730, the command "manipulate inc 0" is given. The system performs the actions previously recorded for the recording "inc" on the AST of id=0. The step is not recorded. In the seventh step 1735, the command "new 11+y" is given. A new AST is created with the nodes "11", "+", and "y". The id of the new AST is 10. The step is not recorded.

In the eight step 1740, the command "manipulate inc 10" is given. The system performs the actions of the recording "inc" on the AST with id=10. The step is not recorded. The user views the resulting change to AST with id=10. In this example, the system has modified the AST to have the nodes "+" and "1" in addition to the originally-defined nodes. The user in this example expresses dissatisfaction the ninth step 1745, because the system has made an incorrect interpretation of recording of "inc" as applied to the AST with id=10. The AST with id=10 reverts to the previous state. The step is recorded.

In the tenth step 1750, the command "new 1+" is given. A new AST is created (id=14). The node "1" has an id=15. The step is recorded.

In the eleventh step 1805, the command "joinunder 14 10" is given. The system joins the AST with id=10 under the AST with id=14. The step is recorded.

In the twelfth step 1810, the command "evaluate 15 11" is given. The system evaluates the node with id=15 with the node with value of 11. The step is recorded.

In the thirteenth step 1815, the command "stop" is given. The recording is stopped.

In the fourteenth step 1820, the command "new (19+x)+(z+26)" is given. The corresponding new AST is created. It has lower branches of id=18 and id=23. The step is not recorded.

In the fifteenth step 1825, the command "manipulate inc 23" is given. The AST branch with id=23 is modified based on the recording "inc". This results in the branch being modified from "z=26" to "z=27". The step is not recorded.

In the sixteenth step 1830, the command manipulate inc 18" is given. The AST branch with id=18 is modified based on the recording "inc". This results in the branch being modified from "19+x" to "20+x".

Figure 19:
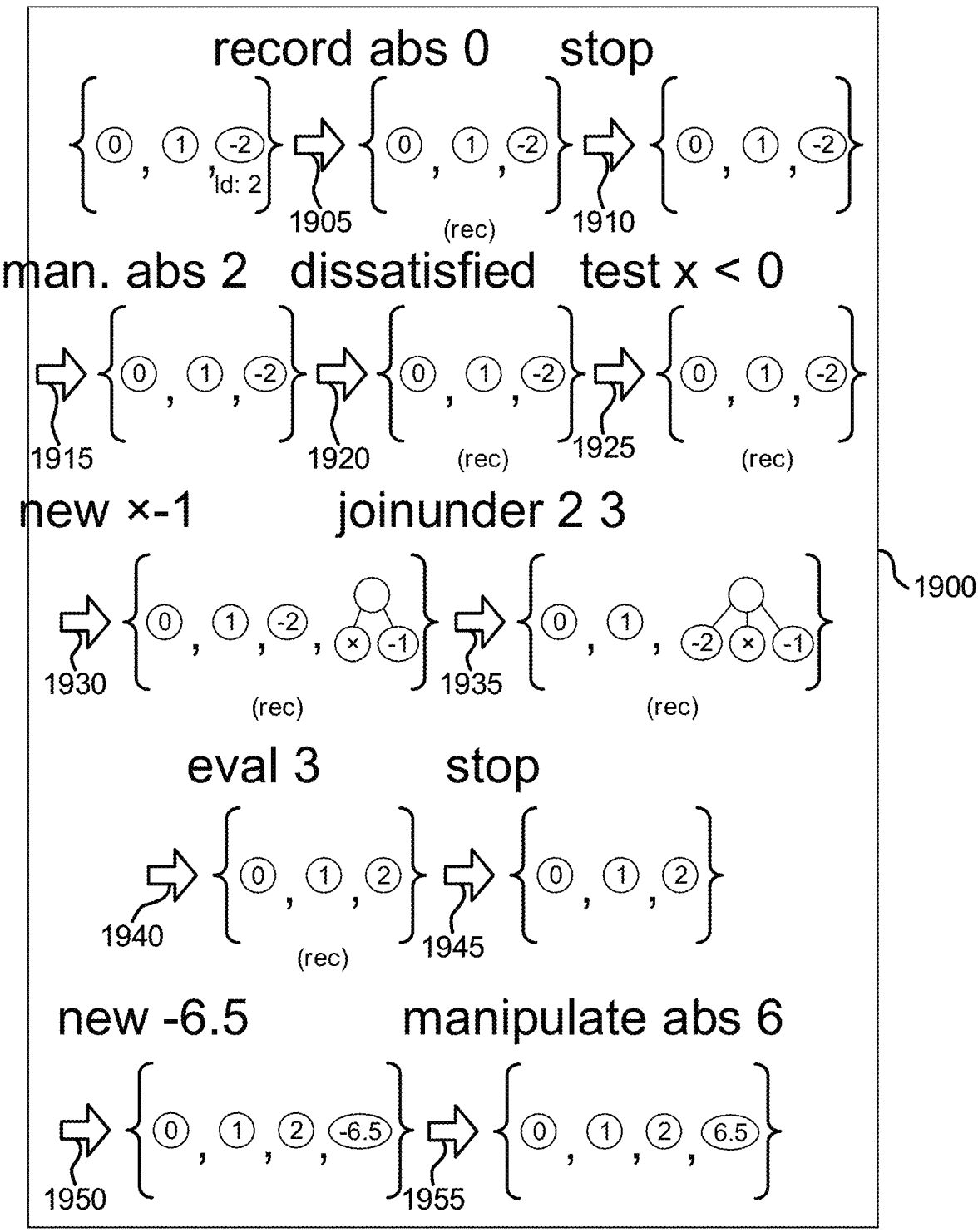
FIG. 19 shows an example of commands for applying a logical condition in accordance with aspects of the present disclosure.

FIG. 19 shows an example of commands for applying a logical condition in accordance with aspects of the present disclosure. The 'test' instruction allows a user to bypass a default similarity scoring using a systems comparator procedure by explicitly providing a desired comparator.

First command sequence 1900 may include first step 1905, record abs 0, second step 1910, stop, third step 1915, manipulate abs 2, fourth step 1920, dissatisfied, fifth step 1925, test x<0 (the condition), sixth step 1930, new *-1, seventh step 1935, joinunder 2 3, eighth step 1940, eval 3, ninth step 1945, stop, tenth step 1950, new -6.5, and eleventh step 1955, manipulate abs 6.

Referring again to FIG. 19, the system attempting to apply the recording "abs" (i.e. a recording for taking the absolute value) to the AST with id=2 in step 1915 results in the user expressing dissatisfaction in step 1920. The system resumes recording upon receiving the dissatisfied command. The command "test x<0" indicates that the user is providing an example of the rule to use when the value is less than 0. The user then inputs a new AST illustrating that if x<0 then the system multiplies the value by -1 (steps 1930 through 1940). The user then stops the recording in step 1945 having provided the system with the revised instructions. The revised instructions are tested in steps 1950 and 1955, where the system properly applies the revised instructions to the AST with value -6.5 to modify the AST to 6.5 in step 1955.

Figure 20:
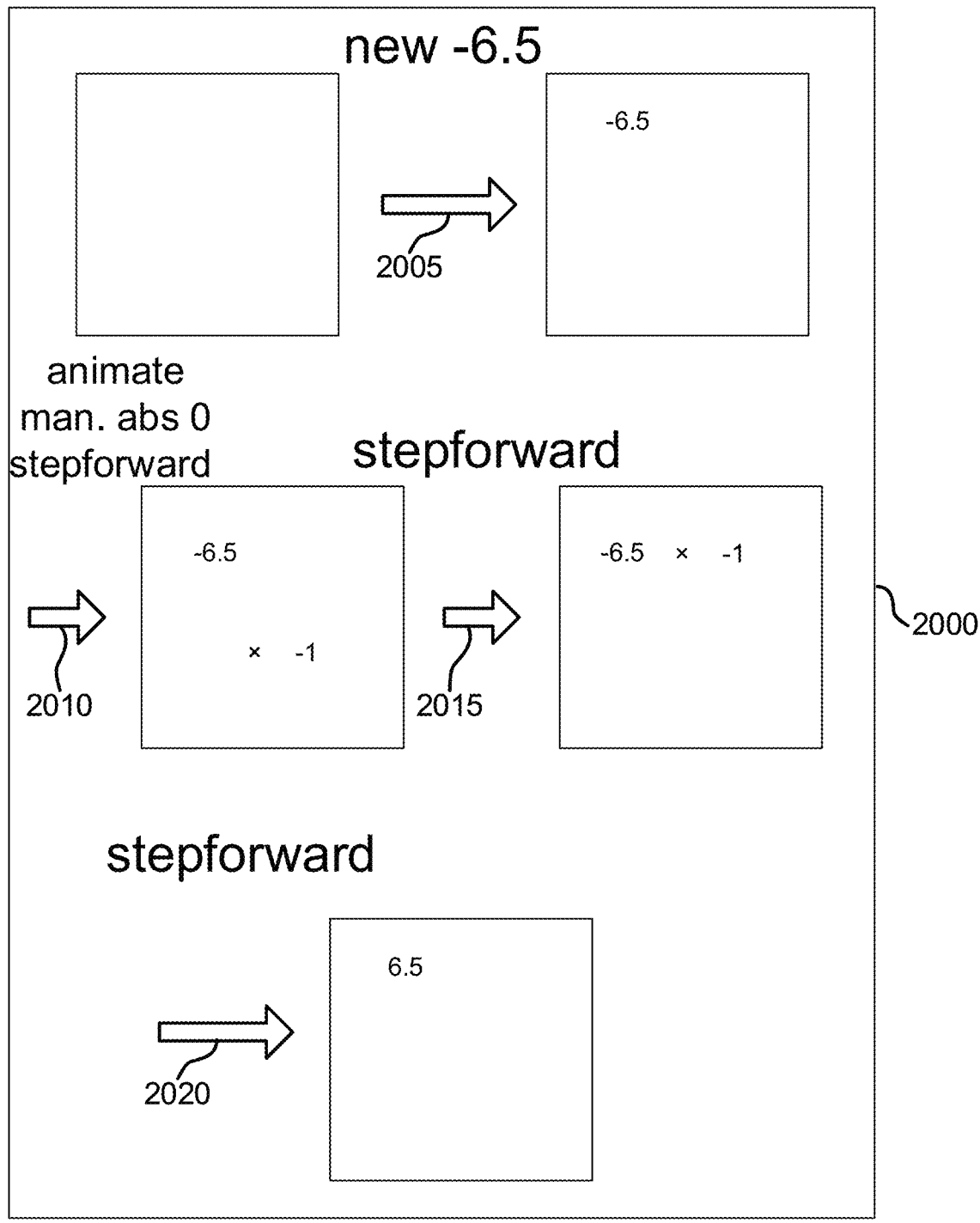
FIG. 20 shows an example of commands for animating instructions in accordance with aspects of the present disclosure.

FIG. 20 shows an example of commands for animating instructions in accordance with aspects of the present disclosure. The 'animate' function allows the user to step through the manipulation of a tree, observing a visually represented global state for each instruction. The command sequence below assumes that the abs function described above with reference to FIG. 19 has been defined.

First command sequence 2000 may represent a continuation of first command sequence 1900 and may include first step 2005, new -6.5, second step 2010, animate, manipulate abs 0, and stepforward, third step 2015, stepforward, and fourth step 2020, stepforward.

In FIG. 20, the commands "animate" and "stepforward" are used to display incrementally the visual states associate with the command. In step 2010, the command animate is given, indicating that the next command is to be animated. Then the command "manipulate abs 0" is given, which is the instruction that will be animated. The command "stepforward" is given, and the system displays the first visual step in the manipulation. In subsequent stepforward steps 2015 and 2020, the system displays the subsequent step in response to the command. In this way the user may see a visual representation of each step or sub-step of an instruction or command.

Figure 21:
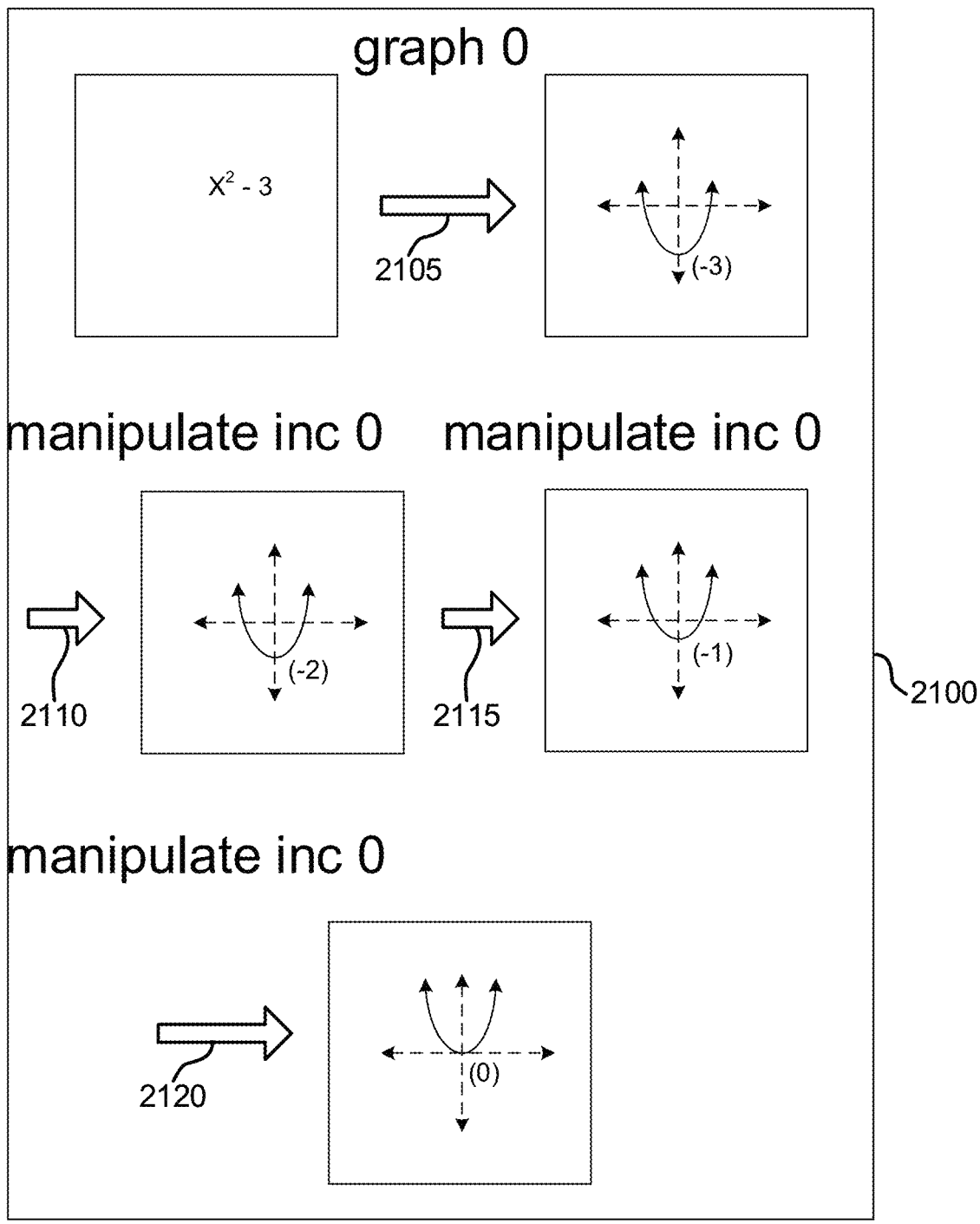
FIGS. 21 through 22 show examples of commands for graphing instructions in accordance with aspects of the present disclosure.

FIG. 21 shows an example of commands for graphing instructions in accordance with aspects of the present disclosure. The instruction 'graph' may represent expressions or matrices or tables as visual units.

First command sequence 2100 may include first step 2105, graph 0, second step 2110, manipulate inc 0, third step 2115, manipulate inc 0, and fourth step 2120, manipulate inc 0.

In FIG. 21 an example expression is graphed, in this example the recording "inc" is defined as previously described with respect to FIG. 18. In step 2105, the command "graph 0" results in the system displaying a graph of the function of AST with id=0, which in this example represents the expression $x^2-3$.

In step 2110, the expression is modified based on the recorded instruction "inc" by using the command "manipulate inc 0" and the resulting expression $(x^2-2)$ is graphed. The command "manipulate inc 0" is applied again in each of steps 2115 and 2120. Each command acts on the current state, with step 2115 resulting in expression $x^2-1$ and step 2120 resulting in the expression $x^2$.

Figure 22:
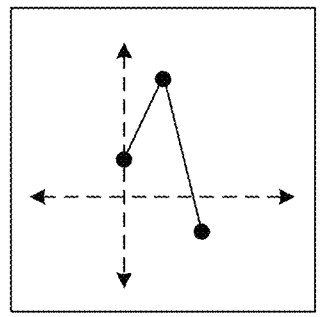

FIG. 22 shows another example of commands for graphing instructions in accordance with aspects of the present disclosure. Second command sequence 2200 may include first step 2205, graph 0, and second step 2210, ungraph 0.

In FIG. 22, a 3×2 matrix with id=0 is initially defined. The matrix is initially displayed in matrix (M×N) format. The command "graph 0" is given in step 2205. The display result is a graph where each row of 2 values is an x-y point on the graph. The command "ungraph 0" in step 2210 changes the display back to the initial matrix display.

Figure 23:
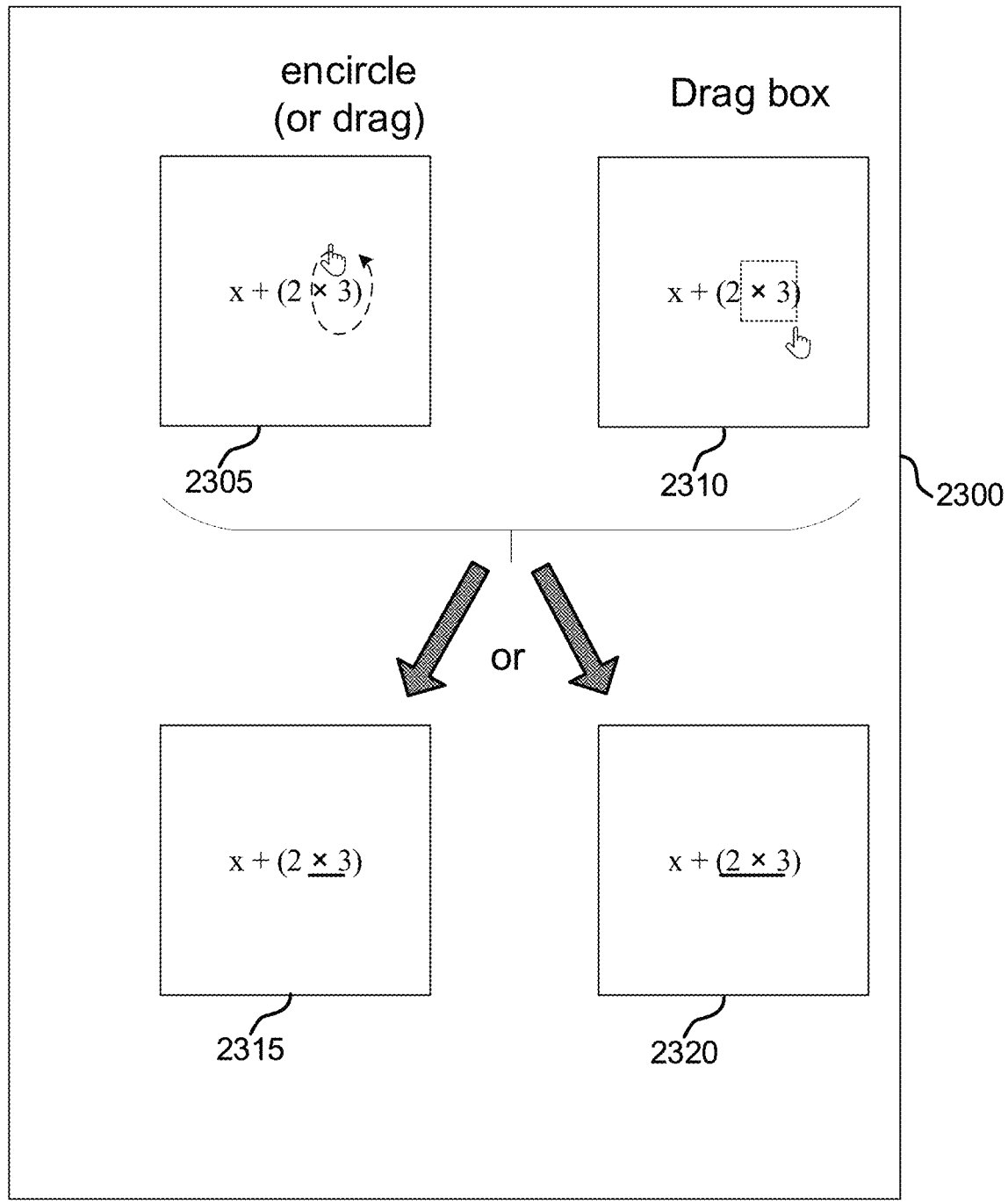
FIG. 23 shows an example of commands for selecting nodes in accordance with aspects of the present disclosure.

FIG. 23 shows an example of commands for selecting nodes in accordance with aspects of the present disclosure. First command sequence 2300 may represent a dragging sequence and may include encircle/drag input 2305, and drag box 2310. In response to the input (either the input of 2305 or 2310, the resulting selection (indicated by underlining) is the selected child nodes as shown in display 2315 or the least common node's children's elements as shown in the display 2320.

The visual environment may enable a user to use gestures and mouse actions (and other input actions, such as keyboard shortcuts) to highlight either exactly the enclosed elements or the least common node's children's elements.

FIG. 24 shows another example of a graphical representation of selecting nodes in accordance with aspects of the present disclosure. Second command sequence 2400 may represent graphical manipulation using keyboard shortcuts, and may include first step 2405, first selection display 2410, and second selection display 2415. FIG. 24 also includes overlapping selections display 2420.

In FIG. 24, the selection is made by the gesture starting at the location initially shown (i.e. generally above the "x" element). The user selects the "x" and the "3" by using a keyboard shortcut, for example holding down the shift key while pressing the down arrow key and then the right arrow key. This results in a similar selection to that of FIG. 23, where the selection may be of the selected child nodes (2410) or the least common node's children's elements (2415). The selection action also contemplates overlapping selections, such as the three overlapping selections shown in overlapping selections display 2420.

Figure 25:
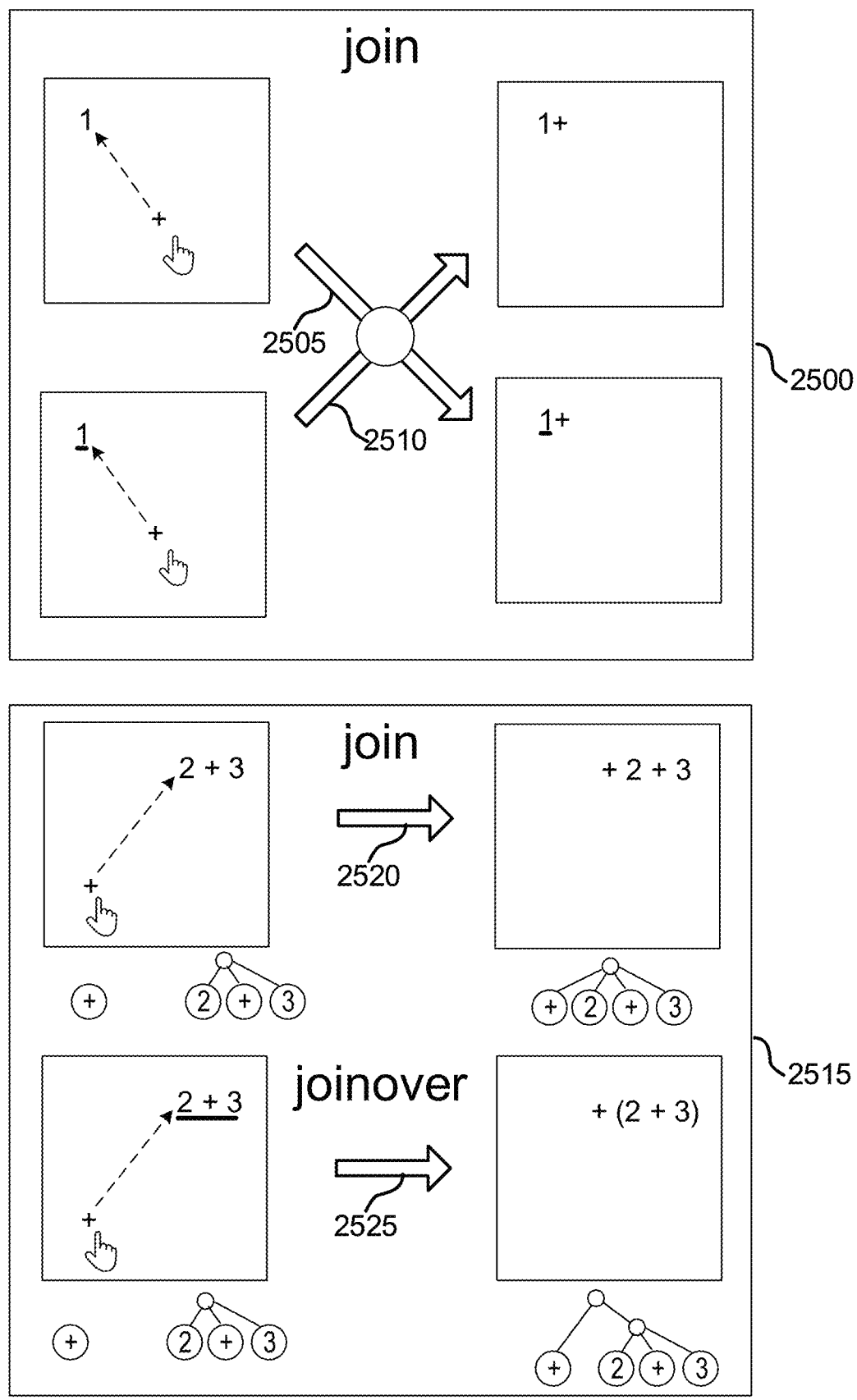

FIG. 25 shows a first example of a graphical representation of joining nodes in accordance with aspects of the present disclosure. The example shown includes first command sequence 2500 and second command sequence 2515. To join nodes, a user may place one element adjacent to another. The latter may be selected in part to disambiguate what an element is being joined to. Disambiguation between joinunder and joinover may be allowed with additional keystrokes or gestures (or by drop points). Underlining of an element indicates that the element is currently selected.

First command sequence 2500 may include first step 2505, join, and second step 2510 (interchangeable with first step 2505). Second command sequence 2515 may include third step 2520, join, and fourth step 2525, joinover.

As shown in step 2520, the graphical user gesture/graphical representation of dragging the "+" element to the left side of the AST of "2+3" where no item is selected results in the "+" being joined to the AST at the left at the same level as the other elements.

As shown in step 2525, when "2+3" is previously selected (indicated by the underlining), a different "joinover" command is executed by using the same gesture/representation. In step 2525, the user gesture/graphical representation of dragging the "+" element to the left side results in a new parent node being created, with the "+" attached to the new parent node and the original parent node now a child node below the parent node.

FIG. 26 shows a second example of a graphical representation of joining nodes in accordance with aspects of the present disclosure. The example shown includes third command sequence 2600 and fourth command sequence 2615.

Third command sequence 2600 may include first step 2605, joinunder, and second step 2610, joinunder. Fourth command sequence 2615 may include third step 2620, joinover, and fourth step 2620, joinover.

Disambiguation between the "joinunder" and the "joinover" commands may be allowed with an additional keystroke or graphically by designating a different approach or a different drop point for each command.

In steps 2605 and 2610, when the "+" is dragged just under the "2" element or dropped at a drop point under the "2" element (illustrated by the small circle underneath the "2"), the joinunder command is executed.

In steps 2620 and 2625, the gesture is similar but the element is dragged or dropped above the "2", resulting in the joinover command.

Figure 27:
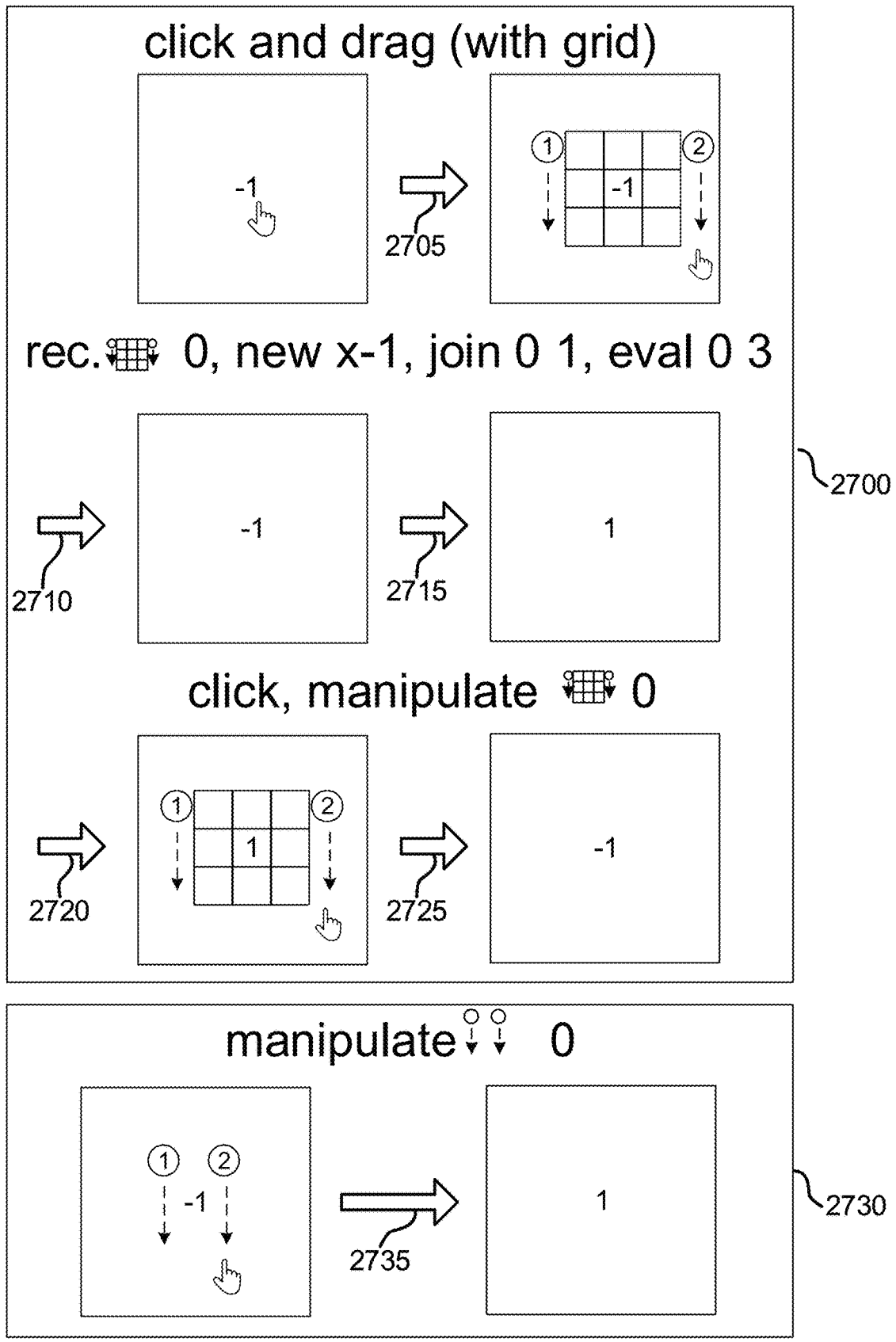
FIGS. 27 through 29 show examples of a graphical representation of recording and manipulating nodes in accordance with aspects of the present disclosure.

FIG. 27 shows an example of a graphical representation of recording and manipulating nodes in accordance with aspects of the present disclosure. The example shown includes first command sequence 2700 and second command sequence 2730. Recording and manipulating may include a combination or keystrokes, commands, and gestures. For example, the system may draw an optionally stretched m-by-n (M×N) grid around a selected node.

Commands may be recorded (and replayed, or manipulated) relative to the m-by-n (M×N) node. In some embodiments, users may draw and record gestures without a grid based on relative locations.

First command sequence 2700 may include first step 2705, click and drag, second step 2710, record (action) 0, third step 2715, new *−1 then join 0 1, then eval 0 3, fourth step 2720, click, and fifth step 2725, manipulate (action) 0. Second command sequence 2730 may include sixth step 2735, manipulate (action) 0.

Figure 28:
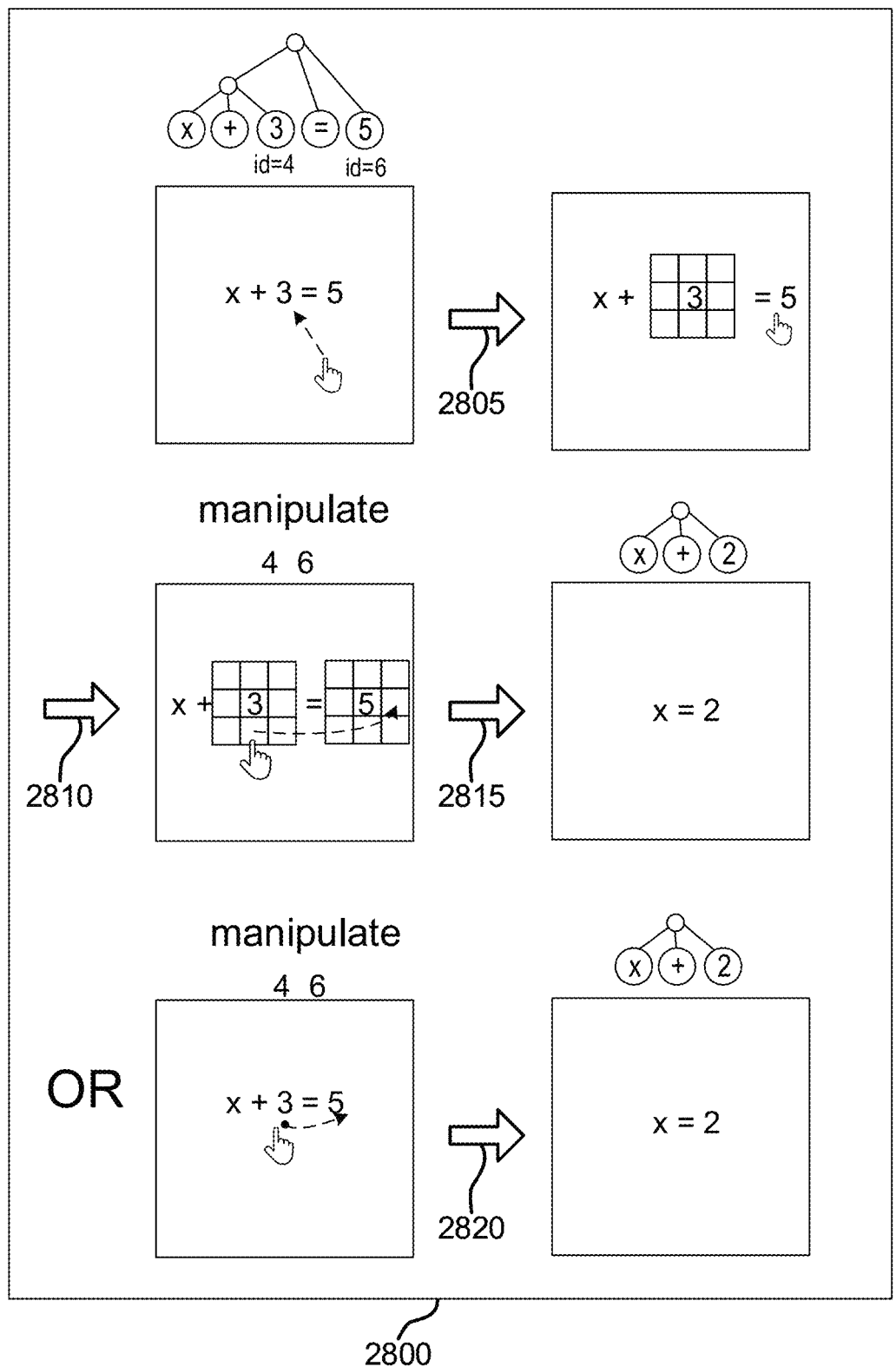

FIG. 28 shows an example of a graphical representation of recording and manipulating nodes in accordance with aspects of the present disclosure. In some cases, multiple nodes may be selected, displaying multiple grids.

Third command sequence 2800 may include first step 2805, selection, second step 2810, selection, third step 2815, manipulate 4 6, and fourth step 2820, manipulate 4 6.

The example graphical representation starts with the AST "x+3=5" having the tree structure shown. The element "3" is selected, which caused a graph to be shown. In step 2805, the element "5" is selected, whereby a graph is also shown around the "5". The user gesture/graphical representation of dragging underneath the "3" (id=4) and the "5" (id=6) to the right of the "5" results in the equivalent command of "manipulate 4 6". The result is the AST "x=2".

Similarly, in lieu of step 2815, in step 2820 a similar user gesture may be used without the user of the graphs for the same result.

Figure 29:
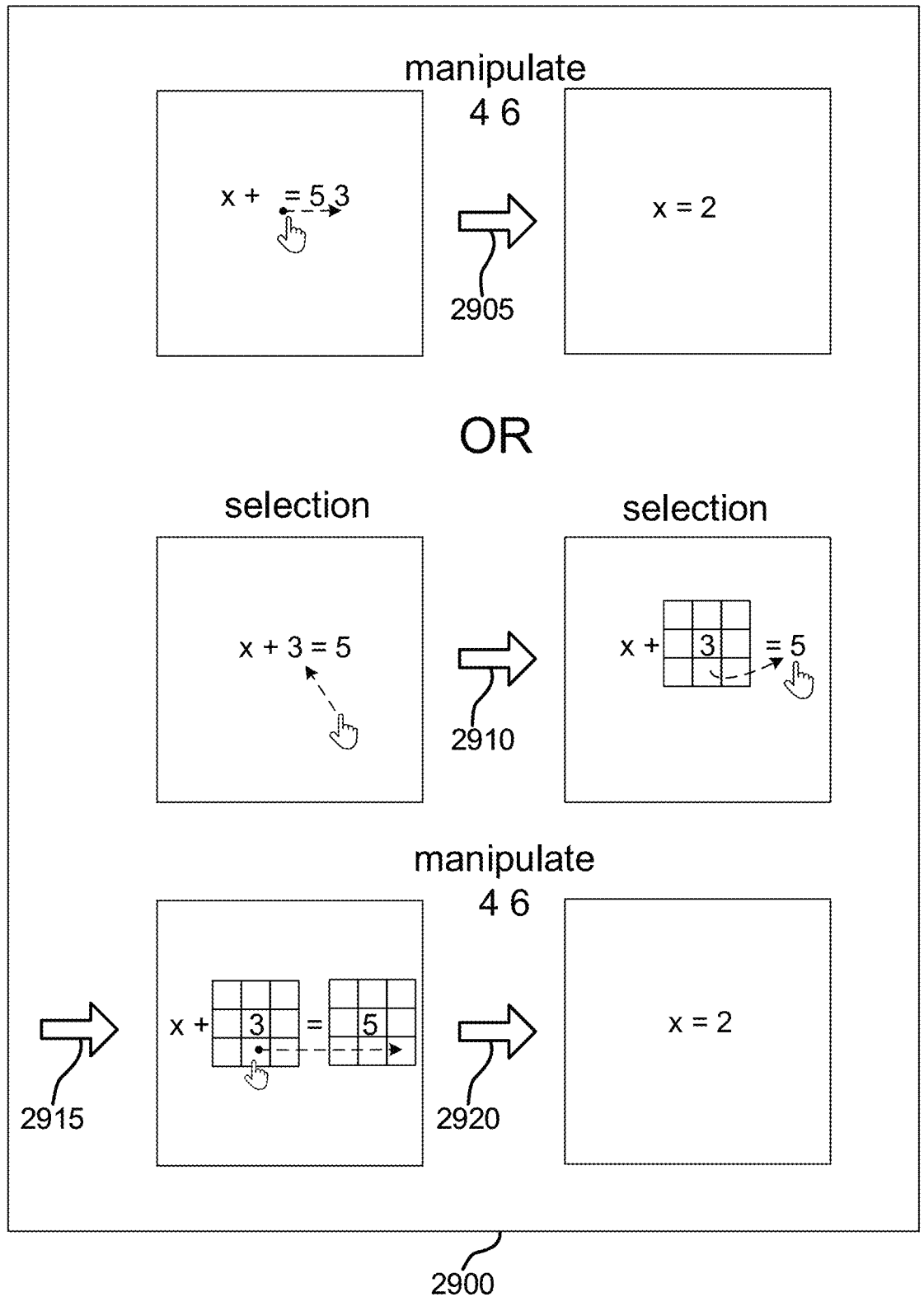

FIG. 29 shows an example of a graphical representation of recording and manipulating nodes in accordance with aspects of the present disclosure.

Fourth command sequence 2900 may include first step 2905, manipulate 4 6, OR second step 2910, selection, third step 2915, selection, and fourth step 2920, manipulate 4 6.

In the sequence of step 2905, dragging through the graphical representations of the elements from left to right indicates the command "manipulate 4 6" (where the id numbers are the same as for FIG. 28).

Alternatively, in the sequence of steps 2910, 2915, and 2920, visual graph displays are used to indicate selections of the elements "3" and "5", and then the same dragging user gesture/graphical representation is used to indicate execution of the "manipulate 4 6" command.

Figure 30:
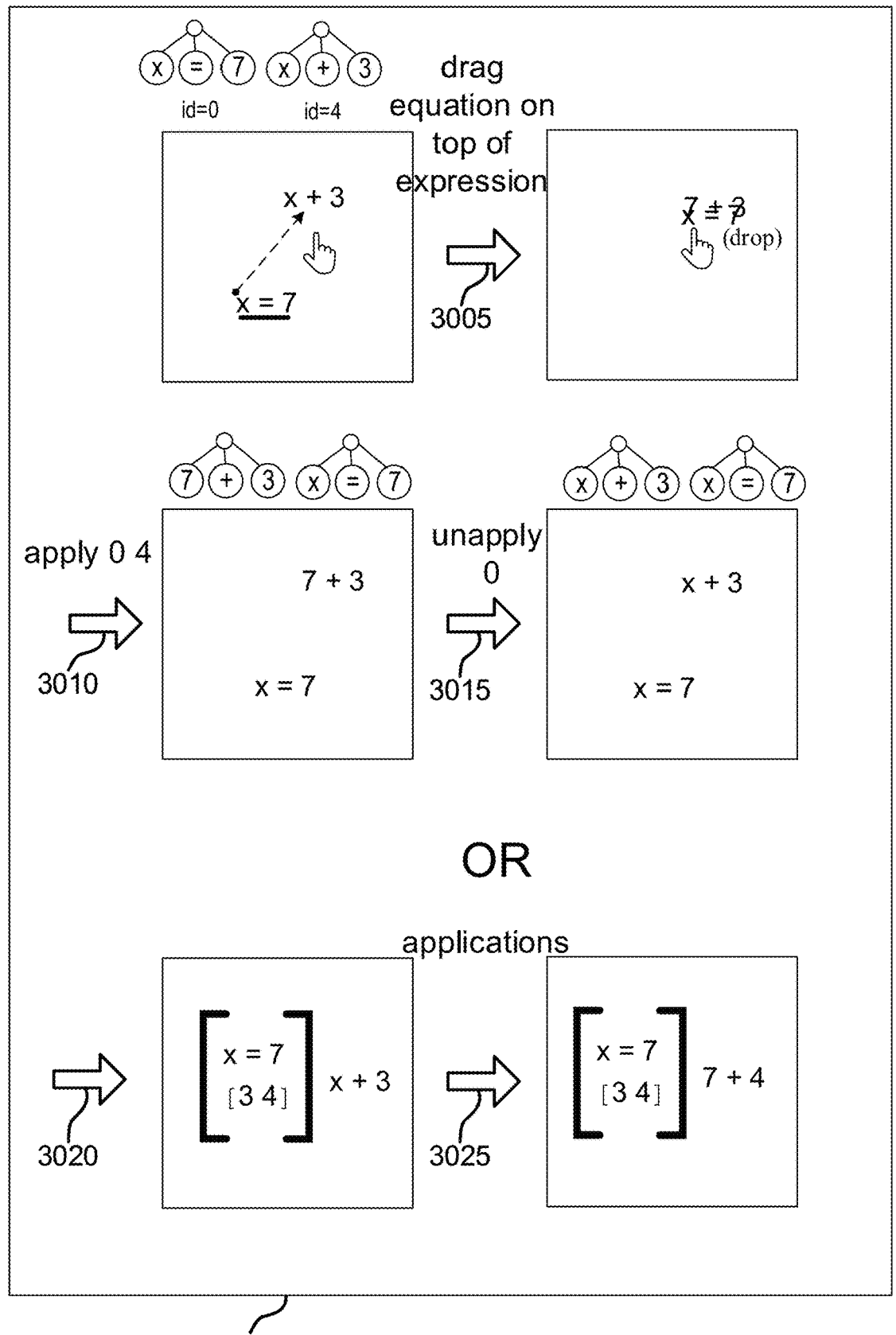
FIG. 30 shows an example of a graphical representation of substitution and application commands in accordance with aspects of the present disclosure.

FIG. 30 shows an example of a graphical representation of substitution and application commands in accordance with aspects of the present disclosure. A user may drag equations on top of any expression as illustrated in FIG. 30. Keyboard shortcuts may also be applied to a selection (i.e., to select a node or move or manipulate a selected node). Some embodiments may include a special shortcut or gesture corresponding to a grid.

A matrix of sequential substitutions may be applied. The matrix may include zero or more equations or id-value pairs which may be the basis for the substitution as illustrated herein. Equations may optionally be applied to all expressions in a state.

First command sequence 3000 may include first step 3005, drag, second step 3010, apply 0 4, third step 3015, unapply 0 4, fourth step 3020, apply (matrix), and alternatively, fifth step 3025, apply (matrix).

The user gesture/graphical representation of dragging the equation x=7 (id=0) on top of the expression x+3 (id=4) results in the execution of the command "apply 0 4". The result is the equation of "x=7" and the expression of "7+3". Execution of the command "unapply 0" in step 301 results in the return to the original expression and equation.

Alternatively, in steps 3020 and 3025 a matrix of sequential substitutions is applied.

Figure 31:
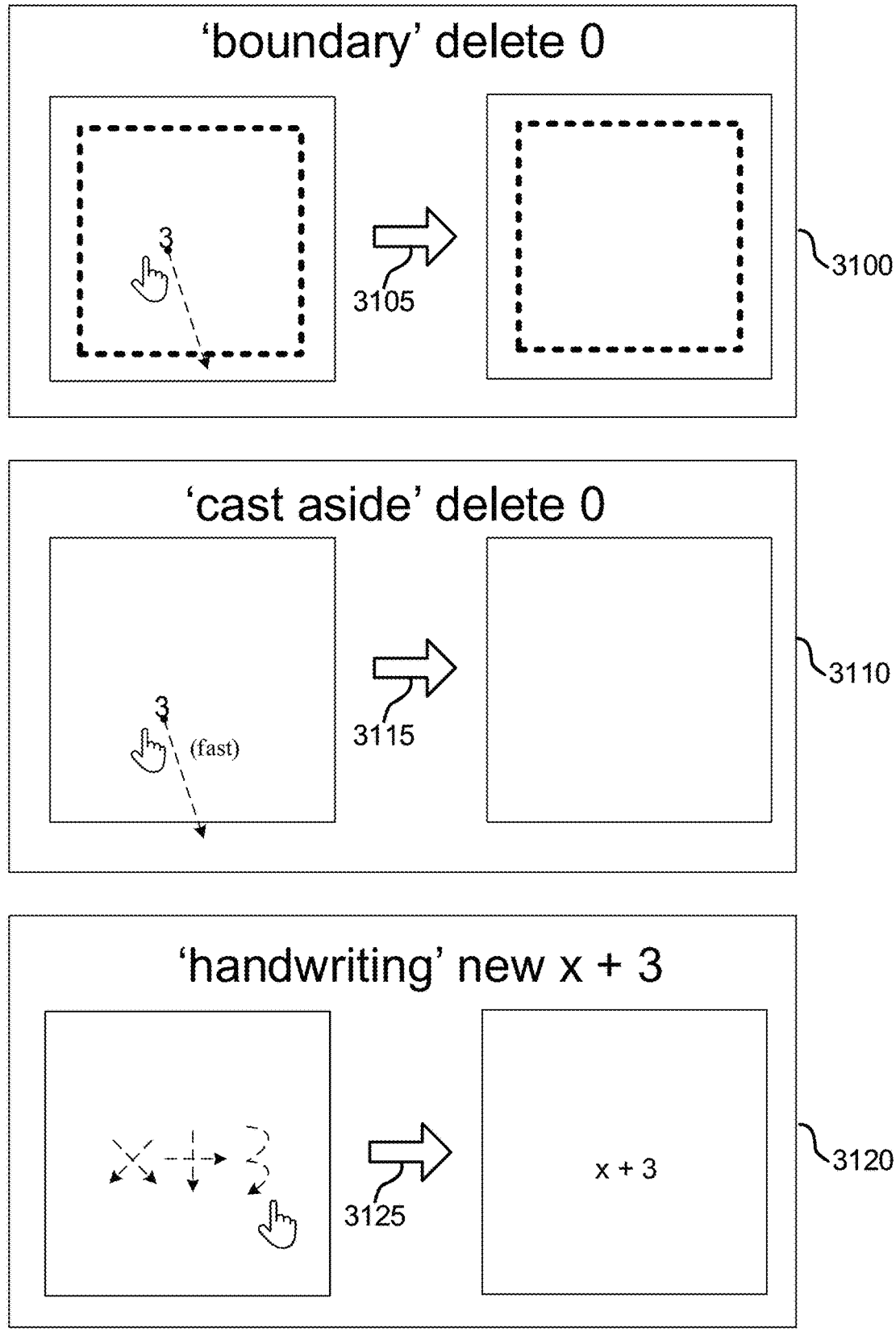
FIG. 31 shows an example of a graphical representation of new and delete commands in accordance with aspects of the present disclosure.

FIG. 31 shows an example of a graphical representation of new and delete commands in accordance with aspects of the present disclosure. The example shown includes first command sequence 3100, second command sequence 3110, and third command sequence 3120.

Double tapping a screen may allow the generation or deletion of elements. Dragging from or to or past the boundary of the viewing space may enable deleting as well. In some cases, elements may be generated using handwriting gestures or motions.

First command sequence 3100 may include first step 3105, delete 0 (using boundary). Second command sequence 3110 may include second step 3115, delete 0 (using cast aside). Third command sequence 3120 may include third step 3125, new x+3 (using handwriting).

Figure 32:
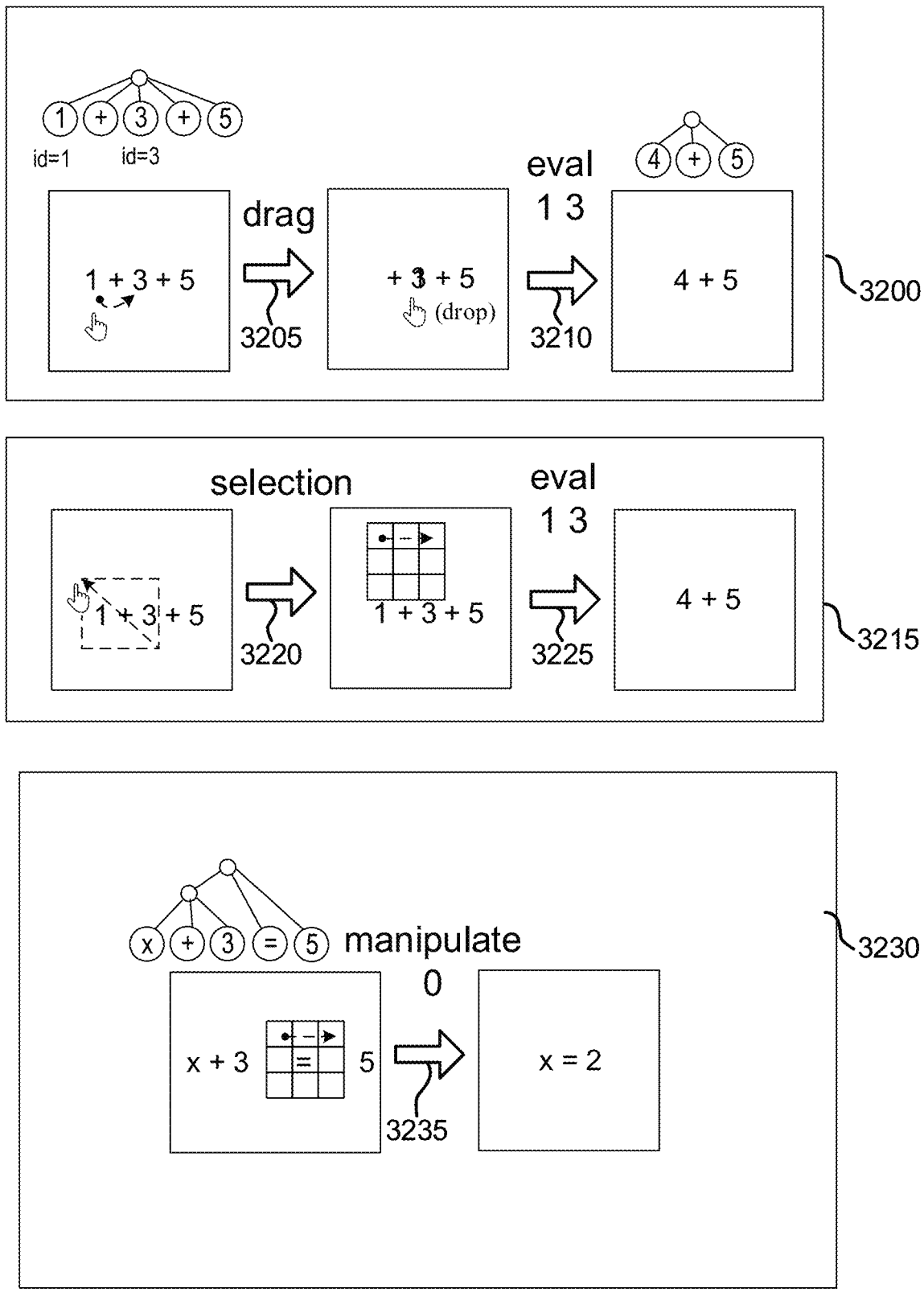
FIG. 32 shows an example of a graphical representation of evaluate commands in accordance with aspects of the present disclosure.

FIG. 32 shows an example of a graphical representation of evaluate commands in accordance with aspects of the present disclosure. The example shown includes first command sequence 3200, second command sequence 3215, and third command sequence 3230.

Dragging one element corresponding to an id may initiate a command. A user may also select a set of elements and perform a custom gesture on them. Finally, the use of record or manipulate may enable special evaluations to occur programmatically.

First command sequence 3200 may include first step 3205, drag, and second step 3210, eval 1 3. Second command sequence 3215 may include third step 3220, selection, and fourth step 3225, eval 1 3. Third command sequence 3230 may include fifth step 3235, manipulate (action) 0.

In steps 3205 and 3210, selecting the element "1" (id=1) and dragging it onto the "3" (id=3) results in the evaluation of elements with ids 1 and 3.

In steps 3220 and 3225, the same command, "evaluation 1 3" is executed upon a different user gesture/graphical input from steps 3205 and 3210. In step 3220, a box is dragged around the 1, the +, and the 3 to select the elements. A selection grid appears and the user gesture drags to the right to execute the same evaluate 1 3 command.

In step 3235, where the AST with id=0 includes the equation x+3=5, selection of the equal sign and then dragging from the left of the equal sign to the right of the equal sign results in the execution of the command "manipulate 0". The result is displayed as the equation x=2.

Figure 33:
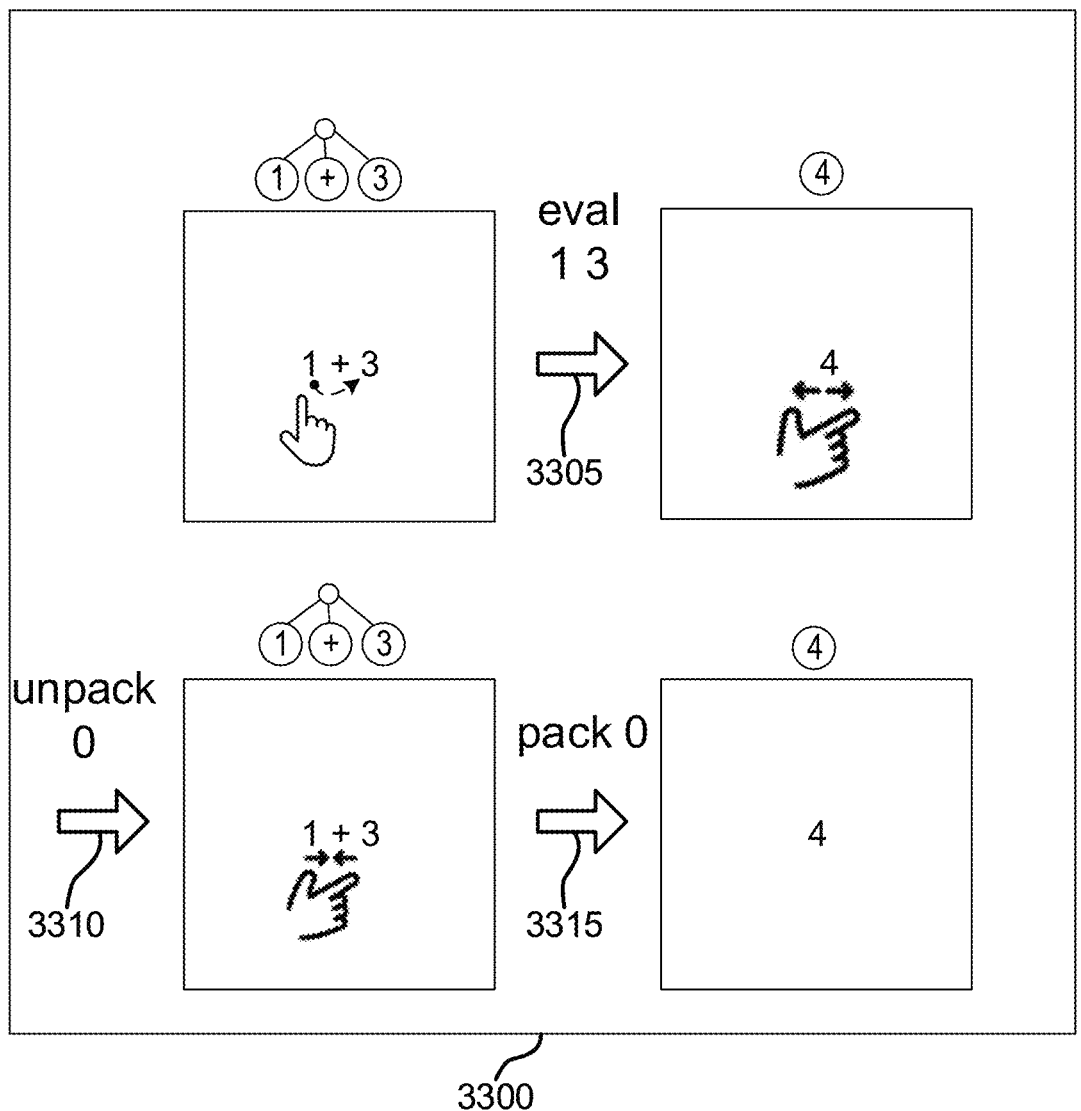
FIGS. 33 through 34 show examples of a graphical representation of packing and unpacking in accordance with aspects of the present disclosure.

FIG. 33 shows an example of a graphical representation of packing and unpacking in accordance with aspects of the present disclosure. Using multitouch pinching and expanding motions may trigger pack and unpack instructions.

First command sequence 3300 may include first step 3305, eval 1 3, second step 3310, unpack 0 (using a gesture), and third step 3315, pack 0 (using a gesture).

The user gesture/graphical representation of dragging of the element "1" onto the "3" results in the execution of the "evaluate 1 3" command. The user gesture of the expanding motion on the resulting element "4" (id=0) executes the command "unpack 0", which shows the initial expression "1+3" again. A pinching gesture on the expression packs the expression back down to the "4".

Figure 34:
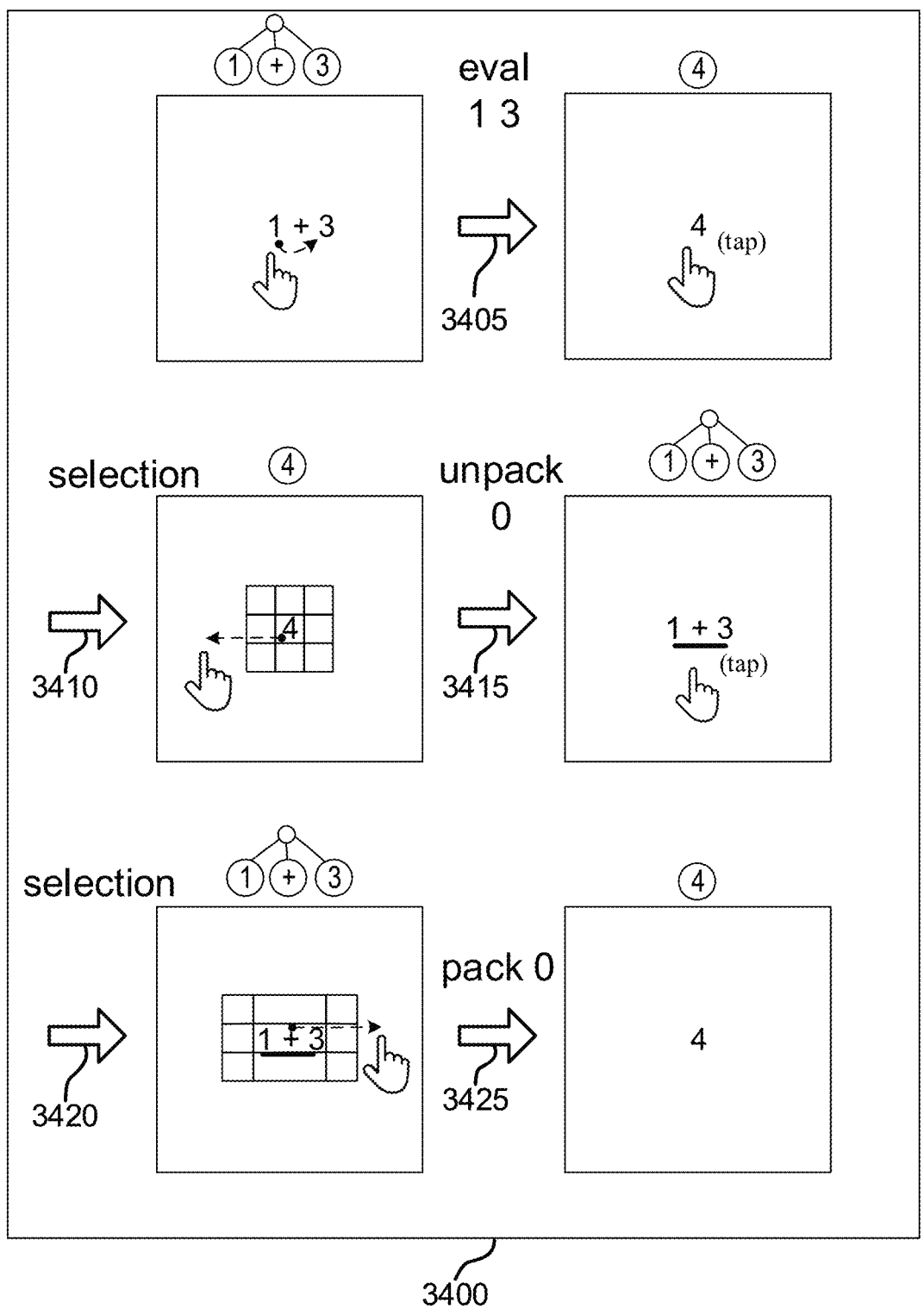

FIG. 34 shows an example of a graphical representation of packing and unpacking in accordance with aspects of the present disclosure. In some embodiments, a single-touch drag into or out of a selection grid may also be used to pack and unpack.

Second command sequence 3400 may include first step 3405, eval 1 3, second step 3410, selection (tap), third step 3415, unpack 0 (directional drag), fourth step 3420, selection (tap), and fifth step 3425, pack 0 (directional drag).

Similarly to FIG. 33, but with the user gesture of a single-touch (tap) and then drag out, the expression is evaluated, packed and unpacked.

Figure 35:
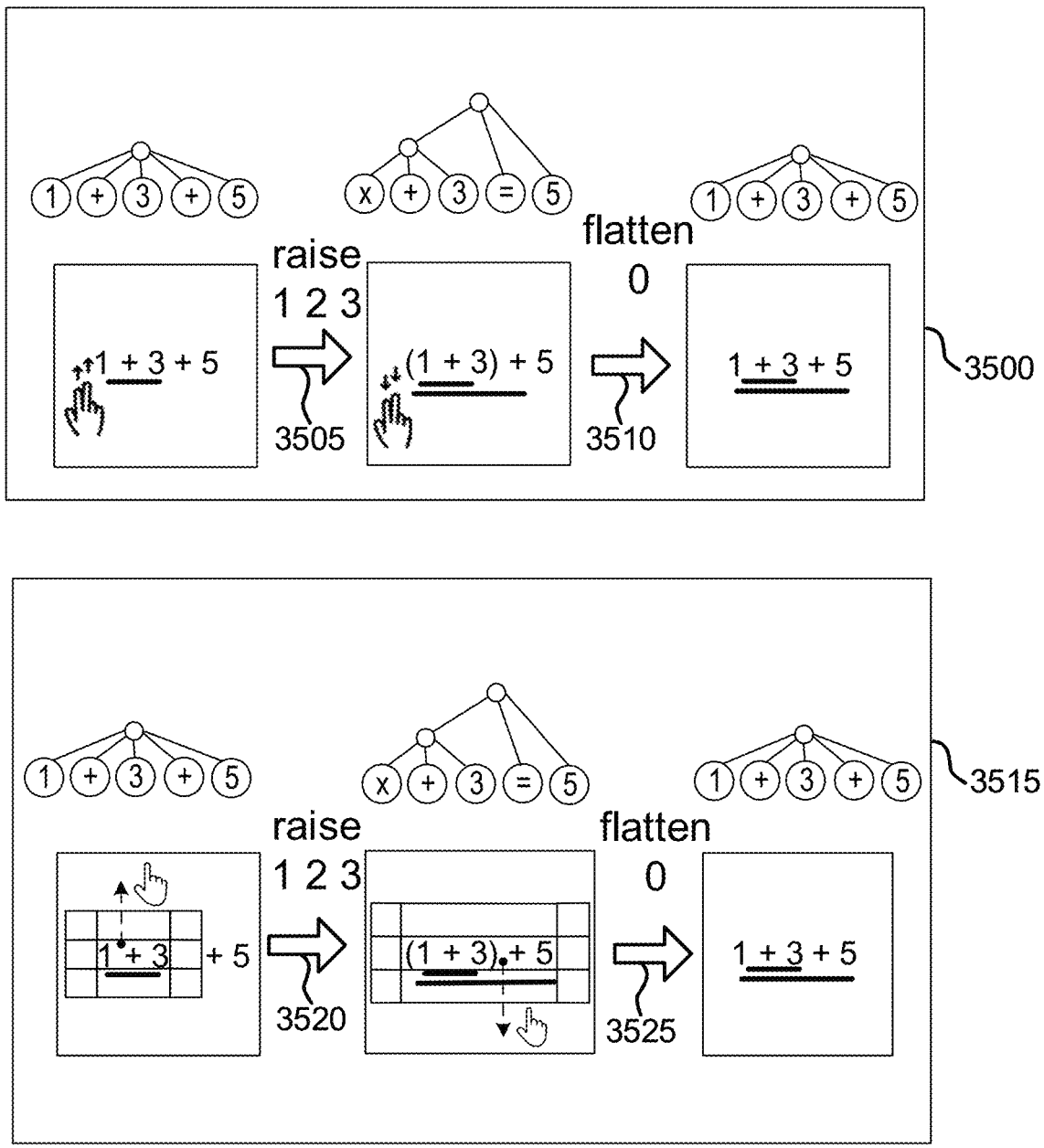
FIG. 35 shows an example of a graphical representation of flatten and raise commands in accordance with aspects of the present disclosure.

FIG. 35 shows an example of a graphical representation of flatten and raise commands in accordance with aspects of the present disclosure. The example shown includes first command sequence 3500 and second command sequence 3515. Multi-touch may also be used to flatten and raise elements, using the drag-up and drag-down motions. Single-touch drag may also be used based on the m-by-n grid.

First command sequence 3500 may include first step 3505, raise 1 2 3 (gesture) and second step 3510, flatten 0 (gesture).

In the first command sequence 3500 the selected elements of "1+3" (corresponding to id=1, id=2, and id=3) are dragged up using a multitouch gesture. The result executes the command "raise 1 2 3", resulting in the modified AST shown in the middle diagram. The selection underlining has changed to indicated the modified element positions in the AST. The user gesture is then a multitouch downwards, resulting in the command "flatten 0", where the parent node is id=0. The AST is then flattened to its original single-level structure.

Second command sequence 3515 may include third step 3520, raise 1 2 3 (grid drag), and fourth step 3525, flatten 0 (grid drag).

In the second command sequence 3515, the same commands are carried out, but the user gestures utilize the selection grid and a single-touch gesture above of below the grid.

Figure 36:
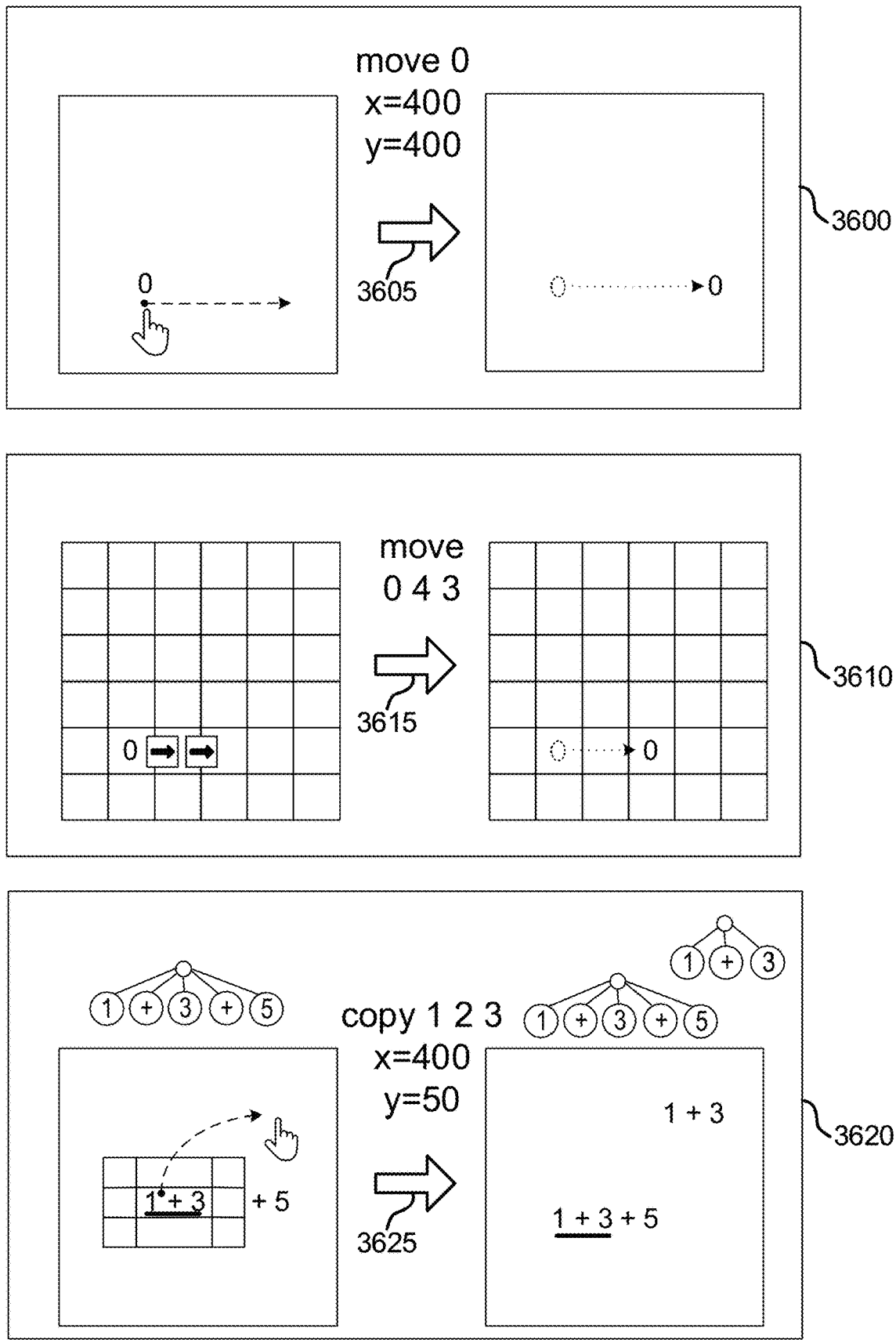
FIG. 36 shows an example of a graphical representation of moving and copying in accordance with aspects of the present disclosure.

FIG. 36 shows an example of a graphical representation of moving and copying in accordance with aspects of the present disclosure. The example shown includes first command sequence 3600, second command sequence 3605, and third command sequence 3610.

A user may move an element or selected groups of elements with a single drag and drop, or using keyboard strokes. To duplicate a node, a user may drag out of a selection grid indicator. If there is ambiguity between copy and flatten/raise/pack, disambiguation may be used. For example, distinctions may be drawn based on where in or out of the grid the motion begins and ends, as well as using indicators such as double-tap.

First command sequence 3600 may include first command sequence 3600, move 0 x=400 y=400. Second command sequence 3605 may include second command sequence 3605, move 0 4 3 (keyboard action). Third command sequence 3610 may include third command sequence 3610, copy 1 2 3 x=400 y=50.

First command sequence 3600 uses a user gesture of a single drag and drop to the right to move the element with id=0 to a coordinate location of x=400 and y=400.

Second command sequence 3610 uses two keyboard arrow strokes to move the element two grid locations to the right, which executes the command to move element with id=0 to grid location 4,3.

Third command sequence 3620 uses the graphical selection grid. The user gesture/graphical representation is to drag the selected expression (1+3) out of the selection grid. This results in the selected elements (ids 1, 2, and 3) being copied to their own AST, as shown in the result of step 3625. The new AST is located at coordinate location x=400, y=500.

FIG. 37 shows an example of a graphical representation of detach commands in accordance with aspects of the present disclosure. The example shown includes first command sequence 3700, second command sequence 3710, and third command sequence 3720.

A user may drag an element or a selected set of elements such that, when dropped, it is detached if it is more than one grid units distance away from that to which it was attached. Graphically, dragging an element or set of elements away from that to which it is attached to a space adjacent to a different expression may cause a compound action consisting of a detach and then a join.

First command sequence 3700 may include first step 3705, detach 3. Second command sequence 3710 may include second step 3715, detach 5 6. Third command sequence 3720 may include third step 3725, detach 3 & join 3 4.

In first command sequence 3700, the user gesture of dragging the element with id=3 results in the command "detach 3", and the element with id=3 is detached and becomes its own AST.

In the second command sequence 3710, the user gesture of dragging the selection "+6" detaches the + and the 6 (ids 5 and 6, respectively) from the AST and a new AST with the elements + and 6 is created.

In the third command sequence 3720, element "3" (id=3) is dragged just to the left of the separate expression "+6". This results in the commands "detach 3" and "join 3 4", which results in the AST configurations and the expressions shown on the right.

Figure 38:
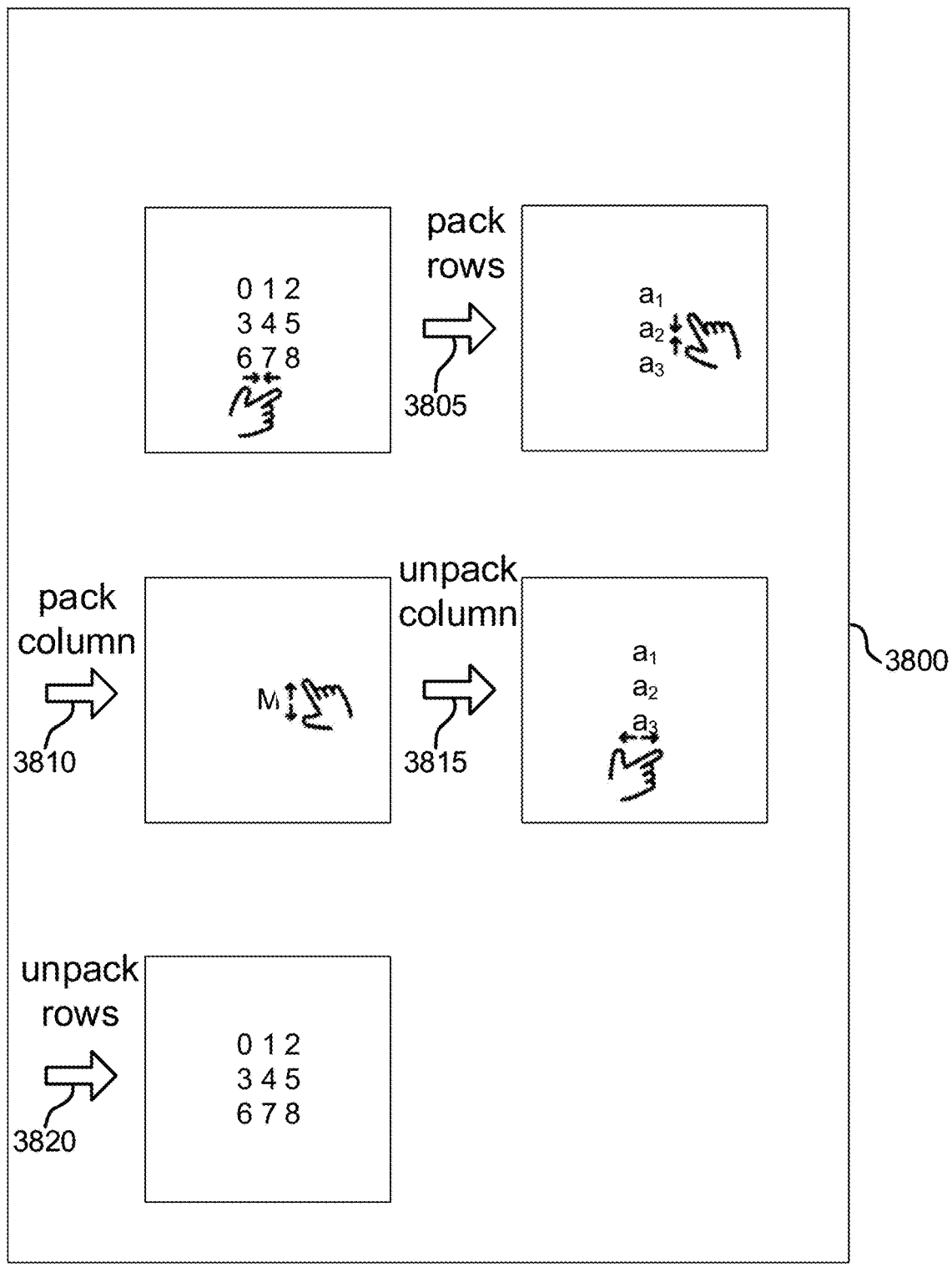
FIGS. 38 through 39 show examples of a graphical representation of matrix packing and unpacking in accordance with aspects of the present disclosure.

FIG. 38 shows an example of a graphical representation of matrix packing and unpacking in accordance with aspects of the present disclosure. A matrix element may be shrunk or expanded (i.e., packed or unpacked) one or more dimensions at a time using a pinching or evaluate like motion. In some cases, shrinking or expanding a matrix in a different order may rearrange a tree. Vectors and submatrices may be individually manipulable.

First command sequence 3800 may include first step 3805, pack rows (gesture), second step 3810, pack column (gesture), third step 3815, unpack column (gesture), and fourth step 3820, unpack rows (gesture).

Figure 39:
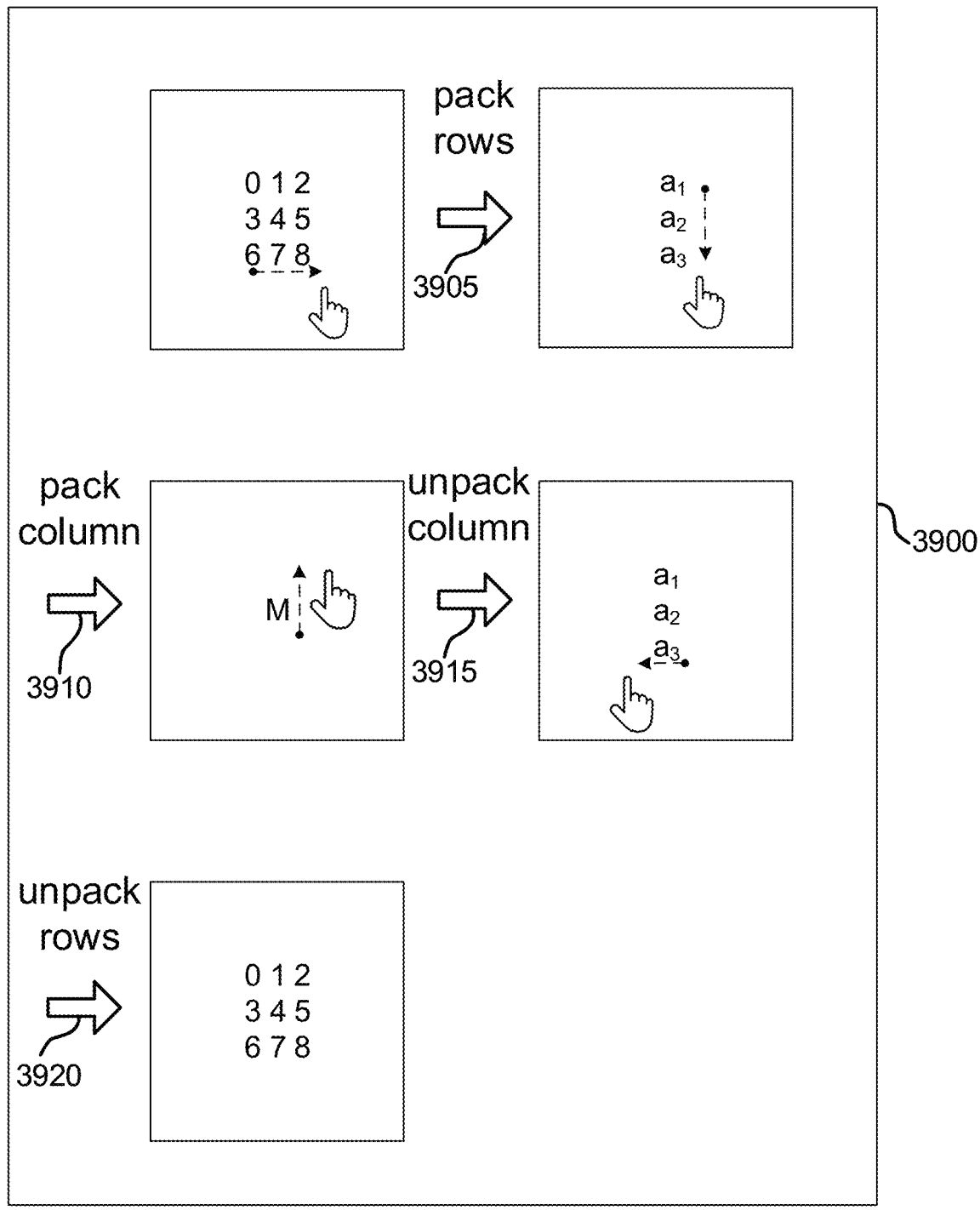

FIG. 39 shows an example of a graphical representation of matrix packing and unpacking in accordance with aspects of the present disclosure. Second command sequence 3900 may include first step 3905, pack rows (drag), second step 3910, pack column (drag), third step 3915, unpack column (drag), and fourth step 3920, unpack rows (drag).

Similarly to the previously-described gestures, the gestures shown in FIGS. 38 and 39 correspond to commands. In this matrix example, the commands associated with the shown gestures are pack rows, pack column, unpack columns, and unpack rows. Although not shown, it will be understood that the commands correspond to the appropriate AST operations.

The gestures of FIG. 38 utilize pinching and expanding gestures, while the gestures of FIG. 39 utilize tap-dragging. Both result in the same executed commands.

Figure 40:
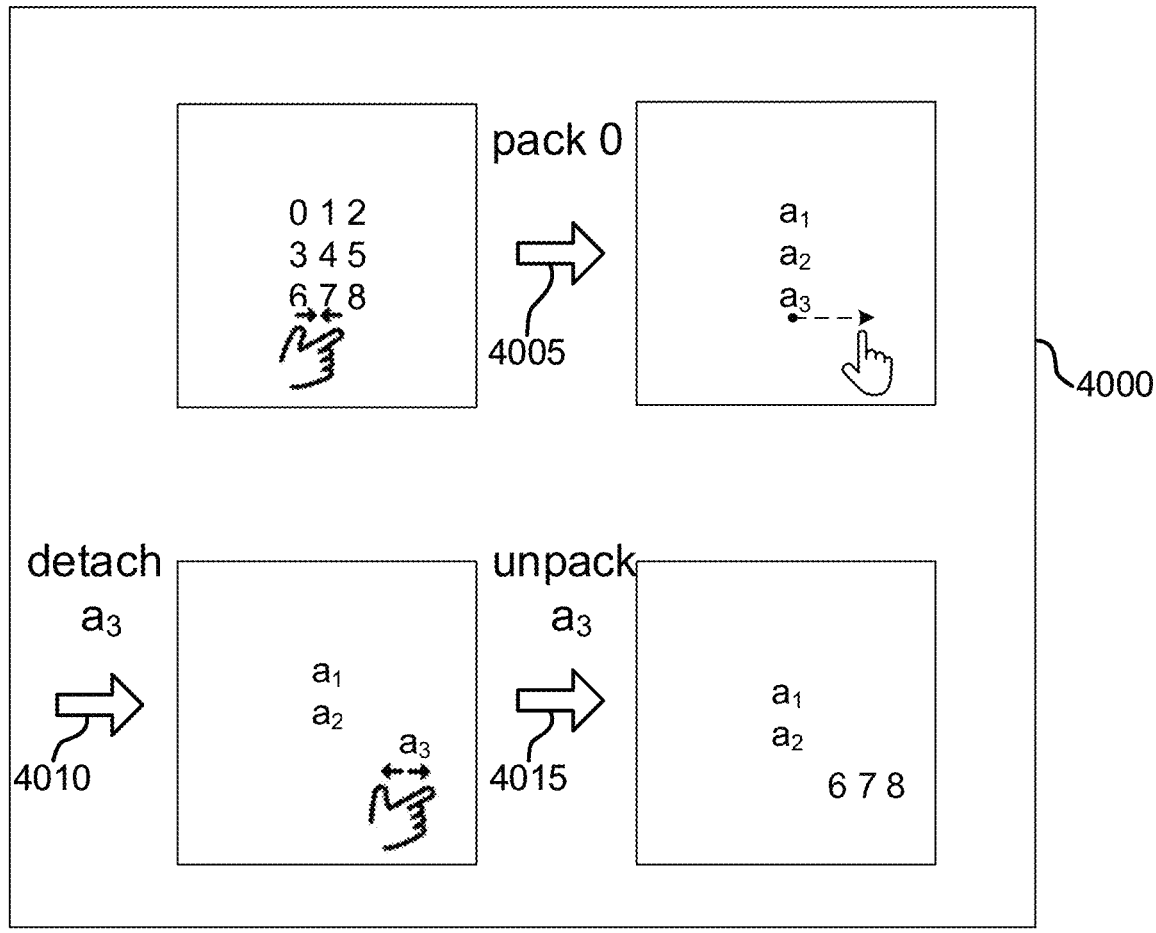
FIGS. 40 through 42 show examples of a graphical representation of matrix instructions in accordance with aspects of the present disclosure.

FIG. 40 shows an example of a graphical representation of matrix instructions in accordance with aspects of the present disclosure. First command sequence 4000 may include first step 4005, pack 0 (gesture) second step 4010, detach a3 (gesture) and third step 4015, unpack a3 (gesture).

FIG. 40 shows examples of some additional graphical representations for matrix instructions. The horizontal pinching gesture results in the "pack 0" command of step 4005 and the matrix is packed into a single column. The packed element $a_3$ is dragged to the right, which results in the command "detach $a_3$". The element $a_3$ is detached and graphically shown to the right of the original matrix column. The element $a_3$ is then subject to the user gesture/graphical representation of expanding, resulting in the element being expanded to its original 3 elements.

Figure 41:
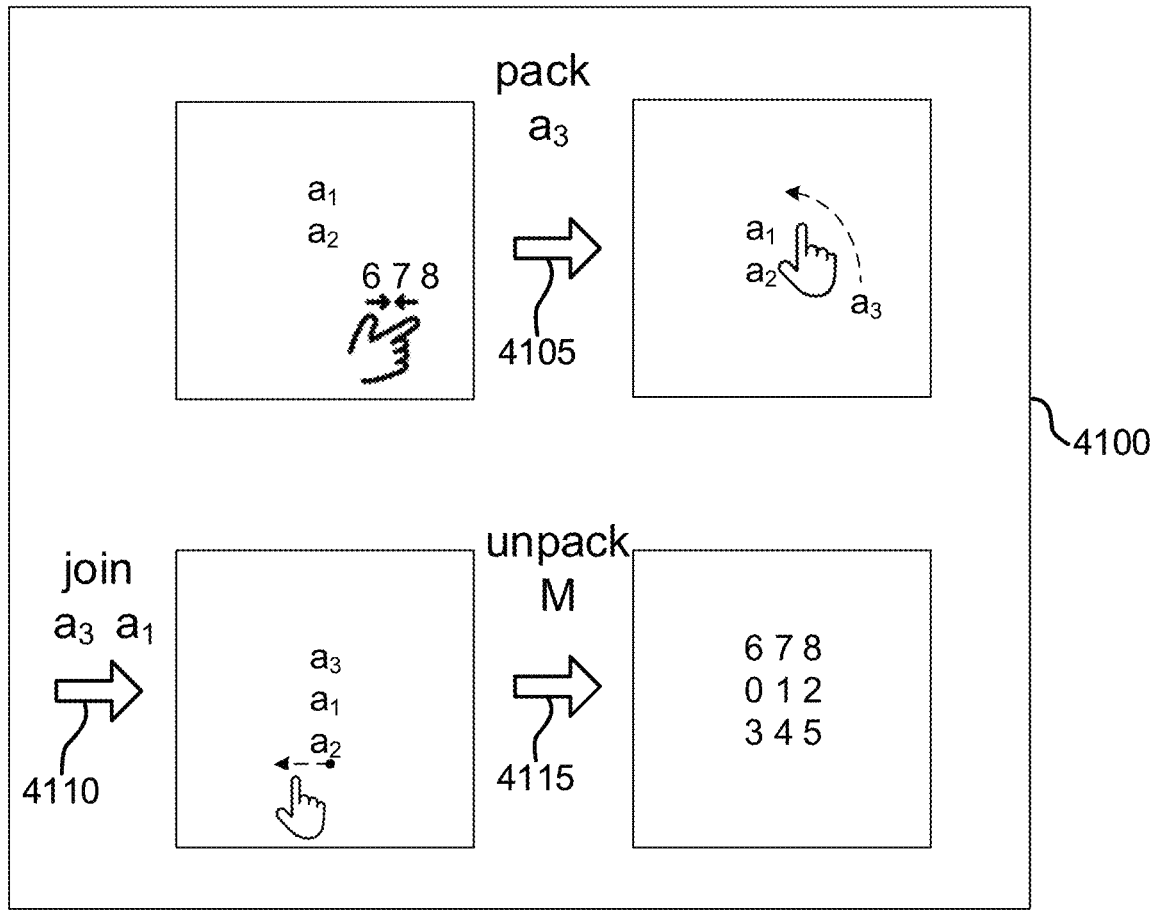

FIG. 41 shows some examples of some graphical representation of matrix instructions in accordance with aspects of the present disclosure. Second command sequence 4100 may include first step 4105, pack a3 (gesture), second step 4110, join a3 a1 (drag) and third step 4115, unpack M (drag).

Continuing with the matrix example of FIG. 40, The unpacked bottom row is packed, again with the pinching gesture. In the next gesture, the packed element $a_3$ is moved to the top of the packed column, joining it to the top of the column. A touch-drag gesture to the right is then used to unpack the matrix M. The previous bottom row is now the top row.

Figure 42:
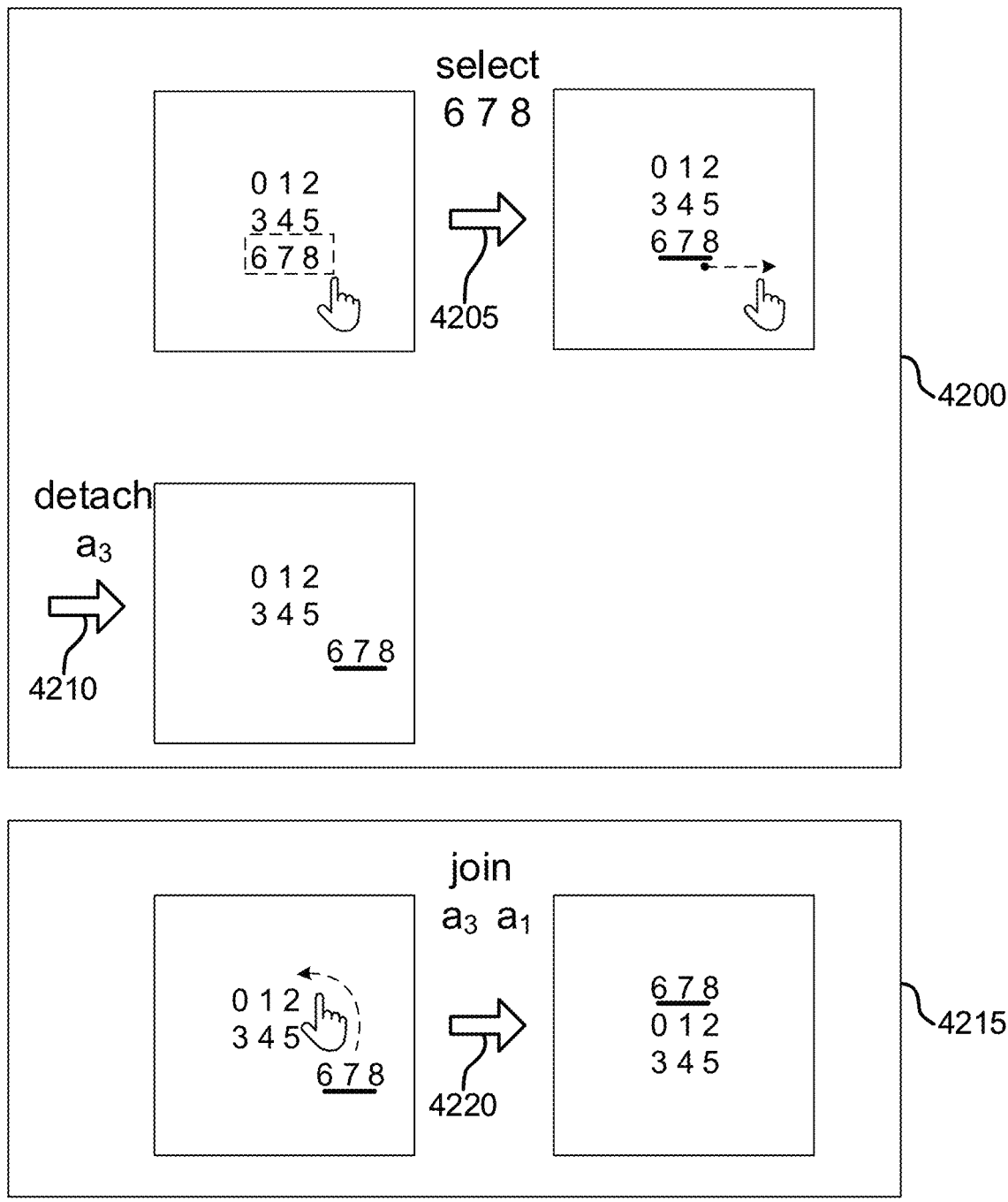

FIG. 42 shows an example of a graphical representation of matrix instructions in accordance with aspects of the present disclosure. The example shown includes third command sequence 4200 and fourth command sequence 4215. Third command sequence 4200 may include first step 4205, select 6 7 8 (drag), and second step 4210, detach a3 (drag). Fourth command sequence 4215 may include third step 4220, join a3 a1 (drag).

Continuing with the matrix example of FIG. 41, vectors or submatrices are also individually manipulable. A lasso/box gesture selects the element of the bottom row of the unpacked matrix. The bottom row elements have id=6, id=7 and id=8, so the user gesture results in the command "select 6 7 8". The selection is visually indicated by the selected elements being underlined. A touch-drag gesture to the right for the selected elements detaches the elements. In the fourth command sequence 4215, the selected elements are dragged to the top of the matrix, which results in the row $a_3$ being joined above the row $a_1$ ("join a3 a1").

Figure 43:
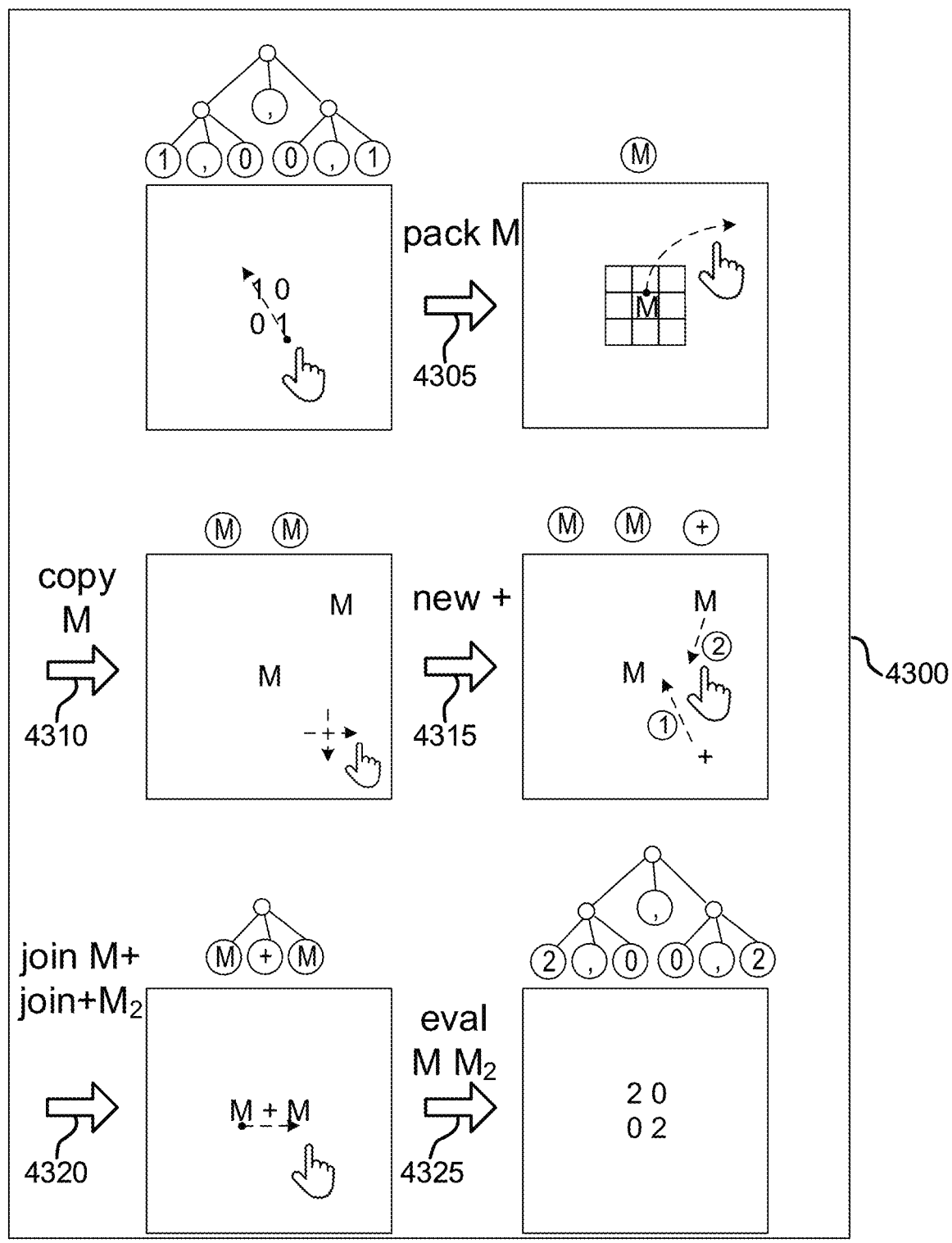
FIGS. 43 through 44 show examples of basic matrix operations in accordance with aspects of the present disclosure.

FIG. 43 shows examples of basic matrix operations in accordance with aspects of the present disclosure. In point matrix operations, each point may have its own history, and a full matrix may have a separate history as well. In some cases, steps of the sequences described herein may be skipped or performed automatically with the creation of custom gestures.

First command sequence 4300 may include first step 4305, pack M (drag), second step 4310, copy M (drag) third step 4315, new+(draw), fourth step 4320, join M+& join M M2 (drag), and fifth step 4325, eval M M2.

In the first step 4305, the matrix M (shown in display form and in AST form above) is packed using a gesture of a diagonal movement. The result is the packed matrix "M". A drag outside of a selection grid results in the command "copy M". There are now two matrices M. The user then draws a plus sign, corresponding to the command "new+". Then, the user first drags the plus sign to the right of the first matrix (denoted by step 1) and then drags the second Matrix right to the combined M+(step 2). This results in the two commands "join M+" and "Join+M2" (where M2 is the second matrix). The resulting AST is M+M. A touch-drag to the right results in the command evaluating M and M2. The AST is modified and the resulting matrix is displayed.

Figure 44:
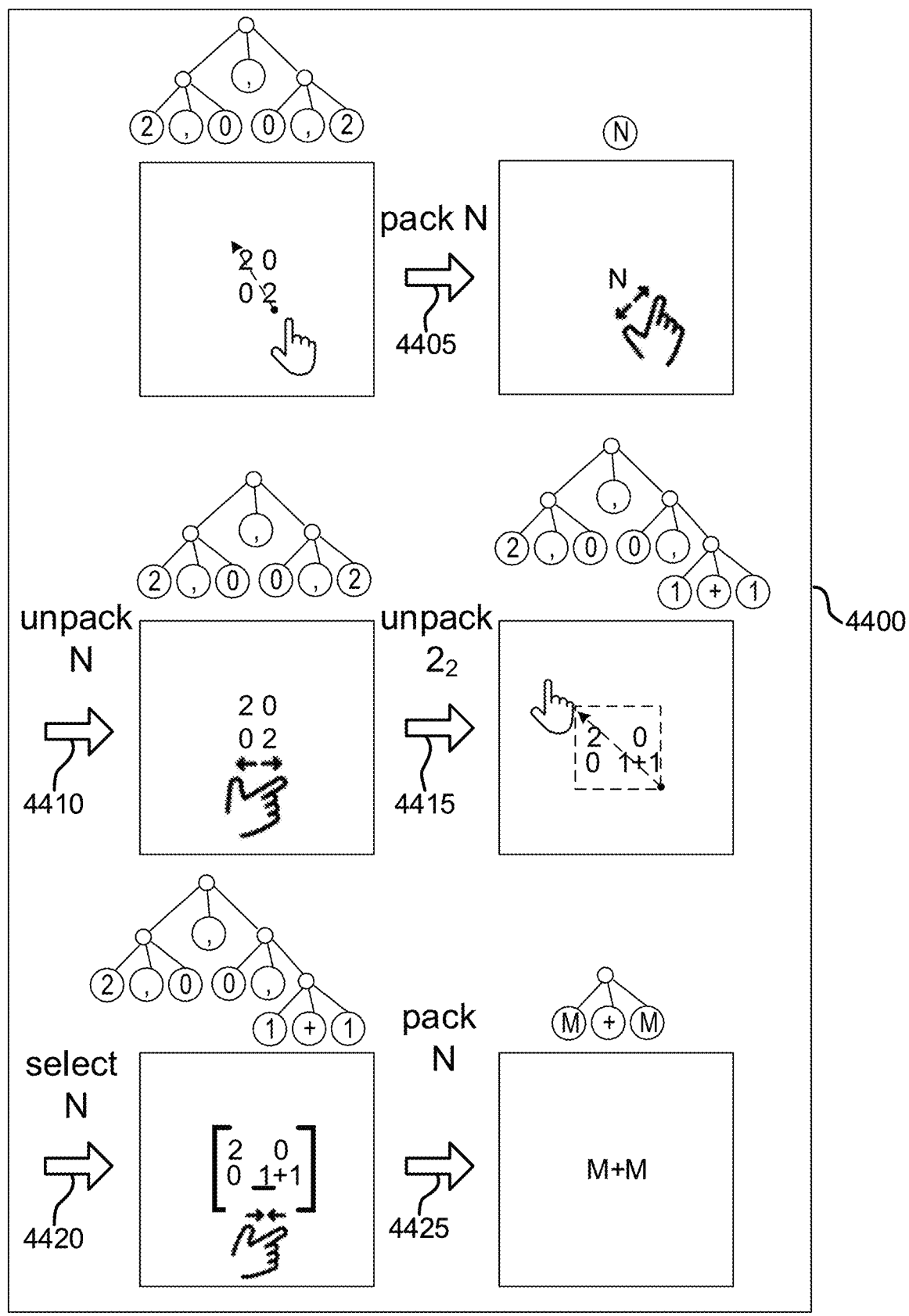

FIG. 44 shows an example of basic matrix operations in accordance with aspects of the present disclosure. Second command sequence 4400 may include first step 4405, pack N (drag), second step 4410, unpack N (gesture), third step 4415, unpack 2(2), fourth step 4420, select N (drag), and fifth step 4425 unpack N (drag).

In step 4405, matrix N is packed using the diagonal drag gesture. The diagonal expand gesture is used to unpack matrix N in step 4410. A horizontal expand gesture is applied to the lower right-hand matrix value (element $2_2$). This results in the command to unpack that matrix value. The value 2 is unpacked to 1+1 and is displayed in place of the previous 2 value. The AST is also modified, as is shown.

A diagonal selection of the matrix to the upper right selects the entire matrix in step 4420. The pinching gesture packs the matrix. In the present example matrix N was created from the M+M matrix of FIG. 43, so packing results in the visual display of "M+M" (where each "M" is [[1,0], [0,1]]).

Figure 45:
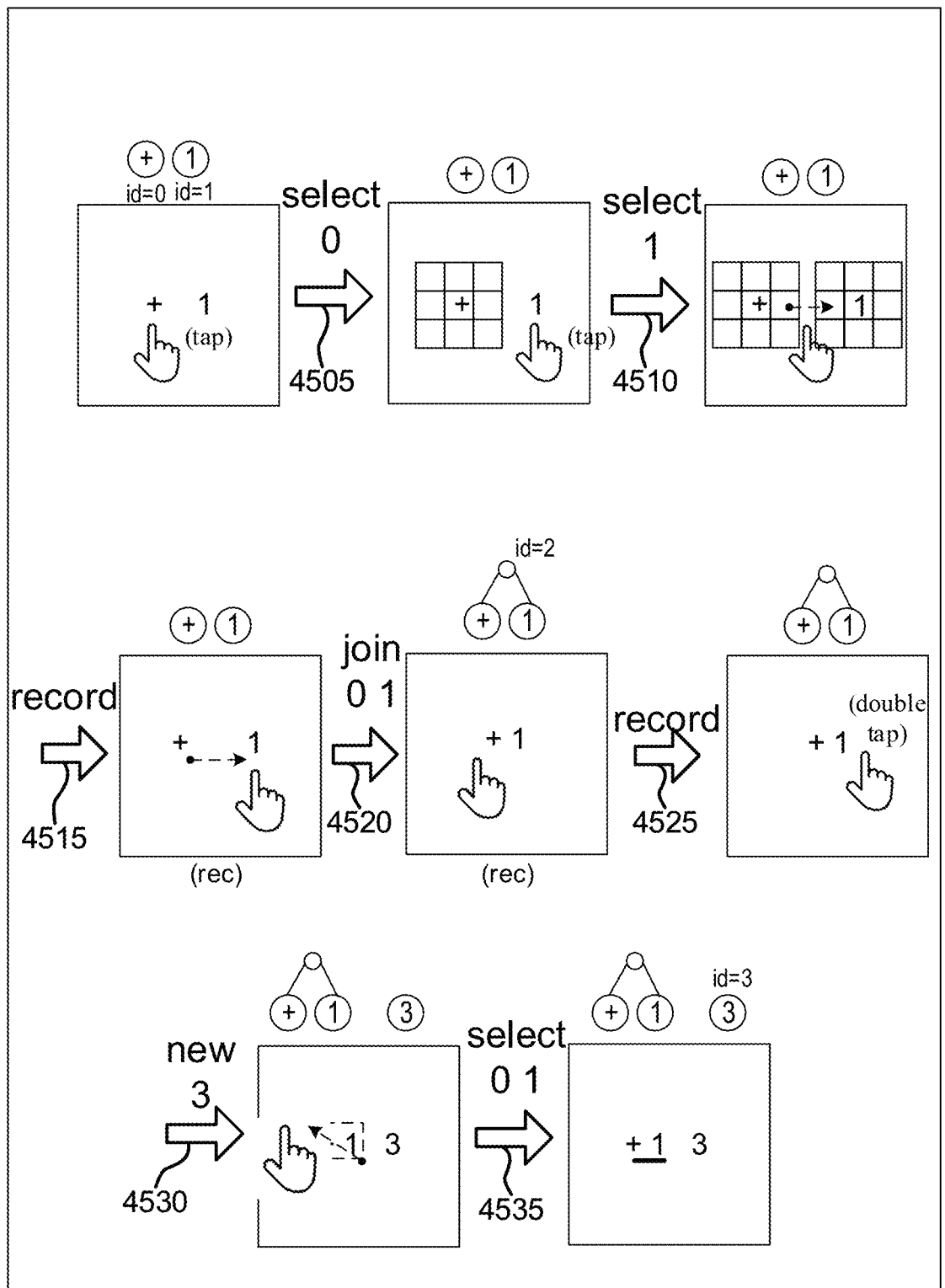
FIGS. 45 through 46 show examples of a graphical representation of multi-parameter recording in accordance with aspects of the present disclosure.

FIG. 45 shows an example of a graphical representation of multi-parameter recording in accordance with aspects of the present disclosure. First command sequence 4500 may include first step 4505, select 0 (tap), second step 4510, select 1 (tap not shown), third step 4515, record (action), fourth step 4520, join 0 1 (drag), fifth step 4525, record, sixth step 4530, new 3 (double tap), and seventh step 4535 select 0 1 (drag).

The example begins with two single-element ASTs: "+" and "1". The plus sign is double-tapped, selecting it (command "select 0" in step 4505). A selection grid is shown. The "1" is then tapped, also selecting it and displaying a selection grid. (command "select 1" in step 4510). The user then gestures using the two selection grids in order to start a recording. The selection grids are no longer visible.

After the recording is initiated, the user drags from the "+" to the "1" to join the two in a single AST (with id=2). The command record stops the recording in step 4525 (alternatively the gesture could call the command "stop"). Next, the user double-taps to the right of the "1" to create a new AST with a value of 3. The user drags across the "+" and the "1" to select both elements. The underline shows that both elements are currently selected.

Figure 46:
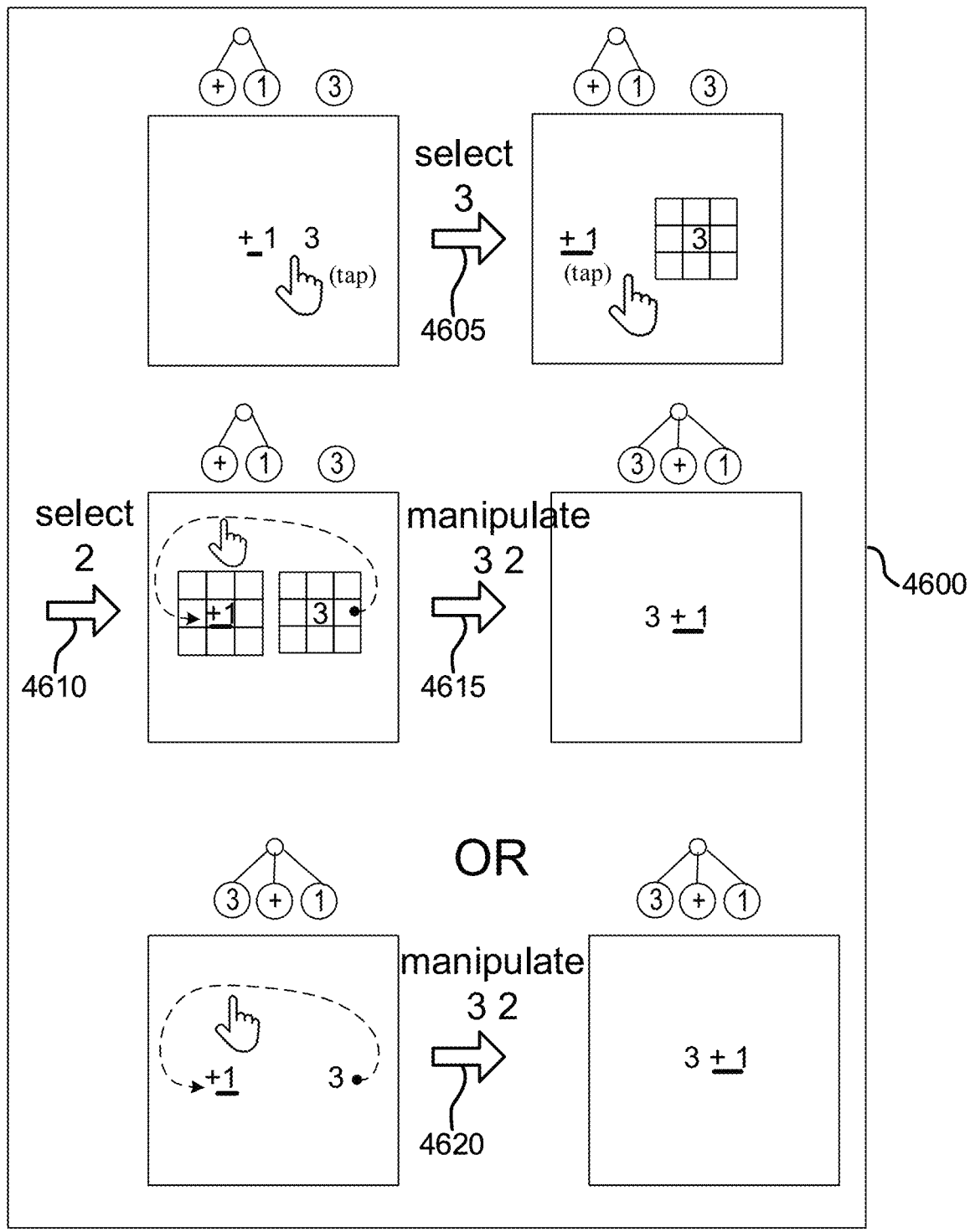

FIG. 46 shows an example of a graphical representation of multi-parameter recording in accordance with aspects of the present disclosure. Second command sequence 4600 may include first step 4605, select 3 (tap), second step 4610, select 2 (tap), third step 4615, manipulate (drag), and/or fourth step 4620, manipulate (action) 3 2.

FIG. 46 shows the same process as FIG. 45, but utilizing selection grids. The "3" is tapped to select and view the selection grid. The "+1" is then tapped to select and view its selection grid. Then, using the selection grids the 3 is dragged to the left of the "+1", joining the elements in a single AST, as shown. This manipulate operation may also be done without grids, as shown in step 4620.

Figure 47:
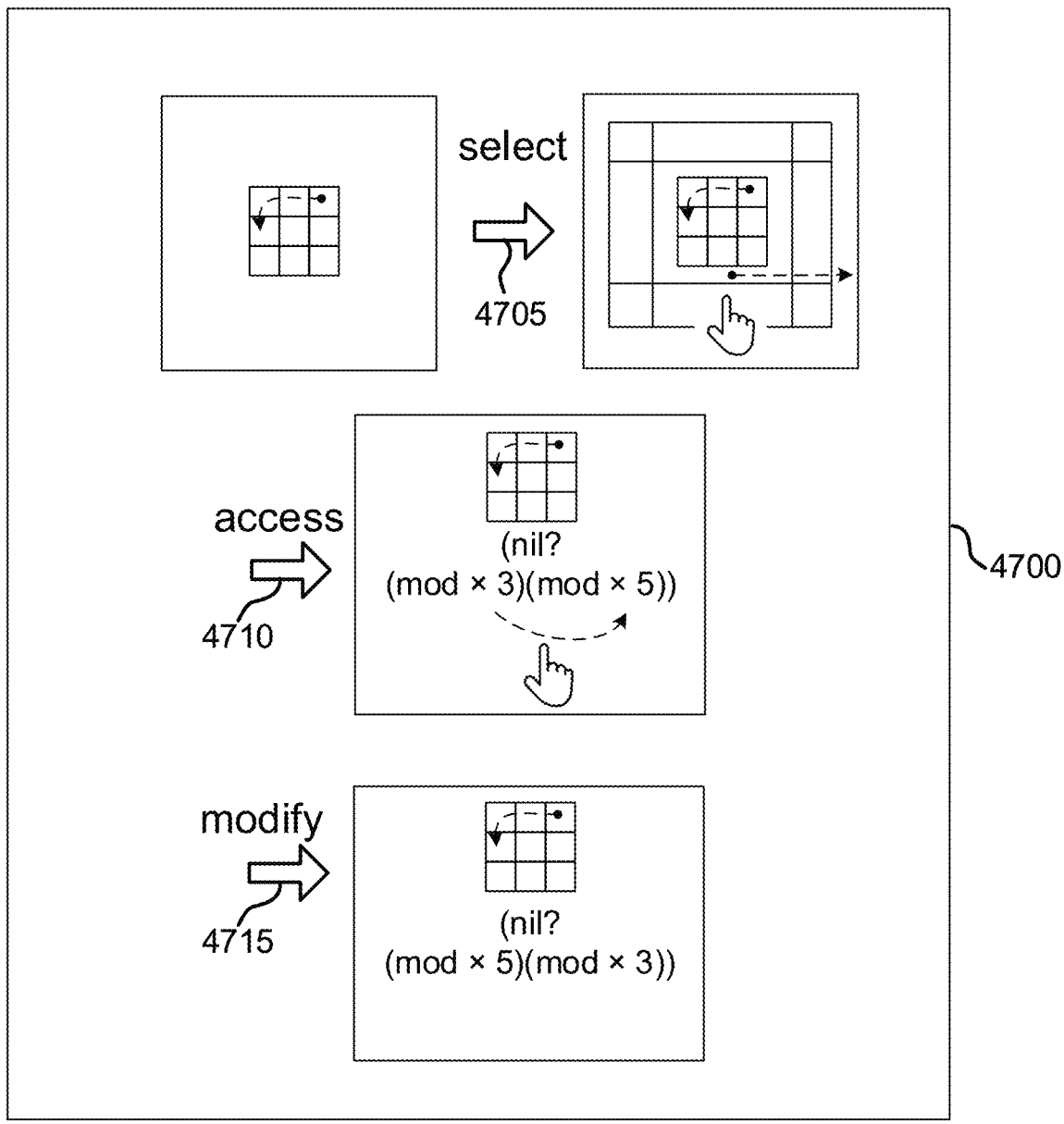
FIG. 47 shows an example of user access of and modification to executable instructions in accordance with aspects of the present disclosure.

FIG. 47 shows an example of user access of and modification to executable instructions. In some cases, a graphical mechanism may render a gesture test list accessible to a user. The gestures may then be manipulated or used by the user. First command sequence 4700 may include first step 4705, select (drag), second step 4710, drag, and third step 4715, drag.

In step 4705, using the selection grid the user inputs a gesture that has had an executable instruction previously associated with it. In step 4710, an additional gesture is performed on the secondary selection grid to access the instruction (or instructions) associated with the gesture. In step 4715, the user performs a gesture to make an adjustment on how the virtual machine/system may determine a sequence of instructions the next time the executable instruction associated with the user input graphical representation is used.

Figure 48:
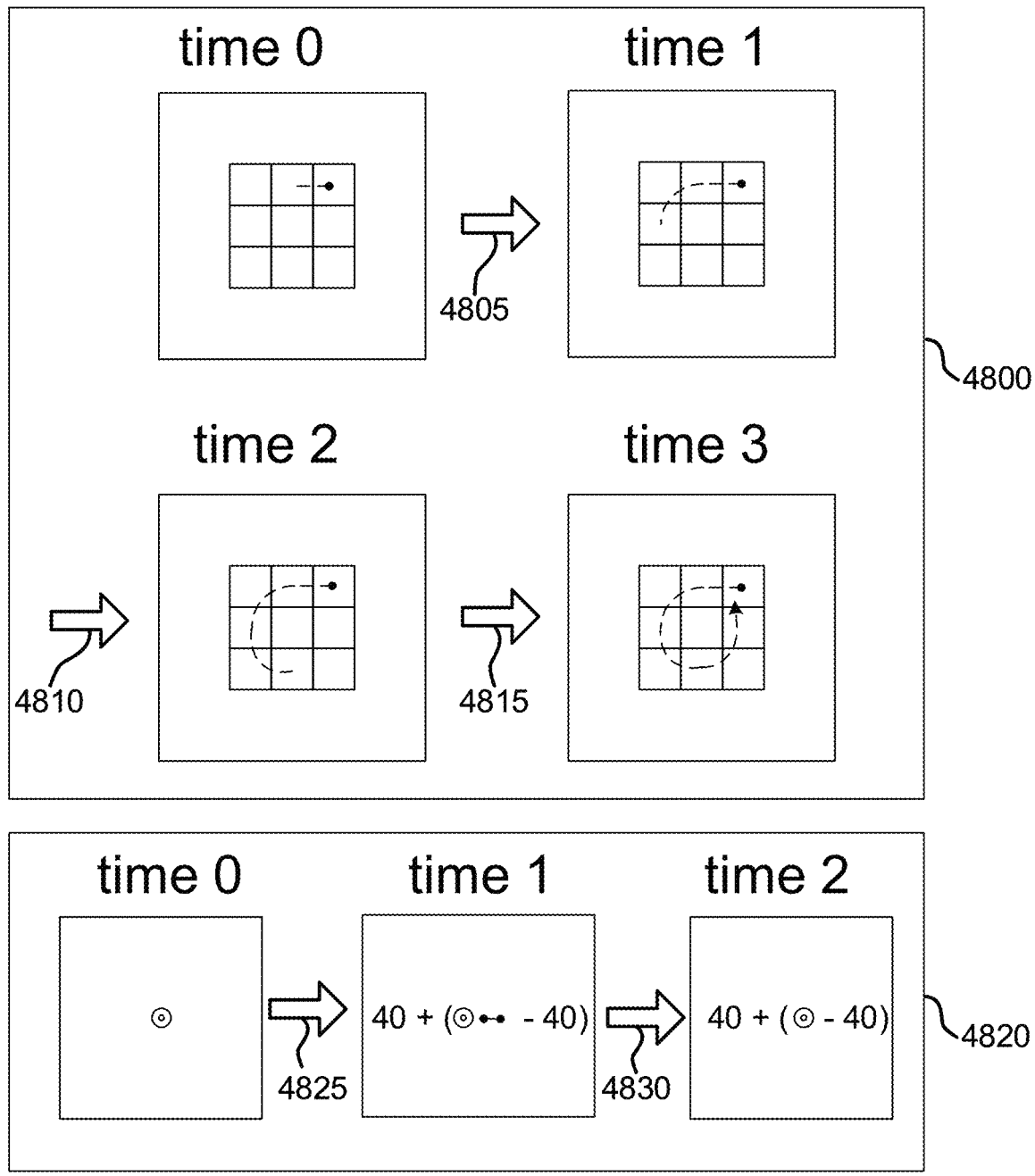
FIG. 48 shows an example of a graphical representation of abstract gestures in accordance with aspects of the present disclosure.

FIG. 48 shows an example of a graphical representation of abstract gestures in accordance with aspects of the present disclosure. The example shown includes first command sequence 4800 and second command sequence 4820.

First command sequence 4800 may represent a graphical animation of a pen gesture being performed, and may include first step 4805, time 0→time 1, second step 4810, time 1→time 2, and third step 4815, time 2→time 3.

Some examples of the system described herein may include one or more still images, like a calligraphy guide, to facilitate user gestures. In some cases, an animation of a generic series of manipulations (or an image of it) may be used in conjunction with other gesture manipulates. Second command sequence 4820 may include fourth step 4825, time 0→time 1, and fifth step 4830, time 1→time 2.

Figure 49:
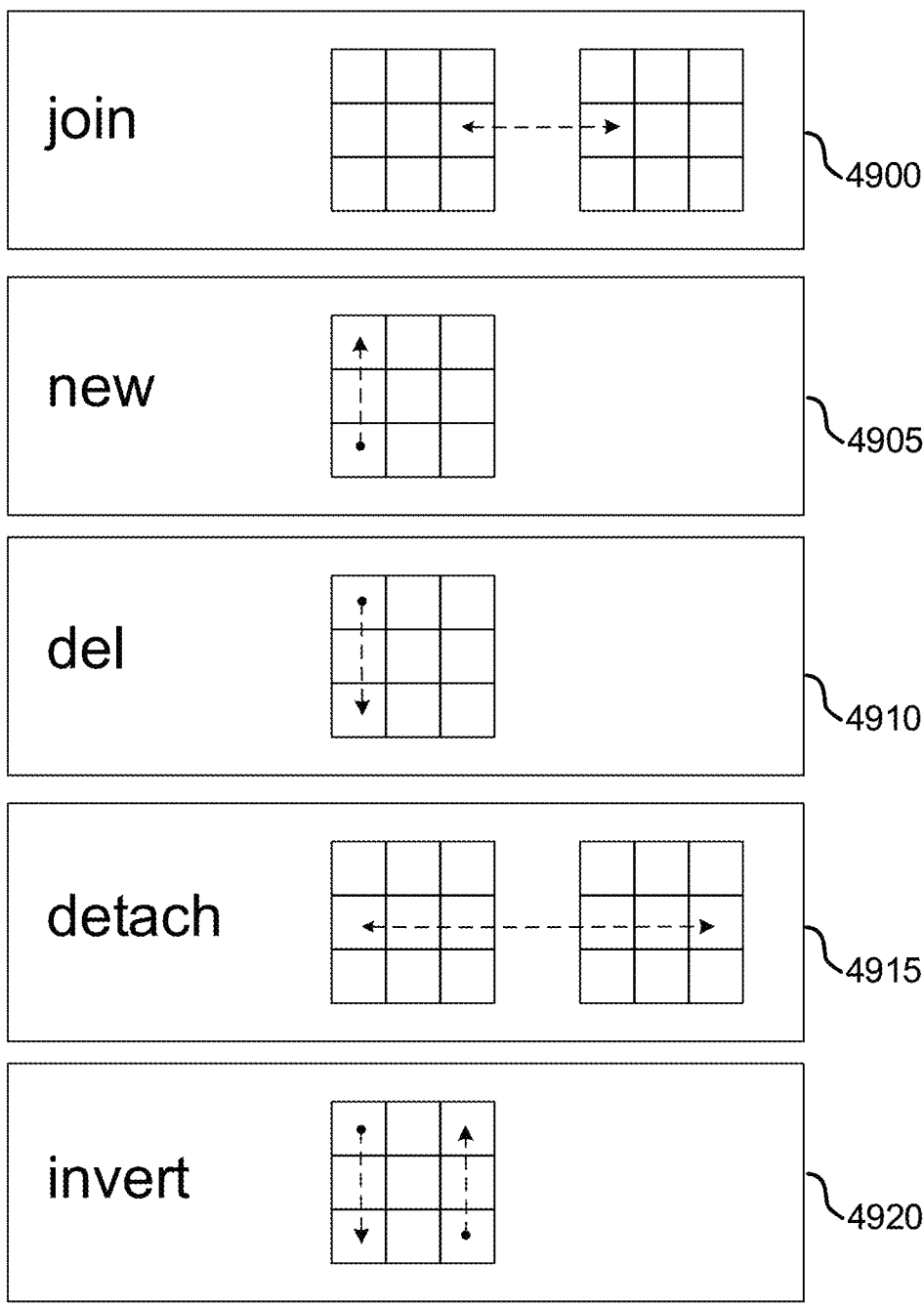

FIG. 49 shows an example of a graphical representation of abstract manipulations in accordance with aspects of the present disclosure. The example shown includes serializations of manipulations on a m-by-n grid represented in first command sequence 4900, join, second command sequence 4905, new, third command sequence 4910, del, fourth command sequence 4915, detach, and fifth command sequence 4920, invert.

FIG. 50 shows an example of a graphical representation of abstract manipulations in accordance with aspects of the present disclosure. As used herein, the ○ symbol represents the composition infix, with functions being read right to left. In some examples, descriptions may be packed and unpacked into (and out of) a single representation.

The example shown includes sixth command sequence 5000 (gesture composition), seventh command sequence 5005 (gesture composition), eighth command sequence 5010 (generate Oth expression and attach on the left), ninth command sequence 5015 (gesture decomposition), and tenth command sequence 5020 (gesture decomposition).

Figure 51:
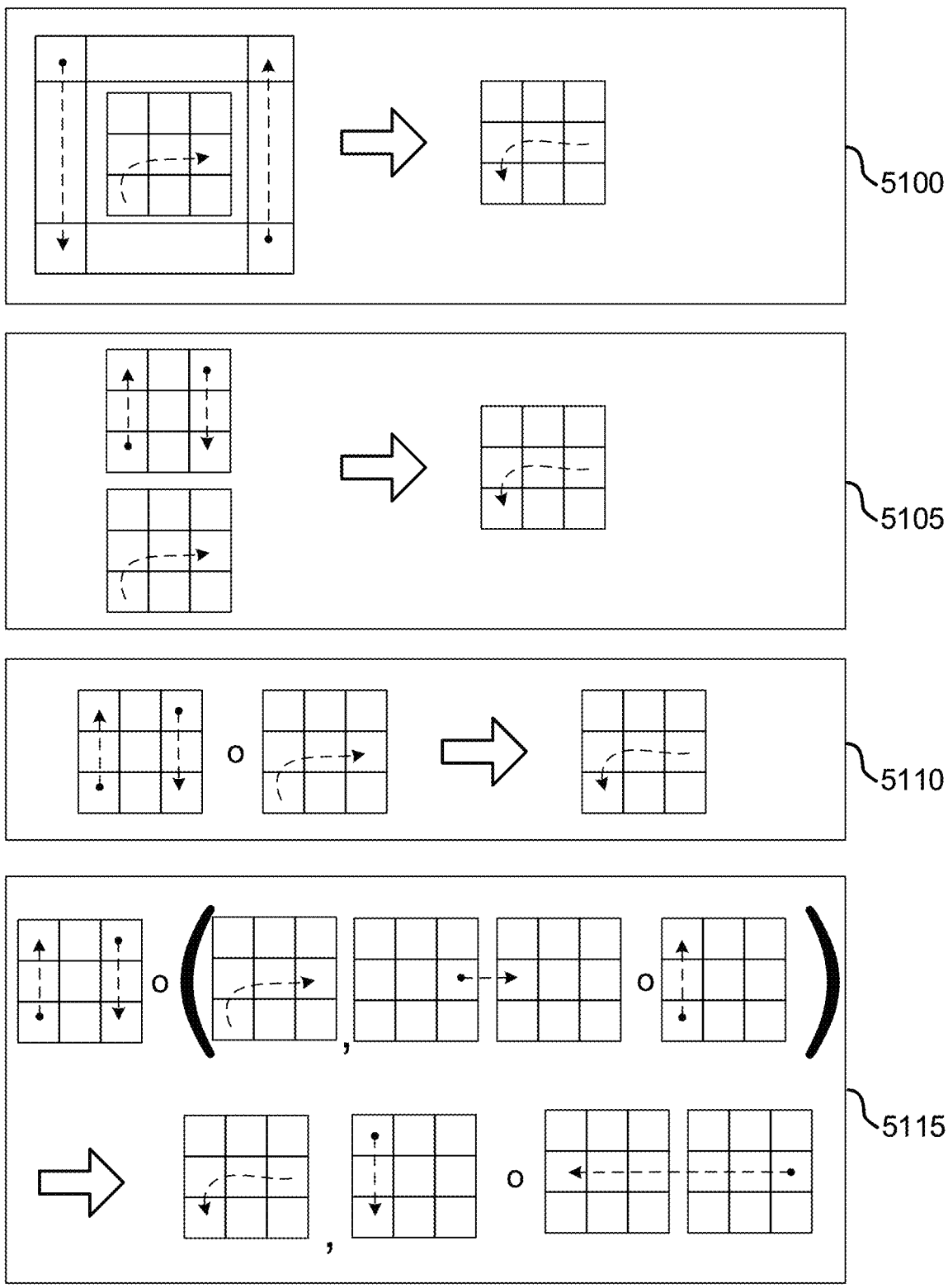

FIG. 51 shows an example of a graphical representation of abstract manipulations in accordance with aspects of the present disclosure. As illustrated herein, gestures may be drawn on top of other gestures, drawn offside, composed and evaluated, and applied to a set of manipulations.

The example shown includes eleventh command sequence 5100 (gesture composition), twelfth command sequence 5105 (gesture composition), thirteenth command sequence 5110 (gesture composition), and fourteenth command sequence 5115 (gesture distribution).

Figure 52:
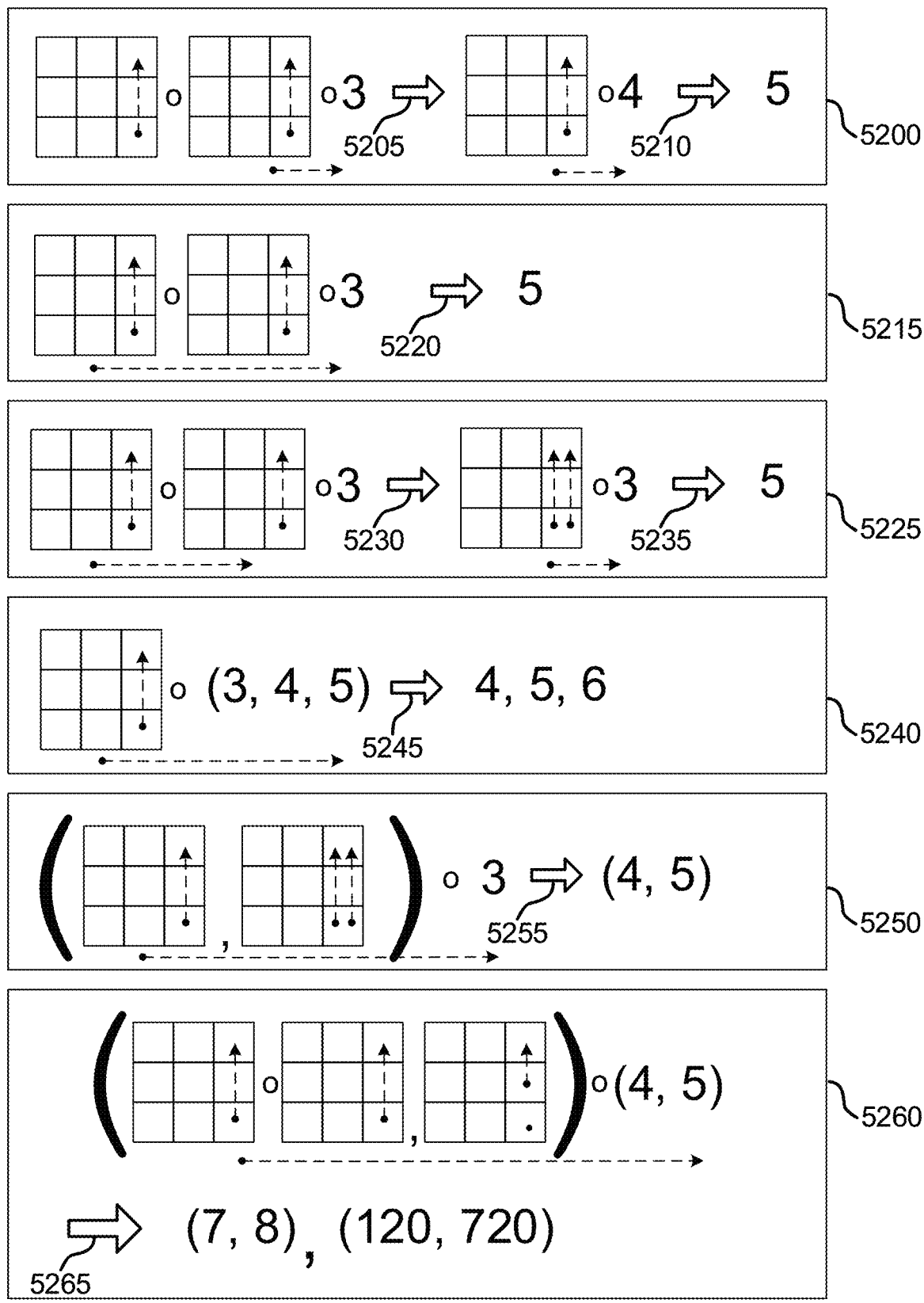
FIGS. 52 through 53 show examples of compound evaluations in accordance with aspects of the present disclosure.
Figure 53:
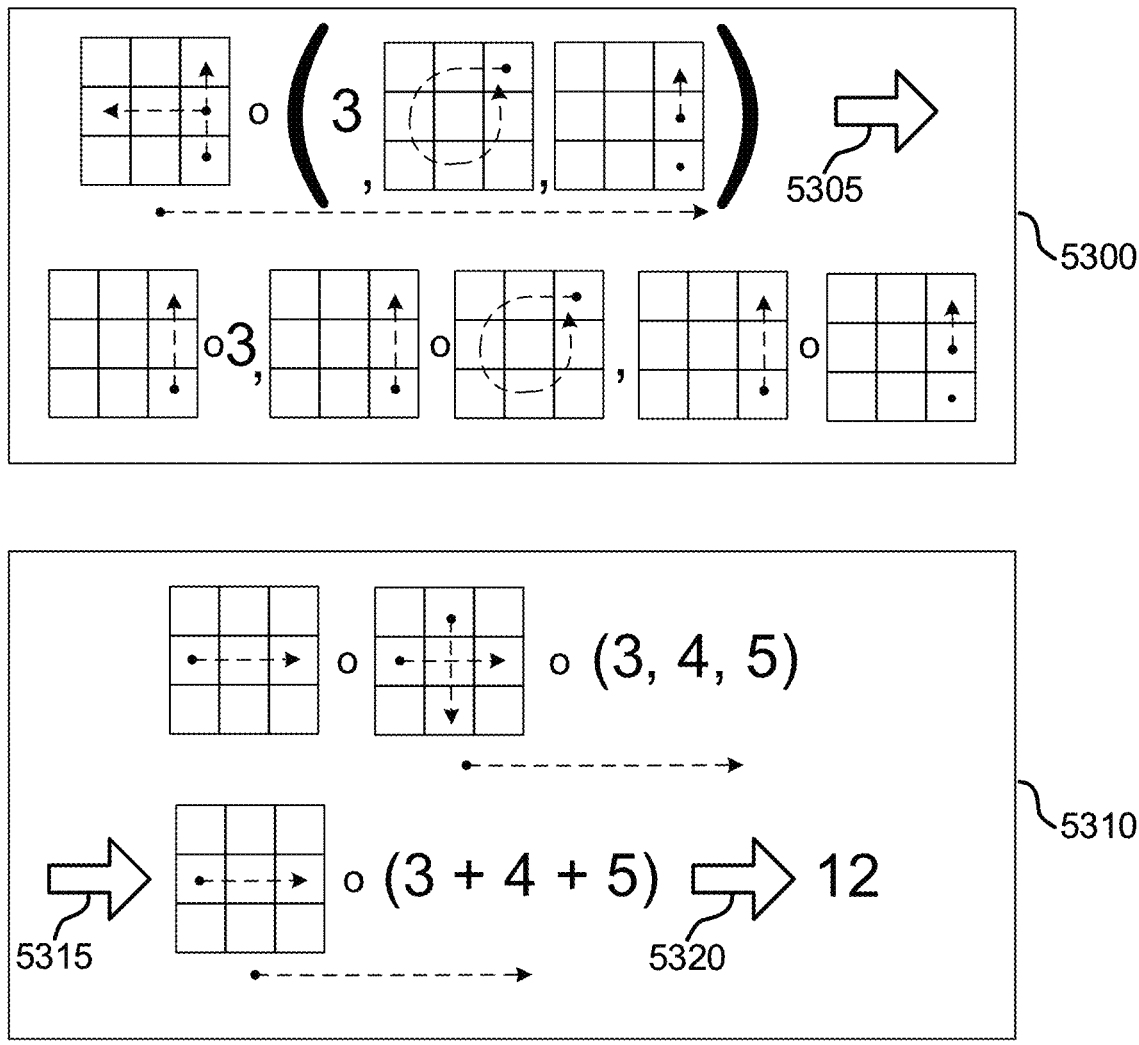

In FIGS. 52 and 53, an m-by-n grid indicating a gesture as an arrow starting in the lower-right corner and ending in the upper-right corner shall represent incrementing a value by 1.

FIG. 52 shows an example of compound evaluations in accordance with aspects of the present disclosure. The composition may follow the algebraic rules for compositions. The compositions may be multiparameter maps, multifunction (function maps), or both multiparameter and multi-function.

The example shown includes first command sequence 5200 (gesture composition), second command sequence 5215 (gesture composition), third command sequence 5225 (gesture composition), fourth command sequence 5240 (gesture composition), fifth command sequence 5250 (gesture composition), and sixth command sequence 5260 (gesture composition).

First command sequence 5200 may include first step 5205, evaluation, and second step 5210, evaluation. Second command sequence 5215 may include third step 5220, evaluation. Third command sequence 5225 may include fourth step 5230, evaluation, and fifth step 5235, evaluation. Fourth command sequence 5240 may include sixth step 5245, evaluation. Fifth command sequence 5250 may include seventh step 5255, evaluation. Sixth command sequence 5260 may include eighth step 5265, evaluation.

In FIG. 53, an m-by-n grid indicating a gesture as two arrows, the first of which starts in the lower-right corner and ends in the upper-right corner, and the second of which starts in the middle-right square and ends in the middle-left square, shall represent taking the abstract representation of the action of incrementing a value by 1 used in FIG. 52 and joining it on the left of its input unevaluated.

FIG. 53 shows an example of compound evaluations in accordance with aspects of the present disclosure. The illustrations of FIG. 53 may include concatenation and reduction.

The example shown includes seventh command sequence 5300 and eighth command sequence 5310. Seventh command sequence 5300 may include first step 5305, distribution. Eighth command sequence 5310 may include second step 5315, distribution, and third step 5320, evaluation.

Figure 54:
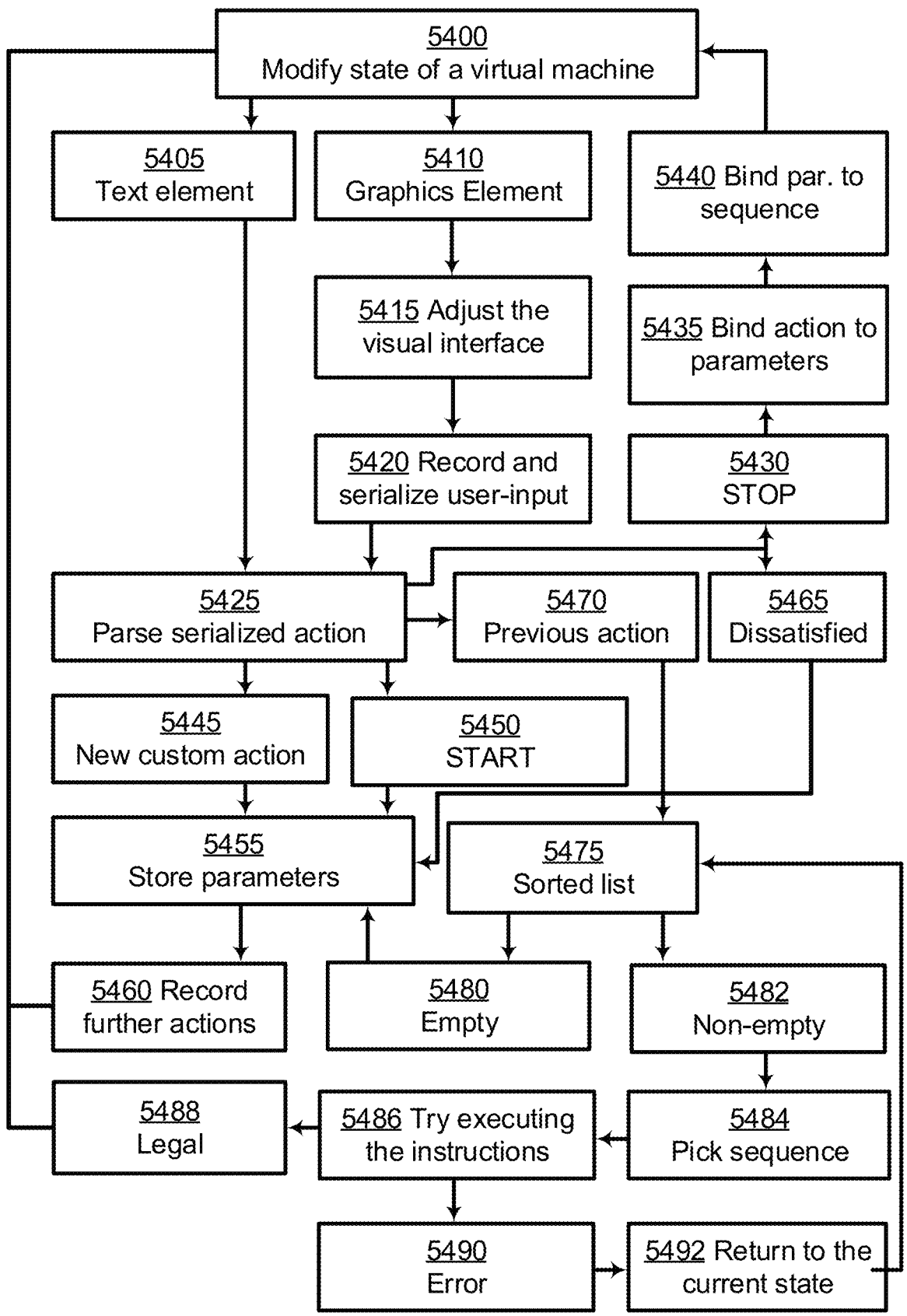
FIG. 54 shows an example of a process for manipulation of abstract syntax trees in accordance with aspects of the present disclosure.

FIG. 54 shows an example of a process for manipulation of abstract syntax trees in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 5400, the system may determine the state of a virtual machine. The process may then proceed to step 5405 or 5410.

At step 5405, the system may identify text. The process may then proceed to step 5425.

At step 5410, the system may identify graphical element.

At step 5415, the system may allow a user to adjust the visual interface to accommodate accurate action input reading.

At step 5420, the system may record and serialize a user-input action.

At step 5425, the system may parse the serialized action. The process may then proceed to step 5430, 5445, 5465, or 5470.

At step 5430, the system may identify a stop record command.

At step 5435, the system may associate the recorded action with exact parameters or user provided generalizations.

At step 5440, the system may associate parameters or generalizations with a recorded instruction sequence. The process may then return to step 5400.

At step 5445, the system may generate a new custom action. The process may then proceed to step 5455.

At step 5450, the system may start recording.

At step 5455, the system may store parameters of the recorded action.

At step 5460, the system may record further actions until a stop record command is identified. The process may then return to step 5400.

At step 5465, the system may determine that an action is dissatisfied. The process may then proceed to step 5455.

At step 5470, the system may identify a previously recorded custom action.

At step 5475, the system may generate a sequence of instruction sequences sorted by the recorded actions parameters similarity to expressions to which the instruction sequences were applied in previous recordings. The process may then proceed to either 5480 or 5482 depending on whether the list is empty.

At step 5480, the system may determine that the list is empty. The process may then proceed to step 5455.

At step 5482, the system may determine that the list is non-empty.

At step 5484, the system may pick the instruction sequence with the highest similarity scores from the sorted list.

At step 5486, the system may try executing the instruction sequence on the current state. The process may then proceed to step 5488 or 5490 based on whether the recorded actions are legal.

At step 5488, the system may determine that the recorded actions are legal. The process may then return to step 5400.

At step 5490, the system may identify an error (i.e., an illegal action).

At step 5492, the system may return to the current state and remove the sequence from the list. The process may then return to step 5475.

Figure 55:
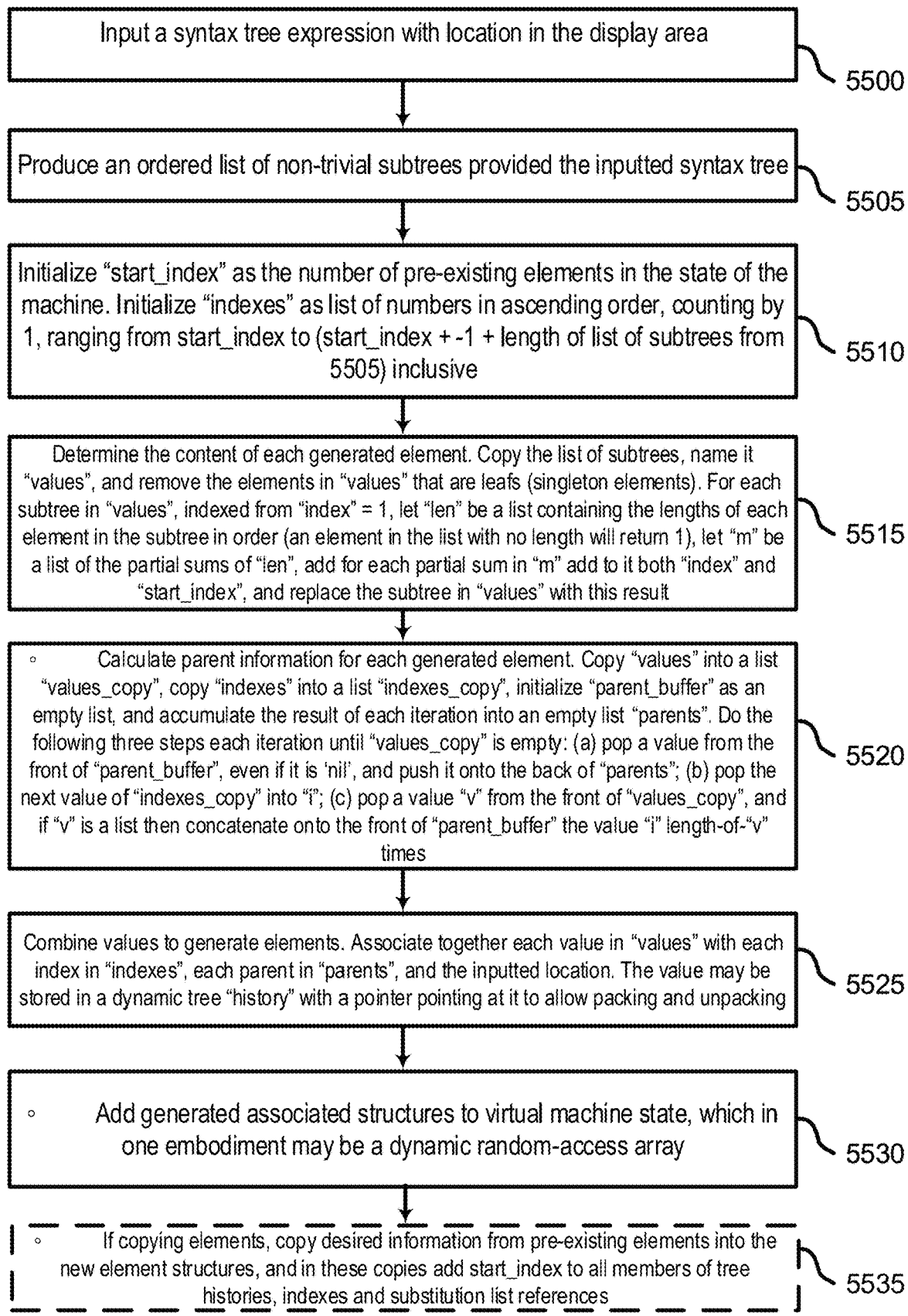
FIG. 55 shows an example of an implementation of node generation in accordance with aspects of the present disclosure.

FIG. 55 shows an example of an implementation of node generation in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 5500, the system may input a syntax tree expression with location in the display area At step 5505, the system may produce an ordered list of non-trivial subtrees provided the inputted syntax tree, such as would be determined in a pre-order walk of the inputted tree At step 5510, the system may initialize "start_index" as the number of pre-existing elements in the state of the machine. The system may initialize "indexes" as a list of numbers in ascending order, counting by 1, ranging from start_index to (start_index+−1+length of list of subtrees from 5505) inclusive.

At step 5515, the system may determine the content of each generated element. The system may copy the list of subtrees, name it "values", and remove the elements in "values" that are leafs (singleton elements). For each subtree in "values", indexed from "index"=1, the system may let "len" be a list containing the lengths of each element in the subtree in order (an element in the list with no length will return 1), let "m" be a list of the partial sums of "len", add for each partial sum in "m" add to it both "index" and "start_index", and replace the subtree in "values" with this result.

At step 5520, the system may calculate parent information for each generated element. The system may Copy "values" into a list "values_copy", copy "indexes" into a list "indexes copy", initialize "parent_buffer" as an empty list, and accumulate the result of each iteration into an empty list "parents". The system may do the following three steps each iteration until "values_copy" is empty: (a) pop a value from the front of "parent_buffer", even if it is 'nil', and push it onto the back of "parents"; (b) pop the next value of "indexes copy" into "i"; (c) pop a value "v" from the front of "values_copy", and if "v" is a list then concatenate onto the front of "parent_buffer" the value "i" length-of-"v" times.

At step 5525, the system may combine values to generate elements. The system may associate together each value in "values" with each index in "indexes", each parent in "parents", and the inputted location. The value may be stored in a dynamic tree "history" with a pointer pointing at it to allow packing and unpacking.

At step 5530, the system may add generated associated structures to virtual machine state, which in one embodiment may be a dynamic random-access array.

At optional step 5535, if copying elements, the system may copy desired information from pre-existing elements into the new element structures, and in these copies add start_index to all members of tree histories, indexes and substitution list references.

Figure 56:
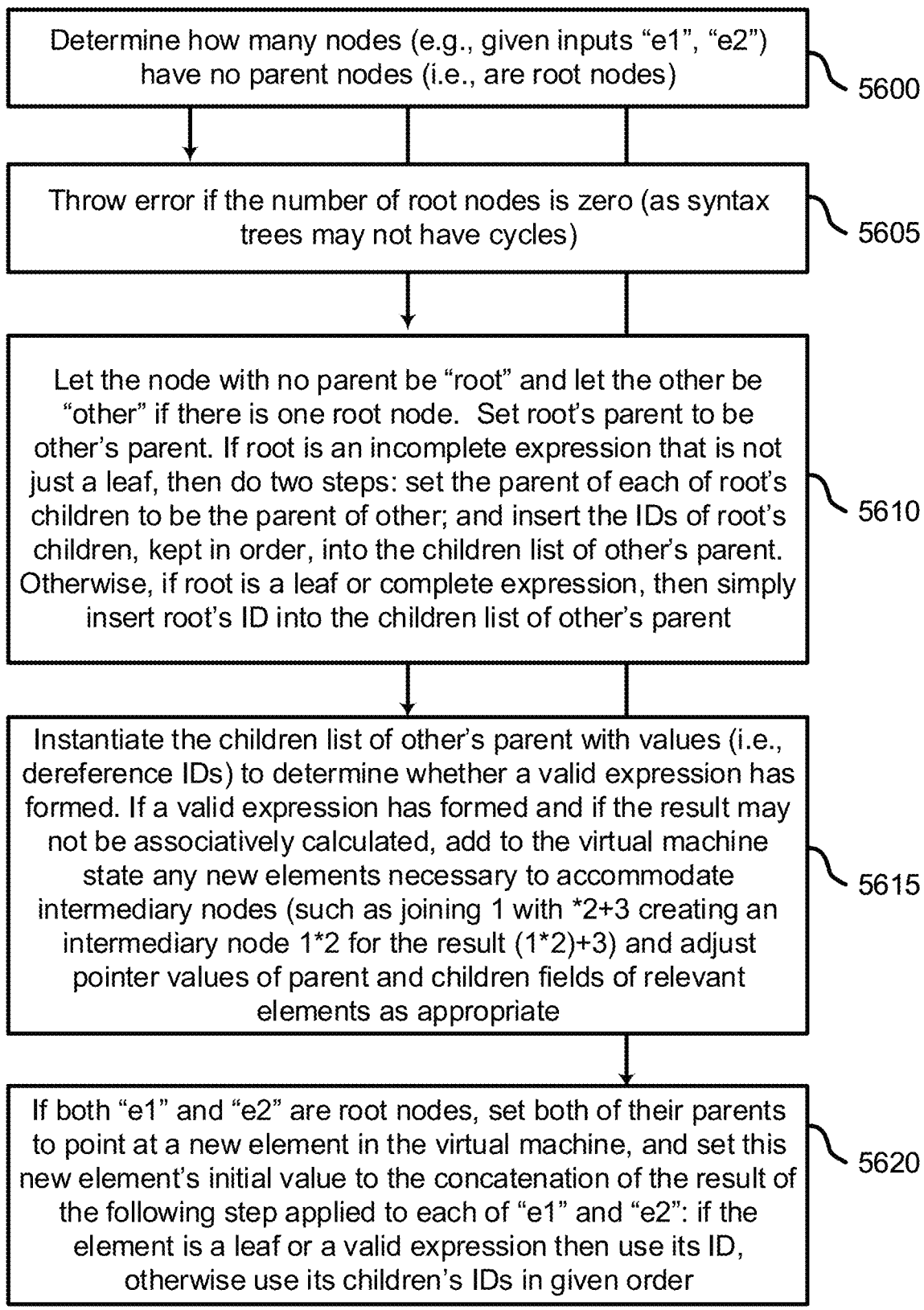
FIG. 56 shows an example of a process for joining nodes in accordance with aspects of the present disclosure.

FIG. 56 shows an example of a process for joining nodes in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 5600, the system may determine how many nodes (e.g., given inputs "e1", "e2") have no parent nodes (i.e., are root nodes)

At step 5605, the system may throw error if the number of root nodes is zero (as syntax trees may not have cycles)

At step 5610, the system may let the node with no parent be "root" and let the other be "other" if there is one root node. Set root's parent to be other's parent. If root is an incomplete expression that is not just a leaf, then do two steps: set the parent of each of root's children to be the parent of other; and insert the IDs of root's children, kept in order, into the children list of other's parent. Otherwise, if root is a leaf or complete expression, then simply insert root's ID into the children list of other's parent.

At step 5615, the system may instantiate the children list of other's parent with values (i.e., dereference IDs) to determine whether a valid expression has formed. If a valid expression has formed and if the result may not be associatively calculated, add to the virtual machine state any new elements necessary to accommodate intermediary nodes (such as joining 1 with *2+3 creating an intermediary node 1*2 for the result (1*2)+3) and adjust pointer values of parent and children fields of relevant elements as appropriate.

At step 5620, if both "e1" and "e2" are root nodes, the system may set both of their parents to point at a new element in the virtual machine, and set this new element's initial value to the concatenation of the result of the following step applied to each of "e1" and "e2": if the element is a leaf or a valid expression then use its ID, otherwise use its children's IDs in given order.

Figure 57:
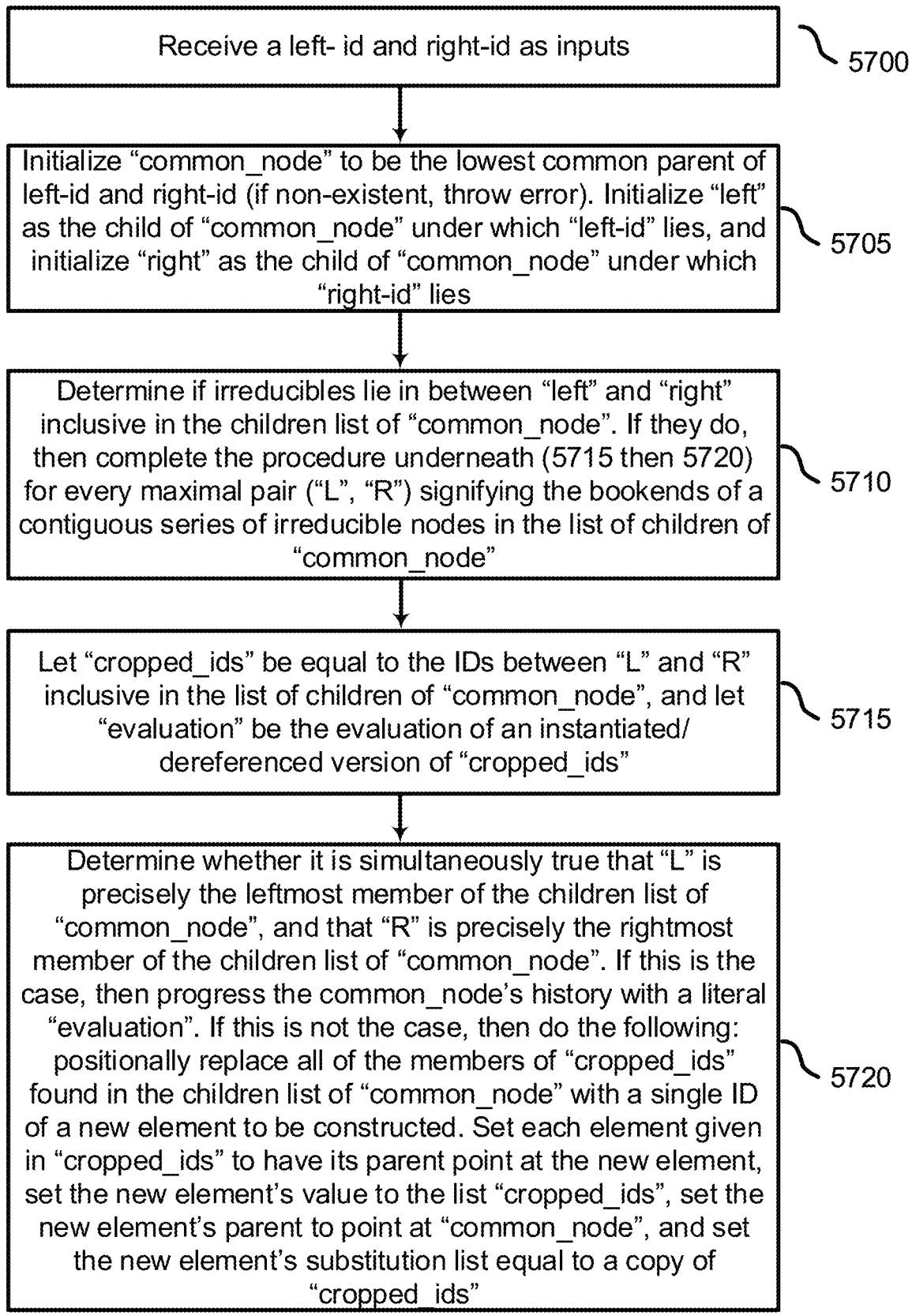
FIG. 57 shows an example of a process for evaluating or packing nodes in accordance with aspects of the present disclosure.

FIG. 57 shows an example of a process for evaluating or packing nodes in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 5700, the system may receive a left-id and right-id as inputs.

At step 5705, the system may initialize "common_node" to be the lowest common parent of left-id and right-id (if non-existent, throw error). The system may initialize "left" as the child of "common_node" under which "left-id" lies, and initialize "right" as the child of "common_node" under which "right-id" lies.

At step 5710, the system may determine if irreducibles lie in between "left" and "right" inclusive in the children list of "common_node". If they do, then complete the procedure underneath (5715 then 5720) for every maximal pair ("L", "R") signifying the bookends of a contiguous series of irreducible nodes in the list of children of "common_node".

At step 5715, the system may let "cropped_ids" be equal to the IDs between "L" and "R" inclusive in the list of children of "common_node", and let "evaluation" be the evaluation of an instantiated/dereferenced version of "cropped_ids".

At step 5720, the system may determine whether it is simultaneously true that "L" is precisely the leftmost member of the children list of "common_node", and that "R" is precisely the rightmost member of the children list of "common_node". If this is the case, then progress the common_node's history with a literal "evaluation". If this is not the case, then do the following: positionally replace all of the members of "cropped_ids" found in the children list of "common_node" with a single ID of a new element to be constructed. Set each element given in "cropped_ids" to have its parent point at the new element, set the new element's value to the list "cropped_ids", set the new element's parent to point at "common_node", and set the new element's substitution list equal to a copy of "cropped_ids".

Figure 58:
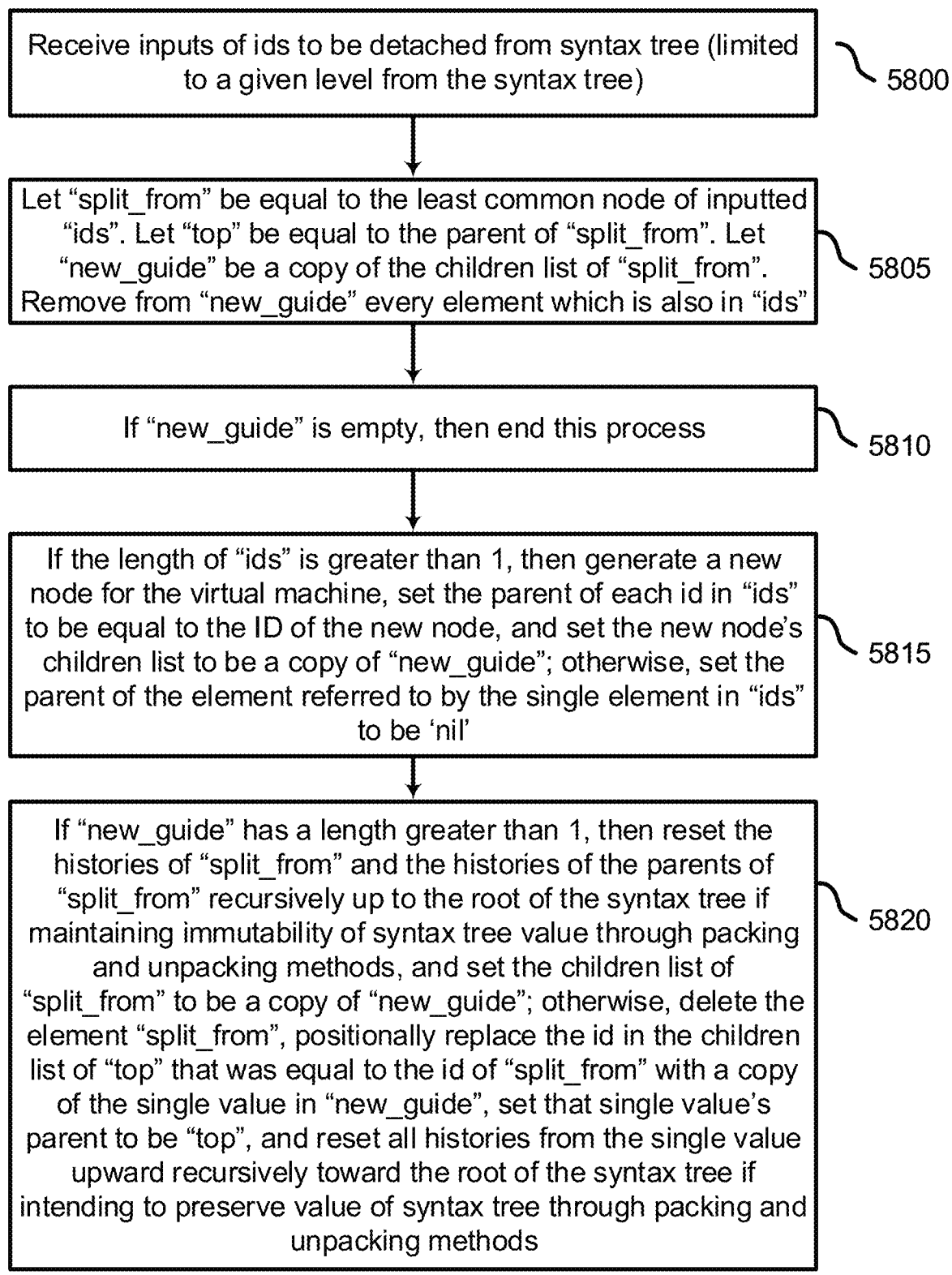
FIG. 58 shows an example of a process for detaching nodes in accordance with aspects of the present disclosure.

FIG. 58 shows an example of a process for detaching nodes in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 5800, the system may receive inputs of IDs to be detached from syntax tree (limited to a given level from the syntax tree).

At step 5805, the system may let "split_from" be equal to the least common_node of inputted "ids". Let "top" be equal to the parent of "split_from". The system may let "new_guide" be a copy of the children list of "split_from". The system may remove from "new_guide" every element which is also in "ids".

At step 5810, the system may determine if "new_guide" is empty, if so then end this process.

At step 5815, the system may determine if the length of "ids" is greater than 1, and if so then generate a new node for the virtual machine, set the parent of each id in "ids" to be equal to the ID of the new node, and set the new node's children list to be a copy of "new_guide"; otherwise, set the parent of the element referred to by the single element in "ids" to be 'nil'.

At step 5820, the system may determine if "new_guide" has a length greater than 1, if so then reset the histories of "split_from" and the histories of the parents of "split_from" recursively up to the root of the syntax tree if maintaining immutability of syntax tree value through packing and unpacking methods, and set the children list of "split_from" to be a copy of "new_guide"; otherwise, delete the element "split_from", positionally replace the id in the children list of "top" that was equal to the id of "split_from" with a copy of the single value in "new_guide", set that single value's parent to be "top", and reset all histories from the single value upward recursively toward the root of the syntax tree if intending to preserve value of syntax tree through packing and unpacking methods.

Figure 59:
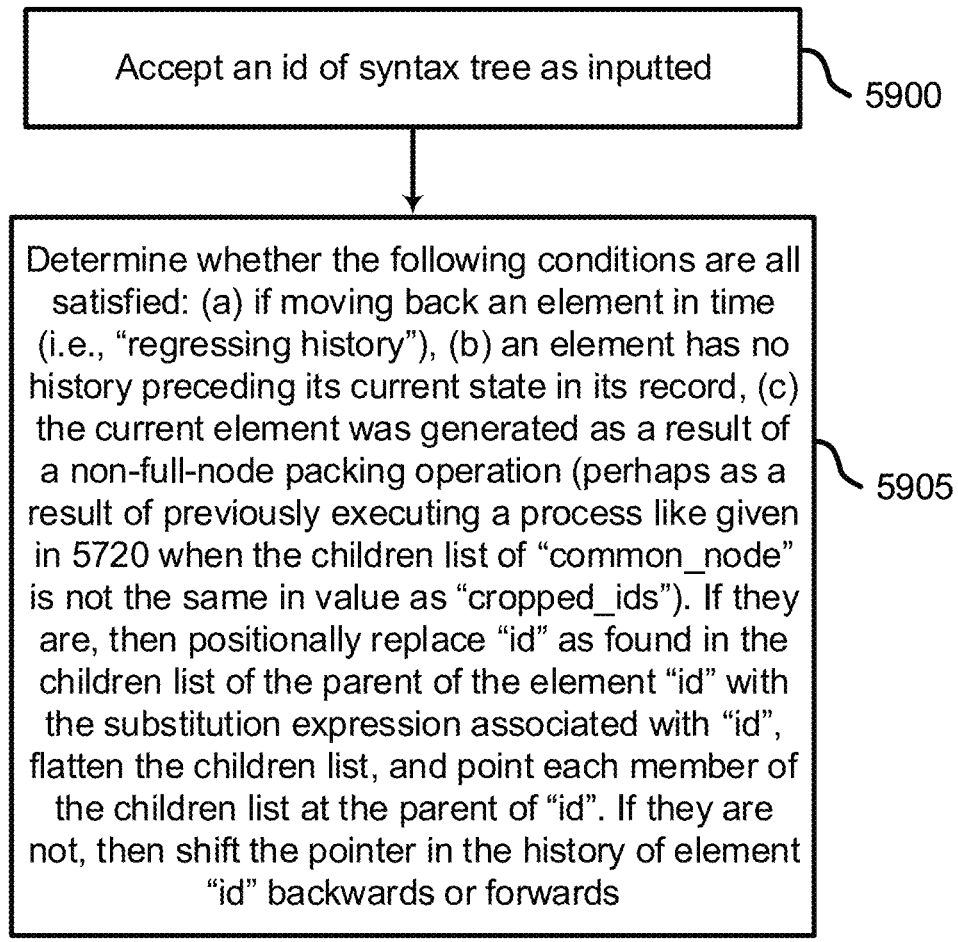
FIG. 59 shows an example of a process for unpacking nodes in accordance with aspects of the present disclosure.

FIG. 59 shows an example of a process for unpacking nodes in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 5900, the system may accept an id of syntax tree as inputted.

At step 5905, the system may determine whether the following conditions are all satisfied: (a) if moving back an element in time (i.e., "regressing history"), (b) an element has no history preceding its current state in its record, (c) the current element was generated as a result of a non-full-node packing operation (perhaps as a result of previously executing a process like given in 5720 when the children list of "common_node" is not the same in value as "cropped_ids"). If they are, then the system may positionally replace "id" as found in the children list of the parent of the element "id" with the substitution expression associated with "id", flatten the children list, and point each member of the children list at the parent of "id". If they are not, then the system may shift the pointer in the history of element "id" backwards or forwards.

Figure 60:
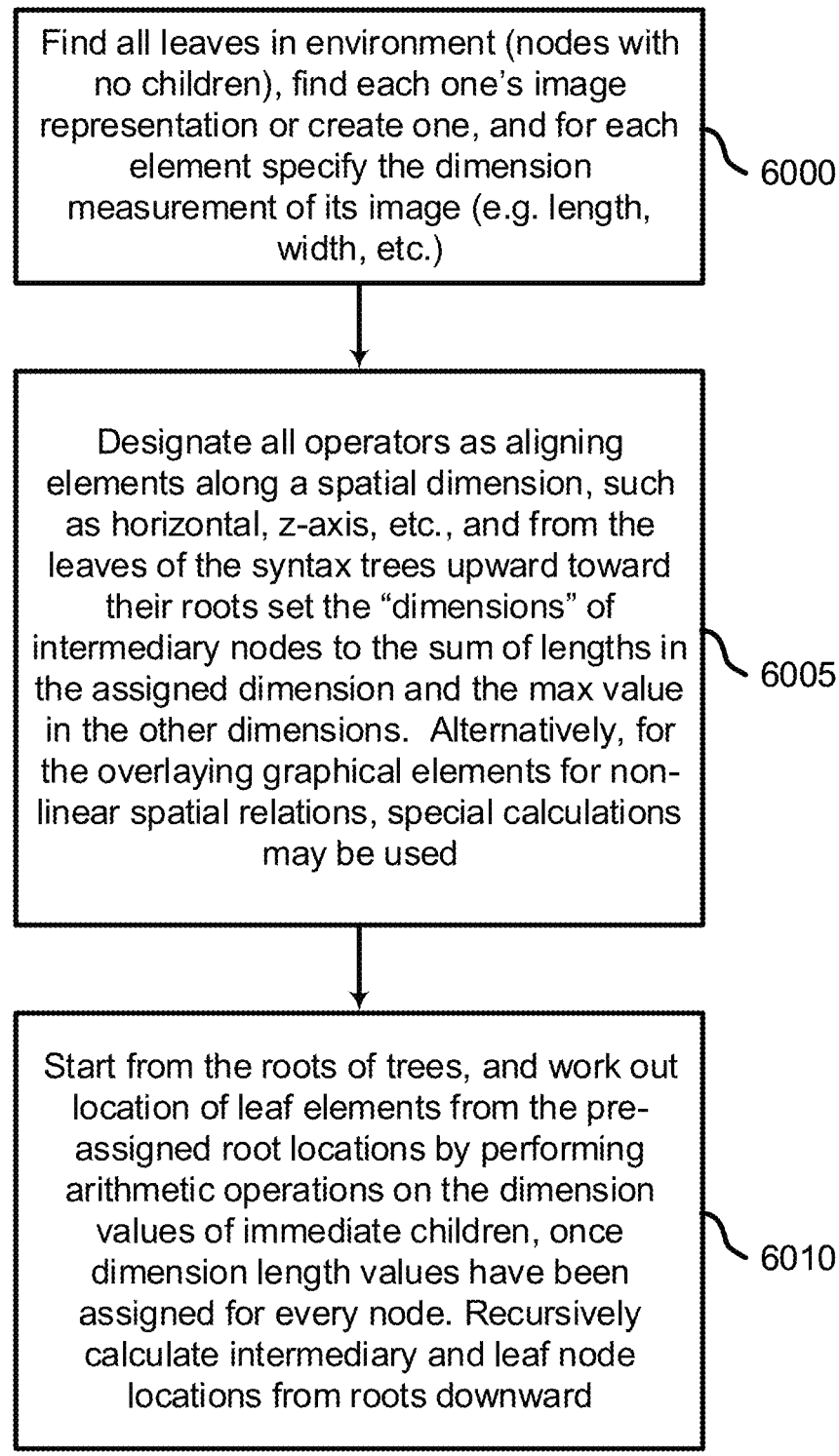
FIG. 60 shows an example of a process for location allocation of elements in a visual environment in accordance with aspects of the present disclosure.

FIG. 60 shows an example of a process for location allocation of elements in a visual environment in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6000, the system may find all leaves in environment (nodes with no children), find each one's image representation or create one, and for each element specify the dimension measurement of its image (e.g. length, width, etc.).

At step 6005, the system may designate all operators as aligning elements along a spatial dimension, such as horizontal, z-axis, etc., and from the leaves of the syntax trees upward toward their roots set the "dimensions" of intermediary nodes to the sum of lengths in the assigned dimension and the max value in the other dimensions. Alternatively, for the overlaying graphical elements for non-linear spatial relations, special calculations may be used.

At step 6010, the system may start from the roots of trees, and work out location of leaf elements from the pre-assigned root locations by performing arithmetic operations on the dimension values of immediate children, once dimension length values have been assigned for every node. Recursively calculate intermediary and leaf node locations from roots downward.

Figure 61:
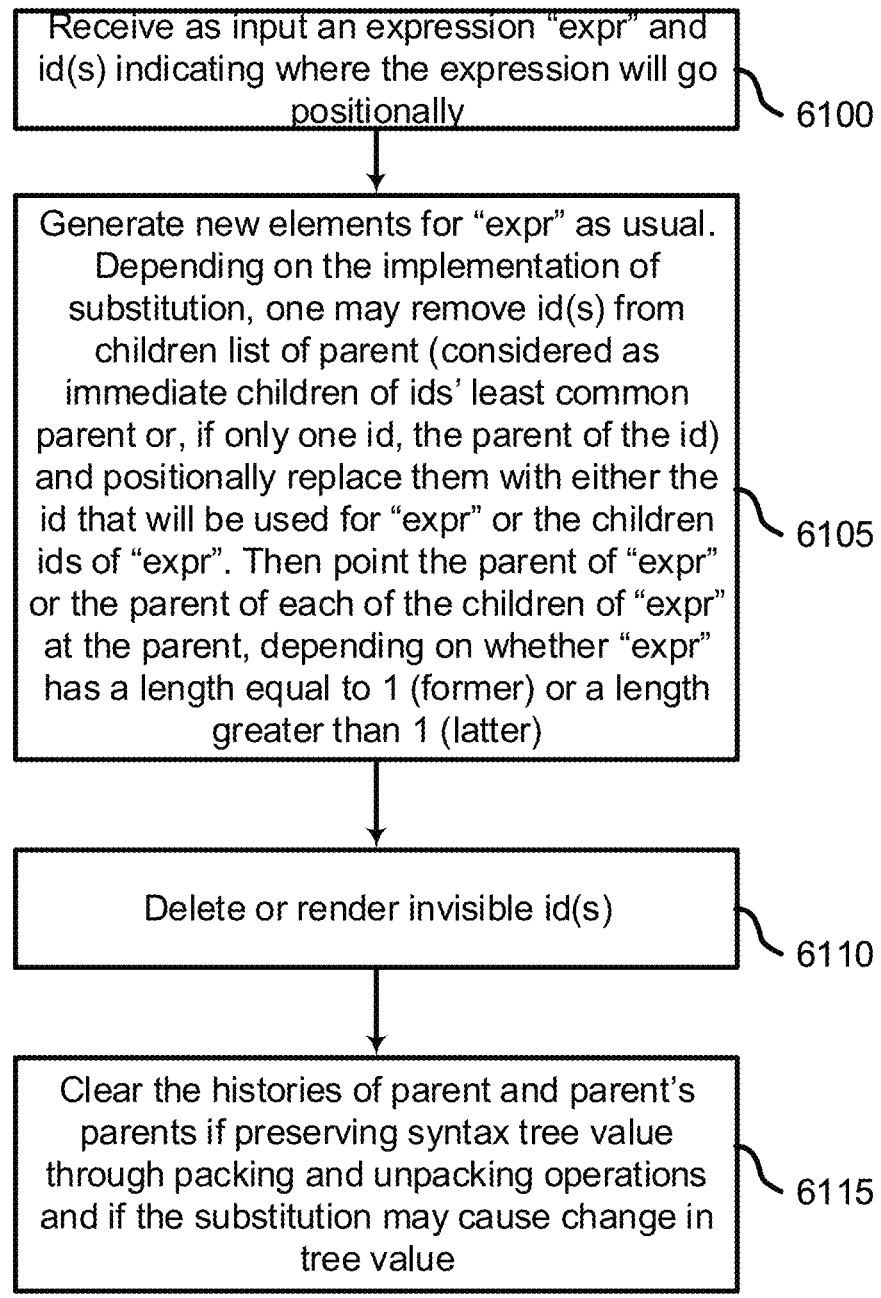
FIG. 61 shows an example of a process for node substitution in accordance with aspects of the present disclosure.

FIG. 61 shows an example of a process for node substitution in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6100, the system may receive as input an expression "expr" and id(s) indicating where the expression will go positionally.

At step 6105, the system may generate new elements for "expr" as usual. Depending on the implementation of substitution, the system may remove id(s) from children list of parent (considered as immediate children of ids' least common parent or, if only one id, the parent of the id) and positionally replace them with either the id that will be used for "expr" or the children ids of "expr". Then the system may point the parent of "expr" or the parent of each of the children of "expr" at the parent, depending on whether "expr" has a length equal to 1 (former) or a length greater than 1 (latter).

At step 6110, the system may delete, or simply render invisible, the id(s) in the visual environment.

At step 6115, the system may clear the histories of parent and parent's parents if preserving syntax tree value through packing and unpacking operations and if the substitution may cause change in tree value.

Figure 62:
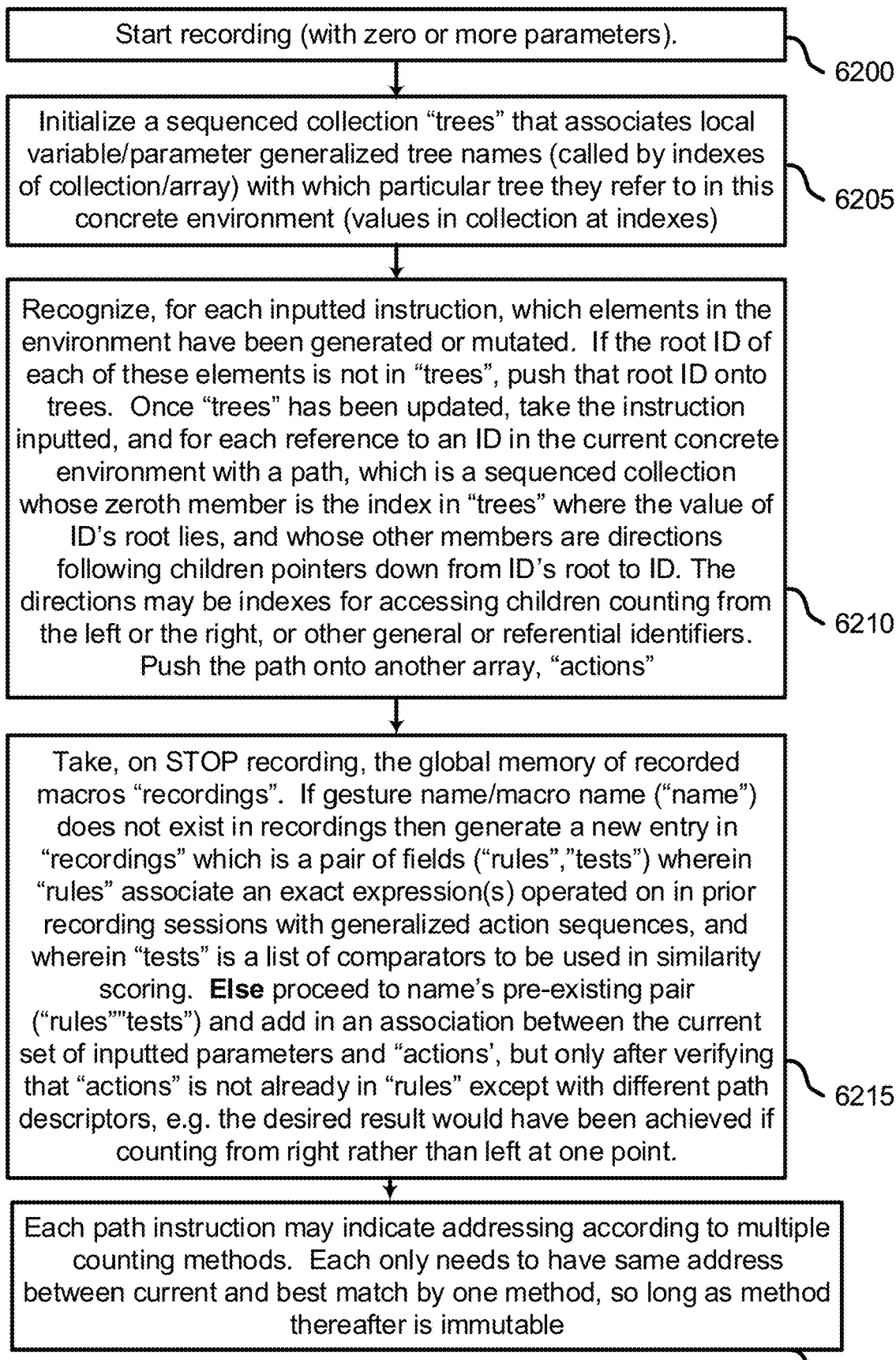
FIG. 62 shows an example of a process for recording a macro in accordance with aspects of the present disclosure.

FIG. 62 shows an example of a process for recording a macro in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6200, the system may start recording (with zero or more parameters).

At step 6205, the system may initialize a sequenced collection "trees" that associates local variable/parameter generalized tree names (called by indexes of collection/array) with which particular tree they refer to in this concrete environment (values in collection at indexes).

At step 6210, the system may recognize, for each inputted instruction, which elements in the environment have been generated or mutated. If the root ID of each of these elements is not in "trees", push that root ID onto trees. Once "trees" has been updated, take the instruction inputted, and for each reference to an ID in the current concrete environment with a path, which is a sequenced collection whose zeroth member is the index in "trees" where the value of ID's root lies, and whose other members are directions following children pointers down from ID's root to ID. The directions may be indexes for accessing children counting from the left or the right, or other general or referential identifiers. Push the path onto another array, "actions".

At step 6215, the system may take, on STOP recording, the global memory of recorded macros "recordings". If gesture name/macro name ("name") does not exist in recordings then generate a new entry in "recordings", which is a pair of fields ("rules", "tests") wherein "rules" associate an exact expression(s) operated on in prior recording sessions with generalized action sequences, and wherein "tests" is a list of comparators to be used in similarity scoring. Else proceed to name's pre-existing pair ("rules", "tests") and add in an association between the current set of inputted parameters and "actions", but only after verifying that "actions" is not already in "rules" except with different path descriptors, e.g. the desired result would have been achieved if counting from right rather than left at one point. At step 6220, each path instruction may indicate addressing according to multiple counting methods. Each only needs to have same address between current and best match by one method, so long as method thereafter is immutable.

Figure 63:
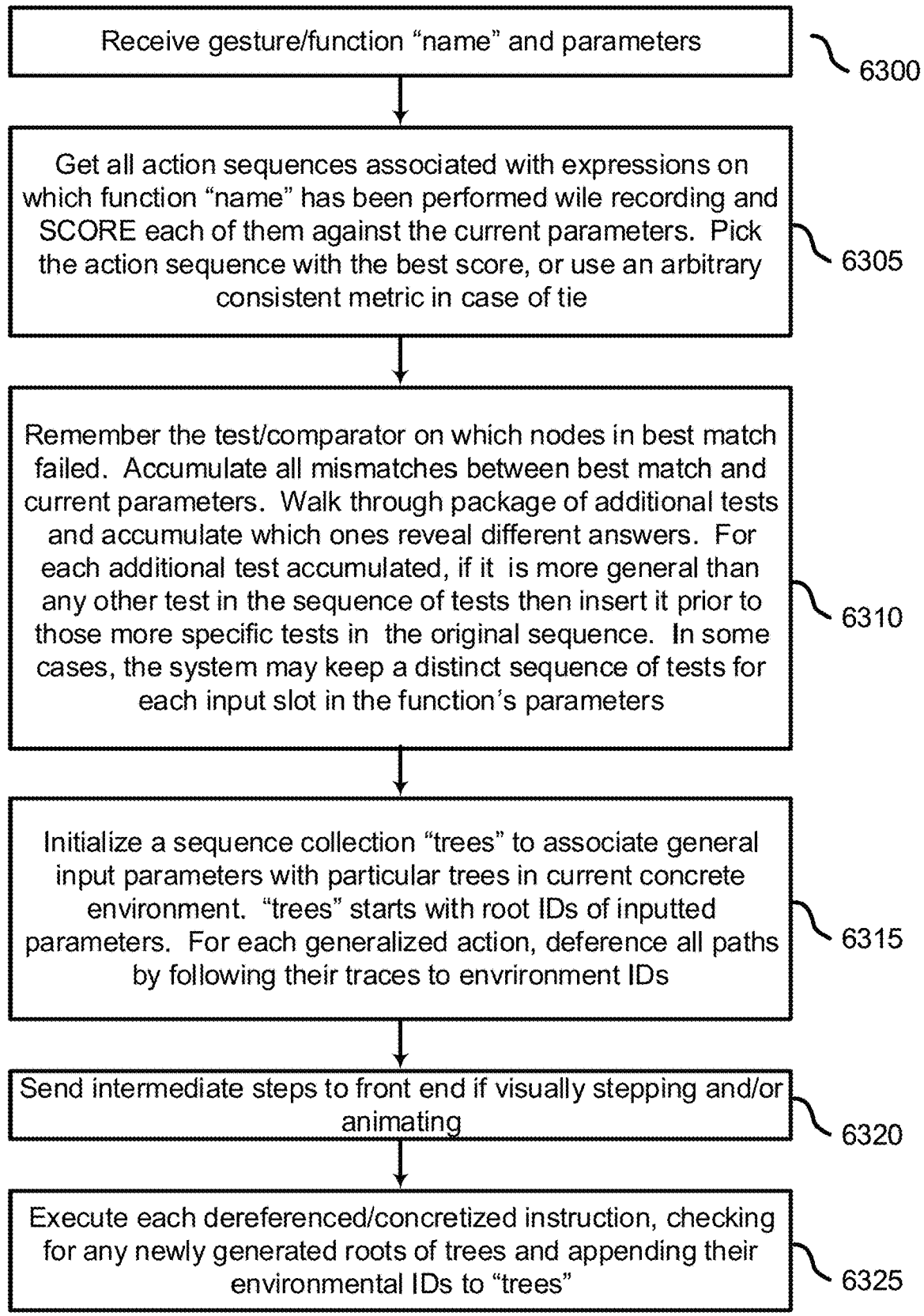
FIG. 63 shows an example of a process for macro application in accordance with aspects of the present disclosure.

FIG. 63 shows an example of a process for macro application in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6300, the system may receive a gesture/function "name" and parameters.

At step 6305, the system may get all action sequences associated with expressions on which function "name" has been performed while recording and score each of them against the current parameters. Pick the action sequence with the best score, or use an arbitrary consistent metric in case of tie.

At step 6310, the system may remember the test/comparator on which nodes in best match failed. Accumulate all mismatches between best match and current parameters. Walk through package of additional tests and accumulate which ones reveal different answers. For each additional test accumulated, if it is more general than any other test in the sequence of tests then insert it prior to those more specific tests in the original sequence. In some cases, the system may keep a distinct sequence of tests for each input slot in the function's parameters.

At step 6315, the system may initialize a sequence collection "trees" to associate general input parameters with particular trees in current concrete environment. "trees" starts with root IDs of inputted parameters. For each generalized action, deference all paths by following their traces to environment IDs.

At step 6320, the system may send intermediate steps to front-end if visually stepping and/or animating.

At step 6325, the system may execute each dereferenced/concretized instruction, checking for any newly generated roots of trees and appending their environmental IDs to "trees".

Figure 64:
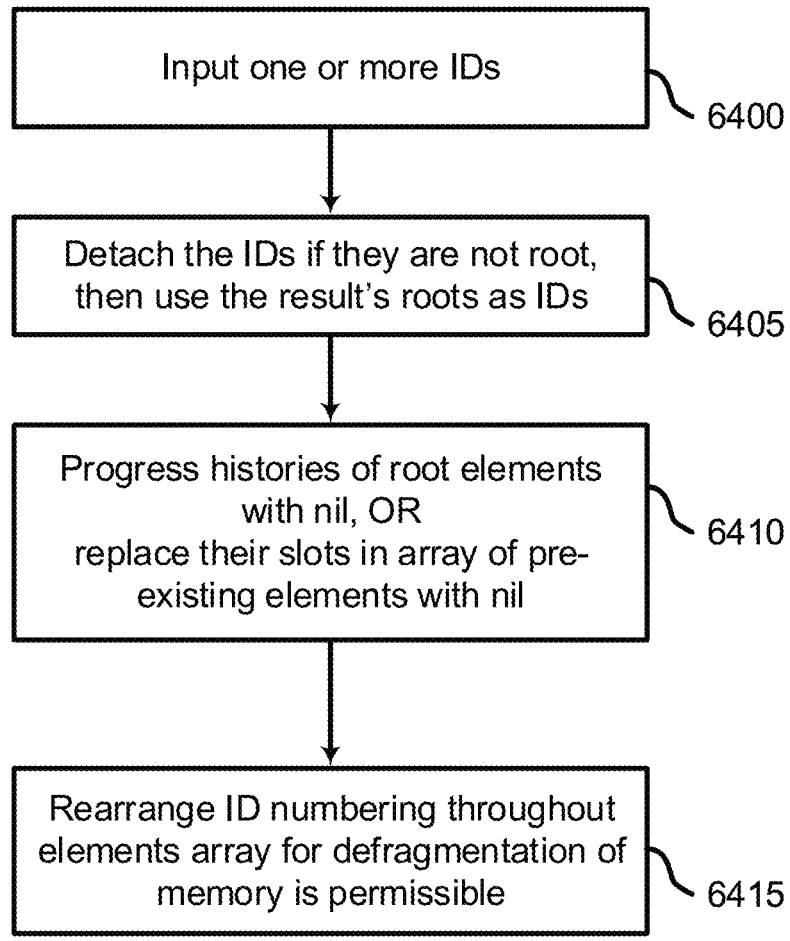
FIG. 64 shows an example of a process for node deletion in accordance with aspects of the present disclosure.

FIG. 64 shows an example of a process for node deletion in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6400, the system may input one or more IDs.

At step 6405, the system may detach the IDs if they are not root, then use the result's roots as IDs.

At step 6410, the system may progress histories of root elements with nil OR replace their slots in array of pre-existing elements with nil.

At step 6420, the system may rearrange ID numbering throughout elements array for defragmentation of memory is permissible.

Figure 65:
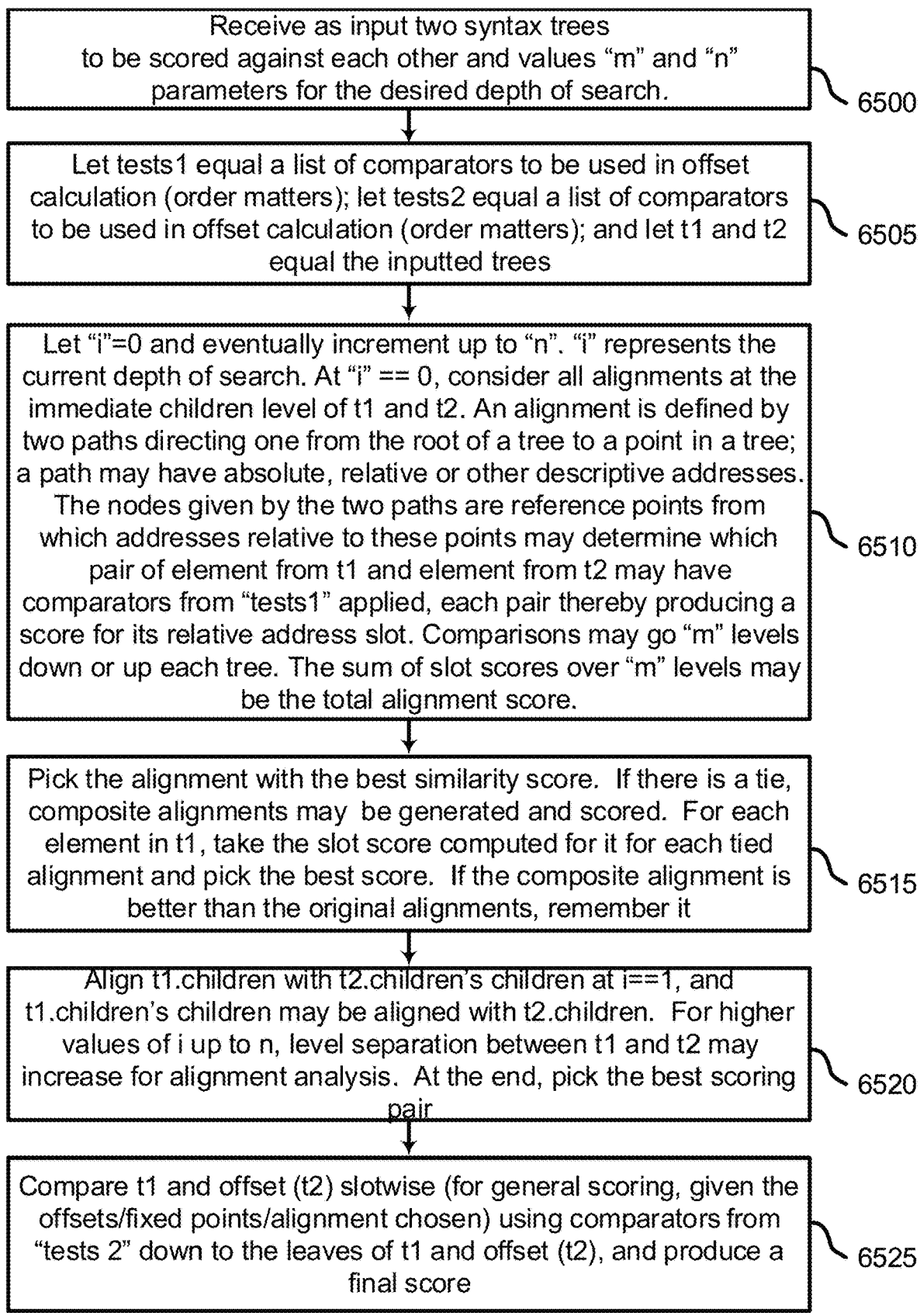
FIG. 65 shows an example of a process for similarity scoring in accordance with aspects of the present disclosure.

FIG. 65 shows an example of a process for similarity scoring in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6500, the system may receive as input two syntax trees to be scored against each other and "m", "n" parameters for the depth allowed for test application and desired depth of search respectively.

At step 6505, the system may let tests1 equal a list of comparators to be used in offset calculation; (order matters); let tests2 equal a list of comparators to be used in offset calculation; (order matters); and let t1 and t2 equal the inputted trees.

At step 6510, the system may let "i"=0 and eventually increment up to "n". "i" represents the current depth of search. At "i"=0, consider all alignments at the immediate children level of t1 and t2. An alignment is defined by two paths directing one from the root of a tree to a point in a tree; a path may have absolute, relative or other descriptive addresses. The nodes given by the two paths are reference points from which addresses relative to these points may determine which pair of element from t1 and element from t2 may have comparators from "tests1" applied, each pair thereby producing a score for its relative address slot. Comparisons may go "m" levels down or up each tree. The sum of slot scores over "m" levels may be the total alignment score.

At step 6515, the system may pick the alignment with the best similarity score. If there is a tie, composite alignments may be generated and scored. For each element in t1, take the slot score computed for it for each tied alignment and pick the best score. If the composite alignment is better than the original alignments, remember it.

At step 6520, the system may align t1.children with t2.children's children at i==1, and t1.children's children may be aligned with t2.children. For higher values of i up to n, level separation between t1 and t2 may increase for alignment analysis. At the end, pick the best scoring pair of two paths.

At step 6525, the system may compare t1 and offset (t2) slotwise (for general scoring, given the offsets/fixed points/alignment chosen) using comparators from "tests2" down to the leaves of t1 and offset (t2), and produce a final score.

Figure 66:
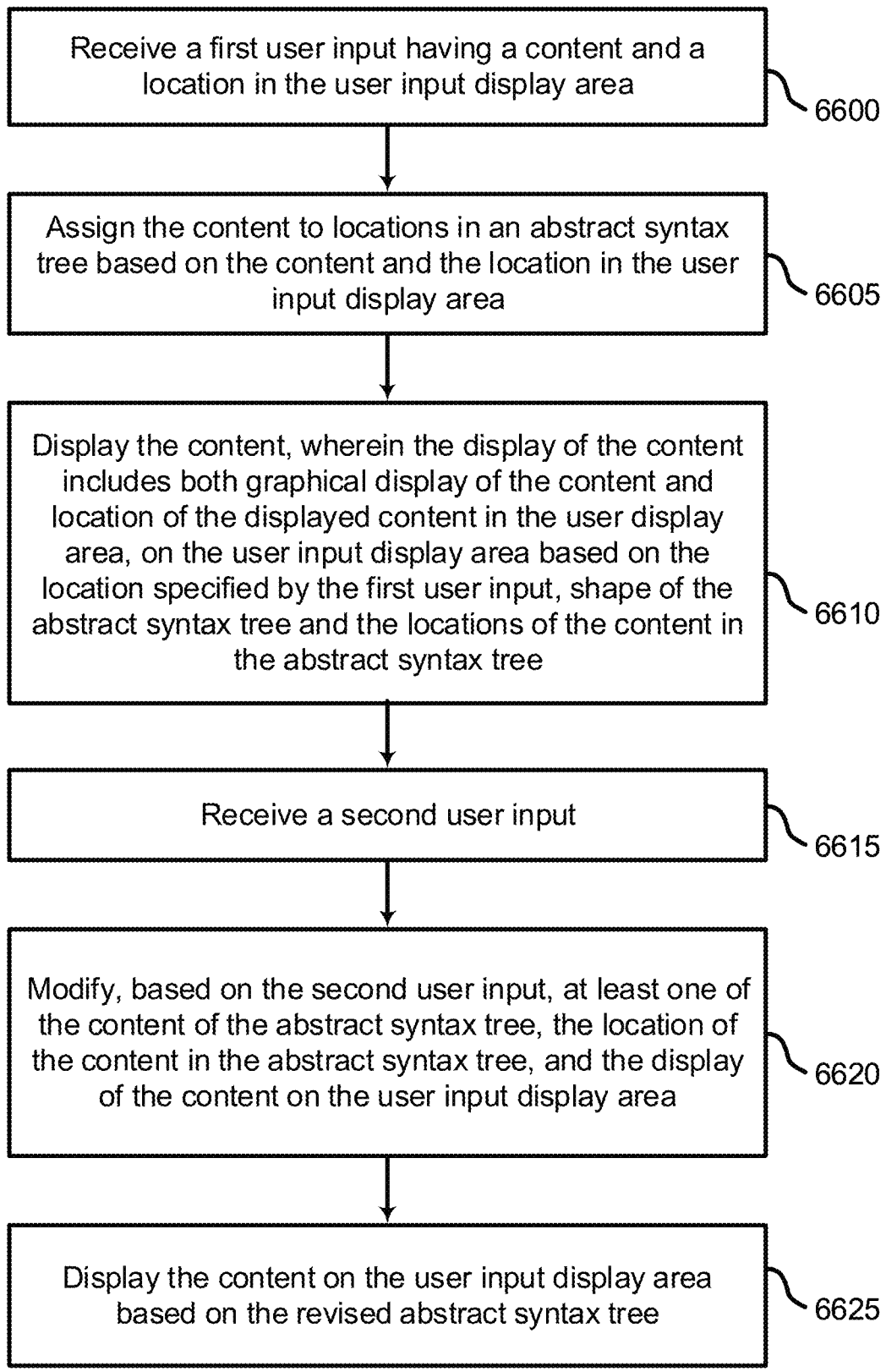
FIG. 66 shows an example of a process for graphically-enabled manipulation of abstract syntax tree structures in accordance with aspects of the present disclosure.

FIG. 66 shows an example of a process for graphically-enabled manipulation of abstract syntax tree structures in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6600, the system may receive a first user input having a content and a location in the user input display area. In some cases, the operations of this step may refer to, or be performed by, an input component as described with reference to FIG. 2.

At step 6605, the system may assign the content to locations in an abstract syntax tree based on the content and the location in the user input display area. In some cases, the operations of this step may refer to, or be performed by, a location component as described with reference to FIG. 2.

At step 6610, the system may display the content, wherein the display of the content includes both graphical display of the content and location of the displayed content in the user display area, on the user input display area based on the location specified by the first user input, shape of the abstract syntax tree and the locations of the content in the abstract syntax tree. In some cases, the operations of this step may refer to, or be performed by, a display component as described with reference to FIG. 2.

At step 6615, the system may receive a second user input. In some cases, the operations of this step may refer to, or be performed by, an input component as described with reference to FIG. 2.

At step 6620, the system may modify, based on the second user input, at least one of the content of the abstract syntax tree, the location of the content in the abstract syntax tree, and the display of the content on the user input display area. In some cases, the operations of this step may refer to, or be performed by, a manipulation component as described with reference to FIG. 2.

At step 6625, the system may display the content on the user input display area based on the revised abstract syntax tree. In some cases, the operations of this step may refer to, or be performed by, a display component as described with reference to FIG. 2.

Figure 67:
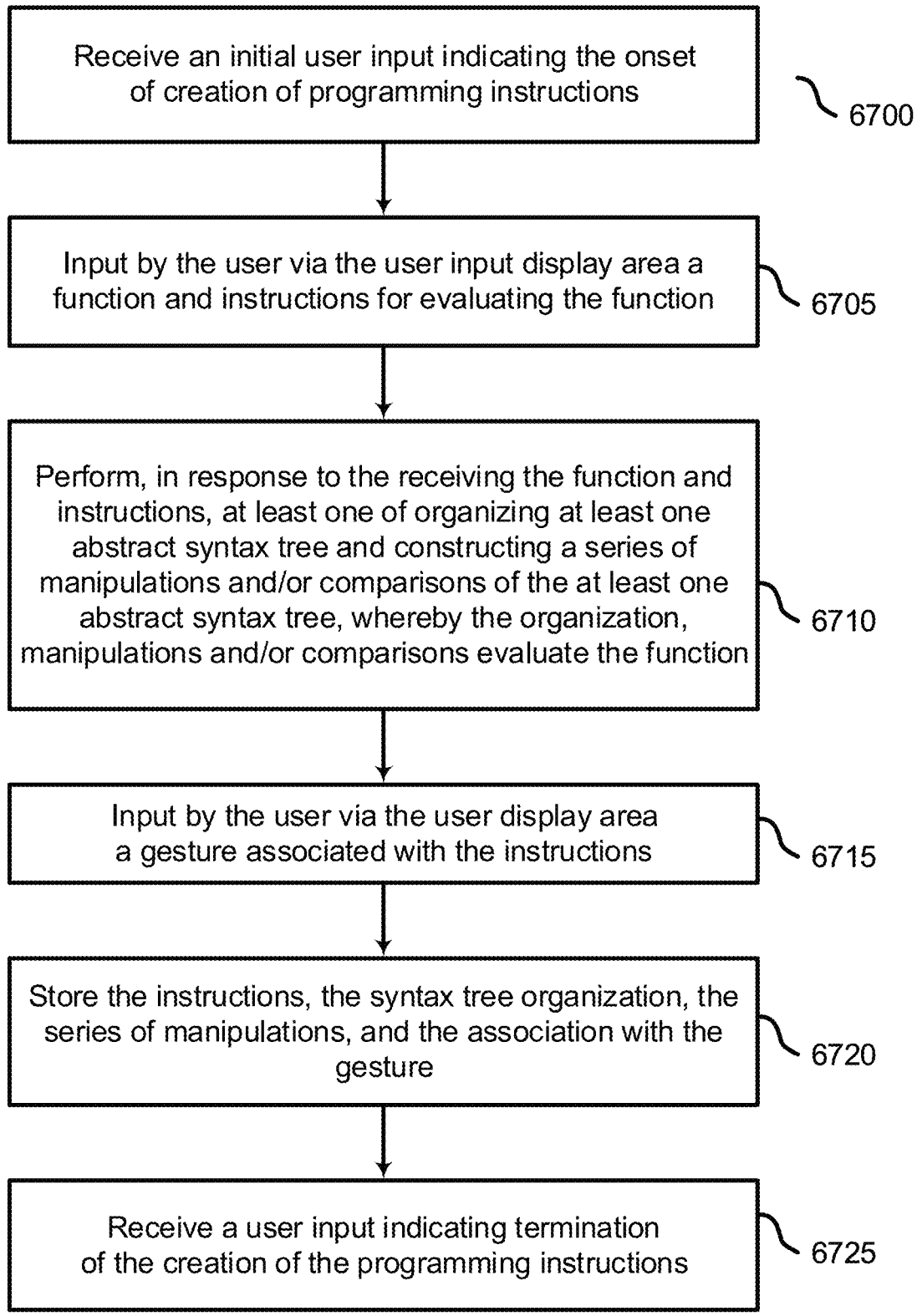
FIG. 67 shows an example of a process for creating a sequence of programming instructions in accordance with aspects of the present disclosure.

FIG. 67 shows an example of a process for creating a sequence of programming instructions in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6700, the system may receive an initial user input indicating onset of creation of programming instructions. In some cases, the operations of this step may refer to, or be performed by, an input component as described with reference to FIG. 2.

At step 6705, the system may input by the user via the user input display area a function and instructions for evaluating the function. In some cases, the operations of this step may refer to, or be performed by, an input component as described with reference to FIG. 2.

At step 6710, the system may perform, in response to the receiving the function and instructions, at least one of organizing at least one abstract syntax tree and constructing a series of manipulations and/or comparisons of the at least one abstract syntax tree, whereby the organization, manipulations and/or comparisons evaluate the function. In some cases, the operations of this step may refer to, or be performed by, a manipulation component as described with reference to FIG. 2.

At step 6715, the system may input by the user via the user display area a gesture associated with the instructions. In some cases, the operations of this step may refer to, or be performed by, an input component as described with reference to FIG. 2.

At step 6720, the system may store of the instructions, the syntax tree organization, the series of manipulations, and the association with the gesture. In some cases, the operations of this step may refer to, or be performed by, a storage component as described with reference to FIG. 2.

At step 6725, the system may receive a user input indicating termination of the creation of the programming instructions. In some cases, the operations of this step may refer to, or be performed by, an input component as described with reference to FIG. 2.

In some embodiments, the process may additionally include inputting by the user of a function to be evaluated, inputting by the user of the gesture, evaluating the function based on the stored programming instructions associated with the gesture, and displaying the result of the evaluation on the display.

In some embodiments, after displaying the result of the evaluation on the display the process may further include receiving a user input indicating dissatisfaction with the evaluation, receiving a second sequence of instructions for evaluating the function, and modifying the stored instructions based on the second set sequence of instructions.

Figure 68:
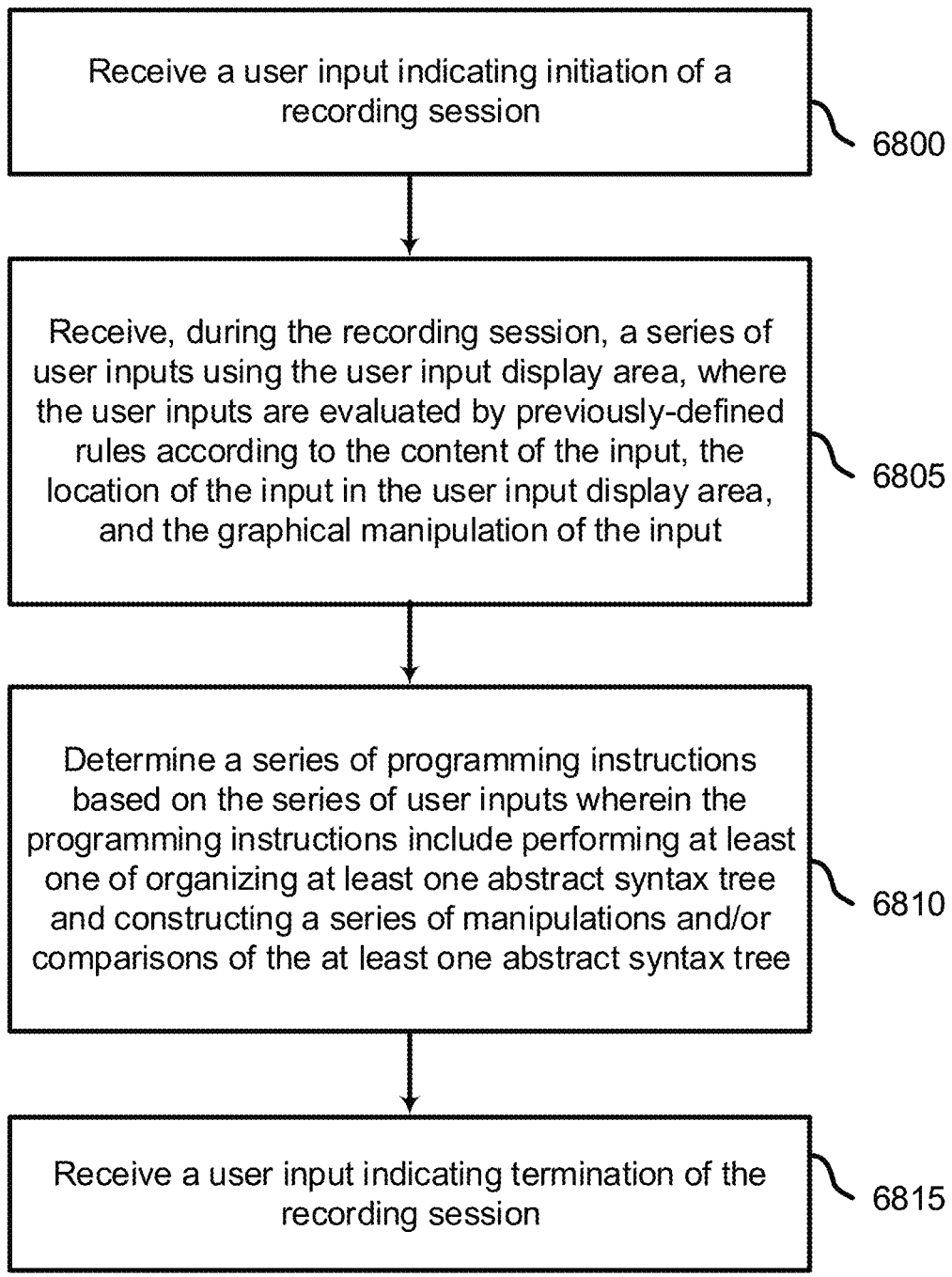
FIG. 68 shows an example of a process for recording a series of evaluation steps and assigning the steps to a specific input in accordance with aspects of the present disclosure.

FIG. 68 shows an example of a process for recording a series of evaluation steps and assigning the steps to a specific input in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6800, the system may receive a user input indicating initiation of a recording session. In some cases, the operations of this step may refer to, or be performed by, an input component as described with reference to FIG. 2.

At step 6805, the system may receive, during the recording session, a series of user inputs using the user input display area, where the user inputs are evaluated by previously-defined rules according to the content of the input, the location of the input in the user input display area, and the graphical manipulation of the input. In some cases, the operations of this step may refer to, or be performed by, an input component as described with reference to FIG. 2.

At step 6810, the system may determine a series of programming instructions based on the series of user inputs wherein the programming instructions include performing at least one of organizing at least one abstract syntax tree and constructing a series of manipulations and/or comparisons of the at least one abstract syntax tree. In some cases, the operations of this step may refer to, or be performed by, a manipulation component as described with reference to FIG. 2.

In some embodiments, the determining of the series of programming instructions may include compiling the instructions into a compound step producing an equivalent result.

At step 6815, the system may receive a user input indicating termination of the recording session. In some cases, the operations of this step may refer to, or be performed by, an input component as described with reference to FIG. 2.

In some embodiments, the process may further include the step of performing one of convert source code for the series of programming instructions to source code for a different programming language and convert source code for a different programming language to source code for the series of programming instructions.

Figure 69:
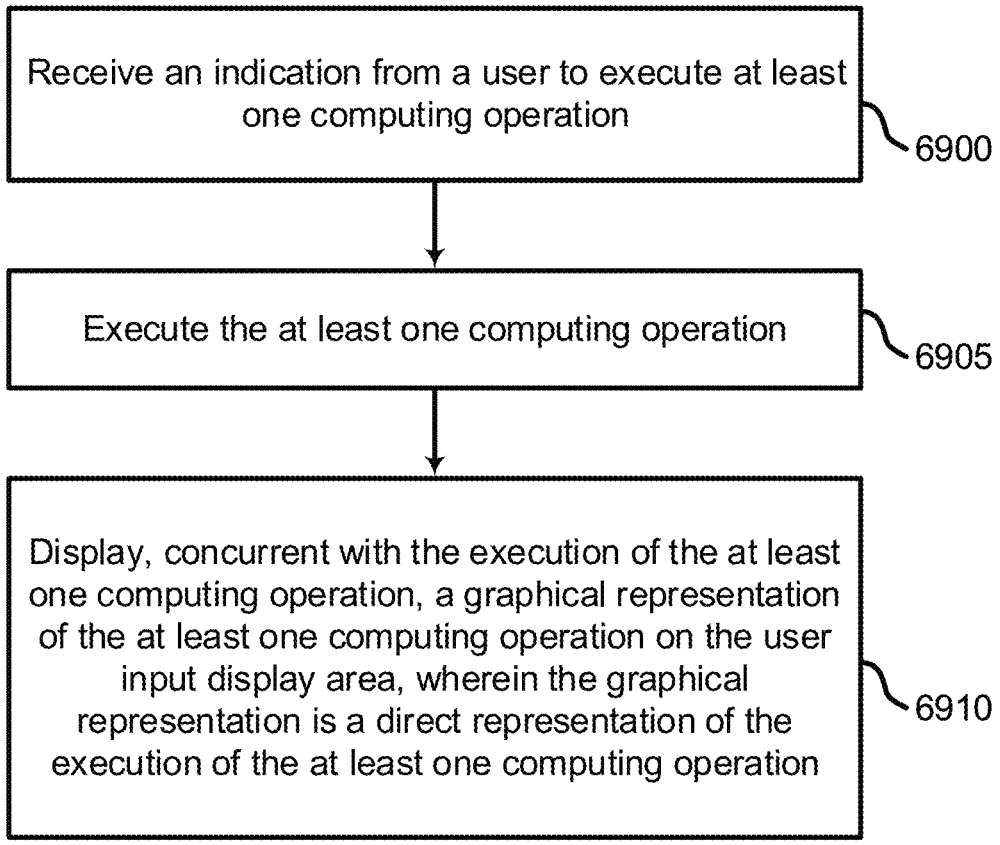
FIG. 69 shows an example of a process for real-time graphical display of computing operations in accordance with aspects of the present disclosure.

FIG. 69 shows an example of a process for real-time graphical display of computing operations in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 6900, the system may receive an indication from a user to execute at least one computing operation. In some cases, the operations of this step may refer to, or be performed by, an input component as described with reference to FIG. 2.

At step 6905, the system may execute the at least one computing operation. In some cases, the operations of this step may refer to, or be performed by, a manipulation component as described with reference to FIG. 2.

At step 6910, the system may display, concurrent with the execution of the at least one computing operation, a graphical representation of the at least one computing operation on the user input display area, wherein the graphical representation is a direct representation of the execution of the at least one computing operation. In some cases, the operations of this step may refer to, or be performed by, a display component as described with reference to FIG. 2. In some embodiments the graphical representation includes at least one moving graphical image.

Figure 70:
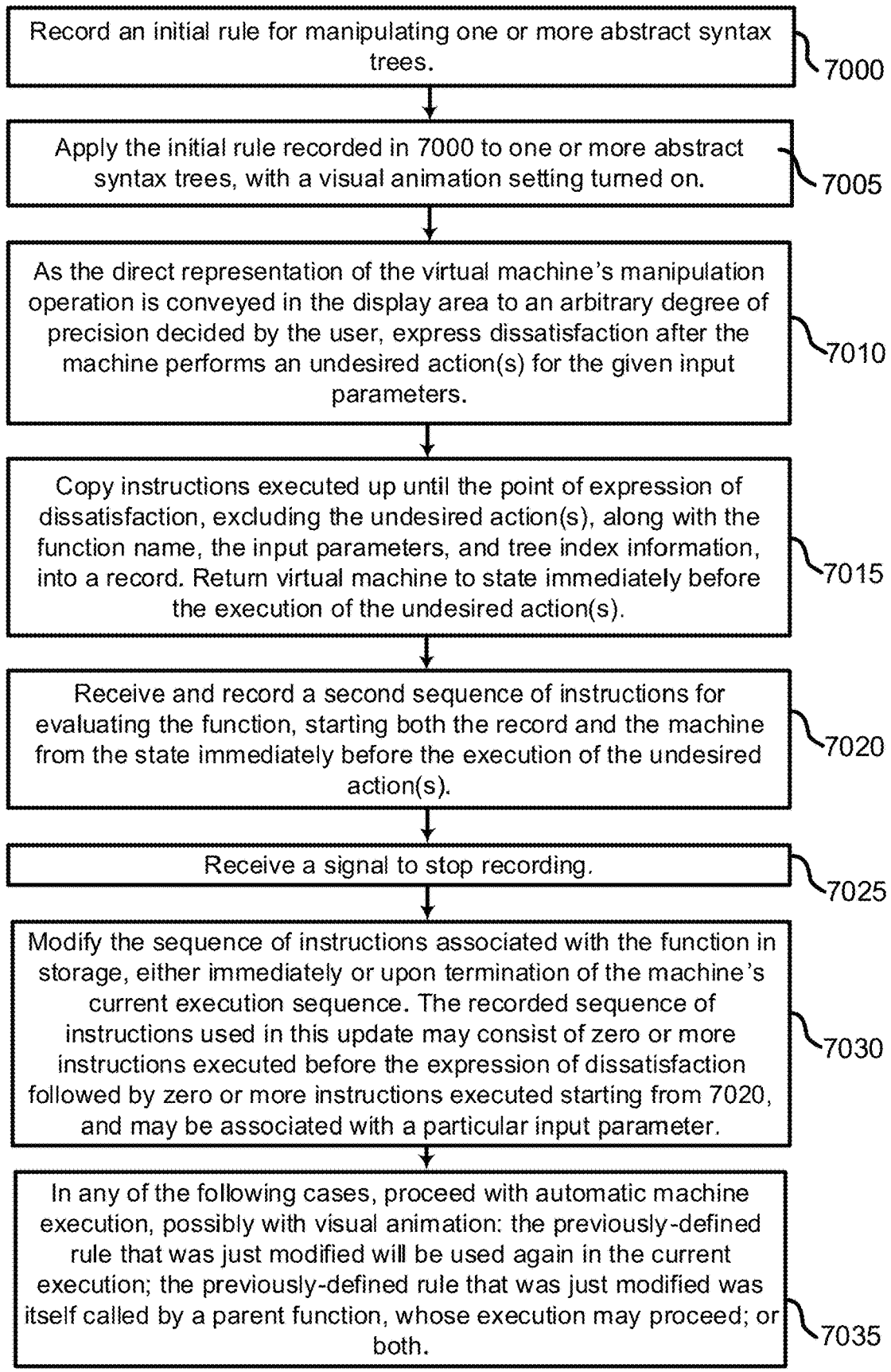
FIG. 70 shows an example of a process for visual repair of machine operation in real time.

FIG. 70 shows an example of a process for visually fixing (repairing) the machine operating in real time on real data. This process may be used if the machine misinterprets the user's intention or otherwise breaks, just as one can fix a physical machine in real time if it abruptly breaks or does something unexpected.

At step 7000, the system may record an initial rule for manipulating one or more abstract syntax trees.

At step 7005, the system may apply the initial rule recorded in step 7000 to one or more abstract syntax trees, with a visual animation setting turned on.

At step 7010, as the direct representation of the virtual machine's manipulation operation is conveyed in the display area to an arbitrary degree of precision decided by the user, the user expresses dissatisfaction after the machine performs an undesired action(s) for the given input parameters.

At step 7015, the system may copy instructions executed up until the point of expression of dissatisfaction, excluding the undesired action(s), along with the function name, the input parameters, and tree index information, into a record. The system may return virtual machine to state immediately before the execution of the undesired action(s).

At step 7020, the system may receive and record a second sequence of instructions for evaluating the function, starting both the record and the machine from the state immediately before the execution of the undesired action(s).

At step 7025, the system may receive a signal to stop recording.

At step 7030, the system may modify the sequence of instructions associated with the function in storage, either immediately or upon termination of the machine's current execution sequence. The recorded sequence of instructions used in this update may consist of zero or more instructions executed before the expression of dissatisfaction followed by zero or more instructions executed starting from step 7020 and may be associated with a particular input parameter.

At step 7035, the system may, in any of the following cases, proceed with automatic machine execution, possibly with visual animation: the previously-defined rule that was just modified will be used again in the current execution; the previously-defined rule that was just modified was itself called by a parent function, whose execution may proceed; or both.

Referring next to FIG. 71, an example of a traditional spreadsheet representation of a cash flow statement along with the abstract tree dependency structure logic determining how it calculates values is shown.

As shown in FIG. 71, an exemplary cash flow statement is input into a spreadsheet program interface. The dependency arrows draw out the tree structure underlying the table's design, with 825 (E15, highlighted in green) as the root of the tree and its children located at the origins of the arrows pointing at 825. In one embodiment, as an alternative, one may instead allow the user to see the general tree structure being constructed as they pack and rearrange initial values, and for the tree structure to be itself editable and manipulable. In one embodiment, a display area may be possibly split into two separate views, one for manipulating and viewing values or data and another for viewing and manipulating code; they are generally two views of the same state, giving the user a clearer display of what is going on. The process for implementing building this text-based abstract tree representation is trivial, since it is just an indented presentation of the state of the machine and the action performed at each step. The process of allowing manipulation of these nested structures is also trivial because its representation in the machine and its representation in the view is identical to any other expression described in the invention, except that unpackable information is listed below the expression rather than not being shown at all.

The table shown below is an example where both the values and the abstract tree are visible to the user. Here, commas simply signify that the displayed elements are not connected. The Notes column indicates what has occurred to bring about this view:

The bolded portion in the table above is the resulting abstract tree that is not only a complete description of the dependency relations between values, unlike the spreadsheet example (because the operators like + and − are given), but is also a function that takes seven parameters and evaluates an answer by following the same instructions and creating the same tree structure, which may be given a gestural name. It is also its own text computer code, callable (for example) as CashBalance( ). In effect, building the original cash flow statement for the lemonade stand would involve manipulating the first month's values like above, and then running the inferred script on February's values and March's values. Then all of the data are encapsulated in a single unpackable tree.

| Values | Abstract Tree (using example indexes) | Notes |
|---|---|---|
| 1000, 10, 0, 0, 40, 20, 50 | 0, 1, 2, 3, 4, 5, 6 | Inputs read in as seven singleton trees. Recording of a function commences, with all seven trees as parameters. |
| 1000, 10 + 0 + 0 + 40 + 20 + 50 | 0, 1 + 2 + 3 + 4 + 5 + 6 | Inputs joined together with '+' |
| 1000, 10 + 110 | 0,<br>a + b<br>1 + 2 + 3<br>4 + 5 + 6 | eval 1 3 and eval 4 6 are performed. The generalized shape of the tree produced is a sum of two numbers, each of which is a sum of three numbers. Here, leaves are given with numbers or operators and non-leaves use alphabetic names like a and b. |
| l000, 10-110 | 0,<br>a − b<br>1 + 2 + 3<br>4 + 5 + 6 | By substitution, the top-level + is changed to a −, since the user wants to build a cash flow data structure involving subtracting total expenses from total income. |
| 1000, −100 | 0,<br>c<br>a − b<br>1 + 2 + 3<br>4 + 5 + 6 | eval a b is performed. The general shape of the tree produced is a single number which is the difference of two numbers, each of which is the sum of three numbers. |
| 1000 + (−100) | 0 + c<br>a − b<br>1 + 2 + 3<br>4 + 5 + 6 | join 0 c is performed. The subtree starting at a − b is substantiates c instead of 0 since 0 is a leaf node. |
| 900 | d<br>0 + c<br>a − b<br>1 + 2 + 3<br>4 + 5 + 6 | eval 0 c is performed. Recording is stopped. |
| 900 | Cash Balance<br>Prev. Balance + Cash Flow<br>Income − Expenses<br>Lemonade + Tea + AP<br>Cups + Ingred. + Labor | The user is at liberty to name and rename elements in the abstract syntax tree. |
| 900<br>1000 + (−100)<br>10~110<br>10 + 0 + 0<br>40 + 20 + 50 | Cash Balance<br>Prev. Balance + Cash Flow<br>Income − Expenses<br>Lemonade + Tea + AP<br>Cups + Ingred. + Labor | The user may optionally unpack their computation and view the resulting tree's contents to an arbitrary degree of precision, using packing and unpacking operations. |

The ability of the system to convert value-dependency structures in spreadsheets (such as shown in FIG. 71) into abstract syntax trees manipulable using methods previously disclosed in this application, and vice versa, is also contemplated.

Next, the user may make queries and write scripts by manipulating the bolded abstract syntax tree; the locations of the relevant data are clear because the tree is a repeatedly nested structure, and the names in the abstract representation provide absolute or relative addresses for where to find values in each iteration. For example, to construct a formula to sum all income from Tea and Arnold Palmer during winter months, Tea+AP could be detached from the tree, the data received in a structure (list, matrix, tensor, etc.), January and February's values packed together, the result detached, and the result returned. This formula is itself a function, being text-scriptable and gesture-nameable like above.

Next, the user may make queries and write scripts by manipulating the bolded abstract syntax tree; the locations of the relevant data are clear because the tree is a repeatedly nested structure, and the names in the abstract representation provide absolute or relative addresses for where to find values in each iteration. For example, if one wanted a formula to sum all income from Tea and Arnold Palmer during winter months, one could detach Tea+AP from the tree, receive my data in a structure (list, matrix, tensor, etc.), pack together January and February's values, detach the result, and return the result. This formula is itself a function, being text-scriptable and gesture-nameable like above.

FIG. 72 shows an example of an abstract tree representation of a profit/loss statement.

Figure 73:
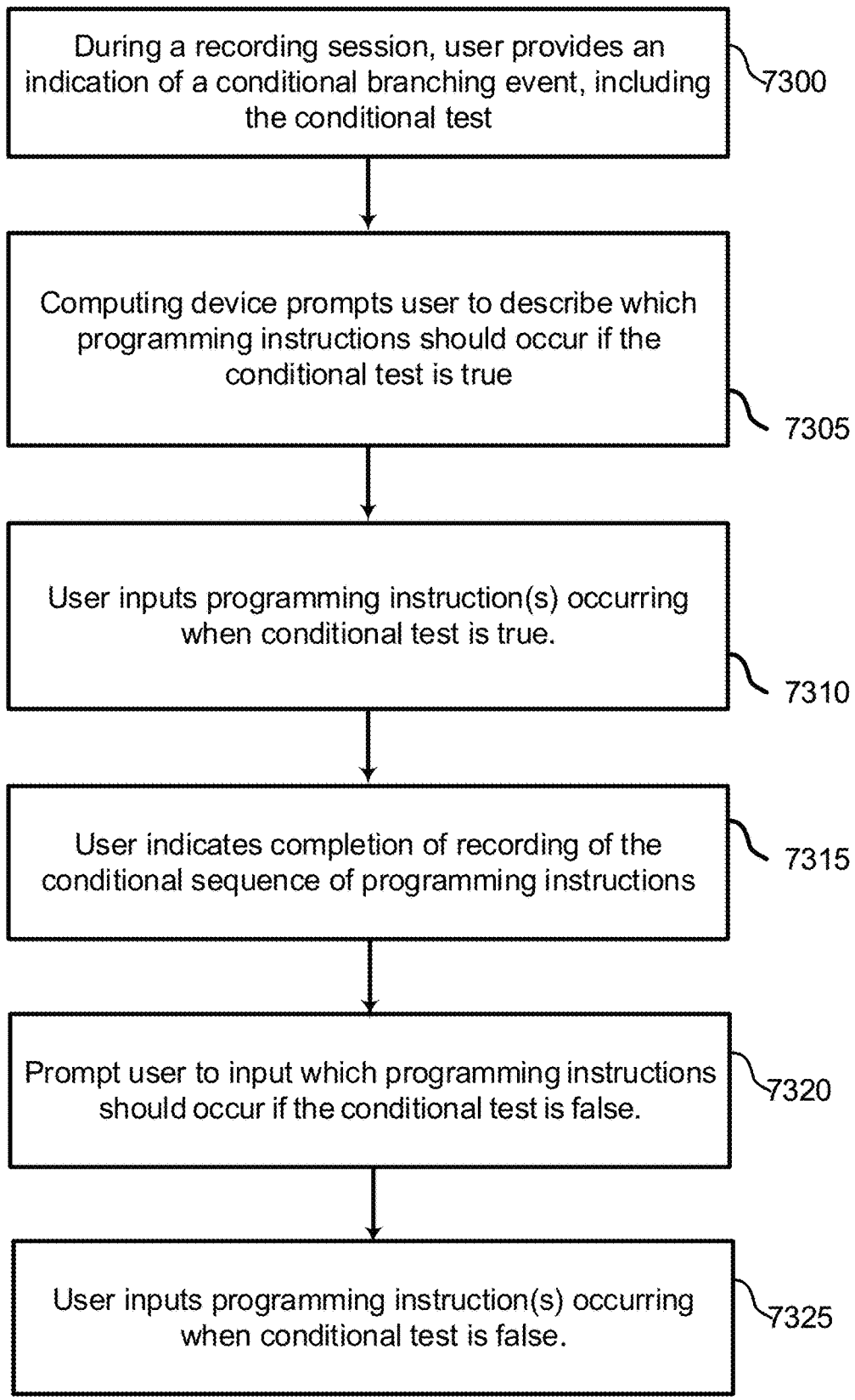
FIG. 73 shows an example of a process for conditional branching in accordance with aspects of the present disclosure.

FIG. 73 shows an example of a process for conditional branching in accordance with aspects of the present disclosure.

In a first step 7300, during a recording session, user provides an indication of a conditional branching event. The indication of the conditional branching event includes indicating the conditional test for the conditional branching event.

In the next step 7305, in response to the indication the system may prompt the user to describe which programming instructions should occur if the conditional test is true.

In the next step 7310, in response to the prompt, the user may input at least one programming instruction to occur when conditional test is true.

In the next step 7315, the user may indicate completion of recording of the conditional sequence of programming instructions.

In the next step 7320, in response to the user indicating completion, the system may prompt the user to input which programming instructions should occur if the conditional test is false.

In the next step 7325, in response to the prompt, the user inputs at least one programming instruction occurring when conditional test is false.

Figure 74:
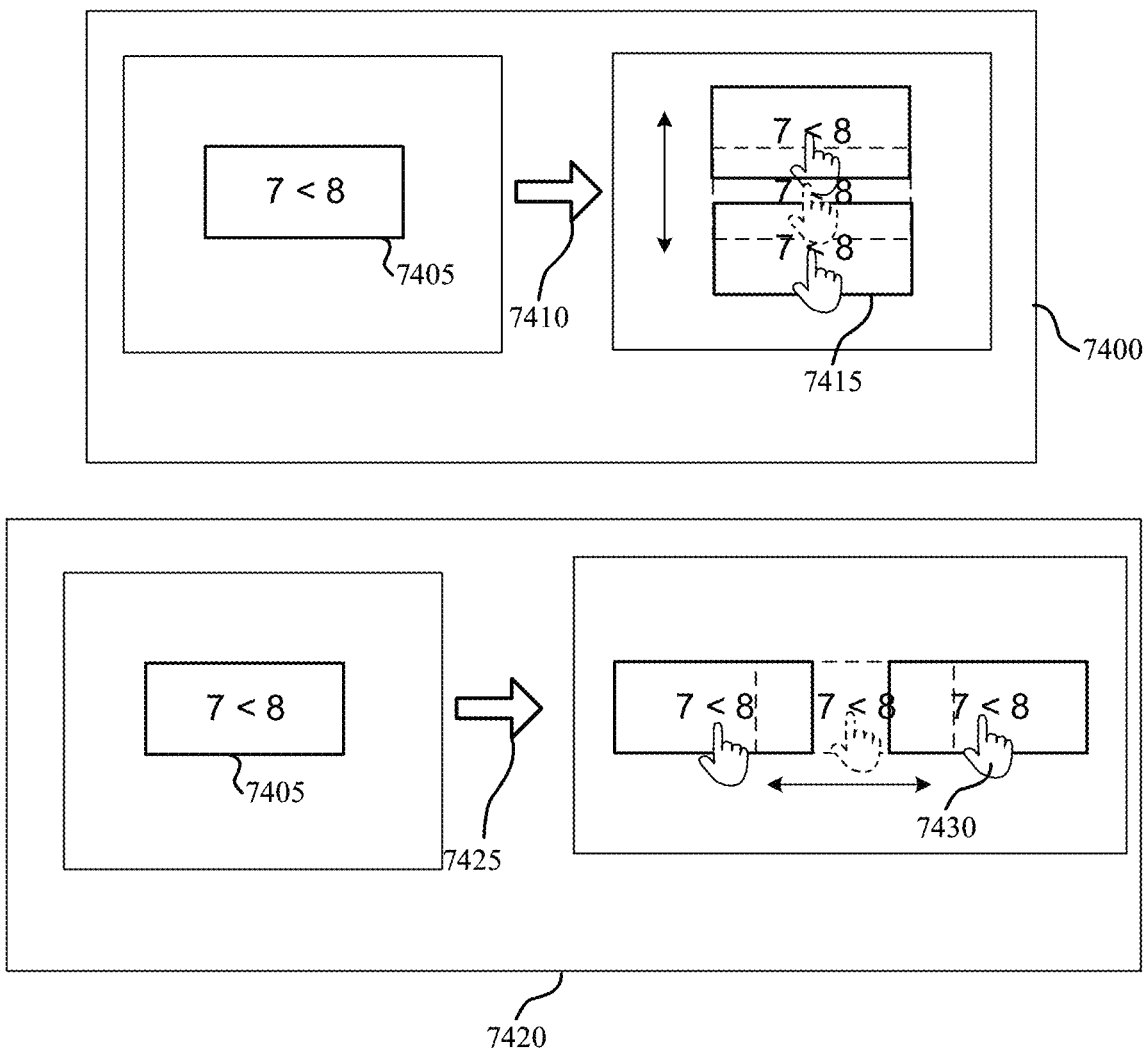
FIG. 74 shows an example of inputs that may be used for conditional branching.

FIG. 74 shows an example of inputs that may be used for conditional branching.

An exemplary first conditional branching input 7400 is shown. A conditional test 7405 is shown at a first location. A first input step 7410 comprises the vertical shaking input 7415. The vertical shaking input 7415 comprises the user selecting the conditional test 7405 and repeatedly dragging the conditional test 7405 up and down relative to the first location (where the first location is indicated by dashed lines). This results in a "shaking" or "wiggling" movement of the conditional test 7405. The system interprets the vertical shaking as an instruction to apply conditional branching to the conditional test 7405.

An exemplary second conditional branching input 7420 is shown. The conditional test 7405 is again shown at the first location. A second input step 7425 comprises the horizontal shaking input 7430. The horizontal shaking input 7415 comprises the user selecting the conditional test 7405 and repeatedly dragging the conditional test 7405 side-to-side relative to the first location (where the first location is indicated by the dashed lines). This produces a "shaking" of "wiggling" movement similar to that for the first conditional branching input 7400, with the difference that the conditional test 7405 is shaken horizontally instead of vertically.

In certain embodiments, when using a shaking gesture or other user input on an expression to signify conditional branching based on a test, a distinction may be recognized between vertical shaking/wiggling and horizontal shaking/wiggling to allow visual or conceptual distinction between entering an affirmative ("true") branch and entering a negative ("false") branch in the construction or execution of sequences of instructions. In other words, horizontal shaking may indicate to the system that the following recorded instructions are to be applied to the conditional test=false case, and vertical shaking may indicate to the system that the following recorded instructions are to be applied to the conditional test=true case.

It will be understood that other suitable inputs or gestures may be used to indicate the conditional branching actions in lieu of the exemplary gestures of FIG. 74.

Figure 75:
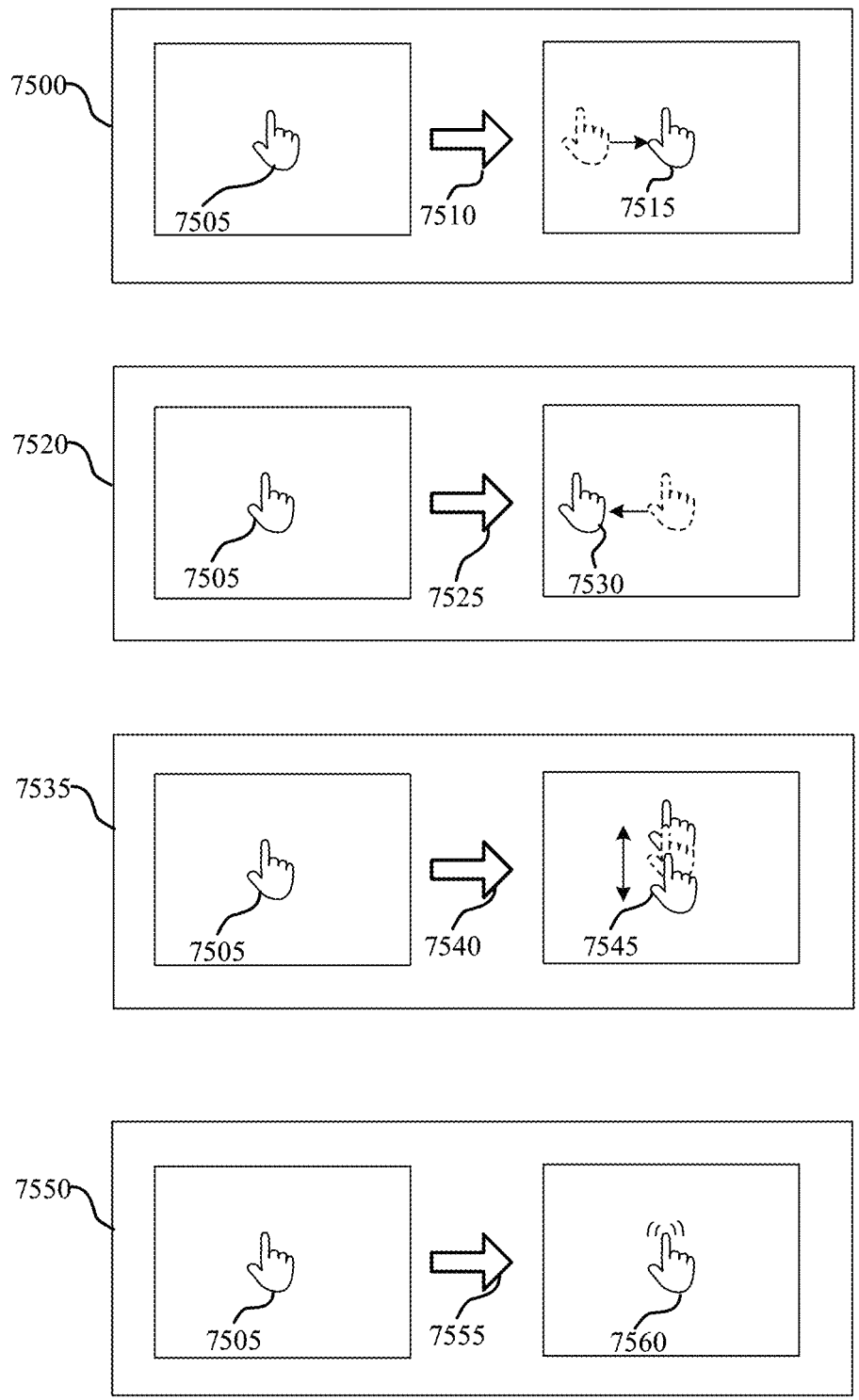
FIG. 75 shows further examples of user gestures or inputs that may be associated with computing instructions.

FIG. 75 shows further examples of user gestures or inputs that may be associated with computing instructions.

In certain embodiments, indications of dissatisfaction, as well as those signifying global undos or redos, may be expressed through gestures or user inputs.

In certain embodiments, further examples of direct gestures or user inputs that may be associated with computing instructions may include performing a gesture or user input that resembles shaking, wiggling, or scribbling; or performing one or more dragging or swiping motions in particular directions, in the negative space of the display area. In these embodiments, negative space may refer to any space in the display area not presently occupied by an expression.

An exemplary global redo gesture 7500 may first comprise a user touch 7505 at a first location in negative space. At redo input step 7510, the user performs a redo input 7515 comprising dragging or swiping to negative space on the right one or more times, thereby indicating to the system a global redo instruction.

An exemplary global undo gesture 7520 may first comprise the user touch 7505 at the first location in negative space. At undo input step 7525, the user performs an undo input 7530 comprising dragging or swiping to negative space on the left one or more times, thereby indicating to the system a global undo instruction.

An exemplary dissatisfaction gesture 7535 may first comprise the user touch 7505 at the first location in negative space. At dissatisfaction input step 7540, the user performs a dissatisfaction swiping input 7545 comprising dragging or swiping generally up-and-down to negative space above and below the first location one or more times, thereby indicating to the system a dissatisfaction input. In some embodiments in lieu of a generally up-and-down movement, the dissatisfaction input 7545 may be shaking, wiggling or scribbling inputs in the negative space.

An exemplary toggle/options gesture 7550 may first comprise the user touch 7505 at the first location in negative space. At toggle/options input step 7555, the user performs a toggle/options input 7560 comprising tapping at or substantially near the first location one or more times, thereby indicating to the system an instruction to toggle an individual setting or open an options menu or a settings menu. In one embodiment, the toggled setting may be whether to animate each individual instruction or not.

Referring again to FIGS. 74-75, in another embodiment of the invention, during playback of previously-recorded or previously-defined sequences of programming instructions, such as described with respect to FIGS. 74-75, and/or debugging, the machine may perform not just merely "corresponding visual changes to the environment" but also more specifically show the user a visual expression of the programming instruction identical or near-identical to the visual result of the gesture or user input used when recording that programming instruction.

For example, with respect to FIG. 74, during playback of a recording that includes vertical shaking input 7415, during playback (execution of the previously-defined/previously-recorded sequence) a similar or the same motion may be displayed by the system during playback/execution of the programming instructions to graphically indicate to the user that a conditional branching event is taking place by repeating the graphical input that the user used to record the instructions. For example, the system may display the vertical shaking input 7415 if entering an affirmative branch of a conditional or horizontal shaking input 7430 if entering a negative branch of a conditional.

In another example, if dragging one element next to another is how the user signifies a "joining" operation (for example as previously disclosed with respect to FIG. 25), then the visual virtual machine system may, on playback/debugging/executing a previously-defined sequence, display a similar indication that joining is taking place by moving one element next to another.

In another example, if evaluating an expression is signified by dragging its constituent elements together into a single location, e.g. its center, the visual machine system may show on playback that an expression is being evaluated by showing the user in the visual environment/display area the expression's elements moving/collapsing into a single center location.

Figure 76:
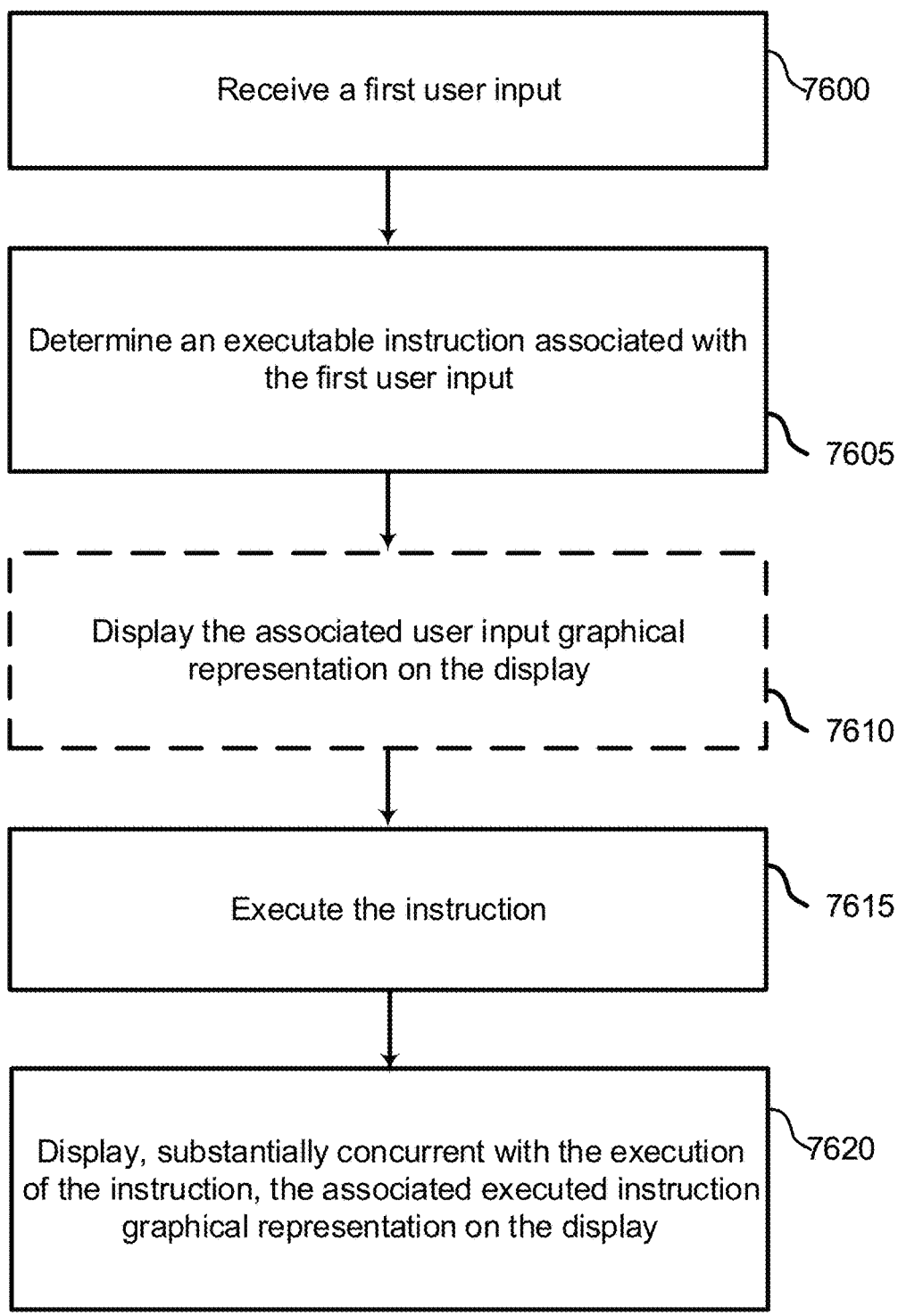
FIG. 76 shows an example of a process for real-time interactive graphical computing in accordance with aspects of the present disclosure.

FIG. 76 shows an example of a process for real-time interactive graphical computing in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

In some embodiments, the processes are performed by a system including a user computing device, a display coupled to the user computing device, a graphical user interface displayed on the display, and a virtual machine configured for network communication with the user computing device and including an instruction set architecture, wherein the instruction set architecture is configured to retain associations between each of a plurality of executable instructions and at least one of a user input, a user input graphical representation, and a executed instruction graphical representation. In some cases, the system may be as described with reference to FIG. 2.

At step 7600, the application may receive a first user input to execute at least one instruction. In some cases, the operations of this step may refer to, or be performed by, an application as described with reference to FIG. 2.

At step 7605, the system may determine an executable instruction associated with the first user input. In some cases, the operations of this step may refer to, or be performed by, a storage component as described with reference to FIG. 2.

At optional step 7610, the system may display the associated user input graphical representation on the display. In some cases, the operations of this step may refer to, or be performed by, a graphical user interface as described with reference to FIG. 2.

At step 7615, the system may execute the instruction. In some cases, the operations of this step may refer to, or be performed by, a manipulation component and/or an evaluation component as described with reference to FIG. 2.

At step 7620, the system may display, substantially concurrent (or concurrent) with the execution of the instruction, the associated executed instruction graphical representation for the executable instruction on the user input display area. In some cases, the operations of this step may refer to, or be performed by, a graphical user interface as described with reference to FIG. 2.

It will be understood by those of ordinary skill in the art that, in view of the previously disclosed embodiments, that although the steps of the proceed of FIG. 76 are presented sequentially, steps may still occur substantially concurrently. For example, the user input graphical representation may be displayed so as to appear substantially simultaneously with the occurrence of the user gesture/user input that the user input graphical representation appears in response to. In practice, generally the receiving of the user input and the display of the user input graphical representation will occur simultaneously or substantially simultaneously.

Referring again to FIG. 76, one of the novel aspects of the invention is the association of one or more graphical representations with a performed instruction. Many examples of graphical representations and associated instructions have been previously described, for example the graphical representations of the join functions of FIG. 25. The graphical representation of the join function includes first command sequence 2500, where in the example of FIG. 25 the graphical representation comprises moving the "+" element towards the right side of the "1" element and then displaying the two elements as they would be shown in a written equation: "1+".

The advantage of this association of the graphical representation with the function or instruction is that the user is provided with a consistent, intuitive interface. The user understands that, for example, the graphical representation of two elements moving towards each other and then displayed in close relationship indicates the underlying function of the elements being placed in the corresponding nodes of the abstract syntax tree. This graphical representation may be performed by the system for the user without direct user input, such as in a "playback" mode, so that the underlying functions and instructions carried out by the system are visually observable to the user through the executed instruction graphical representation, or may be as a result of direct input by the user via a user interface where the user provides a specific input that is interpreted by the system as an instruction or operation to be executed, while at the same time the system also displays graphically the user input graphical representation such that the user can see a visual expression of the instruction being performed.

In some embodiments this association may be implemented by the virtual machine including, for each instruction that may be executed, an association with a user input and an executed instruction graphical representation, and optionally (but typically) a user input graphical representation. Thus, upon receiving the user input corresponding to an instruction, the virtual machine can determine the instruction called by the user input and execute the instruction. The virtual machine also determines the corresponding executed instruction graphical representation, which is displayed on the display to show to the user a) that the instruction is being executed and b) what instruction is being executed.

In some embodiments the executed instruction graphical representation represents both the executed instruction and the user input. For example, for the "join" command of FIG. 25 the moving of the elements corresponds directly to the input that the user is providing. In some embodiments, the executed instruction graphical representation may be based on the user input.

In some embodiments, the executed instruction graphical representation is the same as or is similar to the associated user input graphical representation.

In some embodiments, the executable instruction includes multiple operations, e.g. is a macro or other multi-step function.

In some embodiments, the graphical representation may include at least one moving image.

In some embodiments, the associated user input for at least one executable instruction includes a user gesture. In some embodiments, one or more of the associated executed instruction graphical representation and the associated user input graphical representation includes a representation of the user gesture. In some embodiments, the representation of the user gesture includes a graphical image moving in an analogous manner to the user gesture.

It will be understood by those of ordinary skill in the art that this general concept may be applied to any Turing-complete programming language.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A system for real-time interactive graphical computing comprising:
    a user computing device;
    a display coupled to the user computing device; a graphical user interface displayed on the display;
    a virtual machine configured for network communication with the user computing device and including an instruction set architecture, wherein the instruction set architecture is configured to retain an association between each of a plurality of executable instructions for manipulation of an abstract syntax tree and at least an executed instruction graphical representation and a user input; and
    an application configured to run on the virtual machine and communicate with the graphical user interface and configured to:
        display a plurality of nodes of the abstract syntax tree on the display, wherein each node is displayed as an image on the display, and wherein abstract syntax tree relationships between the plurality of nodes are displayed using syntactic notation;
        receive a user input;
        determine executable instructions associated with the user input and at least two displayed nodes of the abstract syntax tree;
        execute the executable instructions on the abstract syntax tree, wherein at least one of the executable instructions modifies at least one of the nodes according to an operation stored in another one of the nodes, thereby manipulating the abstract syntax tree; and
        display, concurrent with the execution of the executable instructions, the executed instruction graphical representations for the executable instructions on the display as applied to the displayed nodes of the abstract syntax tree, wherein the executed instruction graphical representation includes a visual expression using syntactic notation of the modification of the at least one of the nodes of the abstract syntax tree.

2. The system for real-time interactive graphical computing of claim 1, wherein each executable instruction is further associated with a user input graphical representation, and wherein the application is further configured to display the associated user input graphical representation on the display as applied to the associated nodes of the abstract syntax tree prior to the display of the executed instruction graphical representations for the executable instructions.

3. The system for real-time interactive graphical computing of claim 2, wherein the associated user input graphical representation is similar to the associated executed instruction graphical representation.

4. The system for real-time interactive graphical computing of claim 1, wherein at least one of the executable instructions comprises a plurality of operations.

5. The system for real-time interactive graphical computing of claim 1, wherein the graphical user interface comprises a user input display area and includes a user input display area configured to receive user input.

6. The system for real-time interactive graphical computing of claim 1, wherein the executed instruction graphical representations includes at least one moving graphical image.

7. The system for real-time interactive graphical computing of claim 1, wherein for at least one executable instruction the associated user input includes a user gesture.

8. The system for real-time interactive graphical computing of claim 7, wherein for at least one of the at least one executable instruction, the executed instruction graphical representation includes a representation of the user gesture.

9. The system for real-time interactive graphical computing of claim 8, wherein the representation of the user gesture includes at least one displayed node of the abstract syntax tree moving in an analogous manner to the user gesture.

10. The system for real-time interactive graphical computing of claim 7, wherein the user gesture is input using at least one visual input system selected from the group of a touchscreen, a mouse, a keyboard, a brain-computer interface, an interactive whiteboard, and a virtual-reality input.

11. The system for real-time interactive graphical computing of claim 1, wherein the application is further configured to compile a plurality of the plurality of executable instructions into a compound executable instruction wherein executing the compound executable instruction results in the same results as executing the plurality of the plurality of executable instructions.

12. The system for real-time interactive graphical computing of claim 1, the application further configured to perform at least one of convert commands from a programming language into executable instructions compatible with the system and convert executable instructions of the system into the programming language.

13. A method for real-time interactive graphical computing by a system comprising a user computing device, a display coupled to the user computing device, a graphical user interface displayed on the display, a virtual machine configured for network communication with the user computing device and including an instruction set architecture, wherein the instruction set architecture is configured to retain an association between each of a plurality of executable instructions for manipulation of an abstract syntax tree and at least an executed instruction graphical representation and a user input, and an application configured to run on the virtual machine and communicate with the graphical user interface, comprising the steps of:

displaying a plurality of nodes of the abstract syntax tree on the display, wherein each node is displayed as an image on the display, and wherein abstract syntax tree relationships between the plurality of nodes are displayed using syntactic notation;

receiving a user input;

determining executable instructions associated with the user input and at least two displayed nodes of the abstract syntax tree;

executing the executable instructions on the abstract syntax tree, wherein at least one of the executable instructions modifies at least one of the nodes according to an operation stored in another one of the nodes, thereby manipulating the abstract syntax tree; and displaying, concurrent with the execution of the executable instructions, the executed instruction graphical representations for the associated executable instructions on the display as applied to the displayed nodes of the abstract syntax tree, wherein the executed instruction graphical representation includes a visual expression using syntactic notation of the modification of the at least one of the nodes of the abstract syntax tree.

14. The method for real-time interactive graphical computing of claim 13, wherein each executable instruction is further associated with a user input graphical representation, and further comprising the step of displaying the associated user input graphical representation on the display as applied to the associated nodes of the abstract syntax tree prior to the display of the executed instruction graphical representations for the executable instructions.

15. The method for real-time interactive graphical computing of claim 14, wherein the associated user input graphical representation is similar to the associated executed instruction graphical representation.

16. The method for real-time interactive graphical computing of claim 13, wherein at least one of the executable instructions comprises a plurality of operations.

17. The method for real-time interactive graphical computing of claim 13, wherein the graphical user interface comprises a user input display area and includes a user input display area configured to receive user input.

18. The method for real-time interactive graphical computing of claim 13, wherein the displaying of the executed instruction graphical representations includes displaying of at least one moving graphical image.

19. The method for real-time interactive graphical computing of claim 13, wherein for at least one executable instruction the associated user input includes a user gesture.

20. The method for real-time interactive graphical computing of claim 19, wherein for at least one of the at least one executable instruction, the executed instruction graphical representation includes a representation of the user gesture.

21. The method for real-time interactive graphical computing of claim 18, wherein the representation of the user gesture includes at least one displayed node of the abstract syntax tree moving in an analogous manner to the user gesture.

22. The method for real-time interactive graphical computing of claim 17, wherein the user gesture is input using at least one visual input system selected from the group of a touchscreen, a mouse, a keyboard, a brain-computer interface, an interactive whiteboard, and a virtual-reality input.

23. The method for real-time interactive graphical computing of claim 13, further comprising the step of compiling a plurality of the plurality of executable instructions into a compound executable instruction wherein executing the compound executable instruction results in the same results as executing the plurality of the plurality of executable instructions.

24. The method for real-time interactive graphical computing of claim 13, further comprising the step of performing at least one of converting commands from a programming language into executable instructions compatible with the system and converting executable instructions of the system into the programming language.

* * * * *